(12) United States Patent
Takemoto et al.

(10) Patent No.: US 9,083,216 B2
(45) Date of Patent: Jul. 14, 2015

(54) MOTOR AND METHOD FOR MANUFACTURING STATOR CORE AND ROTOR CORE OF MOTOR

(71) Applicant: ASMO CO., LTD., Shizuoka-ken (JP)

(72) Inventors: Yoshiaki Takemoto, Toyohashi (JP); Yoko Tateishi, Kosai (JP)

(73) Assignee: Asmo Co., Ltd., Shizuoka-ken (JP)

( * ) Notice: Subject to any disclaimer, the term of this patent is extended or adjusted under 35 U.S.C. 154(b) by 221 days.

(21) Appl. No.: 13/953,554

(22) Filed: Jul. 29, 2013

(65) Prior Publication Data

US 2014/0042851 A1 Feb. 13, 2014

(30) Foreign Application Priority Data

| Jul. 31, 2012 | (JP) | 2012-170326 |
| Oct. 24, 2012 | (JP) | 2012-235008 |
| Nov. 28, 2012 | (JP) | 2012-260169 |
| Nov. 28, 2012 | (JP) | 2012-260170 |
| Nov. 30, 2012 | (JP) | 2012-263667 |
| Jan. 22, 2013 | (JP) | 2013-009566 |
| Jun. 26, 2013 | (JP) | 2013-134346 |

(51) Int. Cl.
  H02K 16/00 (2006.01)
  H02K 1/24 (2006.01)
  H02K 1/14 (2006.01)
  H02K 15/02 (2006.01)
  H02K 21/14 (2006.01)
  H02K 21/22 (2006.01)
  H02K 1/27 (2006.01)

(52) U.S. Cl.
  CPC .............. *H02K 1/243* (2013.01); *H02K 1/145* (2013.01); *H02K 1/2713* (2013.01); *H02K 15/022* (2013.01); *H02K 21/145* (2013.01); *H02K 21/227* (2013.01); *H02K 2201/12* (2013.01); *H02K 2213/03* (2013.01); *Y10T 29/49012* (2015.01)

(58) Field of Classification Search
  USPC .................. 310/112, 114, 263, 257, 156.069, 310/156.73, 216.025–216.029
  See application file for complete search history.

(56) References Cited

U.S. PATENT DOCUMENTS

| 2001/0002095 A1 | 5/2001 | Sakamoto |
| 2006/0115259 A1* | 6/2006 | Ito et al. ........................... 396/75 |
| 2006/0208602 A1* | 9/2006 | Enomoto et al. ............... 310/257 |
| 2006/0250042 A1* | 11/2006 | Neet et al. ...................... 310/164 |
| 2007/0145834 A1* | 6/2007 | Usui ............................. 310/49 R |
| 2007/0152522 A1* | 7/2007 | Enomoto et al. ................. 310/80 |

(Continued)

FOREIGN PATENT DOCUMENTS

| JP | 5-43749 U | 6/1993 |
| JP | 2002-209370 A | 7/2002 |

*Primary Examiner* — Thanh Lam
(74) *Attorney, Agent, or Firm* — Christensen Fonder P.A.

(57) ABSTRACT

A motor includes a first, second, and third motor unit. First, second and third rotors each including a first and second rotor core and a field magnet. The first and second rotor cores include respectively first and second rotor core bases and a plurality of first and second claw magnetic poles that are arranged alternately along a circumferential direction of the motor. The field magnet causes the plurality of first claw magnetic poles and the plurality of second claw magnetic poles to function as different magnetic poles. Each of first and second stators including pluralities of first claw magnetic poles and second claw magnetic poles alternately arranged along the circumferential direction of the motor. The second stator core having a coil section.

20 Claims, 77 Drawing Sheets

(56) References Cited

U.S. PATENT DOCUMENTS

| | | | |
|---|---|---|---|
| 2007/0164628 A1* | 7/2007 | Fonseca et al. | 310/112 |
| 2007/0267929 A1* | 11/2007 | Pulnikov et al. | 310/156.02 |
| 2007/0284963 A1* | 12/2007 | Mukai et al. | 310/263 |
| 2007/0296285 A1* | 12/2007 | Enomoto et al. | 310/49 R |
| 2009/0102314 A1* | 4/2009 | Miyata et al. | 310/257 |

* cited by examiner

MOTOR AND METHOD FOR MANUFACTURING STATOR CORE AND ROTOR CORE OF MOTOR

BACKGROUND OF THE INVENTION

The present invention relates to a motor and a method for manufacturing a stator core and a rotor core of a motor.

The so-called Lundell structure permanent magnetic field rotor that includes two rotor cores and a field magnet is one example of a rotor for a motor (for example, refer to Japanese Laid-Open Utility Model Publication No. 5-43749). Each of the two rotor cores includes a plurality of claw magnetic poles arranged along a circumferential direction. The two rotor cores are coupled to each other. A field magnet is arranged between the two rotor cores so that the claw magnetic poles of the two rotor cores alternately function as different magnetic poles. In such a Lundell structure rotor, when changing the number of poles, the number of poles is changed without changing the structure of the field magnet. This allows for easy adaptation to changes in the number of the claw magnetic poles.

However, in a motor that employs the above rotor, to change the number of poles (number of slots) of a stator when the number of poles are changed in the rotor, for example, the shape of a stator core (number of teeth and the like) needs to be changed. In addition, the winding and the like of coils need to be changed. Accordingly, in a motor that employs the Lundell structure rotor, in addition to the rotor, it is desirable that the stator have a structure allowing for the number of poles to be easily changed and that the motor realizes a high output.

SUMMARY OF THE INVENTION

It is an object of the present invention to provide a motor and a method for manufacturing a stator core and a rotor core of the motor that allows for the number of poles to be easily changed and realizes a high output.

To achieve the above object, the present invention provides a motor including a first motor unit including a first rotor and a first stator, a second motor unit including a second rotor and a second stator, and a third motor unit including a third rotor and a third stator. The first motor unit, the second motor unit, and the third motor unit are arranged along an axial direction of the motor. The second rotor is arranged deviated from the first rotor in a first circumferential direction, and the third rotor is arranged deviated from the second rotor in the first circumferential direction. The second stator is arranged deviated from the first stator in a second circumferential direction that is opposite to the first circumferential direction, and the third stator is arranged deviated from the second stator in the second circumferential direction. Each of the first rotor, the second rotor, and the third rotor includes a first rotor core including a first rotor core base, which has the shape of an annular plate, and a plurality of first claw magnetic poles, which are arranged at equal intervals on an outer circumferential surface of the first rotor core base. A second rotor core includes a second rotor core base, which has the shape of an annular plate, and a plurality of second claw magnetic poles, which are arranged at equal intervals on an outer circumferential surface of the second rotor core base. A field magnet is arranged between the first and second rotor cores. Each of the plurality of first claw magnetic poles of the first rotor core includes a distal end projecting from the outer circumferential surface of the first rotor core base toward an outer side in a radial direction. Each of the plurality of first claw magnetic poles of the first rotor core is bent from the distal end and extended along the axial direction toward the field magnet. Each of the plurality of second claw magnetic poles of the second rotor core includes a distal end projecting from the outer circumferential surface of the second rotor core base toward an outer side in a radial direction. Each of the plurality of second claw magnetic poles of the second rotor core is bent from the distal end and extended along the axial direction toward the field magnet. The plurality of first claw magnetic poles of the first rotor core and the plurality of second claw magnetic poles of the second rotor core are alternately arranged along a circumferential direction of the motor. The field magnet is magnetized along the axial direction so that the plurality of first claw magnetic poles and the plurality of second claw magnetic poles function as different magnetic poles. Each of the first stator, the second stator, and the third stator includes a first stator core including a plurality of first claw magnetic poles arranged at equal intervals along the circumferential direction, a second stator core including a plurality of second claw magnetic poles arranged at equal intervals along the circumferential direction, and a coil section arranged between the first and second stator cores and wound along the circumferential direction of the motor. The plurality of first claw magnetic poles of the first stator core and the plurality of second claw magnetic poles of the second stator core are alternately arranged along the circumferential direction of the motor, and are configured to oppose the plurality of first claw magnetic poles of the first rotor core and the plurality of second claw magnetic poles of the second rotor core. The stator is configured so that, when the coil section is supplied with power, the plurality of first claw magnetic poles of the first stator core and the plurality of second claw magnetic poles of the second stator core become different magnetic poles and so that polarities thereof are switched.

BRIEF DESCRIPTION OF DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A first embodiment of a motor will now be described with reference to FIG. 1 to FIG. 12.

Figure 1:
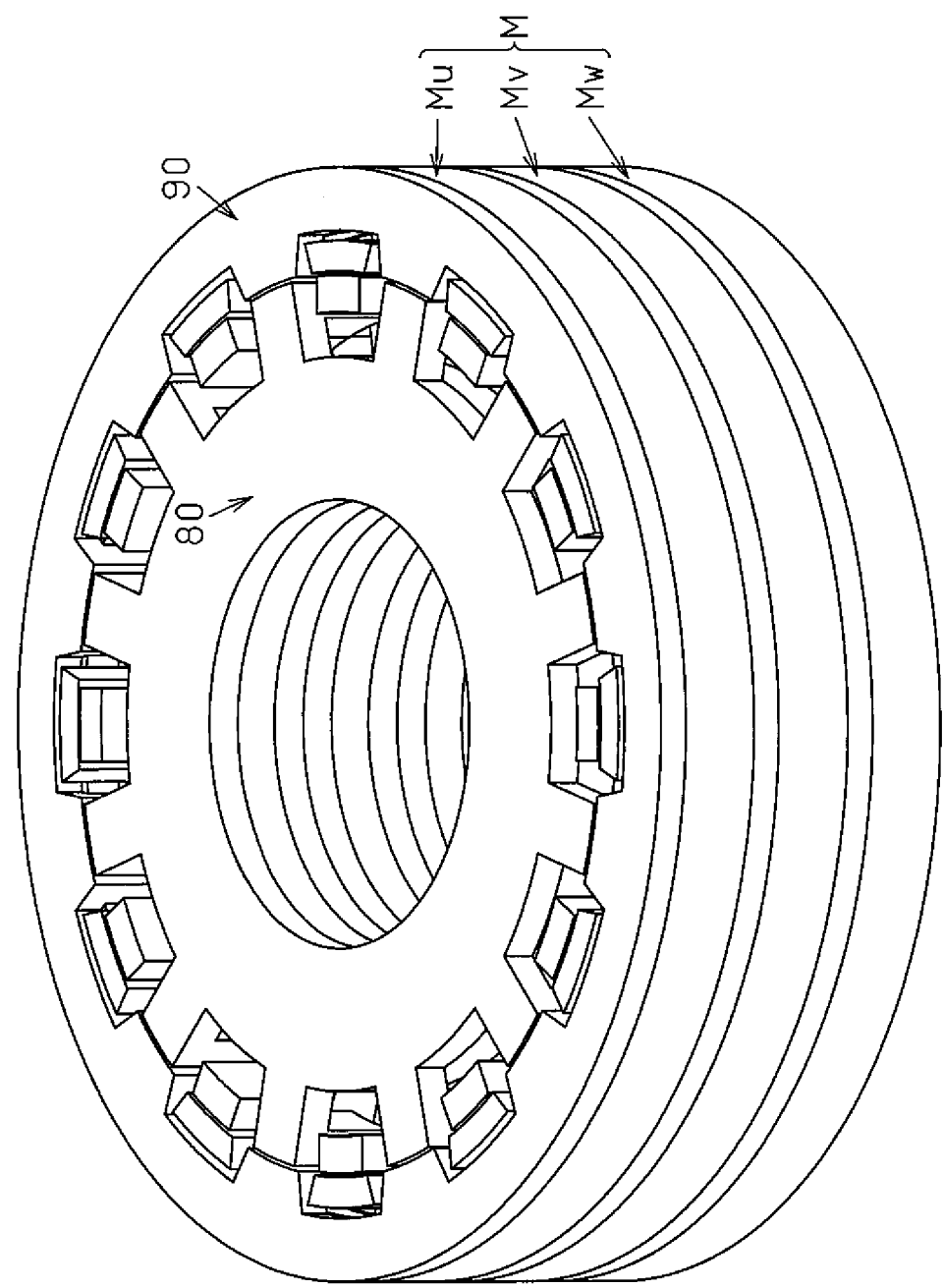
FIG. 1 is a perspective view of a motor according to a first embodiment of the present invention.

FIG. 1 is an overall perspective view of a brushless motor M, which serves as a motor of the present embodiment, and an annular stator 90, which is fixed to a motor housing (not shown) arranged on an outer side of a rotor 80 fixed to a rotation shaft (not shown).

Figure 2:
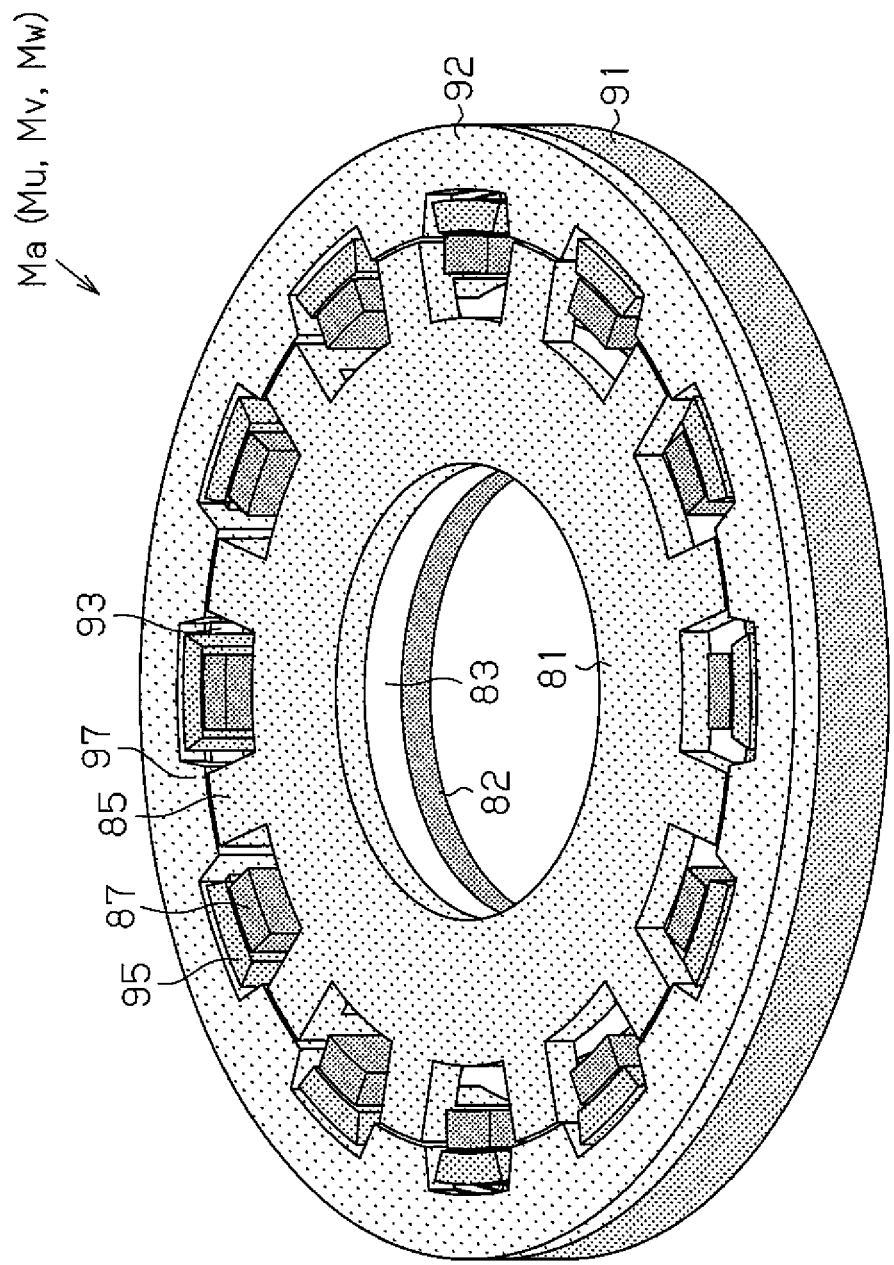
FIG. 2 is a perspective view of the single motor of FIG. 1.
Figure 3:
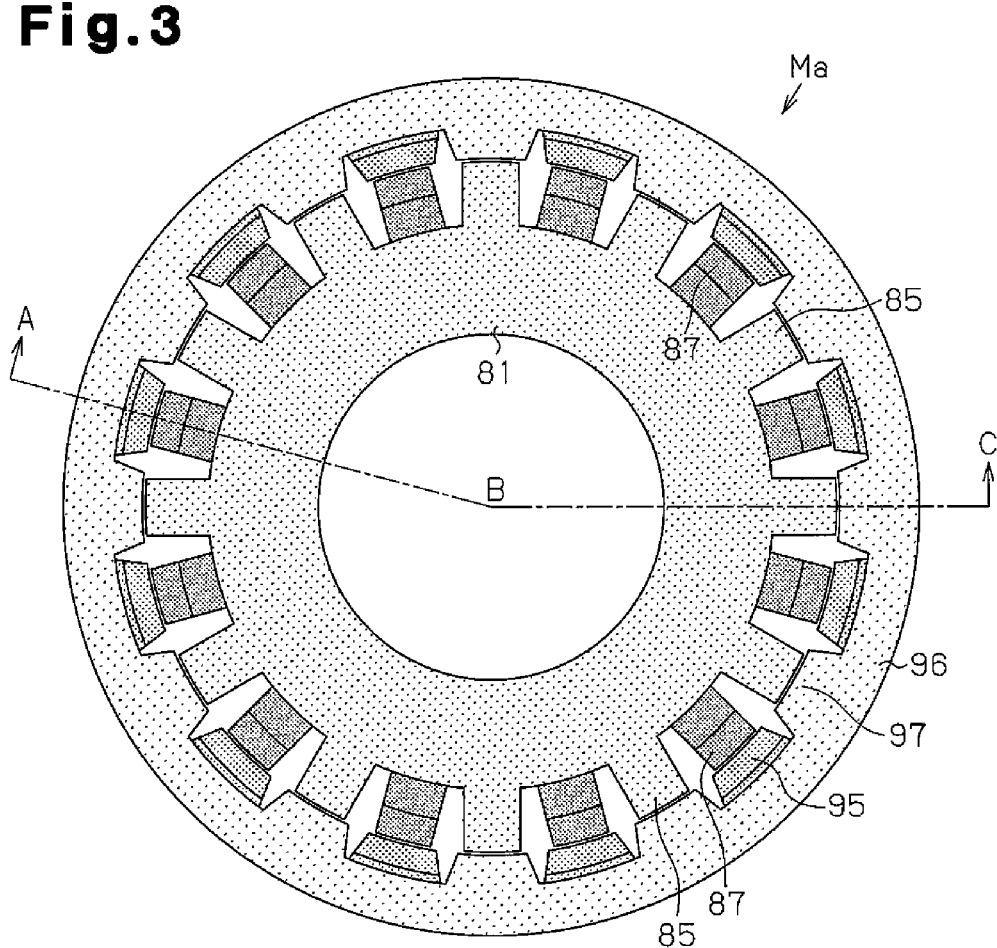
FIG. 3 is a front view taken from an axial direction of the single motor of FIG. 2.
Figure 4:
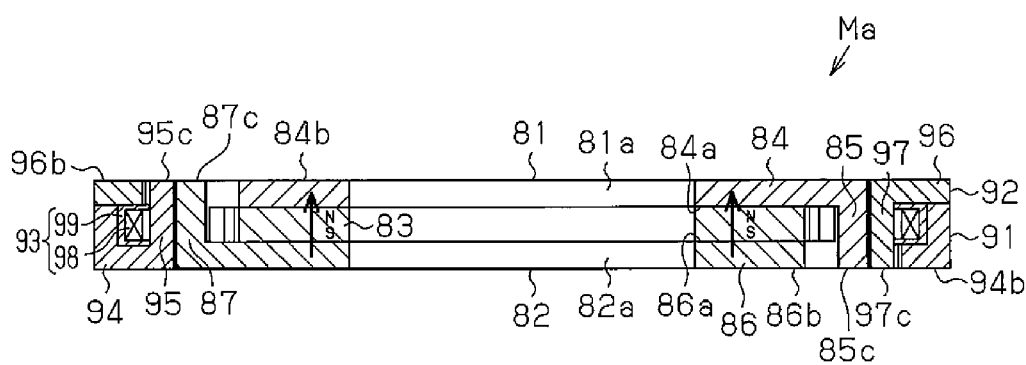
FIG. 4 is a combined cross-sectional view taken along line A-B-C in FIG. 3.

The brushless motor M includes single motors Ma stacked in three stages in an axial direction as shown in FIG. 2 to FIG. 4. In FIG. 1, the motors Ma include a U-phase motor unit (first motor unit) Mu, a V-phase motor unit (second motor unit) Mv, and a W-phase motor unit (third motor unit) Mw in this order from the top.

(Rotor 80)

Figure 5:
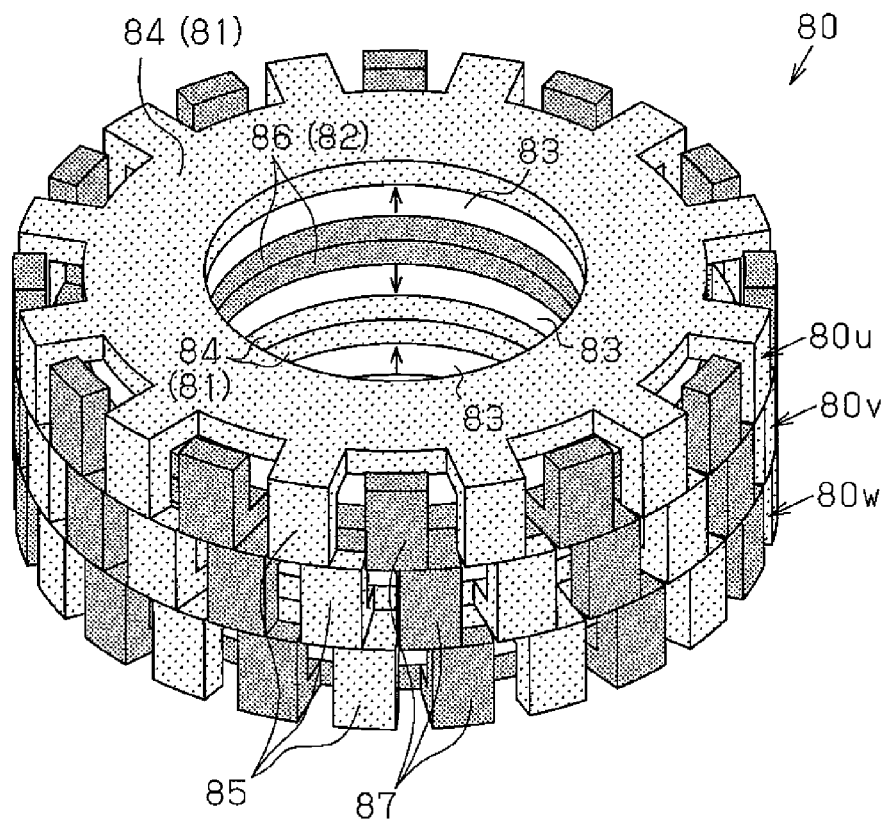
FIG. 5 is an overall perspective view of a rotor of FIG. 1.
Figure 6:
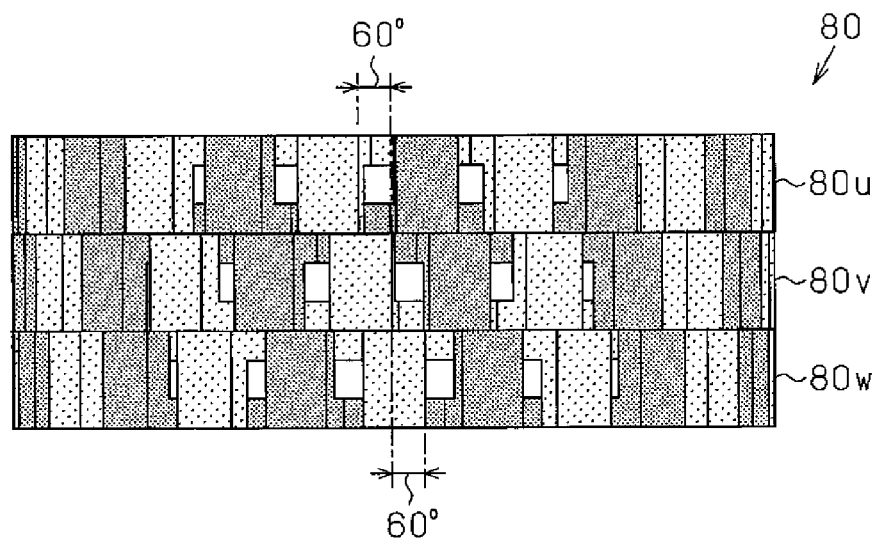
FIG. 6 is a front view taken from a radial direction of the rotor of FIG. 5.
Figure 7:
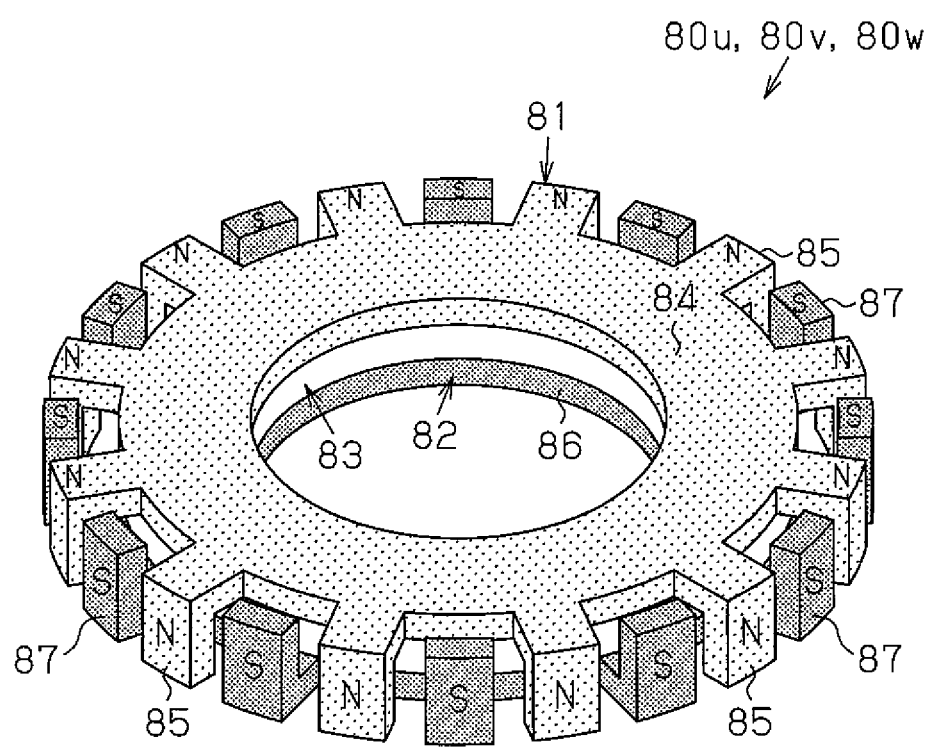
FIG. 7 is a perspective view of the single rotor of FIG. 5.
Figure 8:
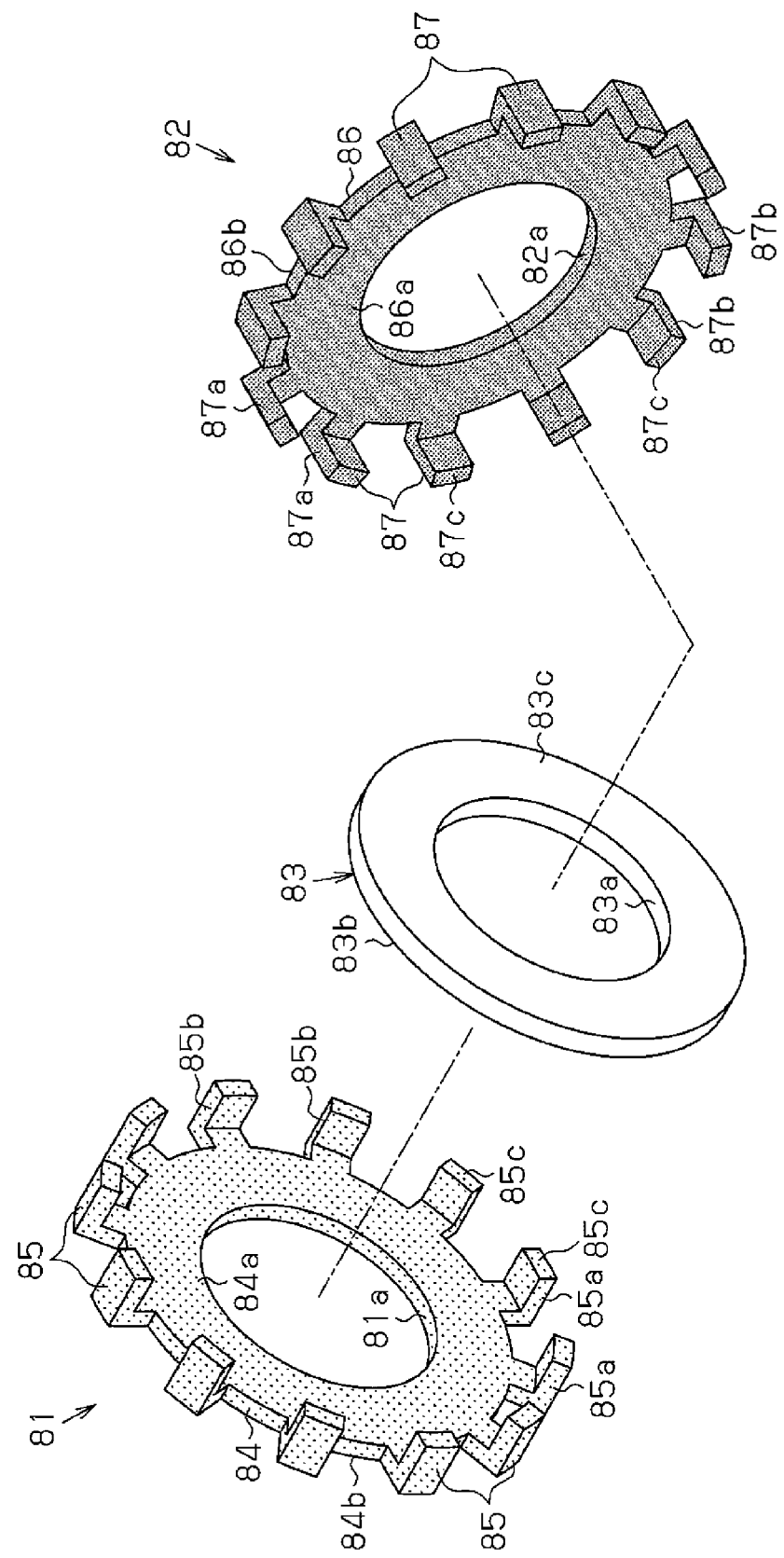
FIG. 8 is an exploded perspective view of the single rotor of FIG. 7.

As shown in FIG. 5 and FIG. 6, the rotor 80 includes three rotors, namely a U-phase rotor 80 (first rotor) u, a V-phase rotor (second rotor) 80v, and a W-phase rotor (third rotor) 80w. As shown in FIG. 7 and FIG. 8, each of the rotors 80u, 80v, 80w of the respective phases includes first and second rotor cores 81, 82 and a field magnet 83.

(First Rotor Core 81)

As shown in FIG. 8, the first rotor core 81 includes a first rotor core base 84 having the shape of an annular plate. A through hole 81a for inserting and fixing the rotation shaft (not shown) is formed at a center position of the first rotor core base 84. Further, twelve pieces of first rotor claw magnetic poles 85 serving as first claw magnetic poles are arranged at equal intervals on an outer circumferential surface of the first rotor core base 84. Each of the first rotor claw magnetic poles 85 projects outward in a radial direction and includes a distal end that is bent to extend toward the second rotor core 82 in the axial direction.

Circumferential end surfaces 85a, 85b of each of the first rotor claw magnetic poles 85 are flat surfaces extending in the radial direction (not being inclined relative to the radial direction as viewed in the axial direction), and each of the first rotor claw magnetic poles 85 includes a sector-shaped cross-section in a direction perpendicular to the axis.

An angle of each first rotor claw magnetic pole 85 in the circumferential direction, that is, an angle formed by the circumferential end surfaces 85a, 85b and a center axis of the rotation shaft (not shown) is smaller than an angle of a gap between a first rotor claw magnetic pole 85 and a first rotor claw magnetic pole 85 that are adjacent to each other.

(Second Rotor Core 82)

Referring to FIG. 8, the second rotor core 82 is formed from the same material and shaped identically to the first rotor core 81. A through hole 82a for inserting and fixing the rotation shaft (not shown) is formed at a center position of a second rotor core base 86 that is substantially disk-shaped. Further, twelve pieces of second rotor claw magnetic poles 87 serving as second claw magnetic poles are arranged at equal intervals on an outer circumferential surface of the second rotor core base 86. Each of the second rotor claw magnetic poles 87 projects outward in the radial direction and includes a distal end that is bent to extend toward the first rotor core 81 in the axial direction.

Circumferential end surfaces 87a, 87b of each of the second rotor claw magnetic poles 87 are flat surfaces extending in the radial direction, and each of the second rotor claw magnetic poles 87 includes a sector-shaped cross-section in the direction perpendicular to the axis.

An angle of each second rotor claw magnetic pole 87 in the circumferential direction, that is, an angle formed by the circumferential end surfaces 87a, 87b and the center axis of the rotation shaft (not shown) is smaller than an angle of a gap between a second rotor claw magnetic pole 87 and a second rotor claw magnetic pole 87 that are adjacent to each other.

Further, the second rotor core 82 is arranged and fixed relative to the first rotor core 81 such that the second rotor claw magnetic poles 87 of the second rotor core 82 are positioned between the first rotor claw magnetic poles 85 of the first rotor core 81 as viewed in the axial direction. Here, the second rotor core 82 is coupled to the first rotor core 81 such that the field magnet 83 is arranged between the first rotor core 81 and the second rotor core 82 in the axial direction.

More specifically, as shown in FIG. 4 and FIG. 8, the field magnet 83 is sandwiched between a surface (opposing surface 84a) of the first rotor core base 84 that opposes the second rotor core base 86 and a surface (opposing surface 86a) of the second rotor core base 86 that opposes the first rotor core base 84.

Here, since one end surface 85a of each first rotor claw magnetic pole 85 in the circumferential direction and the other end surface 87b of each second rotor claw magnetic pole 87 in the circumferential direction are formed to be parallel along the axial direction, a gap between the two end surfaces 85a, 87b is formed in a substantially linear shape along the axial direction. Further, since the other end surface 85b of each first rotor claw magnetic pole 85 in the circumferential direction and one end surface 87a of each second rotor claw magnetic pole 87 in the circumferential direction are formed to be parallel along the axial direction, a substantially straight gap is formed between the two end surfaces 85b, 87a along the axial direction.

(Field Magnet 83)

The field magnet 83 in the present embodiment is an annular plate-shaped permanent magnet formed of a ferrite magnet. As shown in FIG. 8, a through hole 83a for inserting the rotation shaft (not shown) is formed at a center position of the field magnet 83. Further, one side surface 83b of the field magnet 83 contacts the opposing surface 84a of the first rotor core base 84 and the other side surface 83c of the field magnet 83 contacts the opposing surface 86a of the second rotor core base 86, respectively, and the field magnet 83 is sandwiched and fixed between the first rotor core 81 and the second rotor core 82.

An outer diameter of the field magnet 83 is set to conform to outer diameters of the first and second rotor core bases 84, 86, and a thickness thereof is set to a predetermined thickness.

That is, as shown in FIG. 4, the field magnet 83 is arranged between the first rotor core 81 and the second rotor core 82. Here, distal end surfaces 85c of the first rotor claw magnetic poles 85 and a non-opposing surface 86b of the second rotor core base 86 are flush with one another, and distal end surfaces 87c of the second rotor claw magnetic poles 87 and a non-opposing surface 84b of the first rotor core base 84 are flush with one another.

As shown in FIG. 4, the field magnet 83 is magnetized along the axial direction such that the first rotor core 81 becomes an N pole and the second rotor core 82 becomes an S pole. Accordingly, the first rotor claw magnetic poles 85 of the first rotor core 81 function as N poles (first magnetic poles), and the second rotor claw magnetic poles 87 of the second rotor core 82 function as S poles (second magnetic poles) by the field magnet 83.

The U-phase rotor 80u, the V-phase rotor 80v and the W-phase rotor 80w form the so-called Lundell type structure rotors using the field magnet 83. Further, each of the rotors 80u, 80v, 80w forms a rotor with twenty-four poles (twelve pairs of pole numbers) in which the first rotor claw magnetic poles 85 functioning as the N poles and the second rotor claw magnetic poles 87 functioning as the S poles are alternately arranged in the circumferential direction.

Further, the U-phase, V-phase, and W-phase rotors 80u, 80v, 80w are stacked in the axial direction as shown in FIG. 5 and form the rotor 80.

Here, as shown in FIG. 4 and FIG. 7, when the first rotor core 81 is on an upper side and the second rotor core 82 is on a lower side relative to the field magnet 83 (configuration in which a magnetizing direction of the field magnet 83 is upward), the U-phase and W-phase rotors 80u, 80w are stacked facing frontward, and the V-phase rotor 80v is stacked facing backward. Thus, magnetizing directions of the field magnets 83 for the U-phase and W-phase rotors 80u, 80w are of the same direction as shown by arrows in FIG. 5 (upward in FIG. 5), and a magnetizing direction of the field magnet 83 for the V-phase rotor 80v is of an opposite direction relative to the magnetizing direction of the field magnets 83 of the U-phase and W-phase rotors 80u, 80w (downward in FIG. 5).

Further, the second rotor core bases 86 of the U-phase and V-phase rotors 80u, 80v are adjacent to each other in the axial direction, and portions of the field magnets 83 that are the S poles of the U-phase and V-phase rotors 80u, 80v oppose each other via the adjacent second rotor core bases 86. Further, the first rotor core bases 84 of the V-phase and W-phase rotors 80v, 80w are adjacent to each other in the axial direction, and portions of the field magnets 83 that are the N poles of the V-phase and W-phase rotors 80v, 80w oppose each other via the adjacent first rotor core bases 84.

Further, extending directions of the first rotor claw magnetic poles 85 of the U-phase and W-phase rotors 80u, 80w in the axial direction are of the same direction (downward in FIG. 5), and an extending direction of the first rotor claw magnetic poles 85 of the V-phase rotor 80v in the axial direction relative to the above direction is in an opposite direction (upward in FIG. 5). Distal ends of the U-phase first rotor claw magnetic poles 85 and the V-phase first rotor claw magnetic poles 85 in the axial direction contact each other in the axial direction.

In the same manner, extending directions of the second rotor claw magnetic poles 87 of the U-phase and W-phase rotors 80u, 80w in the axial direction are of the same direction (upward in FIG. 5), and an extending direction of the second rotor claw magnetic poles 87 of the V-phase rotor 80v in the axial direction relative to the above direction is in an opposite direction (downward in FIG. 5). Distal ends of the V-phase second rotor claw magnetic poles 87 and the W-phase second rotor claw magnetic poles 87 in the axial direction contact each other in the axial direction.

Further, as shown in FIG. 5 and FIG. 6, the U-phase rotor 80u, the V-phase rotor 80v, and the W-phase rotor 80w are stacked with their phases deviated by 60 degrees in electrical angle (5 degrees in mechanical angle).

More specifically, the V-phase rotor 80v is fixed to the rotation shaft with its phase deviated by 60 degrees in electrical angle from the U-phase rotor 80u in a counterclockwise direction (first circumferential direction). The W-phase rotor 80w is fixed to the rotation shaft with its phase deviated by 60 degrees in electrical angle from the V-phase rotor 80v in the counterclockwise direction.

(Stator 90)

Figure 9:
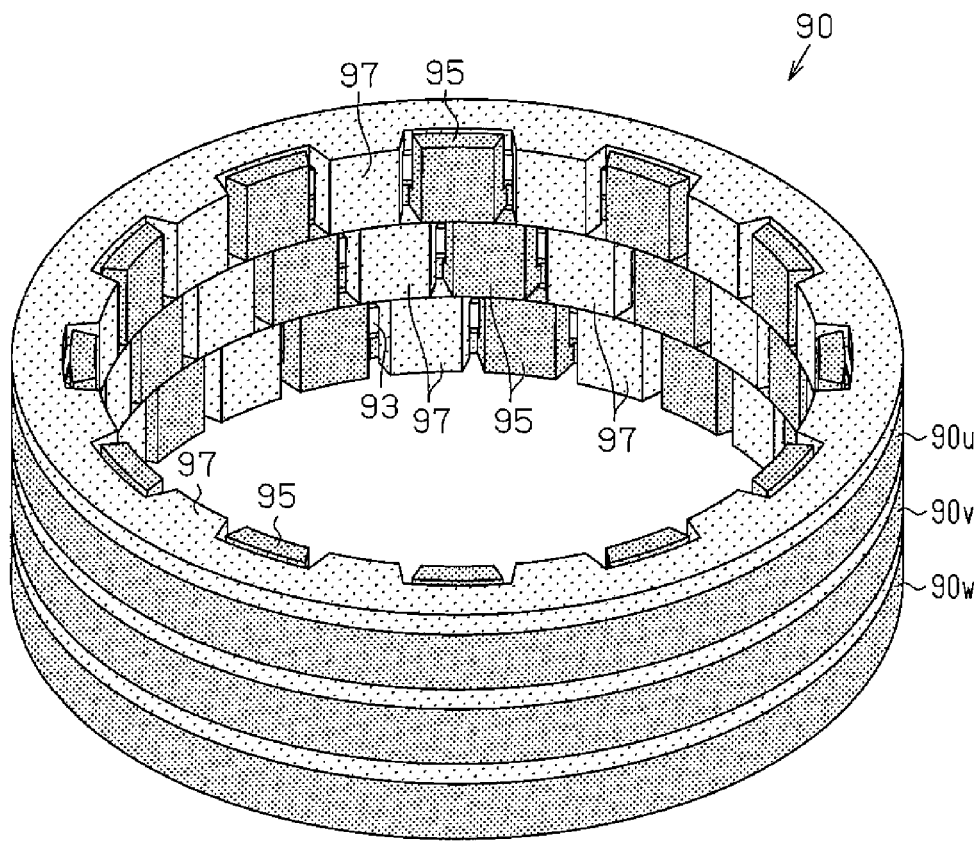
FIG. 9 is an overall perspective view of a stator of FIG. 1.
Figure 10:
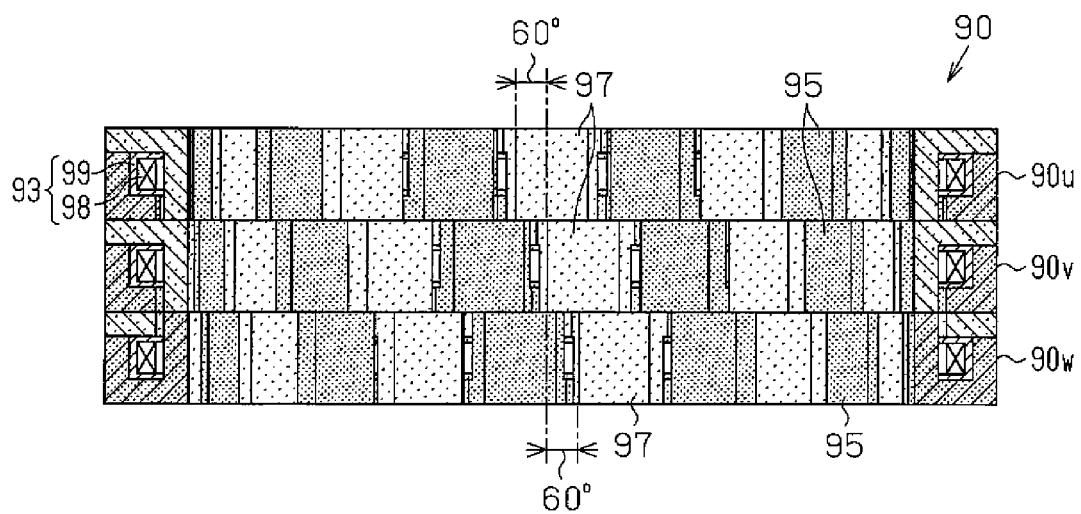
FIG. 10 is a cross-sectional view of the stator of FIG. 9.

As shown in FIG. 9 and FIG. 10, the stator 90 arranged on an outer side of the rotor 80 in the radial direction includes three stators, namely a U-phase stator (first stator) 90u, a V-phase stator (second stator) 90v, and a W-phase stator (third stator) 90w. The stators 90u, 90v, 90w of the respective phases are stacked in order in an axial direction so as to oppose the corresponding one of the U-phase rotor 80u, the V-phase rotor 80v, and the W-phase rotor 80w in the radial direction.

Figure 11:
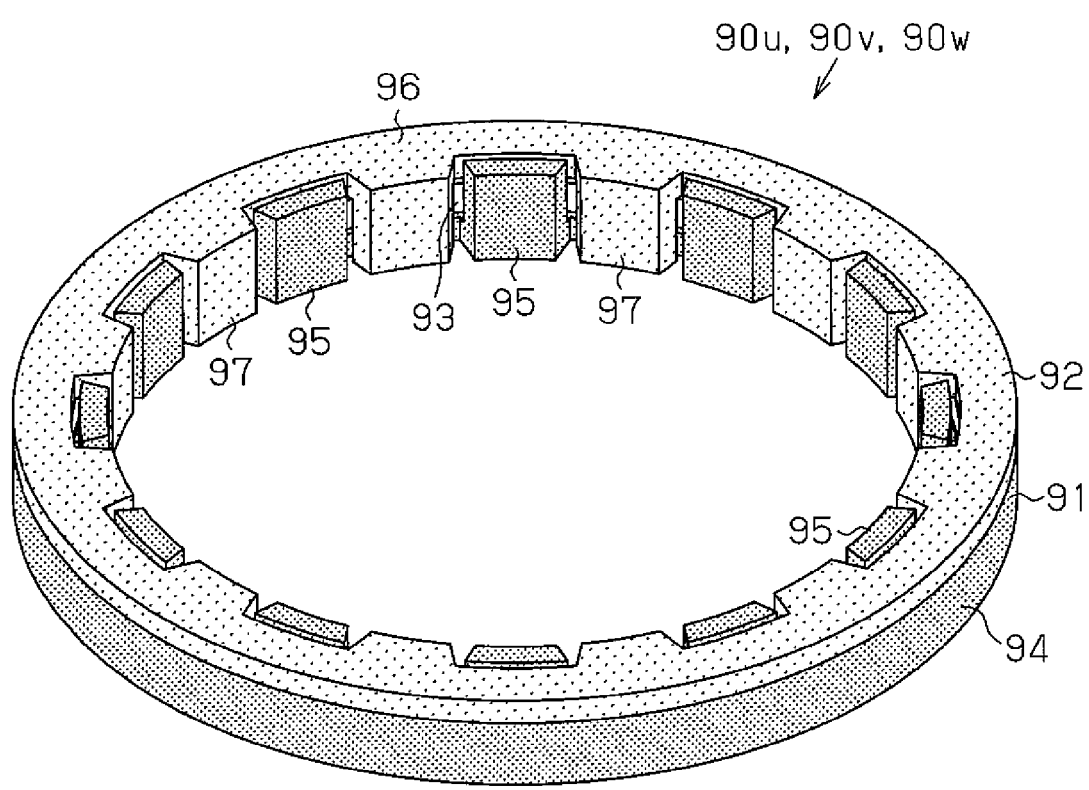
FIG. 11 is a perspective view of the single stator of FIG. 9.
Figure 12:
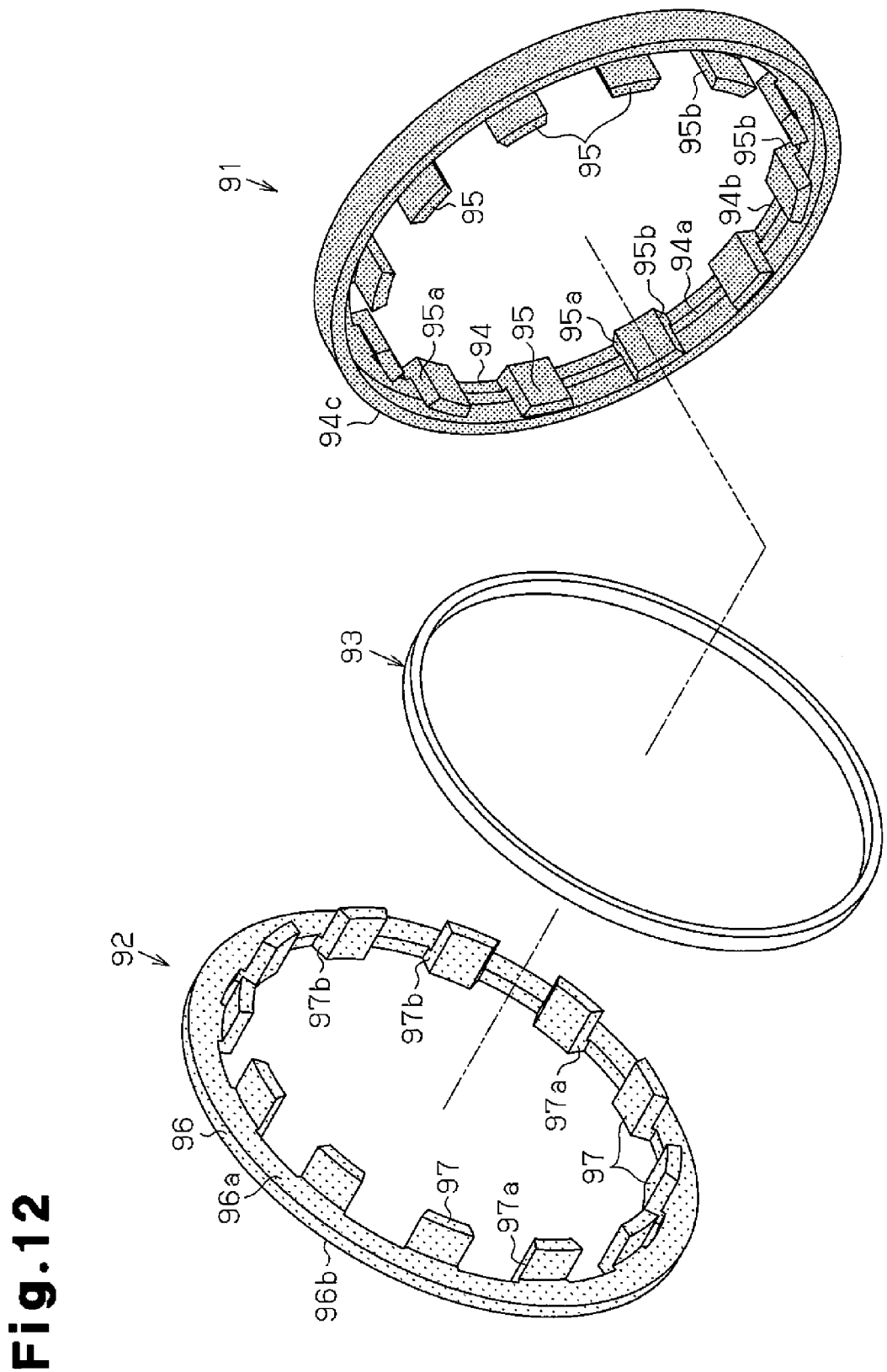
FIG. 12 is an exploded perspective view of the single stator of FIG. 11.

The stators 90u, 90v, 90w of the respective phases have identical structures, and as shown in FIG. 11 and FIG. 12, and each include first and second stator cores 91, 92, and a coil section 93.

(First Stator Core 91)

As shown in FIG. 12, the first stator core 91 includes an annular plate-shaped first stator core base 94, and a cylindrically-shaped cylindrical wall 94c is formed on an outer circumferential portion of the first stator core base 94 so as to extend toward the second stator core 92 in the axial direction. Further, twelve pieces of first stator claw magnetic poles 95 serving as first claw magnetic poles are arranged at equal intervals at an inner circumferential portion of the first stator core base 94, and each of the first stator claw magnetic poles 95 is formed to extend toward the second stator core 92 in the axial direction.

Circumferential end surfaces 95a, 95b of each of the first stator claw magnetic poles 95 are flat surfaces, and each of the first stator claw magnetic poles 95 includes a sector-shaped cross-section in the direction perpendicular to the axis.

An angle of each first stator claw magnetic pole 95 in the circumferential direction, that is, an angle formed by the circumferential end surfaces 95a, 95b and the center axis of the rotation shaft (not shown) is smaller than an angle of a gap between a first stator claw magnetic pole 95 and a first stator claw magnetic pole 95 that are adjacent to each other.

(Second Stator Core 92)

As shown in FIG. 12, the second stator core 92 includes an annular plate-shaped second stator core base 96, which is formed from the same material and shaped identically to the first stator core base 94. The second stator core base 96 is configured such that its outer circumferential portion contacts an annular distal end surface of the cylindrical wall 94c formed on the first stator core 91.

Further, twelve pieces of second stator claw magnetic poles 97 serving as second claw magnetic poles extend in equal intervals from an inner circumferential portion of the second stator core base 96 in the vicinity of the first stator core 91.

Circumferential end surfaces 97a, 97b of each of the second stator claw magnetic poles 97 are flat surfaces, and each of the second stator claw magnetic poles 97 includes a sector-shaped cross-section in the direction perpendicular to the axis.

An angle of each second stator claw magnetic pole 97 in the circumferential direction, that is, an angle formed by the circumferential end surfaces 97a, 97b and the center axis of the rotation shaft (not shown) is smaller than an angle of a gap between a second stator claw magnetic pole 97 and a second stator claw magnetic pole 97 that are adjacent to each other.

That is, the shape of the second stator core 92 is identical to a shape in which the cylindrical wall 94c is omitted from the first stator core 91.

Further, the second stator core 92 is arranged and fixed relative to the first stator core 91 such that each of the second stator claw magnetic poles 97 of the second stator core 92 is positioned between the first stator claw magnetic poles 95 of the first stator core 91 as viewed in the axial direction.

The second stator core 92 is coupled to the first stator core 91 such that the coil section 93 is arranged between the first stator core 91 and the second stator core 92 in the axial direction.

In further detail, as shown in FIG. 4 and FIG. 12, the coil section 93 is sandwiched between a surface (opposing surface 94a) of the first stator core base 94 that opposes the second stator core base 96 and a surface (opposing surface 96a) of the second stator core base 96 that opposes the first stator core base 94.

Here, since one end surface 95a of each first stator claw magnetic pole 95 in the circumferential direction and the other end surface 97b of each second stator claw magnetic pole 97 in the circumferential direction are formed to be parallel along the axial direction, a substantially straight gap is formed between the two end surfaces 95a, 97b along the axial direction. Further, since the other end surface 95b of each first stator claw magnetic pole 95 in the circumferential direction and one end surface 97b of each second stator claw magnetic pole 97 in the circumferential direction are formed to be parallel along the axial direction, a substantially straight gap between the two end surfaces 95b, 97a is formed along the axial direction.

(Coil Section 93)

As shown in FIG. 4, the coil section 93 has an annular wiring 98 and the annular wiring 98 is fitted in an annular coil bobbin 99. The coil bobbin 99 includes a U-shaped cross-section and has an open radially inner side. An outer diameter of the coil bobbin 99 is substantially equal to an inner diameter of the cylindrical wall 94c of the first stator core 91. A radially outer circumferential surface of the coil bobbin 99 contacts an inner circumferential surface of the cylindrical wall 94c. An inner diameter of the coil bobbin 99 is substantially equal to an outer diameter of the first stator claw magnetic poles 95 (second stator claw magnetic poles 97). A distal end surface of the coil bobbin 99 on the radially inner side contacts outer side surfaces of the first stator claw magnetic poles 95 and the second stator claw magnetic poles 97.

Further, an outer side surface of the coil bobbin 99 that opposes the first stator core 91 in the axial direction contacts the opposing surface 94a of the first stator core base 94, and an outer side surface of the coil bobbin 99 that opposes the second stator core 92 in the axial direction contacts the opposing surface 96a of the second stator core base 96.

A thickness of the coil bobbin 99 (length in the axial direction) is set to a predetermined thickness corresponding to a length of the first stator claw magnetic poles 95 (second stator claw magnetic poles 97) in the axial direction.

That is, as shown in FIG. 4, the coil bobbin 99 that is internally provided with the annular wiring 98 is arranged between the first stator core 91 and the second stator core 92. Here, distal end surfaces 95c of the first stator claw magnetic poles 95 and a non-opposing surface 96b of the second stator core base 96 are flush with one another, and distal end surfaces 97c of the second stator claw magnetic poles 97 and a non-opposing surface 94b of the first stator core base 94 are flush with one another.

Further, a length from the non-opposing surface 94b of the first stator core base 94 to the non-opposing surface 96b of the second stator core base 96 in the axial direction conforms to a length from a non-opposing surface 84b of the first rotor core base 84 to a non-opposing surface 86b of the second rotor core base 86 in the axial direction.

Accordingly, the length of the first stator claw magnetic poles 95 (second stator claw magnetic poles 97) in the axial direction conforms to the length of the first rotor claw magnetic poles 85 (second rotor claw magnetic poles 87) in the axial direction.

In FIG. 12, a drawn-out terminal of the annular wiring 98 and a terminal attaching portion of the coil bobbin 99 are omitted from the drawing to facilitate illustration. Accordingly, a cutout portion for externally extending a terminal attaching portion and formed in the cylindrical wall 94c of the first stator core 91 is also omitted from the drawing.

The U-phase, V-phase, and W-phase stators 90u, 90v, 90w each become a so-called Lundell type (claw-pole type) stator with twenty-four poles that excites the first and second stator claw magnetic poles 95, 97 to magnetic poles that are different from one another each time by the annular wiring 98 between the first and second stator cores 91, 92. Further, as shown in FIG. 9 and FIG. 10, the U-phase, V-phase, and W-phase stators 90u, 90v, 90w are stacked in the axial direction to form the stator 90.

Here, as shown in FIG. 9 and FIG. 10, in the stator 90 including the U-phase, V-phase, and W-phase stators 90u, 90v, 90w, the U-phase stator 90u, the V-phase stator 90v, and the W-phase stator 90w are stacked by deviating their phases by 60 degrees in electrical angle (5 degrees in mechanical angle).

More specifically, the V-phase stator 90v is fixed to a motor housing (not shown) with its phase deviated by 60 degrees in electrical angle in a clockwise direction (second circumferential direction) relative to the U-phase stator 90u. The W-phase stator 90w is fixed to the motor housing with its phase deviated by 60 degrees in electrical angle in the clockwise direction relative to the V-phase stator 90v.

That is, an inclined direction (see FIG. 6) relative to the axial direction formed by the deviation of the three rotors 80u, 80v, 80w when viewed in the radial direction and an inclined direction (see FIG. 10) relative to the axial direction formed by the deviations of the three stators 90u, 90v, 90w when viewed in the radial direction are arranged to be opposite to one another at the opposing surfaces of the rotor 80 and the stator 90.

Further, a U-phase power voltage of a three-phase AC power is applied to the annular wiring 98 of the U-phase stator 90u, a V-phase power voltage of the three-phase AC power is applied to the annular wiring 98 of the V-phase stator 90v, and a W-phase power voltage of the three-phase AC power is applied to the annular wiring 98 of the W-phase stator 90w.

Next, the operation of the brushless motor M will be described.

Now, a three-phase AC power voltage is applied to the stator 90. That is, the U-phase power voltage is applied to the annular wiring 98 of the U-phase stator 90u, the V-phase power voltage is applied to the annular wiring 98 of the V-phase stator 90v, and the W-phase power voltage is applied to the annular wiring 98 of the W-phase stator 90w, respectively. Thus, a rotating magnetic field is generated in the stator 90, and the rotor 80 is rotated and driven.

Here, the stator 90 includes the three-stage structure of the U-phase, V-phase, and W-phase stators 90u, 90v, 90w in correspondence with the three-phase AC power. Accordingly, the rotor 80 also has the three-stage structure of the U-phase, V-phase, and W-phase rotors 80u, 80v, 80w. Thus, in the stator and the rotor of each phase, the stator opposing the field magnet 83 along the axial direction can independently receive magnetic flux of the field magnet 83, and an increase in output can be achieved.

Further, with respect to the U-phase, V-phase, and W-phase stators 90u, 90v, 90w of the stator 90 deviated by 60 degrees in the electrical angle in the clockwise direction, the U-phase, V-phase, and W-phase rotors 80u, 80v, 80w of the rotor 80 are deviated by 60 degrees in the electrical angle in the counter-clockwise direction. That is, the inclined direction (see FIG. 6) relative to the axial direction formed by the deviation of the three rotors 80u, 80v, 80w when viewed in the radial direction and the inclined direction (see FIG. 10) relative to the axial direction formed by the deviation of the three stators 90u, 90v, 90w when viewed in the radial direction are arranged to be opposite to one another at the opposing surfaces of the rotor 80 and the stator 90.

Thus, the first and second rotor claw magnetic poles 85, 87 of the respective phases can suitably follow the switching of the first and second stator claw magnetic poles 95, 97 by the respective phase AC currents flowing in the annular wirings 98 of the respective phases, as a result of which a suitable rotation of the rotor 80 can be realized.

Further, in the present embodiment, the field magnet 83 of the V-phase rotor 80v has its magnetizing direction set opposite to the field magnets 83 of the U-phase and W-phase rotors 80u, 80w. Thus, both polarities of the V-phase field magnet 83 in the axial direction have the same polarities as the U-phase and W-phase field magnets 83 opposed in the axial direction, so the magnetic flux of the V-phase field magnet 83 becomes unlikely to leak to the U-phase and W-phase rotors 80u, 80w. As a result, the magnetic flux of the V-phase field magnet 83 suitably flows in the V-phase first and second rotor claw magnetic poles 85, 87.

Moreover, in the present embodiment, when a request to change the number of magnetic poles is made, since the U-phase, V-phase, and W-phase rotors 80u, 80v, 80w of the rotor 80 form the Lundell type structure, the number of the first and second rotor claw magnetic poles 85, 87 can be changed while maintaining the field magnets 83 in the identical structure. Thus, the change in the number of poles can easily be made. In the same manner, since the U-phase, V-phase, and W-phase stators 90u, 90v, 90w of the stator 90 form the claw-pole type structure, the number of the first and second stator claw magnetic poles 95, 97 can be changed while maintaining the coil sections 93 in the identical structure. Thus, the change in the number of poles can easily be made.

That is, the brushless motor of the present embodiment is capable of easily complying with a specification change in which the number of magnetic poles of the rotor 80 and the stator 90 are combined in various manners without accompanying a drastic change in design.

Next, advantages of the first embodiment will be described.

(1) According to the present embodiment, the stator 90 includes the three stage structure of the U-phase, V-phase, and W-phase stators 90u, 90v, 90w. Accordingly, the rotor 80 also includes the three stage structure of the U-phase, V-phase, and W-phase rotors 80u, 80v, 80w. Further, the three-phase AC power is applied to the stator 90. Moreover, in the stator and the rotor of each phase, since the stator that is opposing the field magnet 83 in the axial direction can individually receive the magnetic flux of the field magnet 83, the increase in the output of the brushless motor M can be achieved.

Further, since a deviation direction of the rotors 80u, 80v, 80w of each phase (each stage) in the circumferential direction and a deviation direction of the stators 90u, 90v, 90w of each phase (each stage) in the circumferential direction are opposite to one another, preferable rotation of the rotor 80 can be realized.

(2) In the present embodiment, the field magnet 83 of the V-phase rotor 80v has the magnetizing direction set opposite to the field magnets 83 of the U-phase and W-phase rotors 80u, 80w. According to this configuration, since both polarities of the V-phase field magnet 83 in the axial direction have the same polarities as the U-phase and W-phase field magnets 83 opposed in the axial direction, it becomes easier for the magnetic flux of the V-phase field magnet 83 to flow to the first and second rotor claw magnetic poles 85, 87 of the same phase. Thus, in the V-phase rotor 80v, the magnetic flux of the field magnet 83 acts in a preferable manner on the first and second rotor claw magnetic poles 85, 87. This realizes further preferable rotation of the rotor 80.

(3) According to the present embodiment, the rotors 80u, 80v, 80w of the respective phases of the rotor 80 are formed in the Lundell type structure, and the stators 90u, 90v, 90w of the respective phases of the stator 90 are formed in the claw-pole type structure. Accordingly, the number of poles can easily be changed by changing the number of the first and second rotor claw magnetic poles 85, 87 and the number of the first and second stator claw magnetic poles 95, 97 while maintaining the field magnet 83 and the coil section 93 in the identical configuration. As a result, the specification change in which the number of magnetic poles of the rotor 80 and the stator 90 are combined in various manners can be complied without accompanying the drastic change in design.

(4) According to the present embodiment, the coil section 93 of each of the stators 90u, 90v, 90w of the respective phases configuring the stator 90 has the annular wiring 98 wound annularly around the axis of the brushless motor M (circumferential direction). Thus, a height of the stator 90 (length in the axial direction) can be configured equal to the rotor 80 (since a so-called coil end portion is not generated), and making the brushless motor M small in the axial direction can be realized.

Second Embodiment

Next, a second embodiment of a motor will be described with reference to FIG. 13 to FIG. 21.

The features of the present embodiment are in first and second rotor claw magnetic poles 85, 87 and first and second stator claw magnetic poles 95, 97. The numbers of stages in a rotor 80 and a stator 90 and the numbers of polarities thereof are the same as the first embodiment. The features will be described in detail and common portions will not be described for the sake of brevity.

Figure 13:
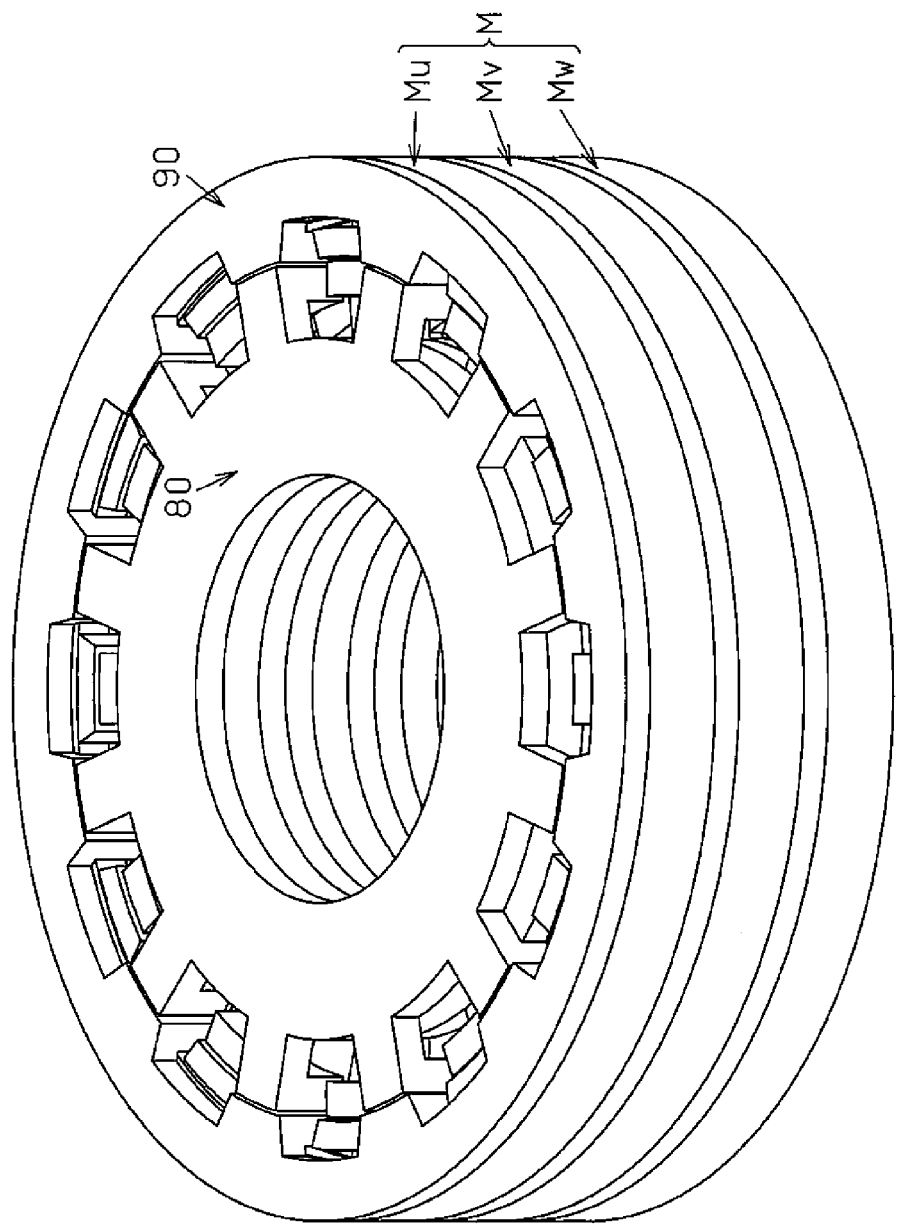
FIG. 13 is a perspective view of a motor according to a second embodiment of the present invention.

FIG. 13 is an overall perspective view of a brushless motor M of the present embodiment, and an annular stator 90 fixed to a motor housing (not shown) is arranged on an outer side of a rotor 80 fixed to a rotation shaft (not shown).

Figure 14:
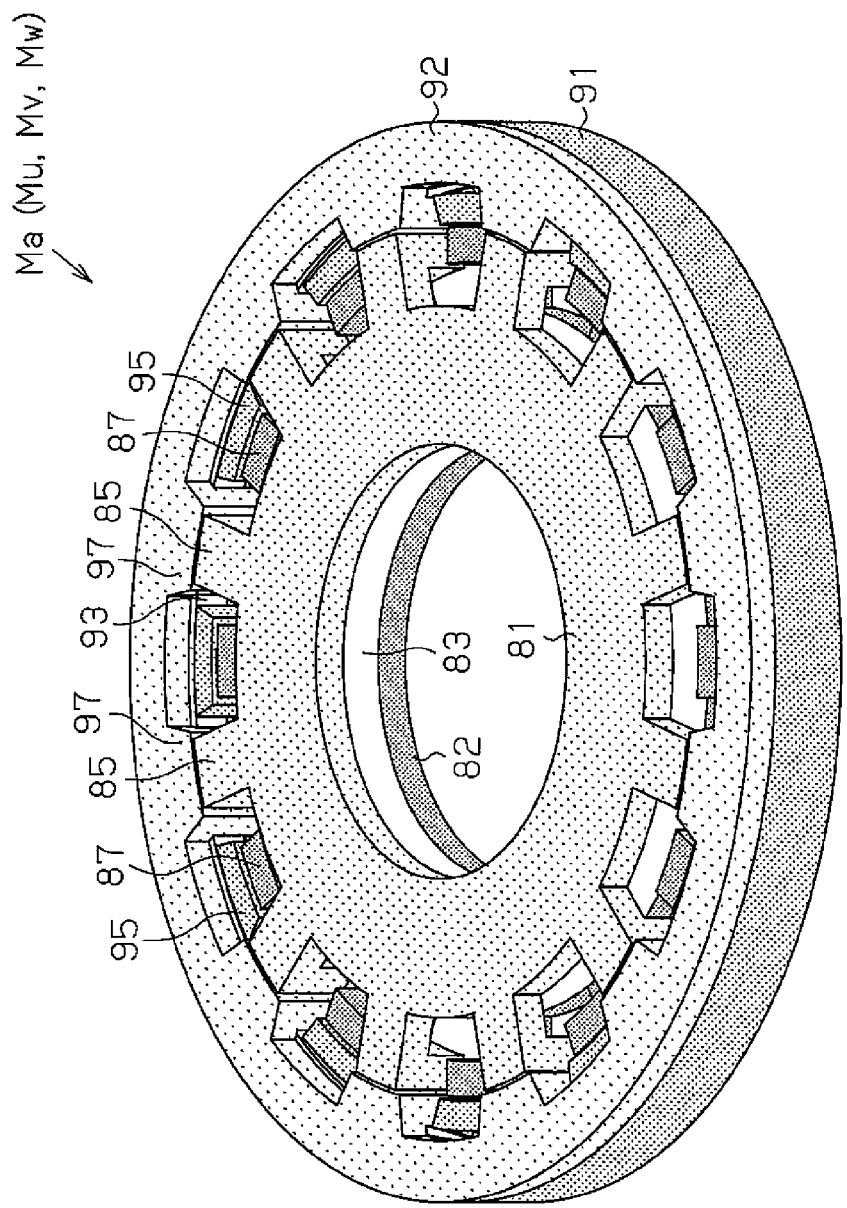
FIG. 14 is a perspective view of the single motor of FIG. 13.
Figure 15:
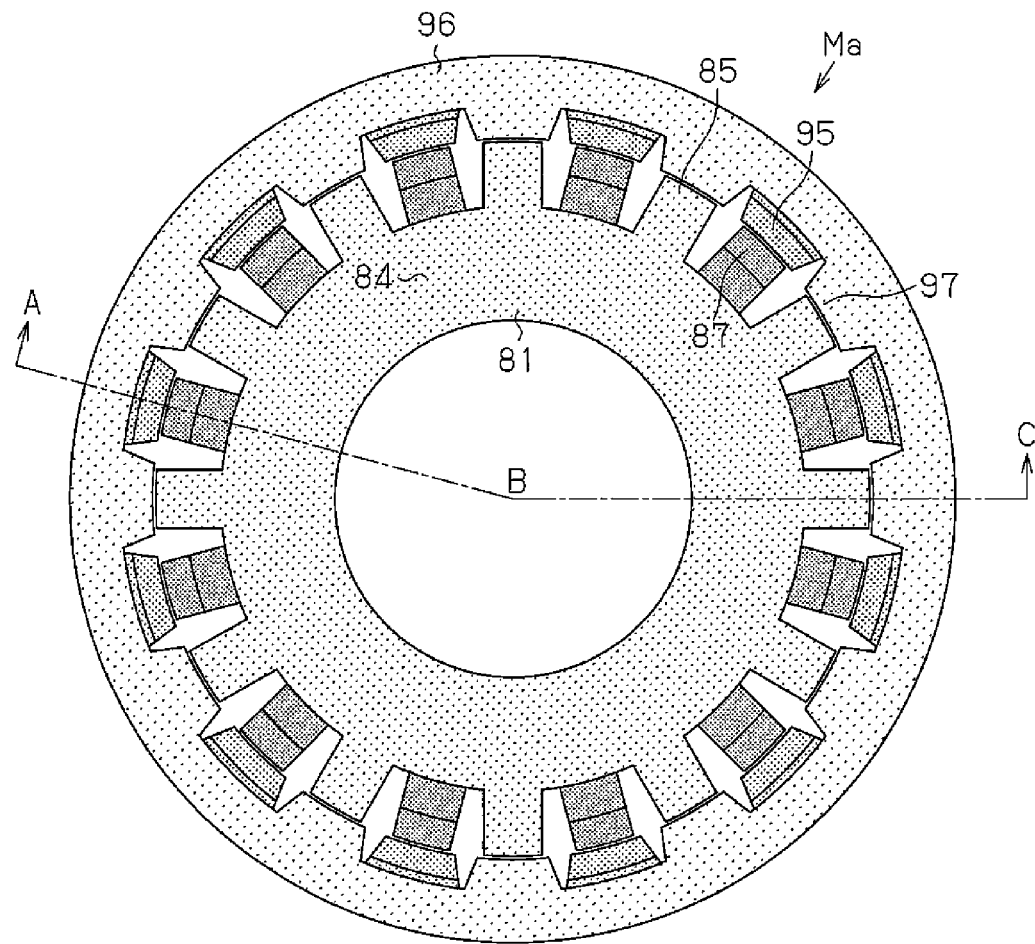
FIG. 15 is a front view taken from an axial direction of the single motor of FIG. 14.
Figure 16:
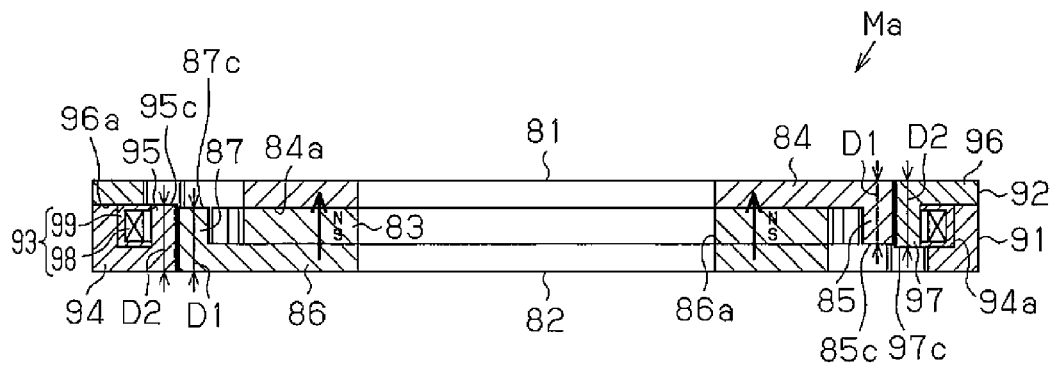
FIG. 16 is a combined cross-sectional view taken along line A-B-C in FIG. 15.

In the same manner as the first embodiment, the brushless motor M includes single motors Ma stacked in three stages in an axial direction as shown in FIG. 14, FIG. 15, and FIG. 16, and in FIG. 13. The motors Ma include a U-phase motor unit Mu, a V-phase motor unit Mv, and a W-phase motor unit Mw in this order from the top.

Figure 17:
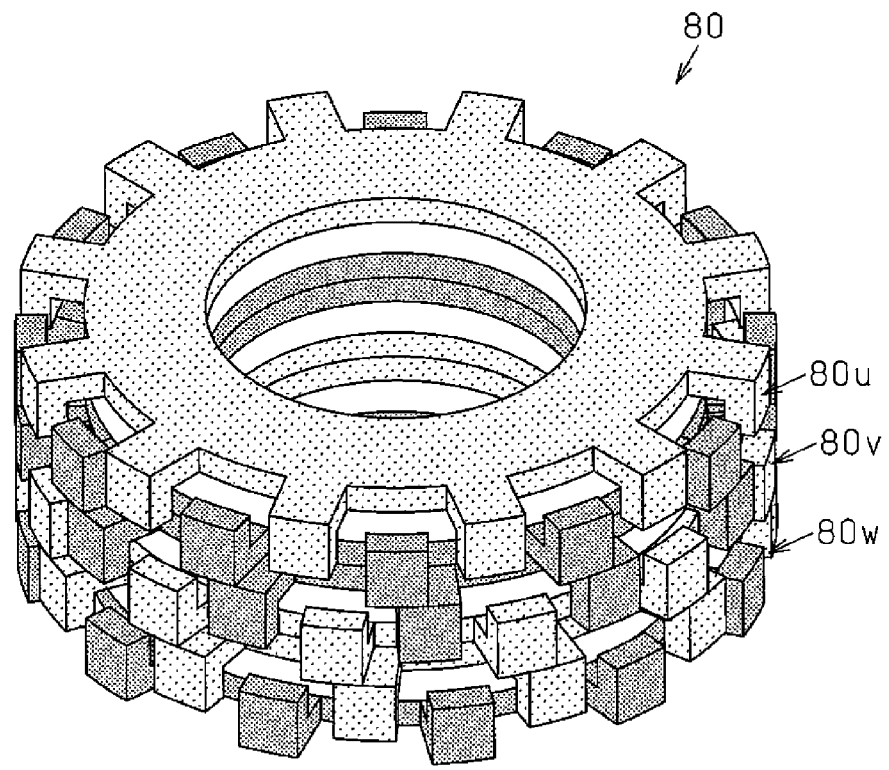
FIG. 17 is an overall perspective view of a rotor of FIG. 13.
Figure 18:
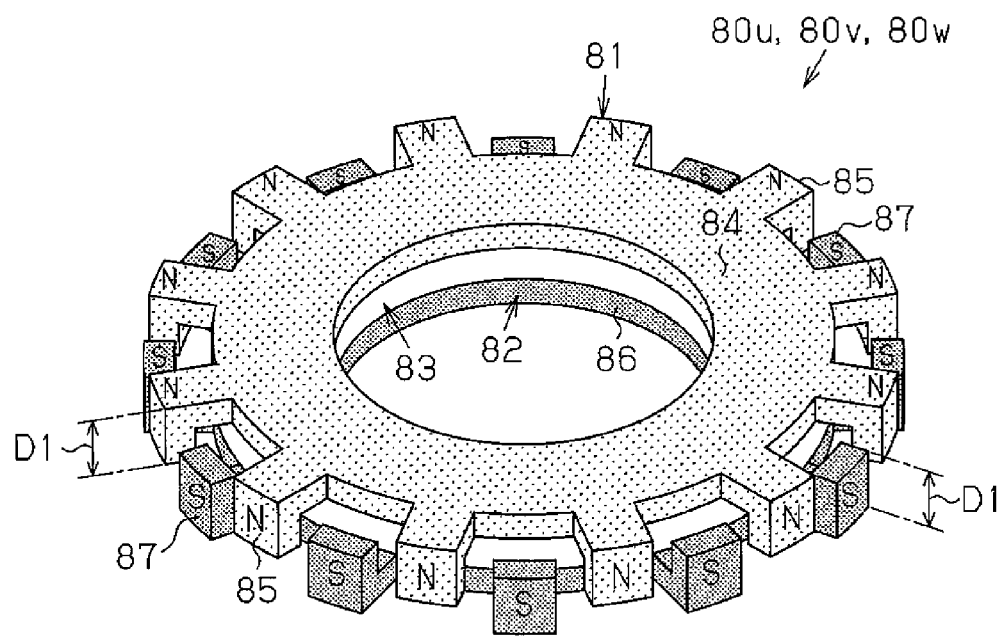
FIG. 18 is a perspective view of the single rotor of FIG. 17.

As shown in FIG. 17 and FIG. 18, a length D1 of first and second rotor claw magnetic poles 85, 87 in the axial direction formed on first and second rotor cores 81, 82 of each of a U-phase rotor 80$u$, a V-phase rotor 80$v$, and a W-phase rotor 80$w$ is shorter compared to the first embodiment.

More specifically, in the first embodiment, the first and second rotor claw magnetic poles 85, 87 have a length so that their distal end surfaces 85$c$, 87$c$ are flush with one another with the non-opposing surfaces 84$b$, 86$b$ of the first and second rotor core bases 84, 86.

In contrast, in the present embodiment, as shown in FIG. 16 and FIG. 18, the first and second rotor claw magnetic poles 85, 87 have the length by which their distal end surfaces 85$c$, 87$c$ are flush with opposing surfaces 84$a$, 86$a$ of the first and second rotor core bases 84, 86, respectively. That is, in the present embodiment, the length D1 of the first and second rotor claw magnetic poles 85, 87 in the axial direction is shorter by a thickness of the first and second rotor core bases 84, 86 in the axial direction.

Figure 19:
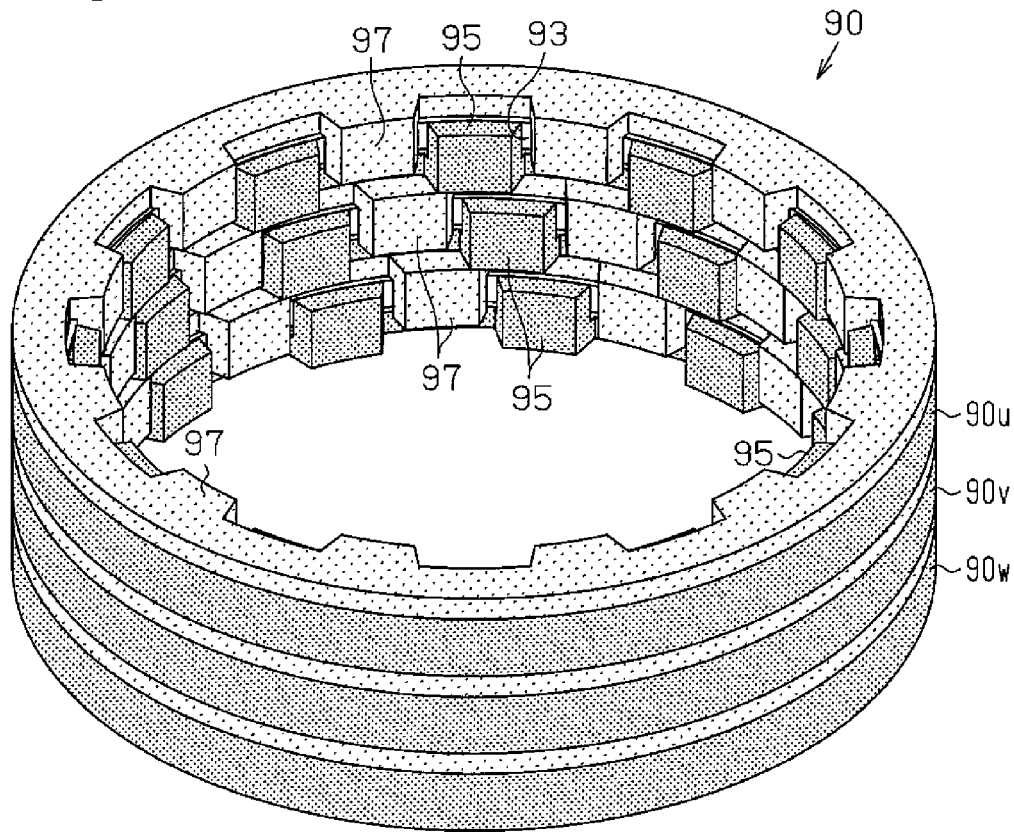
FIG. 19 is an overall perspective view of a stator of FIG. 13.
Figure 20:
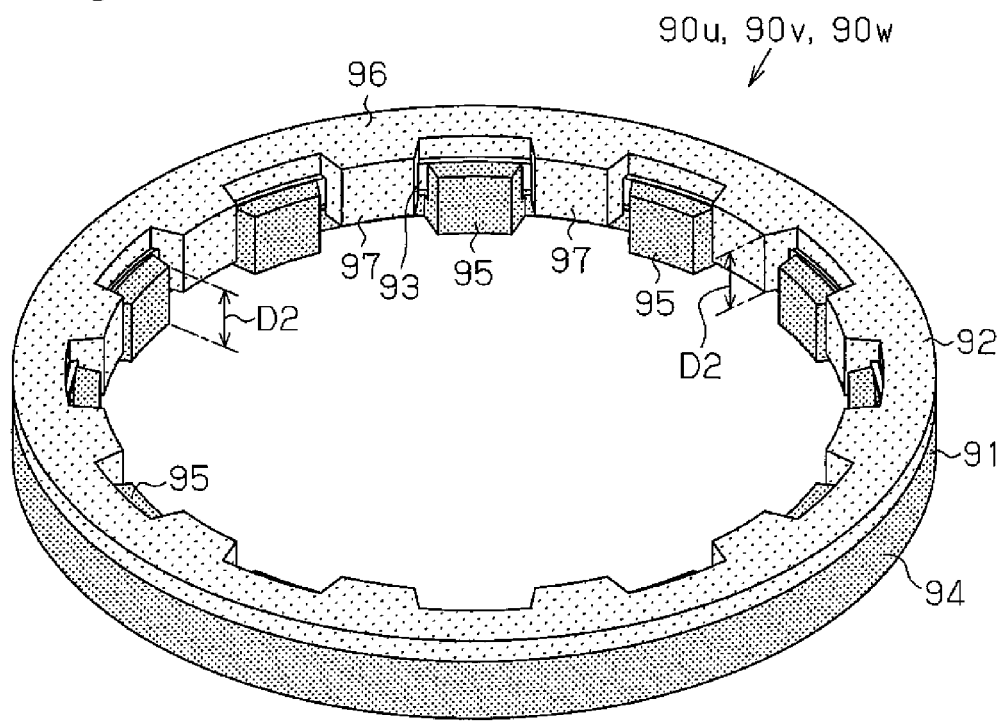
FIG. 20 is a perspective view of the single stator of FIG. 19.

In the same manner, as shown in FIG. 16, FIG. 19, and FIG. 20, a length D2 of the first and second stator claw magnetic poles 95, 97 in the axial direction formed on first and second stator cores 91, 92 of each of the U-phase stator 90$u$, the V-phase stator 90$v$, and the W-phase stator 90$w$ is shorter compared to the first embodiment.

More specifically, in the first embodiment, the first and second stator claw magnetic poles 95, 97 have the length by which their distal end surfaces 95$c$, 97$c$ are flush with one another with the non-opposing surfaces 94$b$, 96$b$ of the first and second stator core bases 94, 96.

In this regard, in the present embodiment, as shown in FIG. 16 and FIG. 18, the first and second stator claw magnetic poles 95, 97 have a length in which their distal end surfaces 95$c$, 97$c$ are flush with opposing surfaces 94$a$, 96$a$ of the first and second stator core bases 94, 96, respectively. That is, in the present embodiment, the length D2 of the first and second stator claw magnetic poles 95, 97 in the axial direction is shorter by a thickness of the first and second stator core bases 94, 96 in the axial direction.

Next, the operation of the brushless motor M will be described.

Now, when a three-phase AC power voltage is applied to the stator 90, like in the first embodiment, a U-phase power voltage is applied to an annular wiring 98 of the U-phase stator 90$u$, a V-phase power voltage is applied to an annular wiring 98 of the V-phase stator 90$v$, and a W-phase power voltage is applied to an annular wiring 98 of the W-phase stator 90$w$. Thus, a rotating magnetic field is generated in the stator 90, and the rotor 80 is rotated and driven.

Here, as shown in FIG. 19, the stator 90 includes the three stage structure of the U-phase, V-phase, and W-phase stators 90$u$, 90$v$, 90$w$ in correspondence with the three-phase AC power. Accordingly, the rotor 80 also includes the three stage structure of the U-phase, V-phase, and W-phase rotors 80$u$, 80$v$, 80$w$. Thus, in the stator and the rotor of each phase, the stator opposing the field magnet 83 along the axial direction can independently receive magnetic flux of the field magnet 83, and an increase in output can be achieved.

In addition, the length D2 of the first and second stator claw magnetic poles 95, 97 in the axial direction is shortened in the U-phase, V-phase, and W-phase stators 90$u$, 90$v$, 90$w$ of the three-stage structure.

That is, in the U-phase, V-phase, and W-phase stators 90$u$, 90$v$, 90$w$, each of the first stator claw magnetic poles 95 are separated from one another, and each of the second stator claw magnetic poles 97 are separated from one another. As a result, short circuiting of the magnetic flux between the first stator claw magnetic poles 95 of the different phases is suppressed, and short circuiting of the magnetic flux between the second stator claw magnetic poles 97 of the different phases is suppressed.

In the same manner, the length D1 of the first and second rotor claw magnetic poles 85, 87 in the axial direction is shortened in the U-phase, V-phase, and W-phase rotors 80$u$, 80$v$, 80$w$ of the three-stage structure.

Thus, the first rotor claw magnetic poles 85 of the U-phase rotor 80$u$ and the first rotor claw magnetic poles 85 of the V-phase rotor 80$v$ are separated from one another in the axial direction, and the second rotor claw magnetic poles 87 of the V-phase rotor 80$v$ and the second rotor claw magnetic poles 87 of the W-phase rotor 80$w$ are separated from one another in the axial direction. As a result, short circuiting of the magnetic flux between the first rotor claw magnetic poles 85 of the U-phase and V-phase is suppressed, and short circuiting of the magnetic flux between the second rotor claw magnetic poles 87 of the V-phase and W-phase is suppressed.

In this manner, since a space is opened between specific claw magnetic poles and the short circuiting of the magnetic flux is suppressed, a magnetic circuit necessary for generation of torque is formed and it becomes possible to form the brushless motor M with high torque.

Here, an experiment was conducted to verify a magnitude of generated torque in the brushless motor M of the present embodiment and the brushless motor M of the first embodiment. In conducting the experiment, same conditions were applied except for the length D1 of the first and second rotor claw magnetic poles 85, 87 of the respective phases in the axial direction being shortened and the length D2 of the first and second stator claw magnetic poles 95, 97 of the respective phases in the axial direction being shortened.

Figure 21:
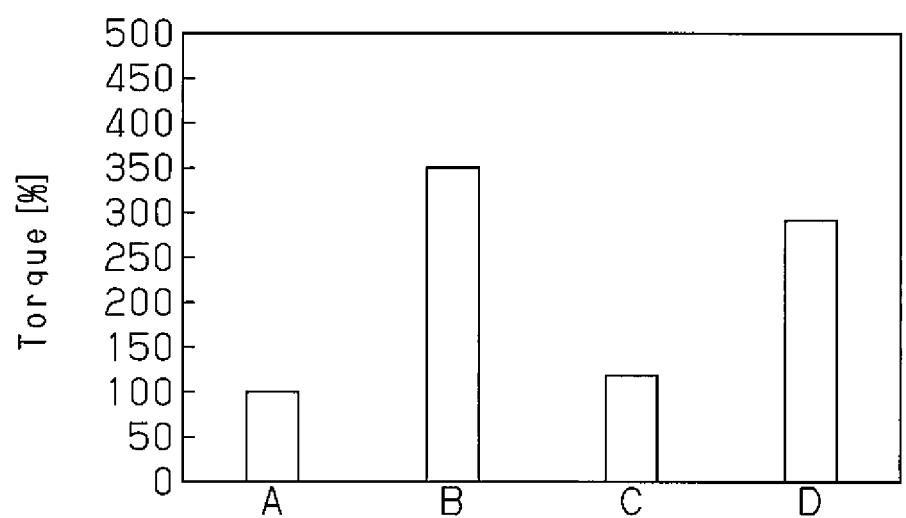
FIG. 21 is a graph comparing the torque with different lengths of the claw magnetic poles of the rotor and the stator.

FIG. 21 is a graph showing a comparison of the torque obtained from the experiment. The horizontal axis indicates types of the first and second stator claw magnetic poles and the first and second rotor claw magnetic poles. "A" denotes the brushless motor M of the first embodiment, and "B" denotes the brushless motor M of the present embodiment. A vertical axis is the torque, and is indicated in percentages with the torque of the brushless motor M of the first embodiment as a reference (100%).

As apparent from FIG. 21, it has been found that the torque of "B" (brushless motor M of the present embodiment) becomes larger than that of "A" (brushless motor M of the first embodiment) by 300% (three times larger).

When a brushless motor in which the length D1 of the first and second rotor claw magnetic poles 85, 87 of the respective phases in the axial direction is shortened in the same manner as of the present embodiment and the length D2 of the first and second stator claw magnetic poles 95, 97 of the respective phases in the axial direction is shortened like the first embodiment, generated torque thereof was experimented and obtained. The result of the experiment is shown by "C" in the horizontal axis.

As apparent from FIG. 21, the torque of "C" was larger, namely about 120%, relative to 100% of "A".

Further, when a brushless motor in which the length D2 of the first and second stator claw magnetic poles 95, 97 of the respective phases in the axial direction is shortened like the present embodiment and the length D1 of the first and second rotor claw magnetic poles 85, 87 of the respective phases in the axial direction is also shortened like the first embodiment, the generated torque was obtained through experiments. A result of the experiment is shown by "D" in the horizontal axis.

As is apparent from FIG. 21, the torque of "D" was larger, namely about 290%, relative to 100% of "A".

It can be understood accordingly that higher torque can be realized than in the brushless motor M of the first embodiment by shortening at least one of the length D2 of the first and second stator claw magnetic poles 95, 97 of the respective phases in the axial direction or the length D1 of the first and second rotor claw magnetic poles 85, 87 of the respective phases in the axial direction.

Moreover, in the present embodiment, like in the first embodiment, when a request to change the number of magnetic poles is made, since the U-phase, V-phase, and W-phase rotors 80u, 80v, 80w of the rotor 80 form the Lundell type structure, the number of poles can easily be changed by simply changing the number of the first and second rotor claw magnetic poles 85, 87 while maintaining the field magnets 83 in the same structure. In the same manner, since the U-phase, V-phase, and W-phase stators 90u, 90v, 90w of the stator 90 form a claw-pole type structure, the number of poles can easily be changed just by changing the number of the first and second stator claw magnetic poles 95, 97 while maintaining the coil sections 93 in the same structure.

As described above in detail, the present embodiment has the following advantages in addition to the advantages of the first embodiment.

According to the present embodiment, the length D2 of the first and second stator claw magnetic poles 95, 97 of the respective phases in the axial direction and the length D1 of the first and second rotor claw magnetic poles 85, 87 of the respective phases in the axial direction are respectively made shorter. Further, since the short circuiting of the magnetic flux is suppressed by opening the space between the specific claw magnetic poles, and the magnetic circuit necessary for the generation of torque is formed, it becomes possible to realize the brushless motor M with high torque.

Third Embodiment

Next, a third embodiment of a motor will be described with reference to FIG. 22 to FIG. 32.

In the present embodiment, the features are in first and second rotor claw magnetic poles 85, 87, while the numbers of stages in a rotor 80 and a stator 90 and the numbers of polarities thereof are the same as the second embodiment. The features will be described in detail and common portions will not be described for the sake of brevity.

Figure 22:
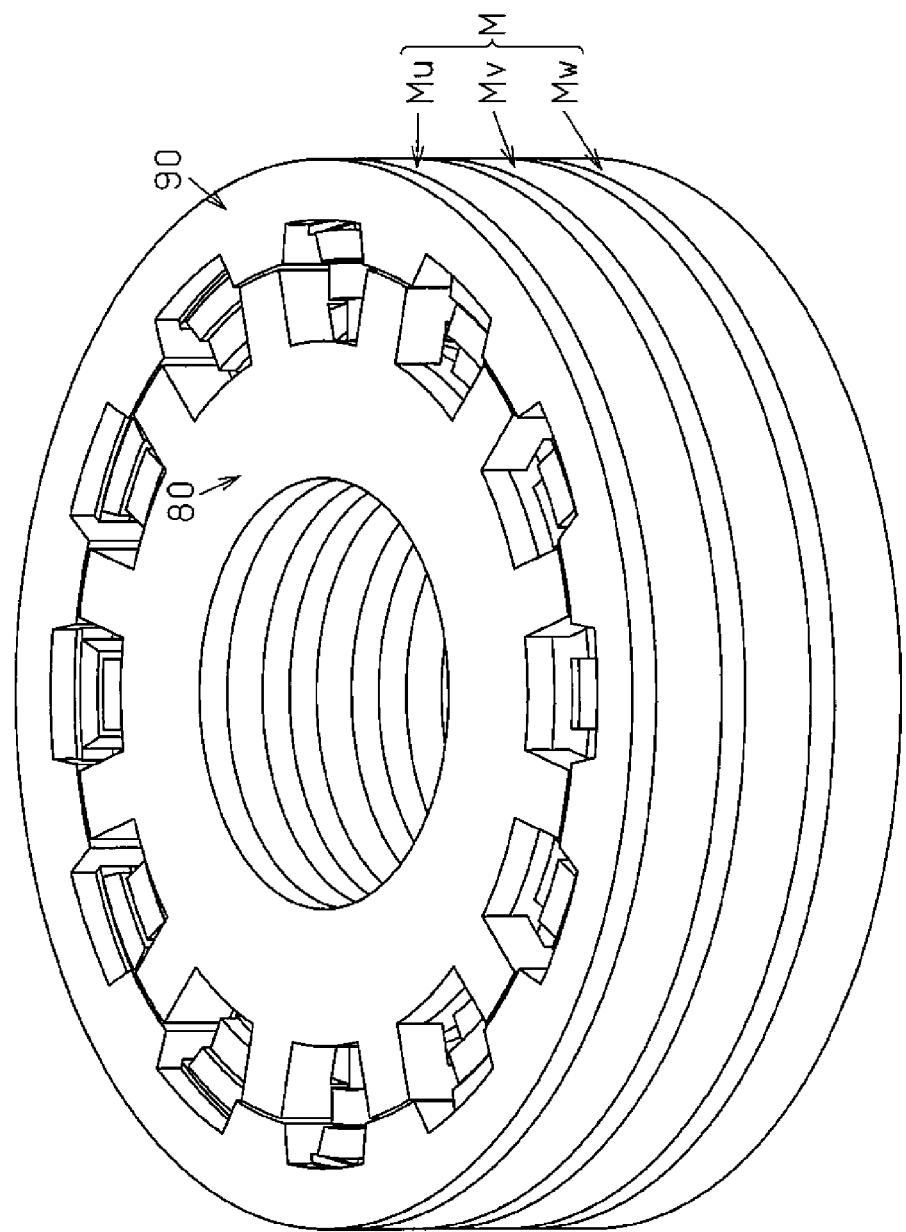
FIG. 22 is a perspective view of a motor according to a third embodiment of the present invention.

FIG. 22 is an overall perspective view of a brushless motor M of the present embodiment, and the annular stator 90 fixed to a motor housing (not shown) is arranged on an outer side of the rotor 80 fixed to a rotation shaft (not shown).

Figure 23:
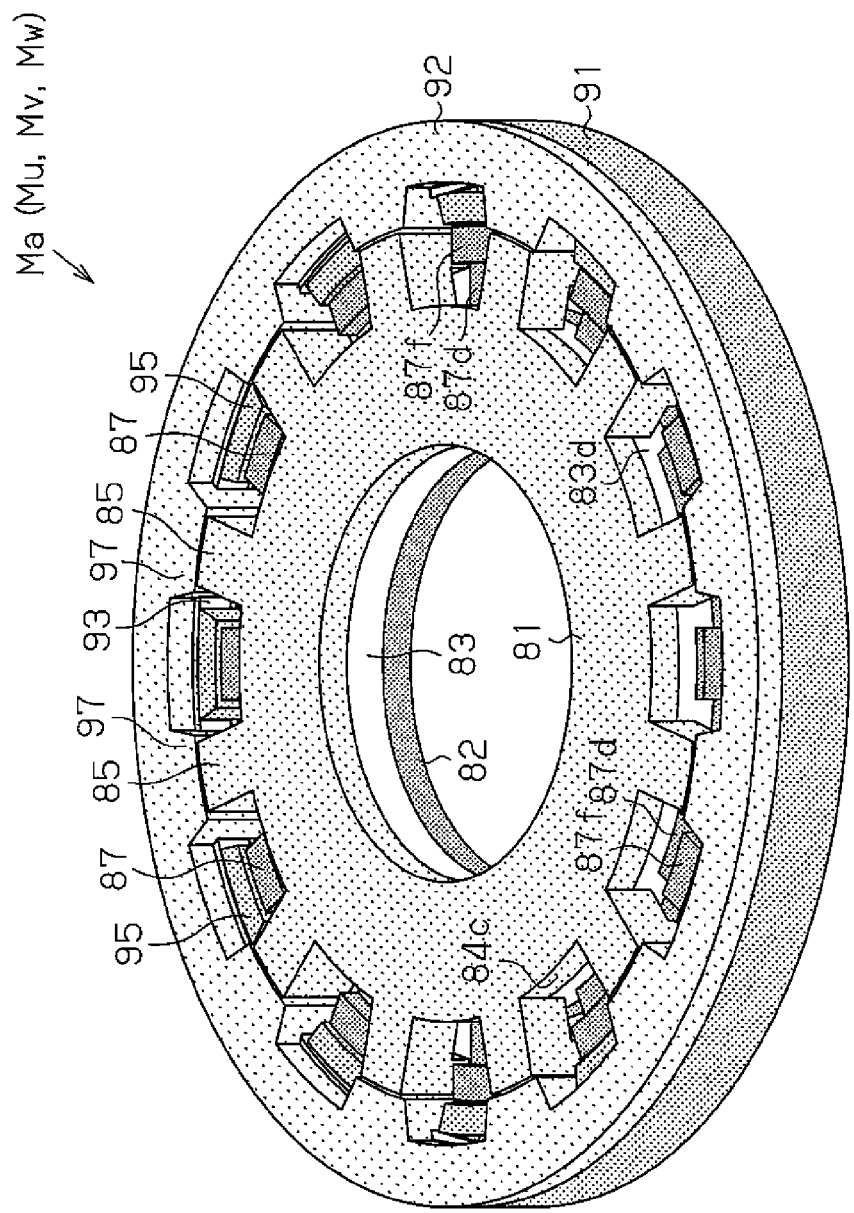
FIG. 23 is a perspective view of the single motor of FIG. 22.
Figure 24:
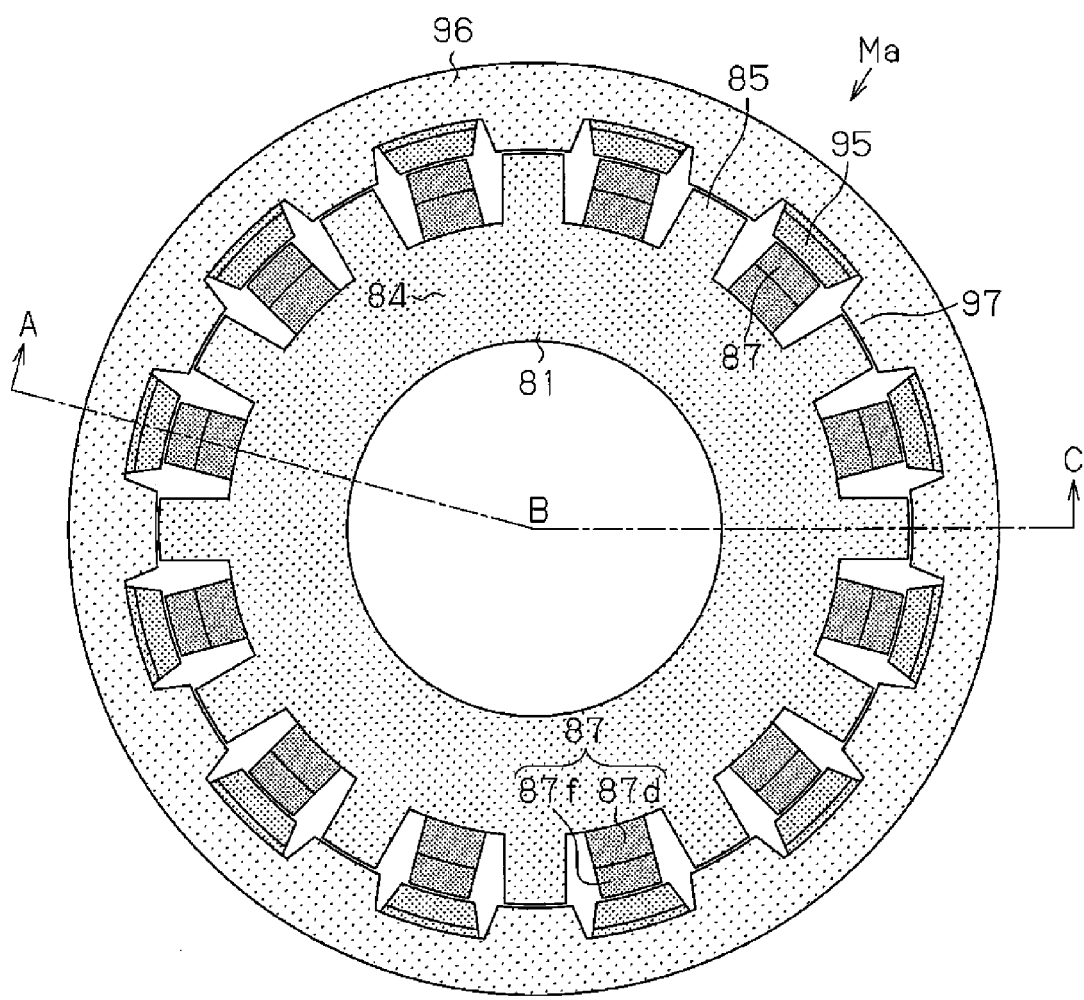
FIG. 24 is a front view taken from an axial direction of the single motor of FIG. 23.
Figure 25:
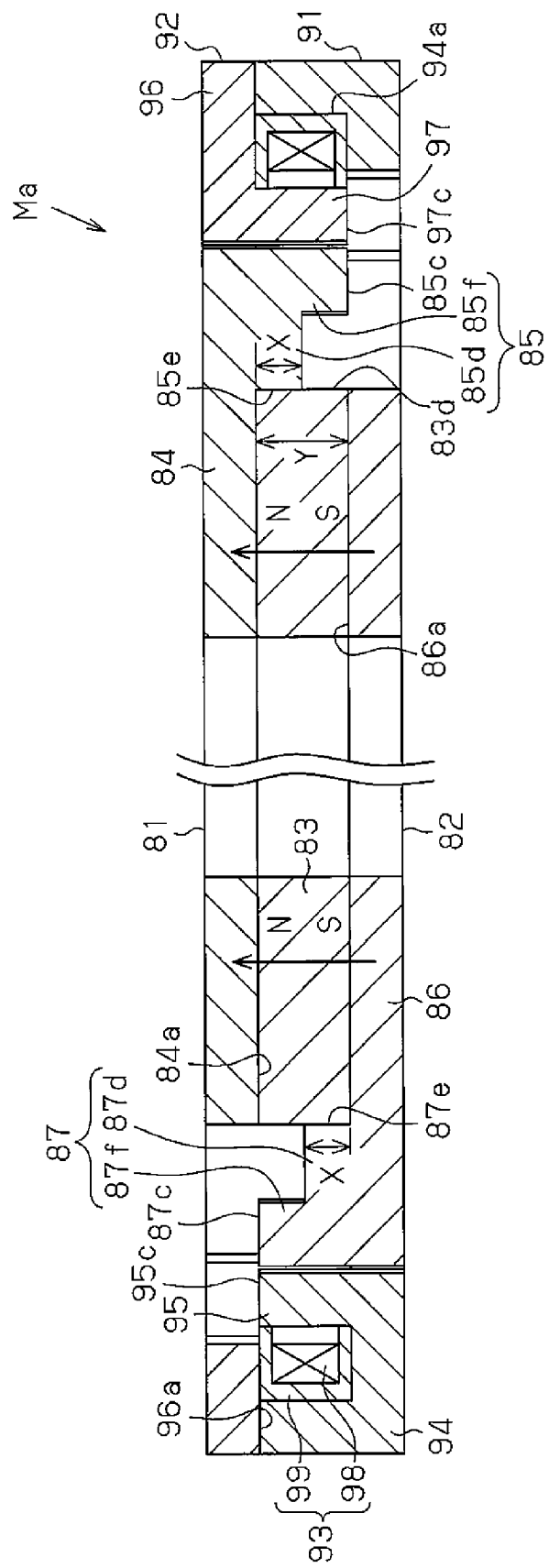
FIG. 25 is a combined cross-sectional view taken along line A-B-C in FIG. 24.

The brushless motor M includes single motors Ma arranged in three stages in an axial direction as shown in FIG. 23 to FIG. 25, and in FIG. 22. The motors Ma include a U-phase motor unit Mu, a V-phase motor unit Mv, and a W-phase motor unit Mw in this order from the top.

(Rotor 80)

Figure 26:
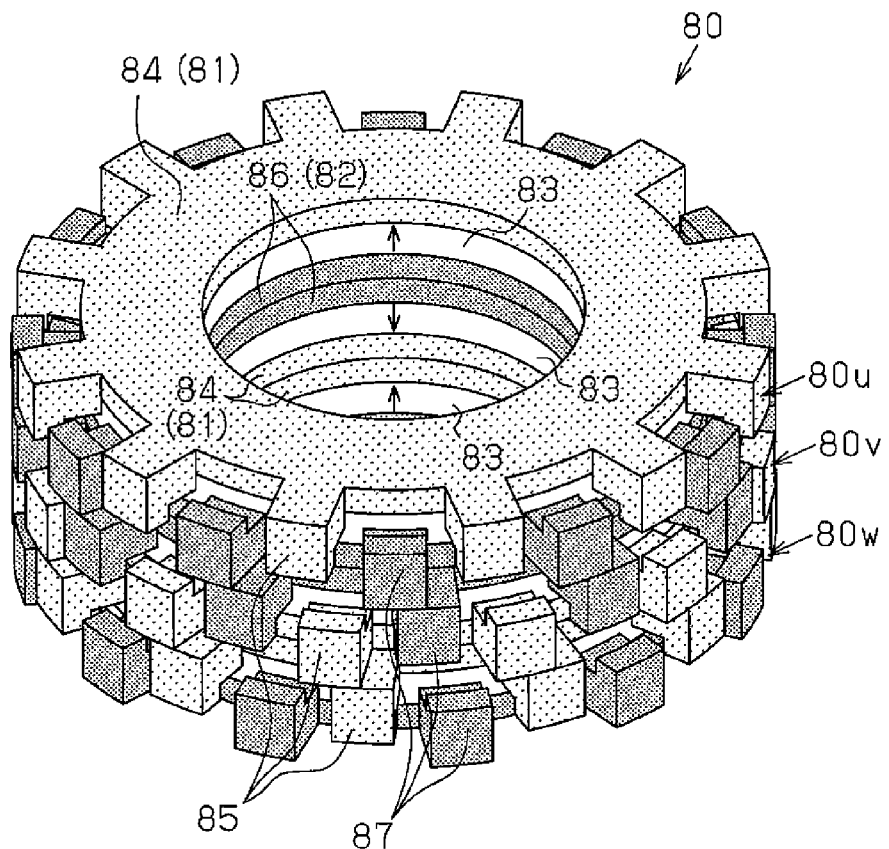
FIG. 26 is an overall perspective view of a rotor of FIG. 22.
Figure 27:
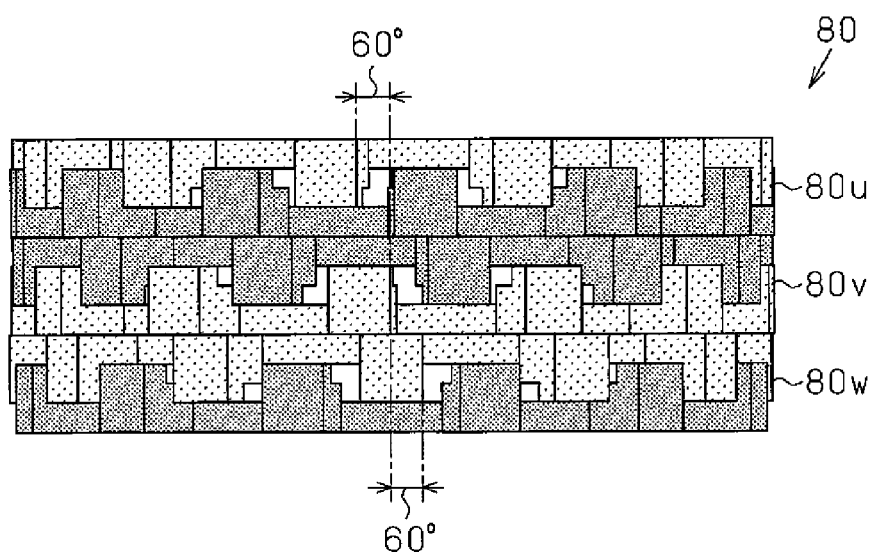
FIG. 27 is a front view taken from a radial direction of the rotor of FIG. 26.
Figure 28:
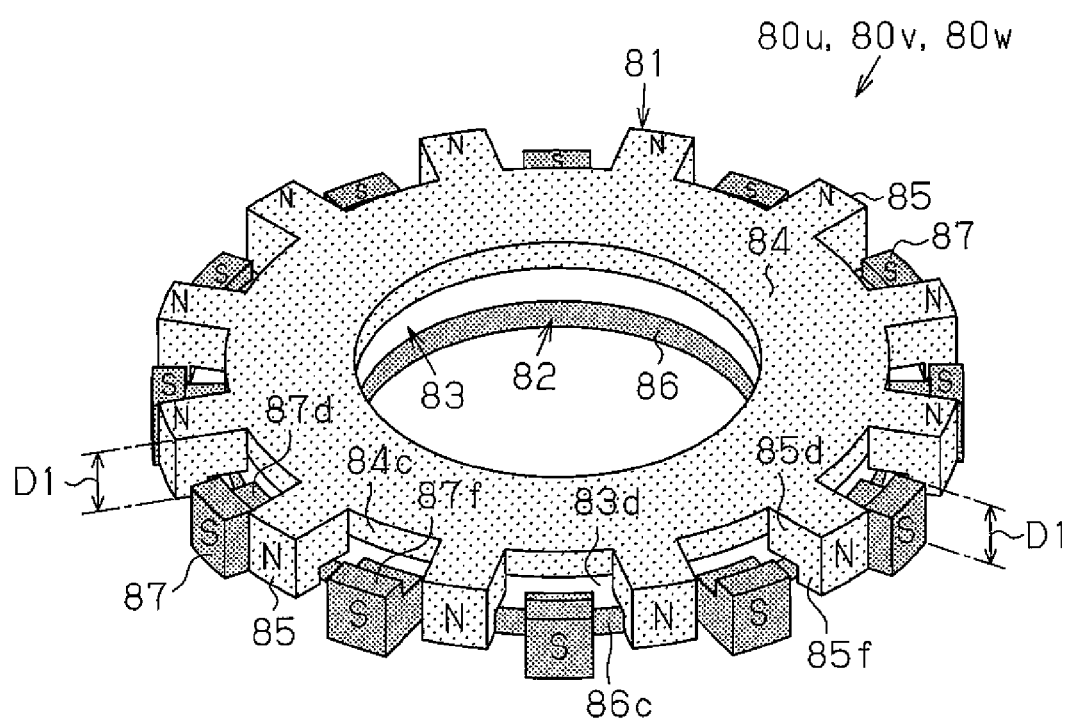
FIG. 28 is a perspective view of the single rotor of FIG. 26.
Figure 29:
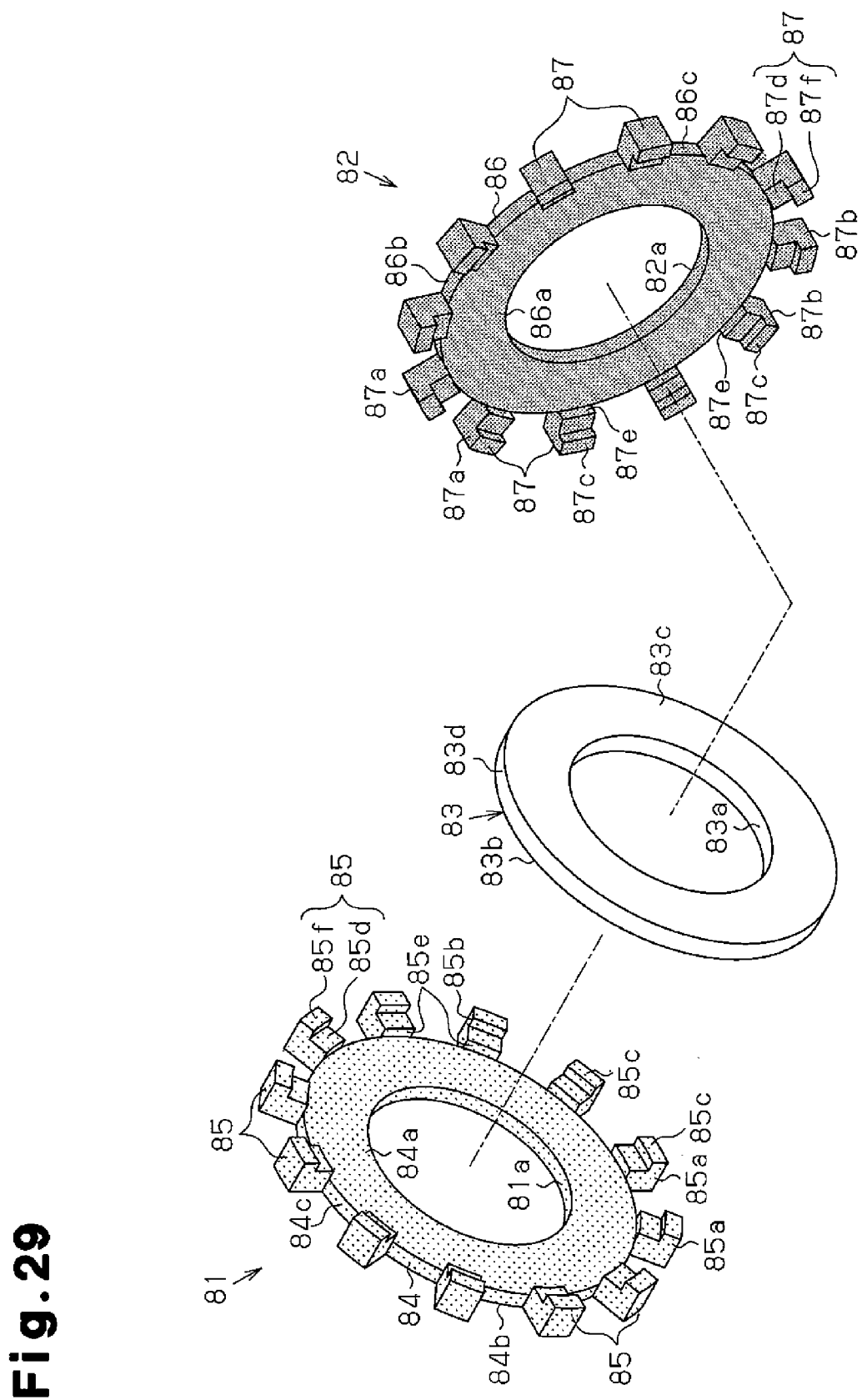
FIG. 29 is an exploded perspective view of the single rotor of FIG. 28.

As shown in FIG. 26 and FIG. 27, the rotor 80 of the brushless motor M includes three components, namely a U-phase rotor 80u, a V-phase rotor 80v, and a W-phase rotor 80w. As shown in FIG. 28 and FIG. 29, each of the rotors 80u, 80v, 80w of the respective phases includes first and second rotor cores 81, 82, and a field magnet 83.

(First Rotor Core 81)

As shown in FIG. 29, the first rotor core 81 includes a first rotor core base 84 having the shape of an annular plate. A through hole 81a for inserting and fixing the rotation shaft (not shown) is formed at a center position of the first rotor core base 84.

Further, twelve pieces of first rotor claw magnetic poles 85 having an identical shape are arranged at equal intervals on an outer circumferential surface 84c of the first rotor core base 84. Each of the first rotor claw magnetic poles 85 projects outward in a radial direction and includes a distal end that is bent to extend toward the second rotor core 82 in the axial direction.

In each of the first rotor claw magnetic poles 85, a portion that projects to the radially outer side from the outer circumferential surface 84c of the first rotor core base 84 has its plate thickness (length in the axial direction) formed thicker than a plate thickness (length in the axial direction) of the first rotor core base 84, and is formed into a first step portion 85d. The first step portions 85d are formed to be thicker toward the second rotor core 82, and have horizontal surfaces on an opposite side of a surface opposing the second rotor core 82 being flush with a non-opposing surface 84b of the first rotor core base 84.

Here, a length of the first step portions 85d in the axial direction from the opposing surface 84a of the first rotor core base 84 to the horizontal surface near the second rotor core 82 is referred to as the step portion height X.

Accordingly, when viewed in the radial direction, a cross-sectional area of a cross-section of the first step portions 85d cut in the axial direction (hereinafter referred to as a magnetic path area) becomes larger compared to a cross-sectional area of the portion projecting to the radially outer side from the outer circumferential surface of the first rotor core base 84 as shown in the second embodiment. That is, as the magnetic path area of the first step portions 85d becomes larger, a magnetic resistance of the first step portions 85d can be smaller than the portion projecting to the radially outer side from the outer circumferential surface of the first rotor core base 84 as shown in the second embodiment.

A first step surface 85e formed on a radially inner side of each first step portion 85d is a circular arc surface that forms a concentric circle with the outer circumferential surface 84c of the first rotor core base 84 with a center axis as a center as viewed in an axial direction.

Further, the first rotor claw magnetic poles 85 are formed by first magnetic pole portions 85f projecting from outer side ends of the first step portions 85d in the radial direction toward the second rotor core 82 along the axial direction.

End surfaces 85a, 85b of each first rotor claw magnetic pole 85 in a circumferential direction including the first step portion 85d and the first magnetic pole portion 85f is a flat surface extending in the radial direction (not inclined in the radial direction when viewed in the axial direction), and the first magnetic pole portion 85f of each first rotor claw magnetic pole 85 includes a sector-shaped cross-section in a direction perpendicular to the axis.

An angle of each first rotor claw magnetic pole 85 in the circumferential direction, that is, an angle formed by the circumferential end surfaces 85a, 85b and the center axis of the rotation shaft (not shown) is smaller than an angle of a gap between a first rotor claw magnetic pole 85 and a first rotor claw magnetic pole 85 that are adjacent to each other.

(Second Rotor Core 82)

As shown in FIG. 29, the second rotor core 82 is formed from the same material and shaped identically to the first rotor core 81, and a through hole 82a for inserting and fixing the rotation shaft (not shown) is formed at a center position of a second rotor core base 86 that is formed substantially in a disk shape.

Further, twelve pieces of second rotor claw magnetic poles 87 having an identical shape are arranged at equal intervals on an outer circumferential surface of the second rotor core base 86. Each of the second rotor claw magnetic poles 87 projects outward in the radial direction and includes a distal end that is bent to extend toward the first rotor core 81 in the axial direction.

In each of the second rotor claw magnetic poles 87, a portion that projects to the radially outer side from the outer circumferential surface 86*c* of the second rotor core base 86 has its plate thickness (length in the axial direction) formed thicker than a plate thickness (length in the axial direction) of the second rotor core base 86, and is formed into a second step portion 87*d*. The second step portions 87*d* are formed to become thicker toward the first rotor core 81, and have horizontal surfaces on an opposite side of a surface opposing the first rotor core 81 being flush with a non-opposing surface 86*b* of the second rotor core base 86.

Here, a length of the second step portions 87*d* in the axial direction from the opposing surface 86*a* of the second rotor core base 86 to the horizontal surface near the first rotor core 81 is referred to as the step portion height X.

Accordingly, when viewed in the radial direction, a cross-sectional area of a cross-section of the second step portions 87*d* cut in the axial direction (hereinafter referred to as a magnetic path area) becomes larger compared to a cross-sectional area of the portion projecting to the radially outer side from the outer circumferential surface of the second rotor core base 86 as shown in the second embodiment. That is, by the magnetic path area of the cross-section of the second step portions 87*d* becoming larger, a magnetic resistance of the second step portions 87*d* can be made smaller than the portion projecting to the radially outer side from the outer circumferential surface of the second rotor core base 86 as shown in the second embodiment.

A second step surface 87*e* formed on a radially inner side of each second step portion 87*d* is a circular arc surface that forms a concentric circle with the outer circumferential surface 86*c* of the second rotor core base 86 with the center axis as a center when viewed in the axial direction.

Further, the second rotor claw magnetic poles 87 are formed by second magnetic pole portions 87*f* projecting from outer side ends of the second step portions 87*d* in the radial direction toward the first rotor core 81 along the axial direction.

The circumferential end surfaces 87*a*, 87*b* of each of the second rotor claw magnetic poles 87 including the second step portion 87*d* and the second magnetic pole portion 87*f* are flat surfaces extending in the radial direction, and the second magnetic pole portion 87*f* of each of the second rotor claw magnetic poles 87 includes a sector-shaped cross-section in the direction perpendicular to the axis.

An angle of each second rotor claw magnetic pole 87 in the circumferential direction, that is, an angle formed by the circumferential end surfaces 87*a*, 87*b* and the center axis of the rotation shaft (not shown) is smaller than an angle of a gap between a second rotor claw magnetic pole 87 and a second rotor claw magnetic pole 87 that are adjacent to each other.

Further, the second rotor core 82 is arranged and fixed relative to the first rotor core 81 such that each of the second rotor claw magnetic poles 87 of the second rotor core 82 is positioned between the first rotor claw magnetic poles 85 of the first rotor core 81 as viewed in the axial direction. Here, the second rotor core 82 is coupled to the first rotor core 81 such that the field magnet 83 is arranged between the first rotor core 81 and the second rotor core 82 in the axial direction.

(Field Magnet 83)

The field magnet 83 in the present embodiment is an annular plate-shaped permanent magnet formed of a ferrite magnet. As shown in FIG. 29, a through hole 83*a* for inserting the rotation shaft (not shown) is formed at a center position of the field magnet 83. Further, one side surface 83*b* of the field magnet 83 contacts the opposing surface 84*a* of the first rotor core base 84 and the other side surface 83*c* of the field magnet 83 contacts the opposing surface 86*a* of the second rotor core base 86, respectively, and the field magnet 83 is sandwiched and fixed between the first rotor core 81 and the second rotor core 82.

An outer diameter of the field magnet 83 is set to conform to outer diameters of the first and second rotor core bases 84, 86 (outer circumferential surfaces 84*c*, 86*c*).

Accordingly, when sandwiching the field magnet 83 with the first rotor core base 84 and the second rotor core base 86, the field magnet 83 is press-fitted into the first and second step portions 85*d*, 87*d* so that the outer circumferential surface 83*d* of the field magnet 83 contacts under pressure the first and second step surfaces 85*e*, 87*e* of the respective first and second rotor claw magnetic poles 85, 87.

Further, a thickness Y of the field magnet 83 (length in the axial direction) is set at a predetermined thickness. In the present embodiment, like the second embodiment, as shown in FIG. 25, the first and second rotor claw magnetic poles 85, 87 have the length by which their distal end surfaces 85*c*, 87*c* are respectively flush with opposing surfaces 84*a*, 86*a* of the first and second rotor core bases 84, 86. That is, in the present embodiment, like to the second embodiment and as shown in FIG. 28, the length D1 of the first and second rotor claw magnetic poles 85, 87 in the axial direction is shortened by a thickness of the first and second rotor core bases 84, 86 in the axial direction.

As shown in FIG. 25, the field magnet 83 is magnetized along the axial direction such that the first rotor core 81 becomes an N pole and the second rotor core 82 becomes an S pole. Accordingly, the first rotor claw magnetic poles 85 of the first rotor core 81 function as N poles (first magnetic poles), and the second rotor claw magnetic poles 87 of the second rotor core 82 function as S poles (second magnetic poles) due to the field magnet 83.

The U-phase rotor 80*u*, the V-phase rotor 80*v* and the W-phase rotor 80*w* form the so-called Lundell type structure rotors using the field magnet 83. Further, each of the rotors 80*u*, 80*v*, 80*w* forms a rotor with twenty-four poles (twelve pairs of pole numbers) in which the first rotor claw magnetic poles 85 functioning as the N poles and the second rotor claw magnetic poles 87 functioning as the S poles are alternately arranged in the circumferential direction.

Further, the U-phase, V-phase, and W-phase rotors 80*u*, 80*v*, 80*w* are stacked in the axial direction as shown in FIG. 26 and FIG. 27, and form the rotor 80.

Here, as shown in FIG. 25 and FIG. 28, when the first rotor core 81 is on an upper side and the second rotor core 82 is on a lower side relative to the field magnet 83 (configuration in which a magnetizing direction of the field magnet 83 is upward), the U-phase and W-phase rotors 80*u*, 80*w* are stacked facing frontward, and the V-phase rotor 80*v* is stacked facing backward. Thus, magnetizing directions of the field magnet 83 by the U-phase and W-phase rotors 80*u*, 80*w* are of a same direction as shown by arrows in FIG. 26 (upward in FIG. 26), and a magnetizing direction of the field magnet 83 by the V-phase rotor 80*v* is of an opposite direction relative to the magnetizing direction of the field magnet 83 by the U-phase and W-phase rotors 80*u*, 80*w* (downward in FIG. 26).

Further, the second rotor core bases 86 of the U-phase and V-phase rotors 80*u*, 80*v* are adjacent to each other in the axial direction, and portions of the field magnets 83 that are the S poles of the U-phase and V-phase rotors 80*u*, 80*v* oppose each other via the adjacent second rotor core bases 86. Further, the first rotor core bases 84 of the V-phase and W-phase rotors 80*v*, 80*w* are adjacent to each other in the axial direction, and portions of the field magnets 83 that are the N poles of the V-phase and W-phase rotors 80*v*, 80*w* oppose each other via the adjacent first rotor core bases 84.

Further, extending directions of the first rotor claw magnetic poles 85 of the U-phase and W-phase rotors 80*u*, 80*w* in the axial direction are of the same direction (downward in FIG. 26), and an extending direction of the first rotor claw magnetic poles 85 of the V-phase rotor 80*v* in the axial direction relative to the above direction is in an opposite direction (upward in FIG. 26). The U-phase first rotor claw magnetic poles 85 and the V-phase first rotor claw magnetic poles 85 are separated in the axial direction.

In the same manner, extending directions of the second rotor claw magnetic poles 87 of the U-phase and W-phase rotors 80*u*, 80*w* in the axial direction are of the same direction (upward in FIG. 26), and an extending direction of the second rotor claw magnetic poles 87 of the V-phase rotor 80*v* in the axial direction relative to the above direction is in an opposite direction (downward in FIG. 26). The V-phase second rotor claw magnetic poles 87 and the W-phase second rotor claw magnetic poles 87 are separated in the axial direction.

Further, as shown in FIG. 26 and FIG. 27, the U-phase rotor 80*u*, the V-phase rotor 80*v*, and the W-phase rotor 80*w* are stacked with their phases deviated by 60 degrees in an electrical angle (5 degrees in mechanical angle).

More specifically, the V-phase rotor 80*v* is fixed to the rotation shaft with its phase deviated by 60 degrees in electrical angle from the U-phase rotor 80*u* in a counterclockwise direction. The W-phase rotor 80*w* is fixed to the rotation shaft with its phase deviated by 60 degrees in electrical angle from the V-phase rotor 80*v* in the counterclockwise direction.

(Stator 90)

Figure 30:
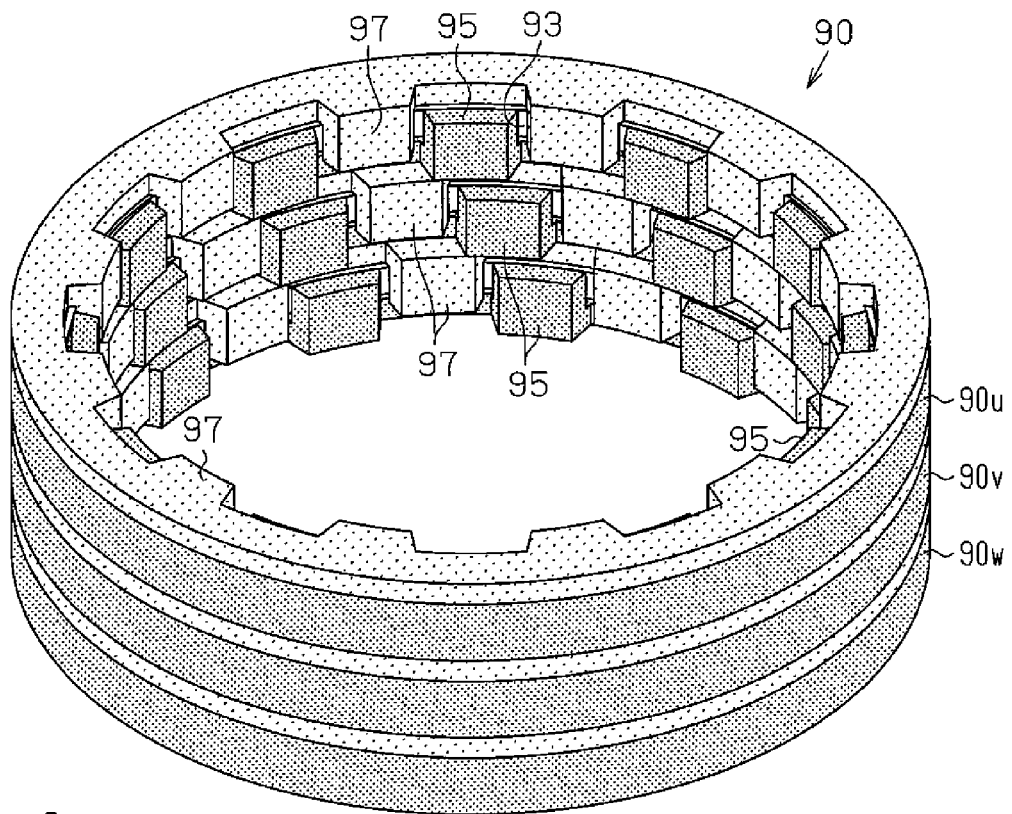
FIG. 30 is an overall perspective view of a stator of FIG. 22.

As shown in FIG. 30, like the second embodiment, the stator 90 arranged on an outer side of the rotor 80 in the radial direction includes three stators, namely a U-phase stator 90*u*, a V-phase stator 90*v*, and a W-phase stator 90*w*. The stators 90*u*, 90*v*, 90*w* of the respective phases are stacked in order in the axial direction so as to respectively oppose the corresponding one of the U-phase rotor 80*u*, the V-phase rotor 80*v*, and the W-phase rotor 80*w* in the radial direction.

Figure 31:
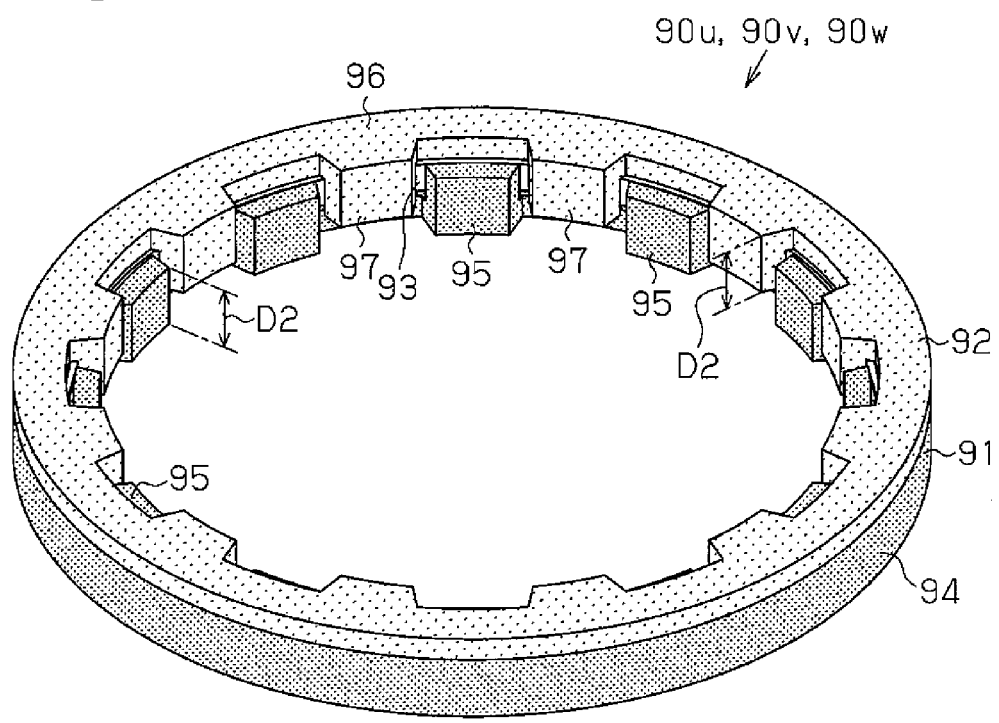
FIG. 31 is a perspective view of the single stator of FIG. 30.

The stators 90*u*, 90*v*, 90*w* of the respective phases have identical structures, and as shown in FIG. 31, like the second embodiment, each include first and second stator cores 91, 92, and a coil section 93. That is, in the present embodiment, the first and second stator claw magnetic poles 95, 97 have a length D2 by which their distal end surfaces 95*c*, 97*c* are respectively flush with opposing surfaces 94*a*, 96*a* of the first and second stator core bases 94, 96.

The U-phase, V-phase, and W-phase stators 90*u*, 90*v*, 90*w* each become a so-called Lundell type (claw-pole type) stator with twenty-four poles that excites the first and second stator claw magnetic poles 95, 97 to magnetic poles that are different from one another at each occasion by the annular wiring 98 between the first and second stator cores 91, 92. Further, as shown in FIG. 30, the U-phase, V-phase, and W-phase stators 90*u*, 90*v*, 90*w* are stacked in the axial direction to form the stator 90.

Here, like to the first and the second embodiments, in the stator 90 including the U-phase, V-phase, and W-phase stators 90*u*, 90*v*, 90*w*, the U-phase stator 90*u*, the V-phase stator 90*v*, and the W-phase stator 90*w* are stacked by deviating their phases by 60 degrees in electrical angle (5 degrees in mechanical angle).

More specifically, the V-phase stator 90*v* is fixed to a motor housing (not shown) with its phase deviated by 60 degrees in electrical angle in a clockwise direction relative to the U-phase stator 90*u*. The W-phase stator 90*w* is fixed to the motor housing with its phase deviated by 60 degrees in electrical angle in the clockwise direction relative to the V-phase stator 90*v*.

That is, an inclined direction (see FIG. 27) relative to the axial direction formed by the deviations of the three rotors 80*u*, 80*v*, 80*w* when viewed in the radial direction and an inclined direction (see FIG. 30) relative to the axial direction formed by the deviations of the three stators 90*u*, 90*v*, 90*w* when viewed in the radial direction are arranged to be opposite to one another at the opposing surfaces of the rotor 80 and the stator 90.

Further, a U-phase power voltage of a three-phase AC power is applied to the annular wiring 98 of the U-phase stator 90*u*, a V-phase power voltage of the three-phase AC power is applied to the annular wiring 98 of the V-phase stator 90*v*, and a W-phase power voltage of the three-phase AC power is applied to the annular wiring 98 of the W-phase stator 90*w*.

Next, the operation of the brushless motor M will be described.

Now, when a three-phase AC power voltage is applied to the stator 90, like the first and second embodiments, a U-phase power voltage is applied to an annular wiring 98 of the U-phase stator 90*u*, a V-phase power voltage is applied to an annular wiring 98 of the V-phase stator 90*v*, and a W-phase power voltage is applied to an annular wiring 98 of the W-phase stator 90*w*. Thus, a rotating magnetic field is generated in the stator 90, and the rotor 80 is rotated and driven.

Here, the stator 90 includes the three stage structure of the U-phase, V-phase, and W-phase stators 90*u*, 90*v*, 90*w* in correspondence with the three-phase AC power. Accordingly, the rotor 80 also includes the three stage structure of the U-phase, V-phase, and W-phase rotors 80*u*, 80*v*, 80*w*. Thus, in the stator and the rotor of each phase, the stator opposing the field magnet 83 along the axial direction can independently receive magnetic flux of the field magnet 83, and an increase in output can be achieved.

In addition, the length D2 of the first and second stator claw magnetic poles 95, 97 in the axial direction is shortened in the U-phase, V-phase, and W-phase stators 90*u*, 90*v*, 90*w* of the three-stage structure.

That is, in the U-phase, V-phase, and W-phase stators 90*u*, 90*v*, 90*w*, each of the first stator claw magnetic poles 95 are separated from one another, and each of the second stator claw magnetic poles 97 are separated from one another. As a result, short circuiting of the magnetic flux between the first stator claw magnetic poles 95 of the different phases is suppressed, and short circuiting of the magnetic flux between the second stator claw magnetic poles 97 of the different phases is suppressed.

In the same manner, a length D1 of the first and second rotor claw magnetic poles 85, 87 in the axial direction is shortened in the U-phase, V-phase, and W-phase rotors 80*u*, 80*v*, 80*w* of the three-stage structure.

Thus, the first rotor claw magnetic poles 85 of the U-phase rotor 80*u* and the first rotor claw magnetic poles 85 of the V-phase rotor 80*v* are separated from one another in the axial direction, and the second rotor claw magnetic poles 87 of the V-phase rotor 80v and the second rotor claw magnetic poles 87 of the W-phase rotor 80w are separated from one another in the axial direction. As a result, short circuiting of the magnetic flux between the first rotor claw magnetic poles 85 of the U-phase and V-phase is suppressed, and short circuiting of the magnetic flux between the second rotor claw magnetic poles 87 of the V-phase and W-phase is suppressed.

Further, the first and second step portions 85d, 87d having a large cross-sectional magnetic path area are provided at the first and second rotor claw magnetic poles 85, 87 of the U-phase, V-phase, and W-phase rotors 80u, 80v, 80w in the three-stage structure. Accordingly, a magnetic resistance in the first and second step portions 85d, 87d becomes small, whereby a magnetic saturation of the magnetic flux between the first and second magnetic pole portions 85f, 87f of the first and second rotor claw magnetic poles 85, 87 and the first and second rotor core bases 84, 86 can be resolved, and the increase in the output can be achieved.

Further, the outer circumferential surface 83d of the field magnet 83 contact under pressure the first and second step surfaces 85e, 87e of the first and second step portions 85d, 87d, respectively. Thus, an air gap that forms magnetic resistance can be reduced, and the output can be further increased.

In addition, the field magnet 83 is sandwiched and fixed by the first rotor core base 84 and the second rotor core base 86 by the outer circumferential surface 83d of the field magnet 83 press-fitted into the first and second step surfaces 85e, 87e of the first and second step portions 85d, 87d. Accordingly, the task for positioning and fixing the field magnet 83 between the first rotor core base 84 and the second rotor core base 86 can be performed just by carrying out fitting and fixing without using a special fixing member and mechanism.

In this manner, since the space between specific claw magnetic poles is open and the short circuiting of the magnetic flux is suppressed, a magnetic circuit for generating torque and free from magnetic saturation is formed and it becomes possible to form the brushless motor M with high torque.

Here, with regard to the brushless motor M of the present embodiment, an experiment was conducted on a magnitude of the torque generated when a ratio of the step portion height X of the first and second step portions 85d, 87d of the first and second rotor claw magnetic poles 85, 87 of the respective phases relative to the thickness Y of the field magnet 83 (length in the axial direction) was variable, that is, a ratio (=X/Y(%)) of the thickness Y and the step portion height X was varied.

Figure 32:
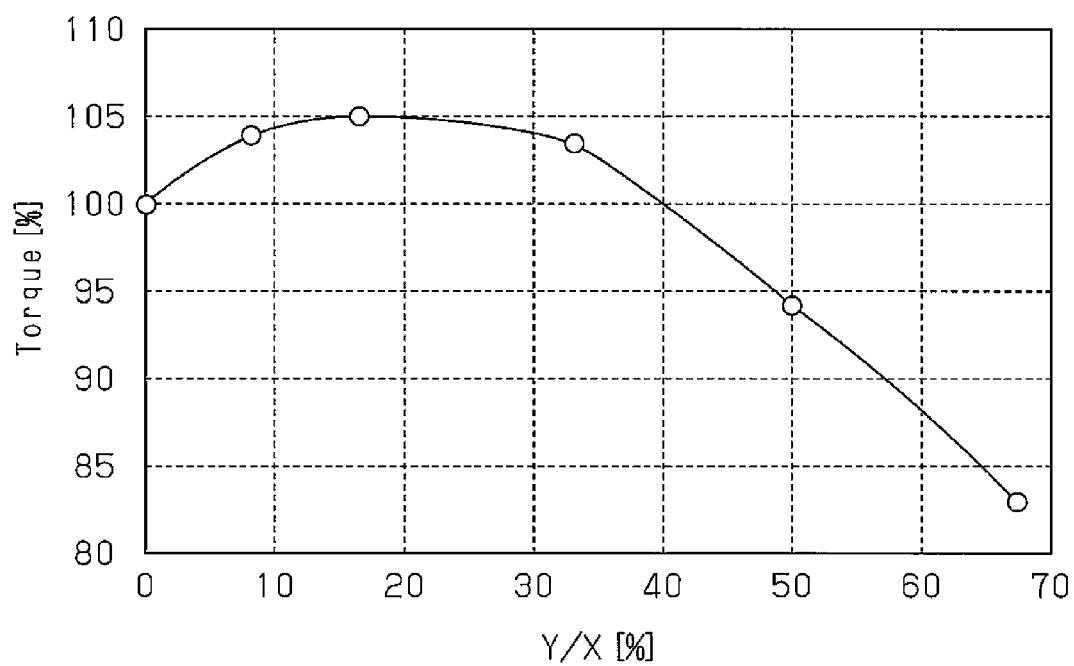
FIG. 32 is a graph showing the relationship of the torque and a ratio of the height of a step portion relative to the thickness of a field magnet.

FIG. 32 is a graph showing a comparison of the torque obtained from the experiment. In FIG. 32, a horizontal axis indicates the ratio of (step portion height X)/(thickness Y of the field magnet 83) by percentage, and a vertical axis indicates torque in percentage with the torque when the ratio of the step portion height X and the thickness Y of the field magnet 83 is zero (step portion height X being zero) is taken as a reference (100%).

As is apparent from FIG. 32, it has been found that the torque exceeds the reference (100%) in a range where the ratio is larger than 0% and smaller than 40%. Especially, it has been found that the torque becomes the largest at 105% (1.05 times) when the ratio is about 17%, that is, by setting the step portion height X to be about 0.17 times the thickness Y of the field magnet 83.

It may be understood that the first and second step portions 85d, 87d are formed on the first and second stator claw magnetic poles 95, 97 of the respective phases. Further, higher torque than the brushless motor M shown in the second embodiment can be obtained by setting the step portion height X of the first and second step portions 85d, 87d to be larger than 0% and smaller than 40% of the thickness Y of the field magnet 83, and the highest torque can be achieved by setting the same at about 17%.

In the present embodiment also, like the first and second embodiments, when a request to change the number of magnetic poles is made, since the U-phase, V-phase, and W-phase rotors 80u, 80v, 80w of the rotor 80 form the Lundell type structure, the number of poles can easily be changed by simply changing the number of the first and second rotor claw magnetic poles 85, 87 while maintaining the field magnets 83 in the identical structure. In the same manner, since the U-phase, V-phase, and W-phase stators 90u, 90v, 90w of the stator 90 form a claw-pole type structure, the number of poles can easily be changed simply by changing the number of the first and second stator claw magnetic poles 95, 97 while maintaining the coil sections 93 in the identical structure.

Fourth Embodiment

Next, a fourth embodiment of a motor will be described with reference to FIG. 33 to FIG. 48.

The features of the present embodiment are in first and second rotor claw magnetic poles 85, 87 and first and second stator claw magnetic poles 95, 97. The features will be described in detail, and common portions will not be described for the sake of brevity.

Figure 33:
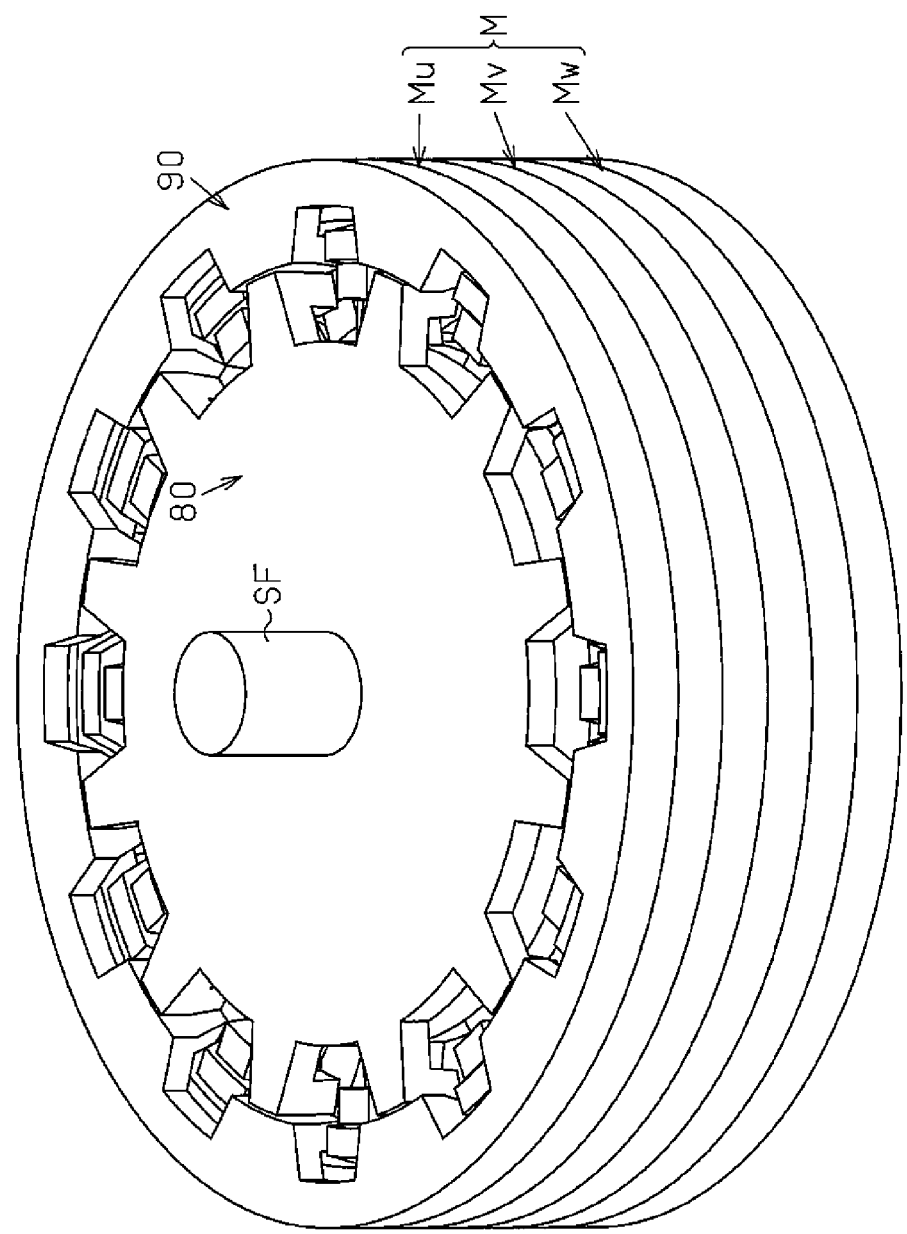
FIG. 33 is a perspective view of a motor according to a fourth embodiment of the present invention.

FIG. 33 is an overall perspective view of a brushless motor M of the present embodiment, and an annular stator 90 fixed to a motor housing (not shown) is arranged on an outer side of a rotor 80 fixed to a rotation shaft SF.

Figure 34:
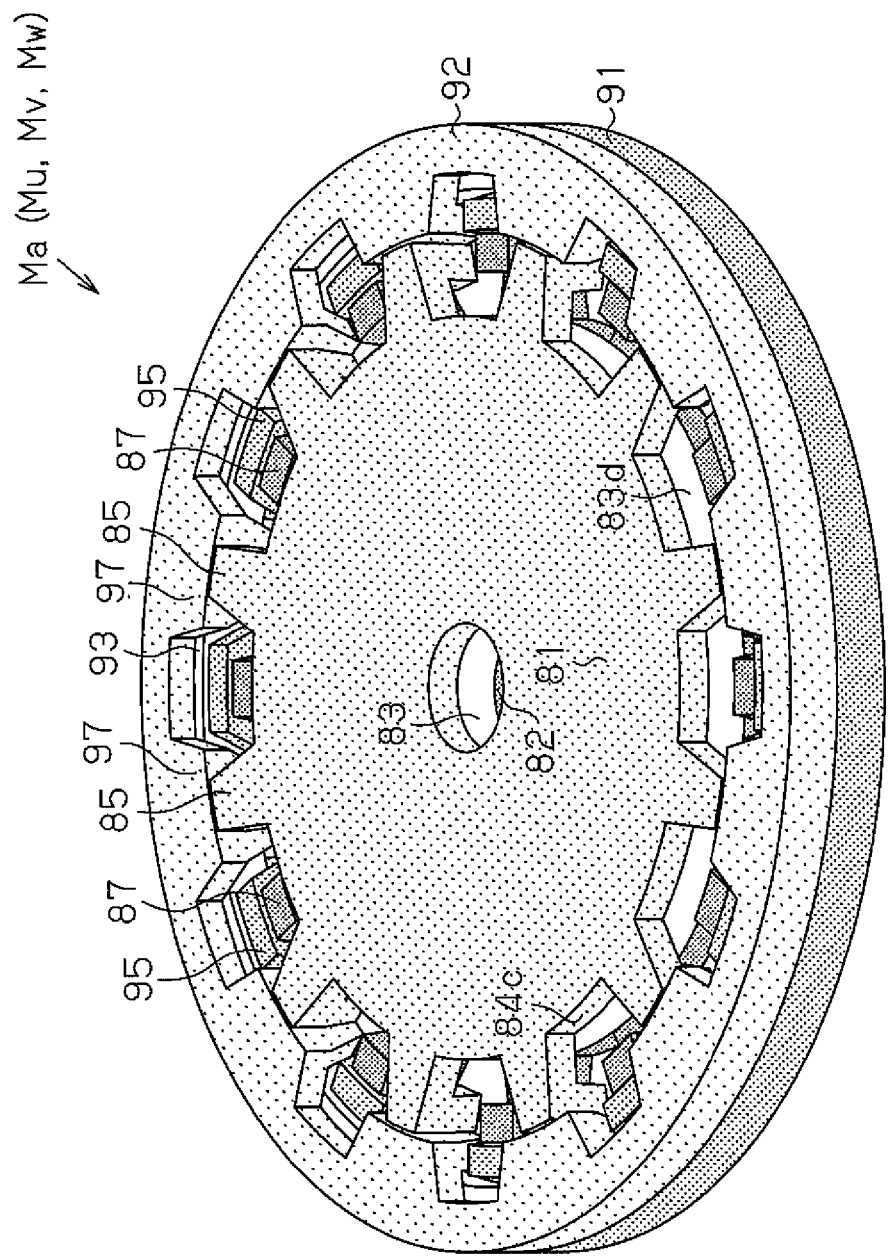
FIG. 34 is a perspective view of the single motor of FIG. 33.
Figure 35:
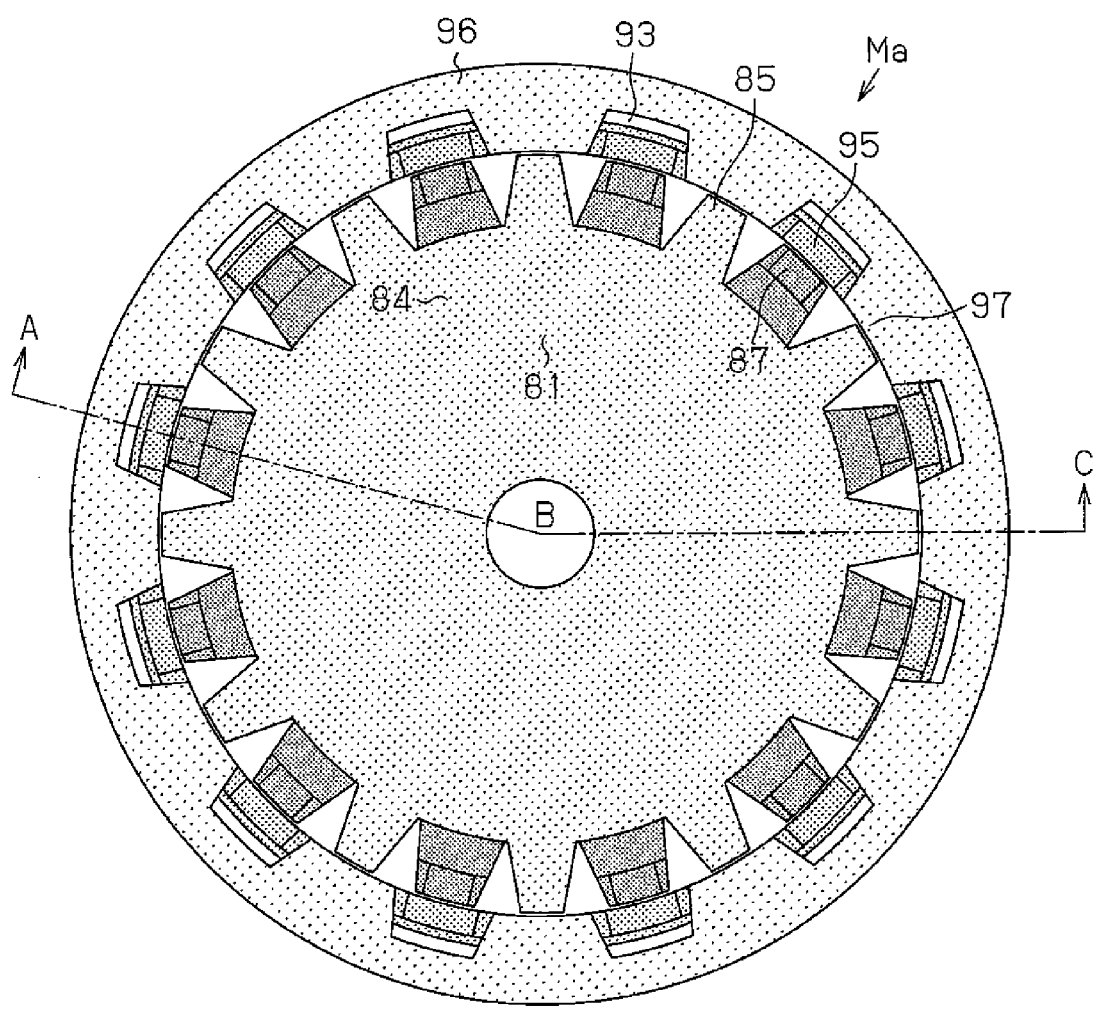
FIG. 35 is a front view taken from an axial direction of the single motor of FIG. 34.
Figure 36:
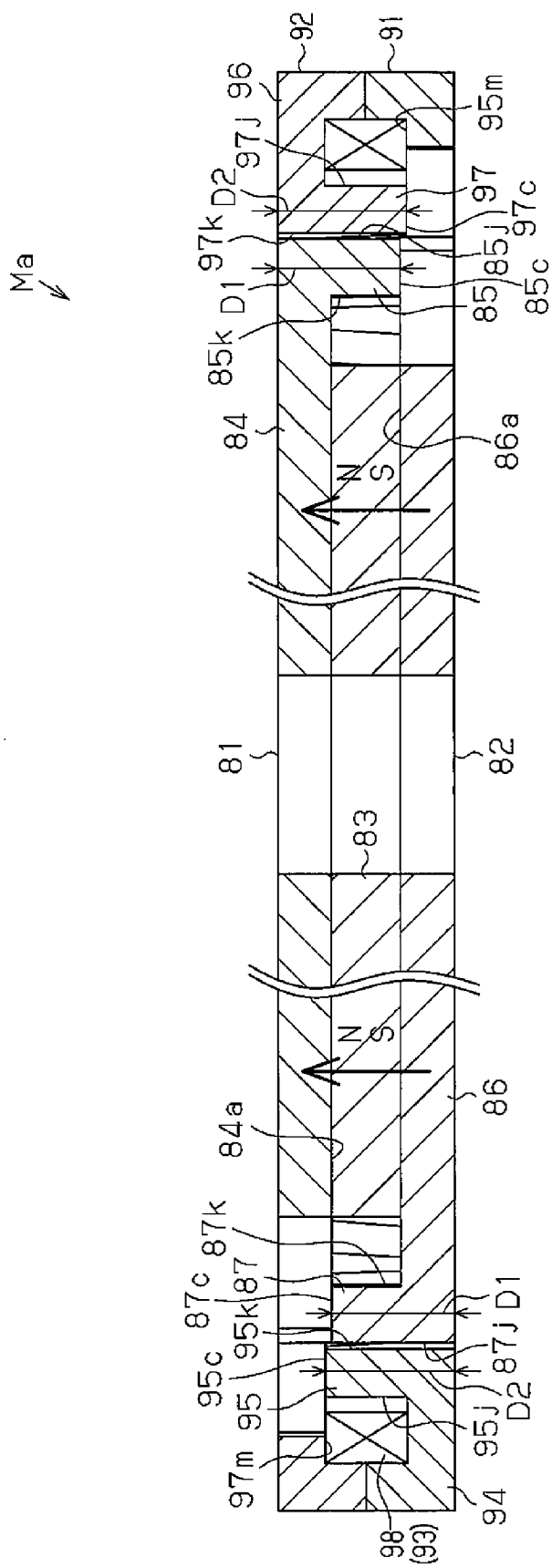
FIG. 36 is a combined cross-sectional view taken along line A-B-C in FIG. 35.

The brushless motor M includes single motors Ma stacked in three stages in an axial direction as shown in FIG. 34 to FIG. 36, and in FIG. 33. The motors Ma include a U-phase motor unit Mu, a V-phase motor unit Mv, and a W-phase motor unit Mw in this order from the top.

(Rotor 80)

Figure 37:
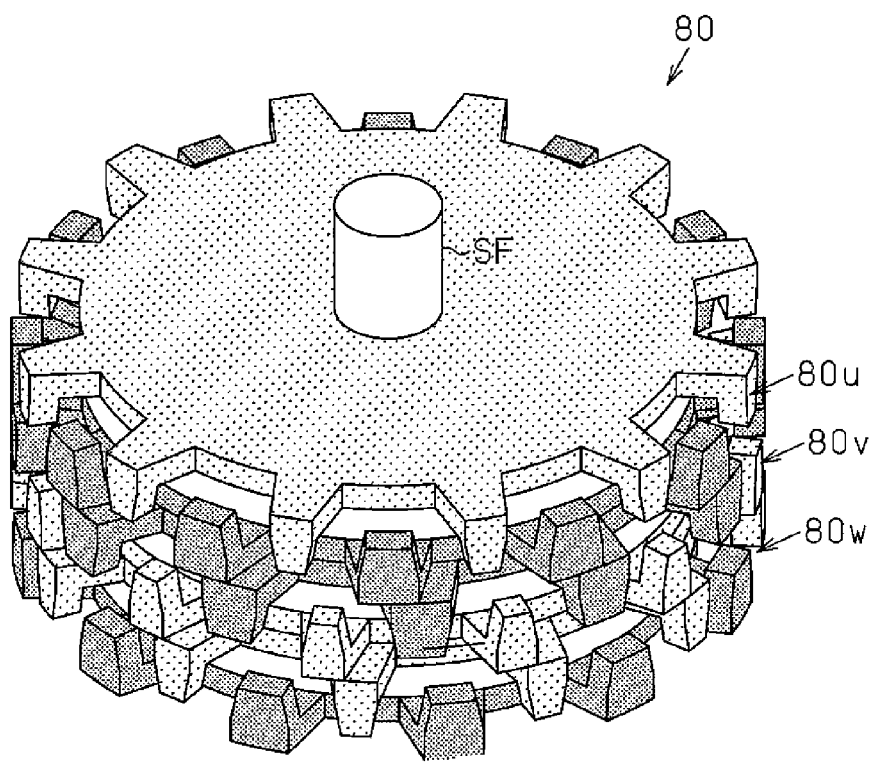
FIG. 37 is an overall perspective view of a rotor of FIG. 33.
Figure 38:
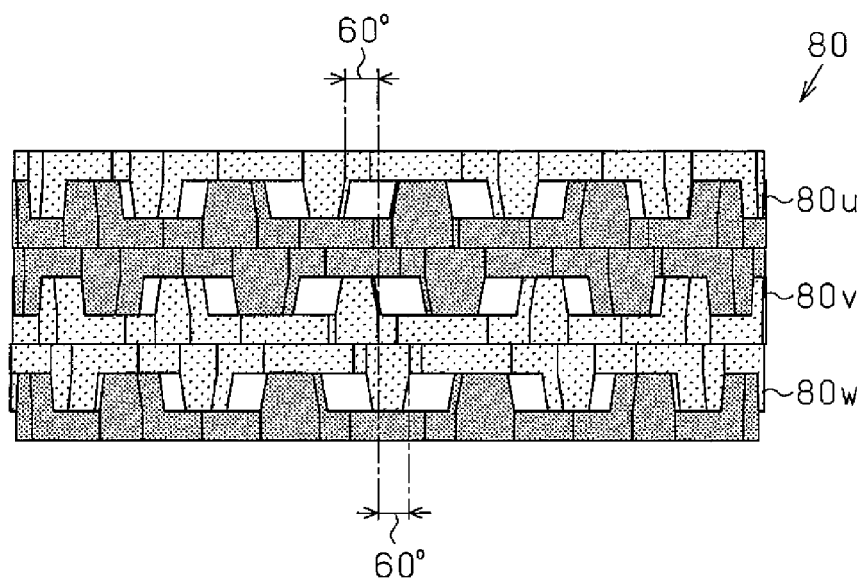
FIG. 38 is a front view taken from a radial direction of the rotor of FIG. 37.
Figure 39:
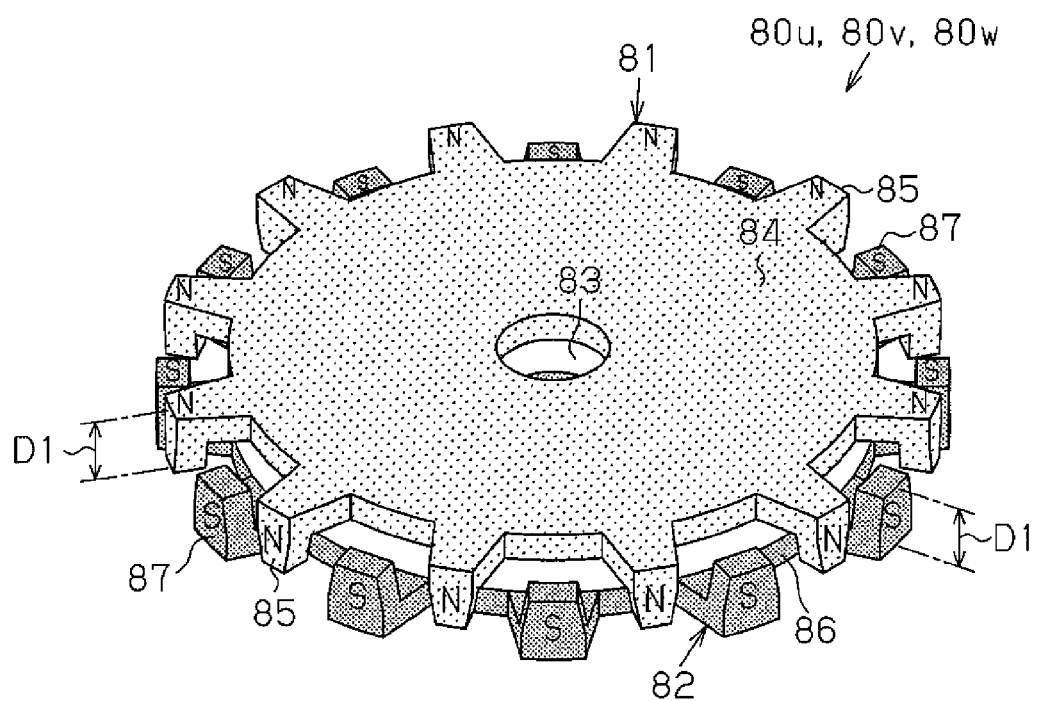
FIG. 39 is a perspective view of the single rotor of FIG. 37.
Figure 40:
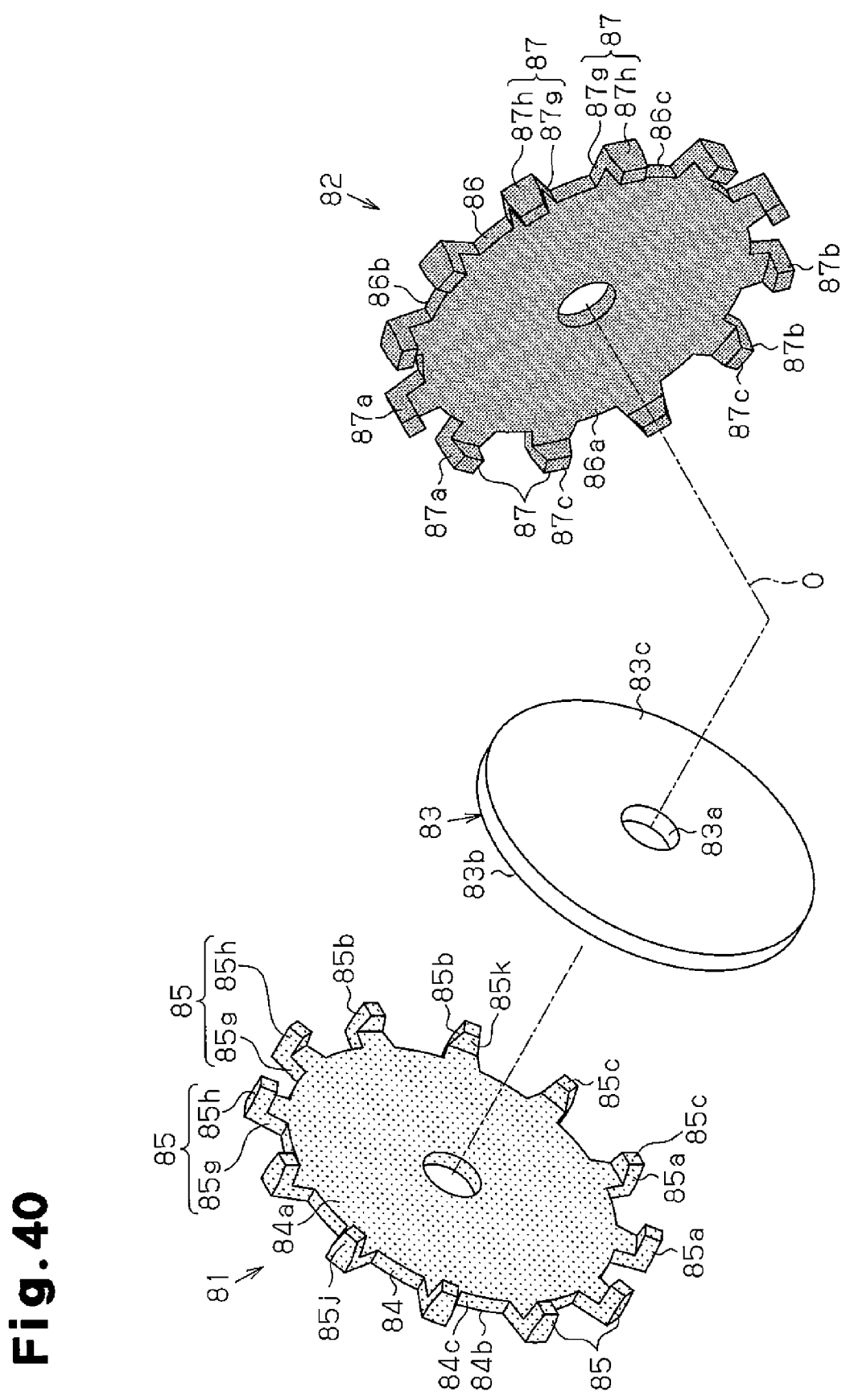
FIG. 40 is an exploded perspective view of the single rotor of FIG. 39.

As shown in FIG. 37 and FIG. 38, the rotor 80 of the brushless motor M includes three components, namely a U-phase rotor 80u, a V-phase rotor 80v, and a W-phase rotor 80w. As shown in FIG. 39 and FIG. 40, each of the rotors 80u, 80v, 80w of the respective phases includes first and second rotor cores 81, 82 and a field magnet 83.

(First Rotor Core 81)

As shown in FIG. 40, the first rotor core 81 includes a first rotor core base 84 formed in a circular disk shape. A through hole 81a for inserting and fixing a rotation shaft SF is formed at a center position of the first rotor core base 84.

Further, twelve pieces of first rotor claw magnetic poles 85 having an identical shape are arranged at equal intervals on an outer circumferential surface 84c of the first rotor core base 84. Each of the first rotor claw magnetic poles 85 projects outward in a radial direction and includes a distal end that is bent to extend toward the second rotor core 82 in the axial direction.

Here, in each of the first rotor claw magnetic poles 85, a portion that projects to the radially outer side from an outer circumferential surface 84c of the first rotor core base 84 is referred to as a first rotor base portion 85g, and the distal end portion bent in the axial direction is referred to as a first rotor magnetic pole portion 85h. Further, the first rotor claw magnetic poles 85 before the first rotor magnetic pole portions 85h are bent and formed (a rotor core material 101 shown in FIG. 45) are formed in a trapezoidal shape that narrows toward the distal end when viewed in the axial direction.

That is, the shape of the first rotor base portions 85g when viewed in the axial direction becomes a trapezoidal shape of which width narrows toward the radially outer side, and the shape of the first rotor magnetic pole portions 85*h* when viewed in the radial direction becomes a trapezoidal shape of which width narrows toward the distal end. Further, circumferential end surfaces 85*a*, 85*b* of each first rotor claw magnetic pole 85 including the first rotor base portion 85*g* and the first rotor magnetic pole portion 85*h* are both flat surfaces, and approach one another toward the radially outer side.

Thus, a cross-sectional area of a cross-section of the first rotor base portion 85*g* cut in an axial direction becomes smaller toward the radially outer side when viewed in the radial direction. Further, a cross-sectional area of a cross-section of the first rotor magnetic pole portion 85*h* cut in the radial direction becomes smaller toward the distal end side when viewed in the axial direction.

The first rotor magnetic pole portion 85*h* that is bent in the axial direction has a sector-shaped cross-section in a direction perpendicular to the axis, and an outer side surface 85*j* and an inner side surface 85*k* thereof in the radial direction are circular arc surfaces that form a concentric circle with the outer circumferential surface 84*c* of the first rotor core base 84 about a center axis O when viewed in the axial direction.

Further, an angle of the first rotor base portion 85*g* of each first rotor claw magnetic pole 85 in a circumferential direction, that is, an angle that basal end portions of the circumferential end surfaces 85*a*, 85*b* form with the center axis O of the rotation shaft SF is smaller than an angle of a gap between basal ends of first rotor base portions 85*g* of the adjacent first rotor claw magnetic poles 85.

(Second Rotor Core 82)

As shown in FIG. 40, the second rotor core 82 is formed from the same material and shaped identically to the first rotor core 81, and a through hole 82*a* for inserting and fixing the rotation shaft SF is formed at a center position of a second rotor core base 86 that is formed in a disk shape.

Further, twelve pieces of second rotor claw magnetic poles 87 having an identical shape are arranged at equal intervals on an outer circumferential surface of the second rotor core base 86. Each of the second rotor claw magnetic poles 87 is projected toward the radially outer side and includes a distal end that is bent to extend toward the first rotor core 81 in the axial direction.

Here, in each of the second rotor claw magnetic poles 87, a portion that projects to the radially outer side from an outer circumferential surface 86*c* of the second rotor core base 86 is referred to as a second rotor base portion 87*g*, and the distal end portion bent in the axial direction is referred to as a second rotor magnetic pole portion 87*h*. Further, the second rotor claw magnetic poles 87 before the second rotor magnetic pole portion 87*h* are bent and formed (the rotor core material 101 shown in FIG. 45) are formed in a trapezoidal shape that narrows toward the distal end when viewed in the axial direction.

That is, the shape of the second rotor base portions 87*g* when viewed in the axial direction becomes a trapezoidal shape of which width narrows toward the radially outer side, and the shape of the second rotor magnetic pole portions 87*h* when viewed in the radial direction becomes a trapezoidal shape of which width narrows toward the distal end. Further, circumferential end surfaces 87*a*, 87*b* of each second rotor claw magnetic pole 87 including the second rotor base portion 87*g* and the second rotor magnetic pole portion 87*h* are both flat surfaces, and approach each other toward the outer side in the radial direction.

Thus, a cross-sectional area of a cross-section of the second rotor base portion 87*g* cut in the axial direction becomes smaller toward the radially outer side when viewed in the radial direction. Further, a cross-sectional area of a cross-section of the second rotor magnetic pole portion 87*h* cut in the radial direction becomes smaller toward the distal end side when viewed in the axial direction.

The second rotor magnetic pole portion 87*h* that is bent in the axial direction has a sector-shaped cross-section in the direction perpendicular to the axis, and an outer side surface 87*j* and an inner side surface 87*k* thereof in the radial direction are circular arc surfaces that form a concentric circle with the outer circumferential surface 86*c* of the second rotor core base 86 about the center axis O when viewed in the axial direction.

An angle of the second rotor base portion 87*g* of each second rotor claw magnetic pole 87 in the circumferential direction, that is, an angle that basal end portions of the circumferential end surfaces 87*a*, 87*b* form with the center axis O of the rotation shaft SF is smaller than an angle of a gap between basal ends of second rotor base portions 87*g* of the adjacent second rotor claw magnetic poles 87.

Further, the second rotor core 82 is arranged and fixed relative to the first rotor core 81 such that each of the second rotor claw magnetic poles 87 is positioned between the first rotor claw magnetic poles 85 of the first rotor core 81 as viewed in the axial direction. Here, the second rotor core 82 is coupled to the first rotor core 81 such that the field magnet 83 is arranged between the first rotor core 81 and the second rotor core 82 in the axial direction.

(Field Magnet 83)

The field magnet 83 in the present embodiment is a disk-shaped permanent magnet formed of a ferrite magnet. As shown in FIG. 40, a through hole 83*a* for inserting a rotation shaft SF is formed at a center position of the field magnet 83. Further, one side surface 83*b* of the field magnet 83 contacts the opposing surface 84*a* of the first rotor core base 84 and the other side surface 83*c* of the field magnet 83 contacts the opposing surface 86*a* of the second rotor core base 86, respectively, and the field magnet 83 is sandwiched and fixed between the first rotor core 81 and the second rotor core 82.

An outer diameter of the field magnet 83 is set to conform to outer diameters of the first and second rotor core bases 84, 86 (outer circumferential surfaces 84*c*, 86*c*). Further, a thickness of the field magnet 83 is set at a predetermined thickness.

In the present embodiment, like the second embodiment, as shown in FIG. 36, the first and second rotor claw magnetic poles 85, 87 have a length at which their distal end surfaces 85*c*, 87*c* are flush with opposing surfaces 84*a*, 86*a* of the first and second rotor core bases 84, 86. That is, in the present embodiment, like the second embodiment shown in FIG. 36, a length D1 of the first and second rotor claw magnetic poles 85, 87 in the axial direction is shorter by a thickness of the first and second rotor core bases 84, 86 in the axial direction.

As shown in FIG. 36, the field magnet 83 is magnetized along the axial direction such that the first rotor core 81 becomes an N pole and the second rotor core 82 becomes an S pole. Accordingly, the first rotor claw magnetic poles 85 of the first rotor core 81 function as N poles (first magnetic poles), and the second rotor claw magnetic poles 87 of the second rotor core 82 function as S poles (second magnetic poles) by the field magnet 83.

The U-phase rotor 80*u*, the V-phase rotor 80*v* and the W-phase rotor 80*w* form the so-called Lundell type structure rotors using the field magnet 83. Further, each of the rotors 80*u*, 80*v*, 80*w* forms a rotor with twenty-four poles (twelve pairs of pole numbers) in which the first rotor claw magnetic poles 85 functioning as the N poles and the second rotor claw magnetic poles 87 functioning as the S poles are alternately arranged in the circumferential direction.

Further, the U-phase, V-phase, and W-phase rotors 80*u*, 80*v*, 80*w* are stacked in the axial direction as shown in FIG. 37 and FIG. 38, and form the rotor 80.

Here, as shown in FIG. 36 and FIG. 39, when the first rotor core 81 is on an upper side and the second rotor core 82 is on a lower side relative to the field magnet 83 (configuration in which a magnetizing direction of the field magnet 83 is upward), the U-phase and W-phase rotors 80*u*, 80*w* are stacked facing frontward, and the V-phase rotor 80*v* is stacked facing backward. Thus, magnetizing directions of the field magnet 83 by the U-phase and W-phase rotors 80*u*, 80*w* are of a same direction (upward in FIG. 39), and a magnetizing direction of the field magnet 83 by the V-phase rotor 80*v* is of an opposite direction relative to the magnetizing direction of the field magnet 83 by the U-phase and W-phase rotors 80*u*, 80*w* (downward in FIG. 39). The rotors 80*u*, 80*v*, 80*w* for the phases are stacked in the same manner as the second embodiment and the third embodiment.

As shown in FIG. 38, the U-phase rotor 80*u*, the V-phase rotor 80*v*, and the W-phase rotor 80*w* are stacked with their phases deviated by 60 degrees in electrical angle (5 degrees in mechanical angle).

More specifically, the V-phase rotor 80*v* is fixed to the rotation shaft SF with its phase deviated by 60 degrees in electrical angle from the U-phase rotor 80*u* in a counterclockwise direction. The W-phase rotor 80*w* is fixed to the rotation shaft SF with its phase deviated by 60 degrees in electrical angle from the V-phase rotor 80*v* in the counterclockwise direction.

(Stator 90)

Figure 41:
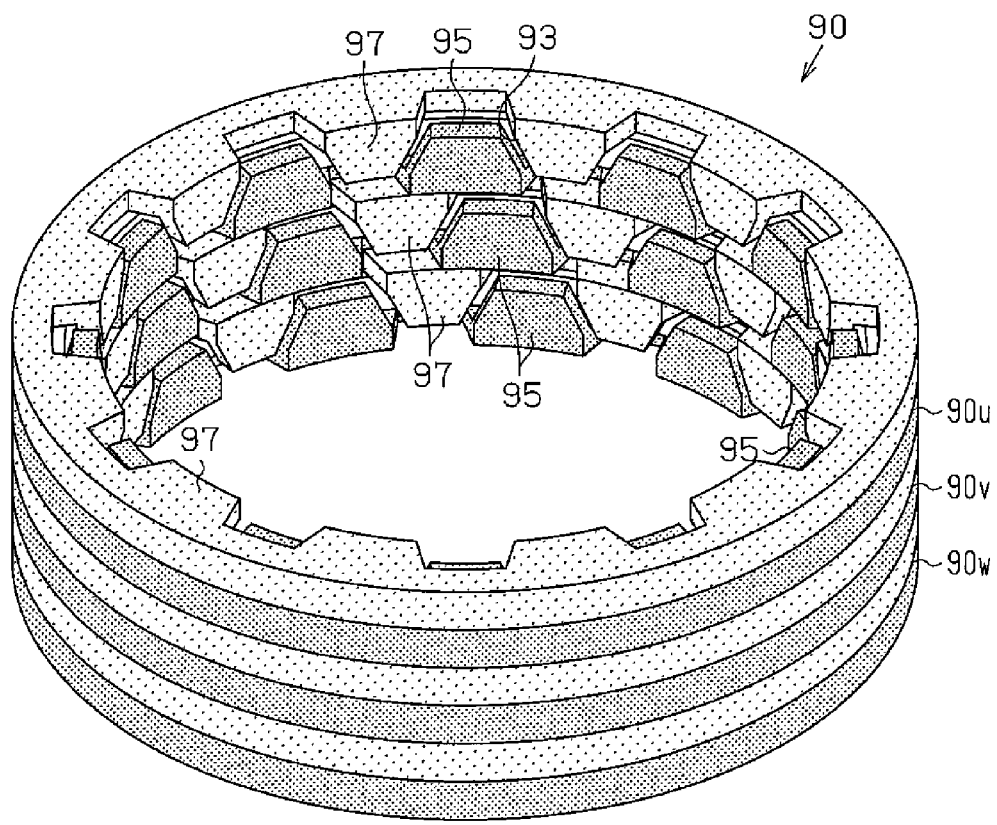
FIG. 41 is an overall perspective view of a stator of FIG. 33.
Figure 42:
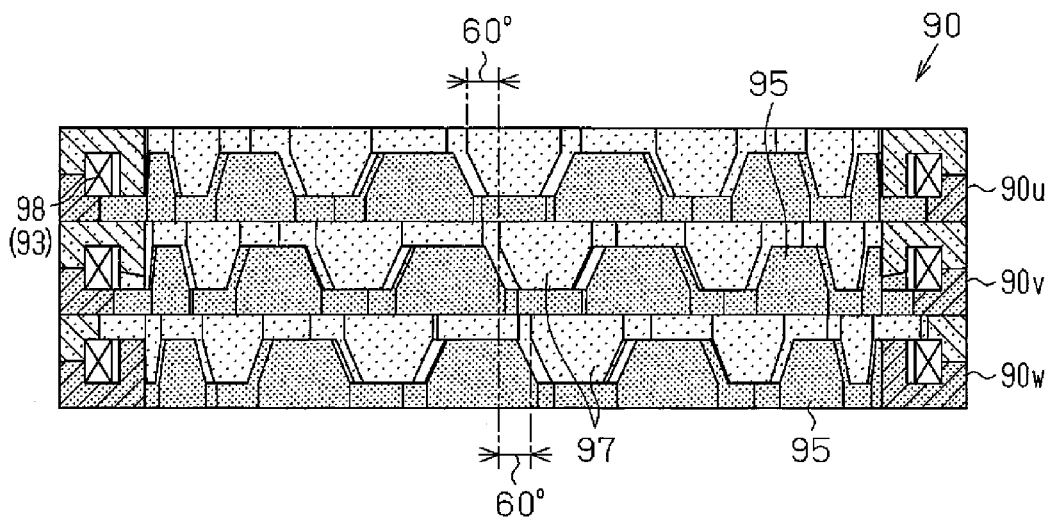
FIG. 42 is a cross-sectional view of the stator of FIG. 41.

As shown in FIG. 41 and FIG. 42, the stator 90 arranged on an outer side of the rotor 80 in the radial direction includes three stators, namely a U-phase stator 90*u*, a V-phase stator 90*v*, and a W-phase stator 90*w*. The stators 90*u*, 90*v*, 90*w* of the respective phases are stacked in order in an axial direction so as to respectively oppose the corresponding one of the U-phase rotor 80*u*, the V-phase rotor 80*v*, and the W-phase rotor 80*w* in the radial direction.

Figure 43:
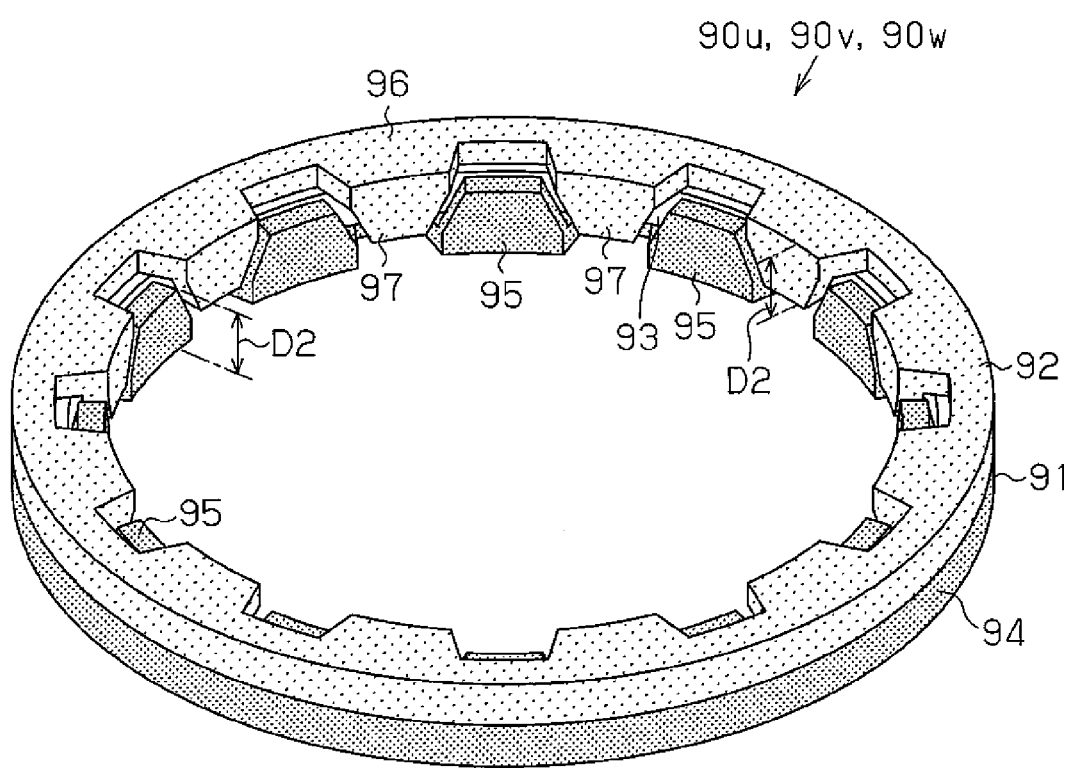
FIG. 43 is a perspective view of the single stator of FIG. 41.
Figure 44:
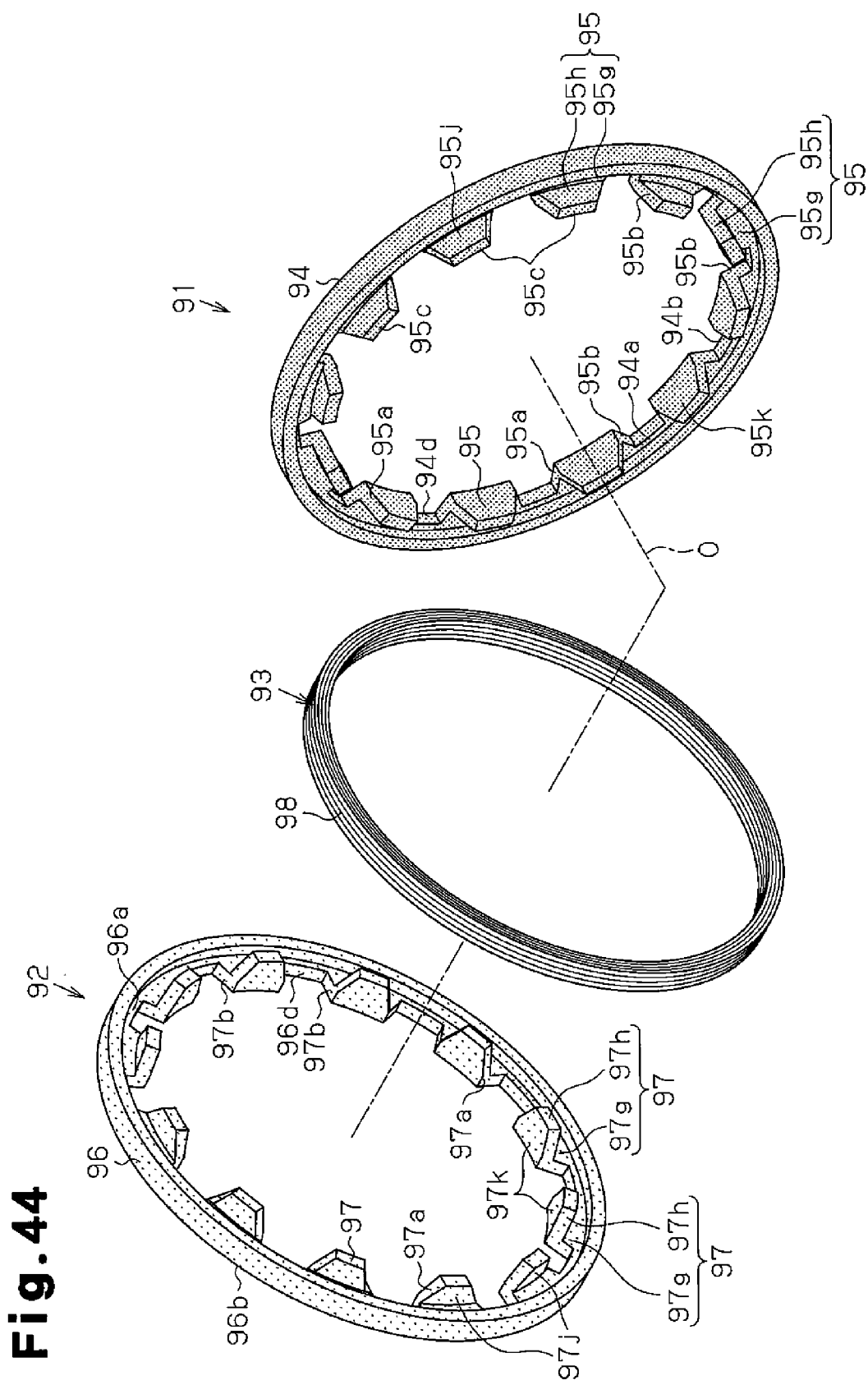
FIG. 44 is an exploded perspective view of the single stator of FIG. 43.

The stators 90*u*, 90*v*, 90*w* for the phases have identical structures, and as shown in FIG. 43 and FIG. 44, and each include first and second stator cores 91, 92, and a coil section 93.

(First Stator Core 91)

As shown in FIG. 44, the first stator core 91 includes an annular shaped first stator core base 94. The annular shaped first stator core base 94 has a length in the axial direction formed longer than a length in the radial direction, and its length in the axial direction is half the length of the rotors of the respective phases in the axial direction.

Twelve pieces of first stator claw magnetic poles 95 are arranged at equal intervals on an inner circumferential surface 94*d* of the first stator core base 94. Each of the first stator claw magnetic poles 95 projects toward an inner side in the radial direction, and its distal end is bent in the axial direction toward the second stator core 92.

Here, in each of the first stator claw magnetic poles 95, a portion projecting toward the inner side in the radial direction from the inner circumferential surface 94*d* on one side of the first stator core base 94 is referred to as a first stator base portion 95*g*, and a distal end portion bent in the axial direction is referred to as a first stator magnetic pole portion 95*h*. Further, the first stator claw magnetic poles 95 before the first stator magnetic pole portions 95*h* are bent and formed (a stator core material 102 shown in FIG. 46) are formed in a trapezoidal shape that narrows toward the distal end when viewed in the axial direction.

That is, the shape of the first stator base portions 95*g* when viewed in the axial direction becomes a trapezoidal shape of which width narrows toward a radially outer side, and the shape of the first stator magnetic pole portions 95*h* when viewed in the radial direction becomes a trapezoidal shape of which width narrows toward the distal end. Further, circumferential end surfaces 95*a*, 95*b* of each first stator claw magnetic pole 95 including the first stator base portion 95*g* and the first stator magnetic pole portion 95*h* are both flat surfaces, and approach each other toward the outer side in the radial direction.

Thus, a cross-sectional area of a cross-section of the first stator base portion 95*g* cut in an axial direction becomes smaller toward the radially outer side when viewed in the radial direction. Further, a cross-sectional area of a cross-section of the first stator magnetic pole portion 95*h* cut in the radial direction becomes smaller toward the distal end side when viewed in the axial direction.

The first stator magnetic pole portion 95*h* that is bent in the axial direction has a sector-shaped cross-section in the direction perpendicular to the axis, and an outer side surface 95*j* and an inner side surface 95*k* thereof in the radial direction are circular arc surfaces that form a concentric circle with the inner circumferential surface 94*d* of the first stator core base 94 about the center axis O when viewed in the axial direction.

An angle of each first stator claw magnetic pole 95 in the circumferential direction, that is, an angle formed by the circumferential end surfaces 95*a*, 95*b* and the center axis O of the rotation shaft SF is smaller than an angle of a gap between basal ends of a first stator claw magnetic pole 95 and a first stator claw magnetic pole 95 that are adjacent to each other.

(Second Stator Core 92)

As shown in FIG. 44, the second stator core 92 includes an annular-shaped second stator core base 96 that is formed from the same material and shaped identically to the first stator core base 94. The second stator core base 96 has its end on one side in the axial direction in contact with an end on the other side of the first stator core base 94 in the axial direction.

Twelve pieces of second stator claw magnetic poles 97 are arranged at equal intervals on the inner circumferential surface 96*d* of the second stator core base 96. Each of the second stator claw magnetic poles 97 is projected toward the inner side in the radial direction, and its distal end is bent in the axial direction toward the first stator core 91.

Here, in each of the second stator claw magnetic poles 97, a portion projecting toward the inner side in the radial direction from the inner circumferential surface 96*d* on the other side of the second stator core base 96 is referred to as a second stator base portion 97*g*, and a distal end portion bent in the axial direction is referred to as a second stator magnetic pole portion 97*h*. Further, the second stator claw magnetic poles 97 before the second stator magnetic pole portions 97*h* are bent and formed (the stator core material 102 shown in FIG. 46) are formed in a trapezoidal shape that narrows toward the distal end when viewed in the axial direction.

That is, the shape of the second stator base portions 97*g* when viewed in the axial direction becomes a trapezoidal shape of which width narrows toward the radially outer side, and the shape of the second stator magnetic pole portions 97*h* when viewed in the radial direction becomes a trapezoidal shape of which width narrows toward the distal end. Further, circumferential end surfaces 97*a*, 97*b* of each second stator claw magnetic pole 97 including the second stator base portion 97*g* and the second stator magnetic pole portion 97*h* are both flat surfaces and approach each other toward the outer side in the radial direction.

Thus, a cross-sectional area of a cross-section of the second stator base portion 97g cut in an axial direction becomes smaller toward the radially outer side when viewed in the radial direction. Further, a cross-sectional area of a cross-section of the second stator magnetic pole portion 97h cut in the radial direction becomes smaller toward the distal end side when viewed in the axial direction.

The second stator magnetic pole portion 97h that is bent in the axial direction has a sector-shaped cross-section in the direction perpendicular to the axis, and an outer side surface 97j and an inner side surface 97k thereof in the radial direction are circular arc surfaces that form a concentric circle with the inner circumferential surface 96d of the second stator core base 96 about the center axis O when viewed in the axial direction.

An angle of each second stator claw magnetic pole 97 in the circumferential direction, that is, an angle formed by the circumferential end surfaces 97a, 97b and the center axis O of the rotation shaft SF is smaller than an angle of a gap between basal ends of a second stator claw magnetic pole 97 and a second stator claw magnetic pole 97 that are adjacent to each other.

That is, by being formed in this manner, the shape of the second stator core 92 becomes identical to the first stator core 91. Further, an end surface on the other side of the first stator core base 94 and an end surface on the one side of the second stator core base 96 are caused to come into contact, and the second stator core 92 is arranged and fixed such that each second stator claw magnetic pole 97 is positioned respectively between the first stator claw magnetic poles 95 when viewed in the axial direction.

Here, each of the first stator claw magnetic poles 95 is configured such that a distal end surface 95c of the first stator magnetic pole portion 95h thereof is positioned at a position where it becomes flush with an opposing surface 97m of the second stator base portion 97g opposing the first stator core 91. In the same manner, each of the second stator claw magnetic poles 97 is configured such that a distal end surface 97c of the second stator magnetic pole portion 97h thereof is positioned at a position where it becomes flush with an opposing surface 95m of the first stator base portion 95g opposing the second stator core 92. That is, in the present embodiment, a length D2 of the first and second stator claw magnetic poles 95, 97 in the axial direction is shorter by a thickness of the first and second stator core bases 94, 96 in the axial direction.

An annular space having a square cross-sectional shape is defined and formed by the inner circumferential surfaces 94d, 96d of the first and second stator core bases 94, 96, the opposing surfaces 95m, 97m of the first and second stator base portions 95g, 97g, and the outer side surfaces 95j, 97j of the first and second stator magnetic pole portions 95h, 97h. Further, as shown in FIG. 36, the coil section 93 is arranged and fixed in the annular space with the square cross-sectional shape.

(Coil Section 93)

As shown in FIG. 44, the coil section 93 has an annular wiring 98 and the annular wiring 98 is wound in an annular space.

The U-phase, V-phase, and W-phase stators 90u, 90v, 90w each become a so-called Lundell type (claw-pole type) stator with twenty-four poles that excites the first and second stator claw magnetic poles 95, 97 to magnetic poles that are different from one another each time due to the annular wiring 98 between the first and second stator cores 91, 92. Further, as shown in FIG. 41 and FIG. 42, the U-phase, V-phase, and W-phase stators 90u, 90v, 90w are stacked in the axial direction to form the stator 90.

Here, as shown in FIG. 41 and FIG. 42, in the stator 90 including the U-phase, V-phase, and W-phase stators 90u, 90v, 90w, the U-phase stator 90u, the V-phase stator 90v, and the W-phase stator 90w are stacked by deviating their phases by 60 degrees in electrical angle.

More specifically, the V-phase stator 90v is fixed to a motor housing (not shown) with its phase deviated by 60 degrees in electrical angle in a clockwise direction relative to the U-phase stator 90u. The W-phase stator 90w is fixed to the motor housing with its phase deviated by 60 degrees in electrical angle in the clockwise direction relative to the V-phase stator 90v.

That is, an inclined direction (see FIG. 38) relative to the axial direction formed by the deviations of the three rotors 80u, 80v, 80w when viewed in the radial direction and an inclined direction (see FIG. 42) relative to the axial direction formed by the deviations of the three stators 90u, 90v, 90w when viewed in the radial direction are arranged to be opposite to one another at the opposing surfaces of the rotor 80 and the stator 90.

Further, a U-phase power voltage of a three-phase AC power is applied to the annular wiring 98 of the U-phase stator 90u, a V-phase power voltage of the three-phase AC power is applied to the annular wiring 98 of the V-phase stator 90v, and a W-phase power voltage of the three-phase AC power is applied to the annular wiring 98 of the W-phase stator 90w.

Next, the operation of the brushless motor M will be described.

When a three-phase AC power voltage is applied to the stator 90, like the first to third embodiments, a U-phase power voltage is applied to an annular wiring 98 of the U-phase stator 90u, a V-phase power voltage is applied to an annular wiring 98 of the V-phase stator 90v, and a W-phase power voltage is applied to an annular wiring 98 of the W-phase stator 90w. Thus, a rotating magnetic field is generated in the stator 90, and the rotor 80 is rotated and driven.

Here, the stator 90 includes the three stage structure of the U-phase, V-phase, and W-phase stators 90u, 90v, 90w in correspondence with the three-phase AC power.

Accordingly, the rotor 80 also includes the three stage structure of the U-phase, V-phase, and W-phase rotors 80u, 80v, 80w. Thus, in the stator and the rotor of each phase, the stator opposing the field magnet 83 along the axial direction can independently receive magnetic flux of the field magnet 83, and an increase in output can be achieved.

Further, the length D1 of the first and second rotor claw magnetic poles 85, 87 in the axial direction is shortened in the U-phase, V-phase, and W-phase rotors 80u, 80v, 80w of the three-stage structure.

Thus, the first rotor claw magnetic poles 85 of the U-phase rotor 80u and the first rotor claw magnetic poles 85 of the V-phase rotor 80v are separated from one another in the axial direction, and the second rotor claw magnetic poles 87 of the V-phase rotor 80v and the second rotor claw magnetic poles 87 of the W-phase rotor 80w are separated from one another in the axial direction. As a result, short circuiting of the magnetic flux between the first rotor claw magnetic poles 85 of the U-phase and V-phase is suppressed, and short circuiting of the magnetic flux between the second rotor claw magnetic poles 87 of the V-phase and W-phase is suppressed.

Moreover, the length D2 of the first and second stator claw magnetic poles 95, 97 in the axial direction is shortened in the U-phase, V-phase, and W-phase stators 90u, 90v, 90w of the three-stage structure.

That is, in the U-phase, V-phase, and W-phase stators 90u, 90v, 90w, each of the first stator claw magnetic poles 95 are separated from one another, and each of the second stator claw magnetic poles 97 are separated from one another. As a result, short circuiting of the magnetic flux between the first stator claw magnetic poles 95 of the different phases is suppressed, and short circuiting of the magnetic flux between the second stator claw magnetic poles 97 of the different phases is suppressed.

Further, since the first and second rotor claw magnetic poles 85, 87 of the U-phase, V-phase, and W-phase rotors 80u, 80v, 80w that are in the three-stage structure are formed in trapezoidal shape that narrows toward the distal end, the magnetic flux from the field magnets 83 are more efficiently guided to the distal end portions of the first and second rotor magnetic pole portions 85h, 87h.

In the same manner, since the first and second stator claw magnetic poles 95, 97 of the U-phase, V-phase, and W-phase stators 90u, 90v, 90w in the three-stage structure are formed in trapezoidal shape that narrows toward the distal end, the magnetic flux from the annular wirings 98 are more efficiently guided to the distal end portions of the first and second stator magnetic pole portions 95h, 97h.

In this manner, since the space between specific claw magnetic poles is open, the short circuiting of the magnetic flux is suppressed, and the magnetic flux is efficiently guided to the distal end portions of the respective magnetic pole portions 85h, 87h, 95h, 97h, it becomes possible to form the brushless motor M with high torque.

In the present embodiment, like the above embodiments, when a request to change the number of magnetic poles is made, since the U-phase, V-phase, and W-phase rotors 80u, 80v, 80w of the rotor 80 form the Lundell type structure, the number of poles can easily be changed by simply changing the number of the first and second rotor claw magnetic poles 85, 87 while maintaining the field magnets 83 in the identical structure. In the same manner, since the U-phase, V-phase, and W-phase stators 90u, 90v, 90w of the stator 90 form the claw-pole type structure, the number of the first and second stator claw magnetic poles 95, 97 can be changed while maintaining the coil sections 93 in the identical structure. Thus, the number of poles is easily changed.

Next, a manufacturing method of the first rotor core 81 of the rotor 80 and the first stator core 91 of the stator 90 will be described.

The second rotor core 82 has an identical shape as the first rotor core 81, and the second stator core 92 has identical shape as the first stator core 91. Thus, the manufacturing method of the first rotor core 81 and the first stator core 91 will be described, and the manufacturing method of the second rotor core 82 and the second stator core 92 will be omitted.

Figure 45:
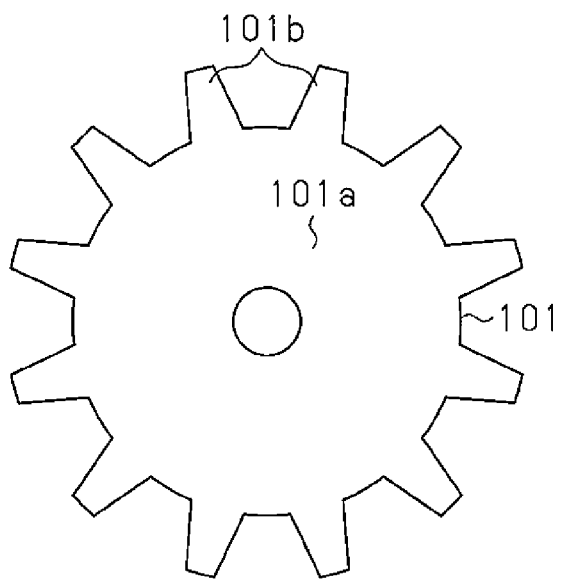
FIG. 45 is a front view showing the material of a first rotor core of FIG. 40.
Figure 46:
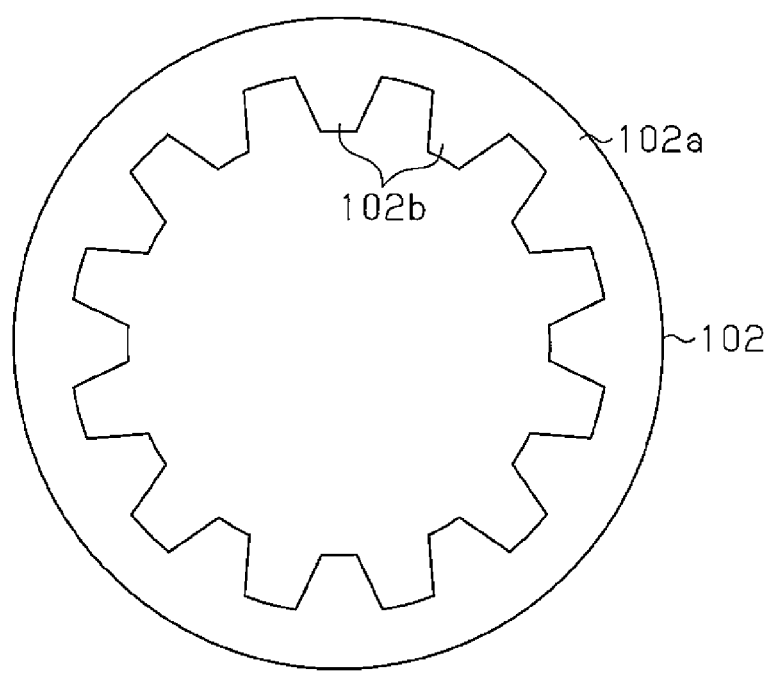
FIG. 46 is a front view showing the material of a first stator core of FIG. 44.

As shown in FIG. 45 and FIG. 46, a rotor core material 101 of the first rotor core 81 and a stator core material 102 of the first stator core 91 are manufactured together by punching a band-shaped rolled steel plate such as a silicon steel sheet using a punching die.

As shown in FIG. 45, the rotor core material 101 includes a rotor core base portion 101a and twelve pieces of rotor magnetic pole portions 101b positioned on an outer circumferential portion of the rotor core base portion 101a. The rotor core base portion 101a that is to be the first rotor core base 84 is formed in a disk shape. The rotor magnetic pole portions 101b that are to be the first rotor claw magnetic poles 85 are formed in a trapezoidal shape that narrows toward a distal end.

Further, as shown in FIG. 46, the stator core material 102 includes a stator core base portion 102a and twelve pieces of stator magnetic pole portions 102b positioned on an inner circumferential portion of the stator core base portion 102a. The stator core base portion 102a to be the first stator core base 94 is formed in an annular shape. The stator magnetic pole portions 102b to be the first stator claw magnetic poles 95 are formed in a trapezoidal shape that narrows toward a distal end.

Figure 47:
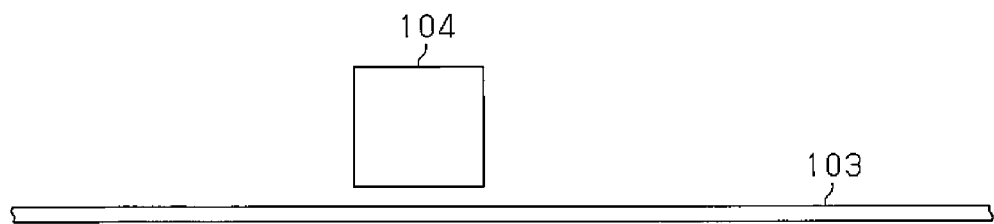
FIG. 47 is an explanatory diagram illustrating a manufacturing process of the materials of the first rotor core and the first stator core.
Figure 48:
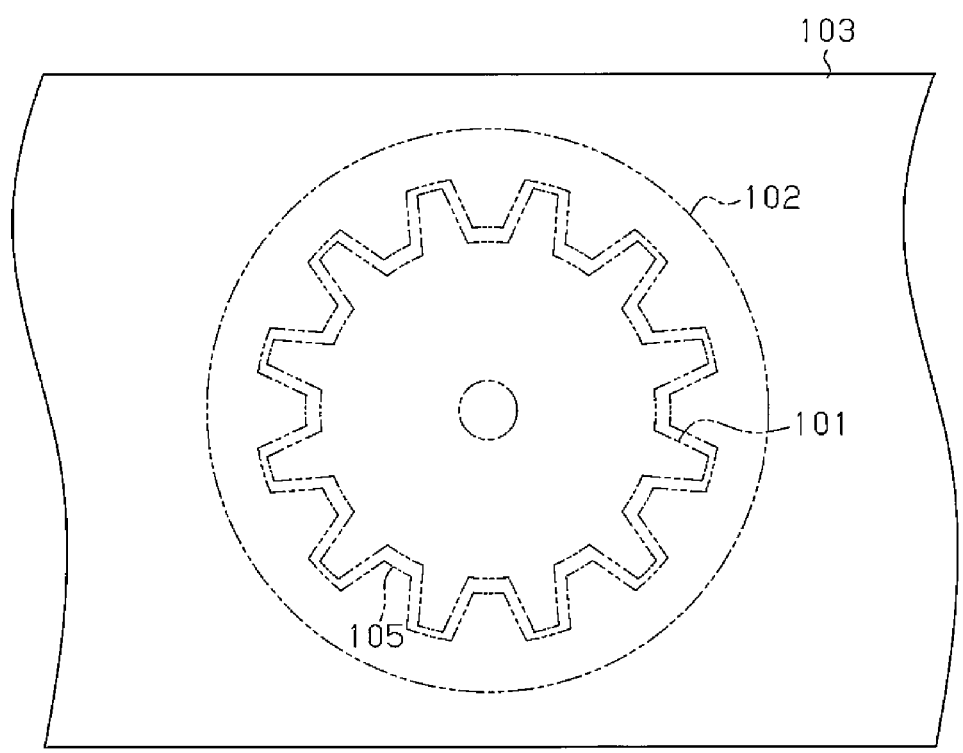
FIG. 48 is a front view showing a rolled steel sheet from which the materials of the first rotor core and the first stator core of FIG. 47 are punched out.

FIG. 47 is an explanatory diagram illustrating a manufacturing process of the rotor core material 101 and the stator core material 102, FIG. 48 is a front view for explaining a rolled steel plate 103 as a band-shaped core plate material from which the rotor core material 101 and the stator core material 102 are punched out of.

In FIG. 47, the band-shaped rolled steel plate 103 is delivered from an upstream side to a downstream side (from left to right in the drawing). Further, in the middle of the feeding, the rotor core material 101 and the stator core material 102 are manufactured by punching the rolled steel plate 103 guided to a punching die 104.

The band-shaped rolled steel plate 103 is formed of a silicon steel sheet, and the rotor core material 101 and the stator core material 102 are simultaneously manufactured by punching portions shown by double-dashed lines in FIG. 48.

That is, in the rolled steel plate 103, as shown in FIG. 48, the disk-shaped rotor core base portion 101a is positioned inside the annular stator core base portion 102a. Here, the punching manufacturing is performed by the punching die 104 such that the twelve pieces of trapezoidal stator magnetic pole portions 102b and the twelve pieces of trapezoidal rotor magnetic pole portions 101b are alternately arranged in the circumferential direction, that is, a rotor magnetic pole portion 101b is positioned between a stator magnetic pole portions 102b and a stator magnetic pole portion 102b.

Thus, the rotor core material 101 and the stator core material 102 are simultaneously manufactured from the rolled steel plate 103. Further, the punching die 104 sequentially repeats these operations on the rolled steel plate 103 that is delivered and guided so that the rotor core material 101 and the stator core material 102 are manufactured simultaneously from the rolled steel plate 103.

Further, the rotor core material 101 undergoes bending processing performed by a pressing machine. This forms the first rotor core 81 shown in FIG. 40.

In the same manner, the stator core material 102 undergoes bending processing performed by a pressing machine, and the first rotor core 81 shown in FIG. 44 is formed.

As described in detail, the present embodiment has the following advantages in addition to the first and second embodiments.

(5) According to the present embodiment, the first and second rotor claw magnetic poles 85, 87 are formed in the trapezoidal shape that narrows toward the distal end. Thus, the magnetic flux from the field magnets 83 reaches the distal end portions of the first and second rotor magnetic pole portions 85h, 87h with further efficiency.

In the same manner, the first and second stator claw magnetic poles 95, 97 are formed in the trapezoidal shape that narrows toward the distal end. Thus, the magnetic flux from the annular wirings 98 efficiently reaches the distal end portions of the first and second stator magnetic pole portions 95h, 97h.

Accordingly, the magnetic flux from the field magnets 83 and the annular wirings 98 is effectively guided to the distal end portions of the respective magnetic pole portions 85h, 87h, 95h, 97h, and acts effectively as a magnetic force. Thus, it becomes possible to provide the brushless motor M with high torque.

(6) According to the present embodiment, the first and second rotor claw magnetic poles 85, 87 are formed in the trapezoidal shape that narrows toward the distal end, and the first and second stator claw magnetic poles 95, 97 are formed in the trapezoidal shape that narrows toward the distal end.

Accordingly, when manufacturing the rotor core material 101 and the stator core material 102 from the rolled steel plate 103, the disk-shaped rotor core base portion 101a is arranged inside the annular stator core base portion 102a. Here, the twelve pieces of trapezoidal stator magnetic pole portions 102b and the twelve pieces of trapezoidal rotor magnetic pole portions 101b are alternately arranged in the circumferential direction.

Accordingly, the rotor core material 101 and the stator core material 102 can be manufactured simultaneously by performing punching with the punching die 104.

In addition, in the rolled steel plate 103, since the rotor core material 101 is manufactured by using a portion inside the stator core material 102, the yield of the rolled steel plate 103 is satisfactory, and the manufacturing cost of the rotor core material 101 and the stator core material 102 can be reduced.

Further, the stator magnetic pole portions 102b and the rotor magnetic pole portions 101b are formed in the trapezoidal shape that narrows toward the distal end. Thus, the rotor magnetic pole portion 101b to be arranged between the stator magnetic pole portion 102b and the stator magnetic pole portion 102b can be punched out without being interfered by the stator magnetic pole portions 102b opposing in the circumferential direction since the distal end portion is narrowed. In the same manner, the stator magnetic pole portion 102b arranged between the rotor magnetic pole portion 101b and the rotor magnetic pole portion 101b can be punched out without being interfered by the rotor magnetic pole portions 101b opposing in the circumferential direction since the distal end portion is narrowed.

Accordingly, processing errors when simultaneously manufacturing the rotor core material 101 and the stator core material 102 through punching can be reduced, the yield can be further increased, and the manufacturing cost can be reduced.

Fifth Embodiment

Next, a fifth embodiment of a motor will be described with reference to FIG. 49 to FIG. 61.

The brushless motor M in the first to fourth embodiments is an inner rotor type. The feature of the present embodiment is in that an outer rotor type is used.

Figure 49:
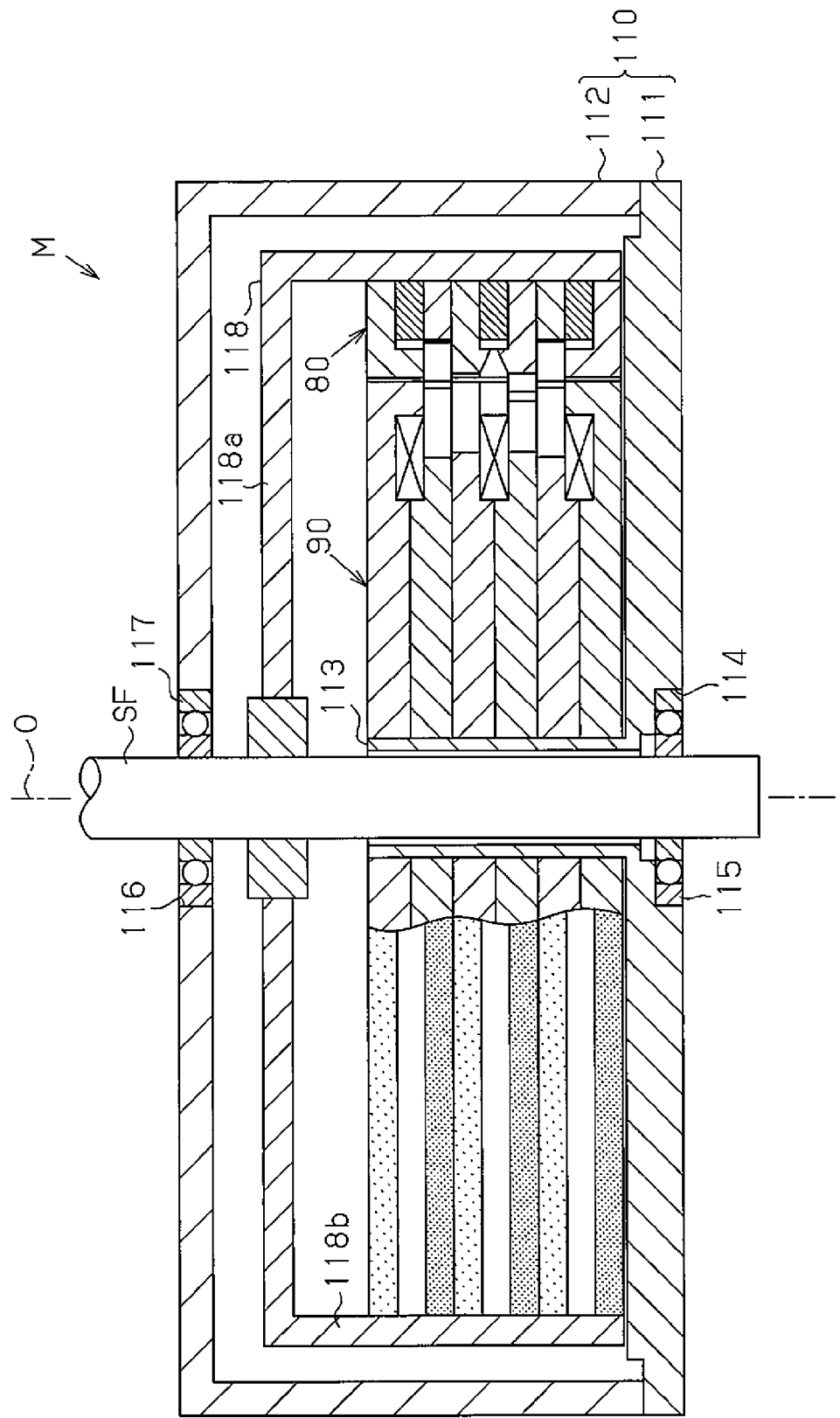
FIG. 49 is a cross-sectional view taken from a radial direction of a motor according to a fifth embodiment of the present invention.

In FIG. 49, a brushless motor M includes a motor housing 110, and the motor housing 110 includes a disk shaped base housing 111, and a cylindrical cover housing 112 having a closed end and covering a side of the base housing 111. The base housing 111 has a cylindrical boss section 113 formed at its inner central position. A through hole 114 is extends through the central position of the base housing 111 that includes the boss section 113, and a bearing 115 is fixed in the through hole 114. Further, at a central position of a closed end of the cylindrical cover housing 112, a through hole 116 is similarly formed, and a bearing 117 is fixed in the through hole 116. Further, the bearings 115, 117 fixed in the through holes 114, 116 rotatably support a rotation shaft SF extending the motor housing 110.

Further, as shown in FIG. 49, a cylindrical rotor housing 118 having a closed end is arranged in the motor housing 110, and the rotor housing 118 includes a circular lid portion 118a and a cylindrical wall 118b. The rotor housing 118 is fixed to the rotation shaft SF extending through a central position of the circular lid portion 118a, and integrally rotates with the rotation shaft SF.

The brushless motor M includes a stator 90 and a rotor 80. The stator 90 is fixed to an outer circumferential surface of the boss section 113 formed in the base housing 111. The rotor 80 is fixed to an inner circumferential surface of the cylindrical wall 118b of the rotor housing 118 so as to encase the stator 90.

Figure 50:
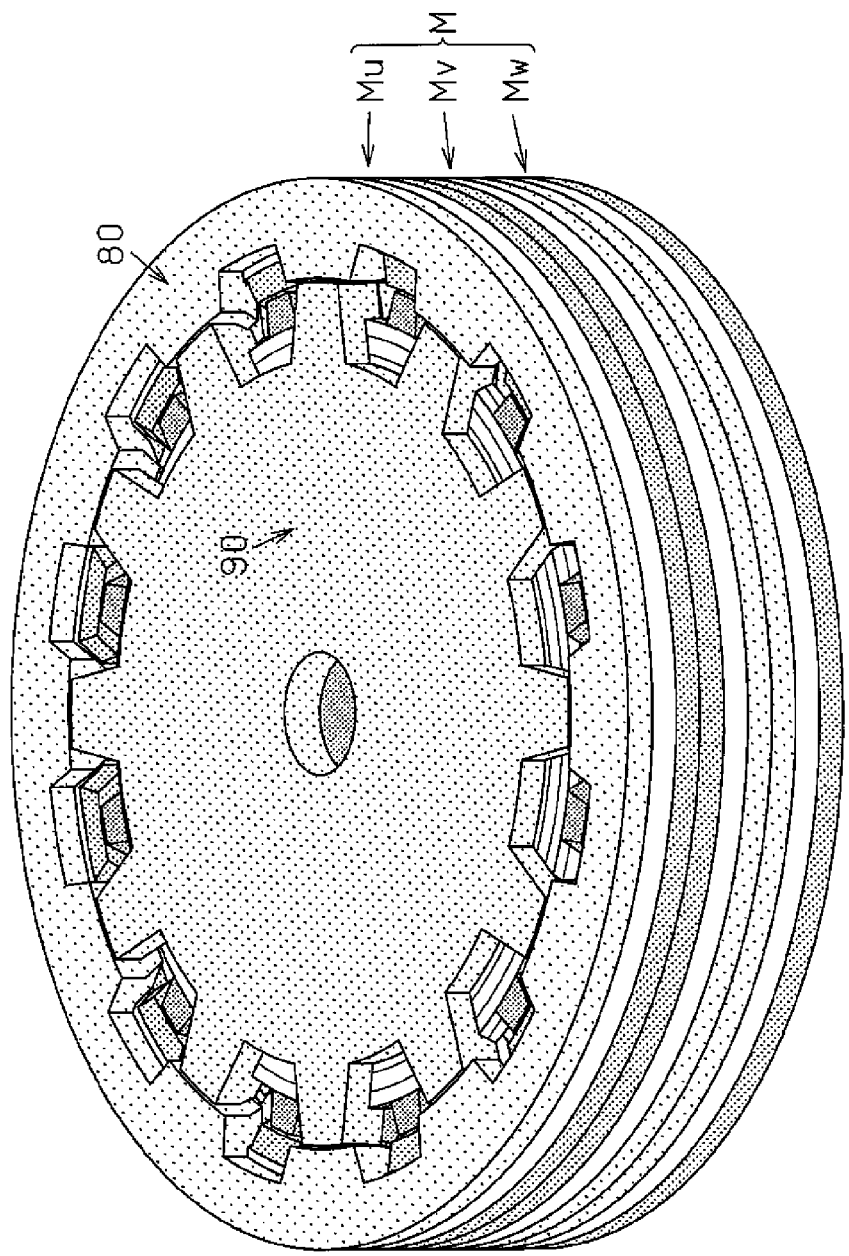
FIG. 50 is a perspective view of the motor of FIG. 49.
Figure 51:
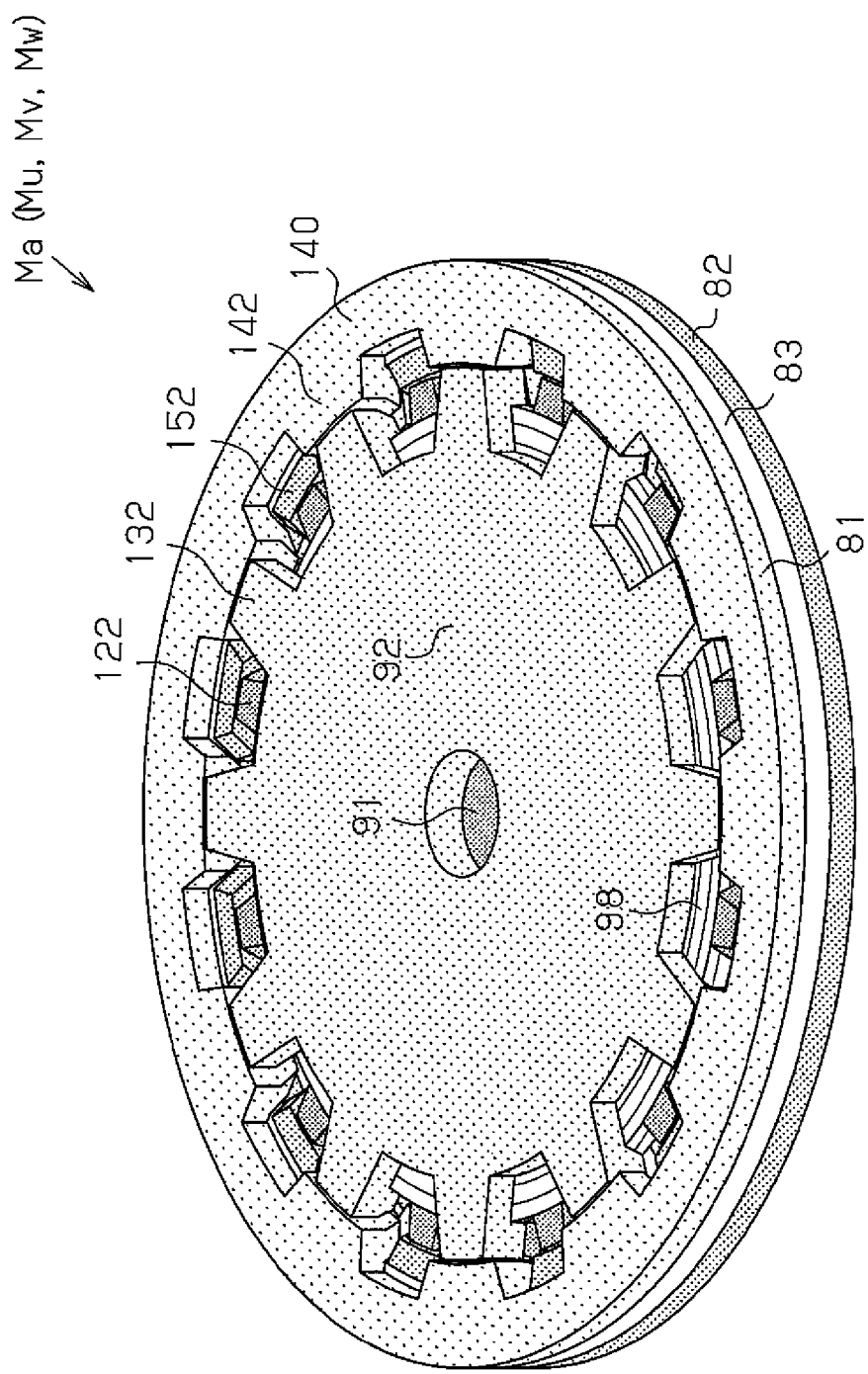
FIG. 51 is a perspective view of the single motor of FIG. 50.
Figure 52:
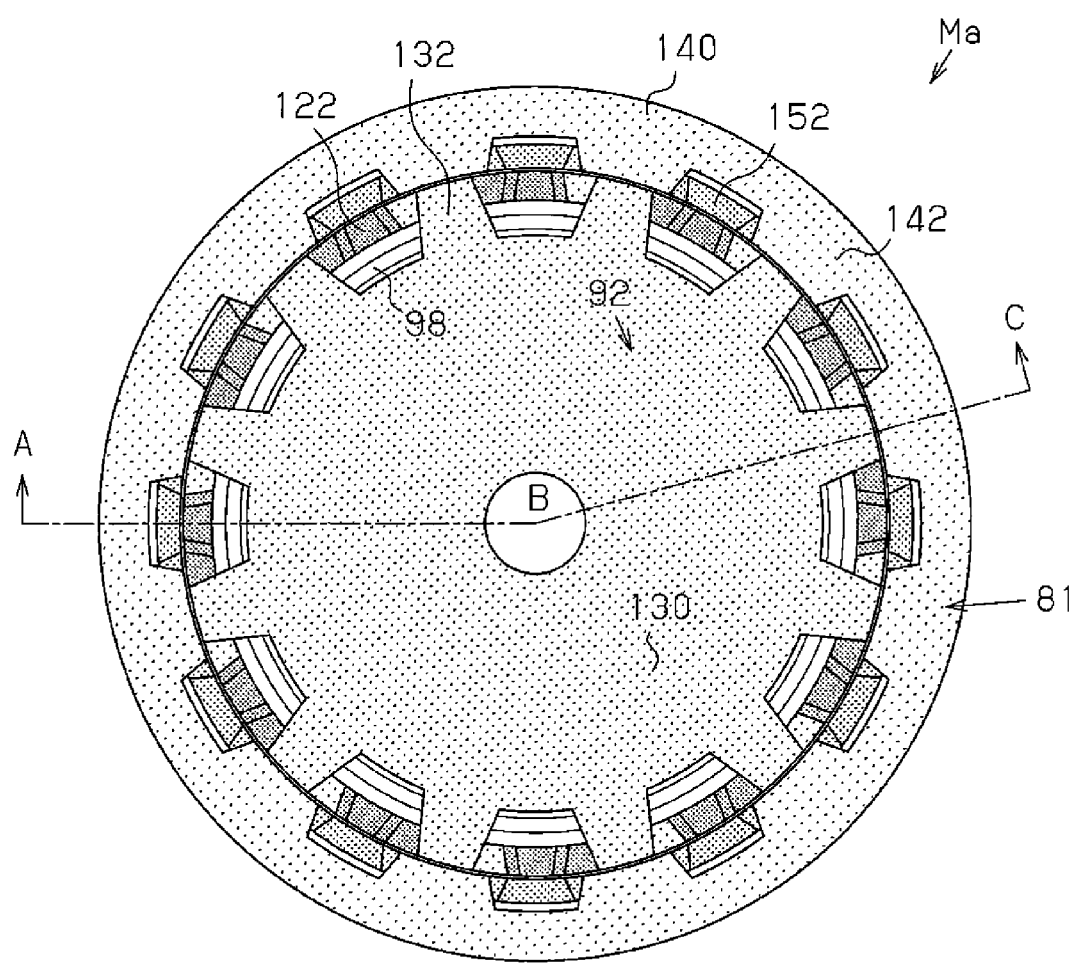
FIG. 52 is a front view taken from an axial direction of the single motor of FIG. 50.
Figure 53:
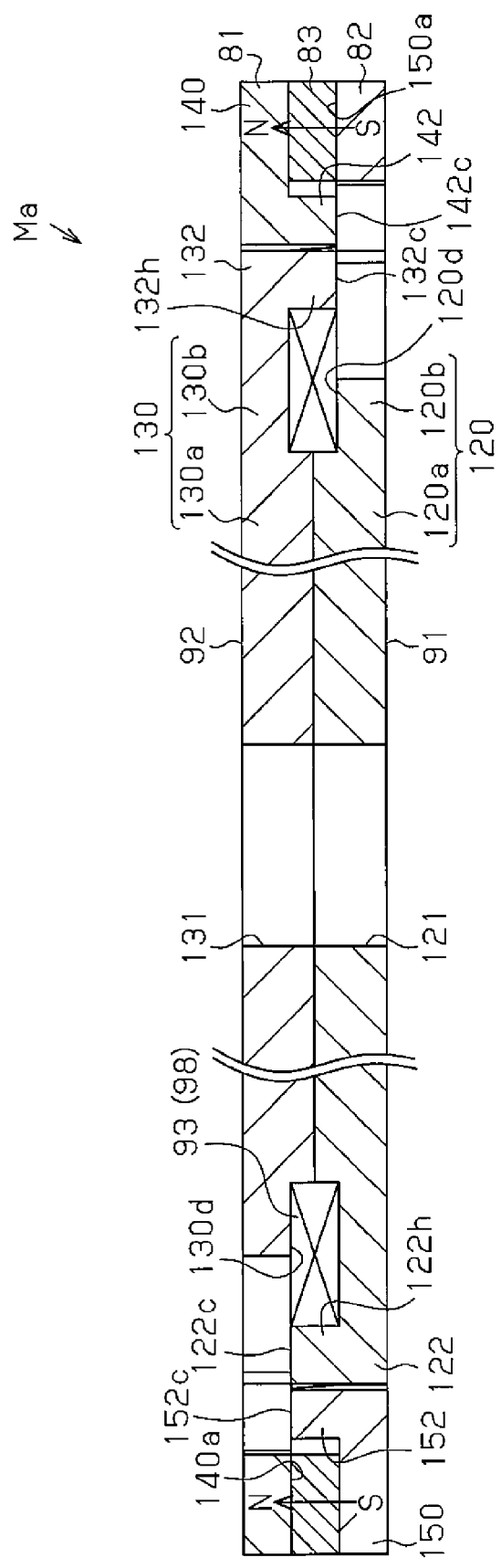
FIG. 53 is a combined cross-sectional view taken along line A-B-C in FIG. 52.

As shown in FIG. 50, the brushless motor M includes single motors Ma stacked in three stages in an axial direction as shown in FIG. 51 to FIG. 53. The motors Ma include a U-phase motor unit Mu, a V-phase motor unit Mv, and a W-phase motor unit Mw in this order from the top.

(Stator 90)

Figure 54:
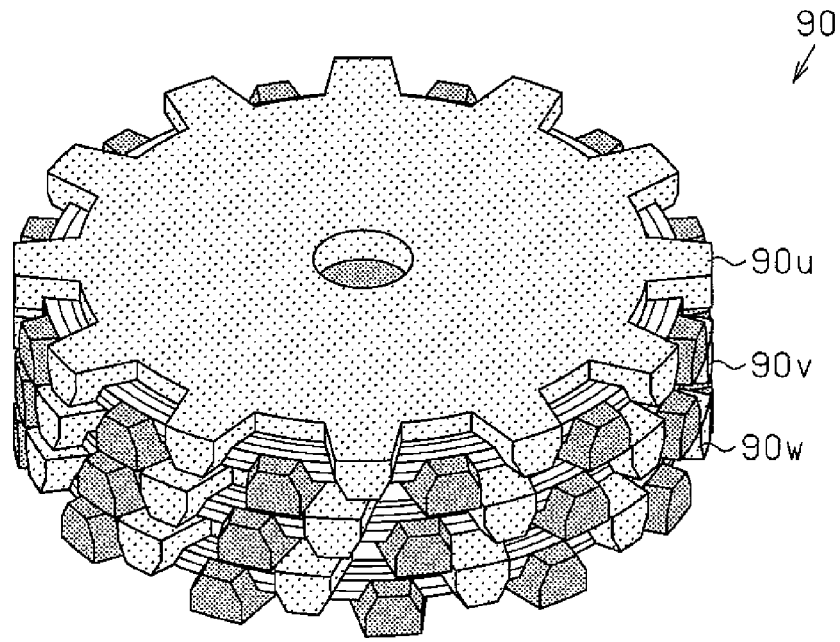
FIG. 54 is an overall perspective view of a stator of FIG. 50.
Figure 55:
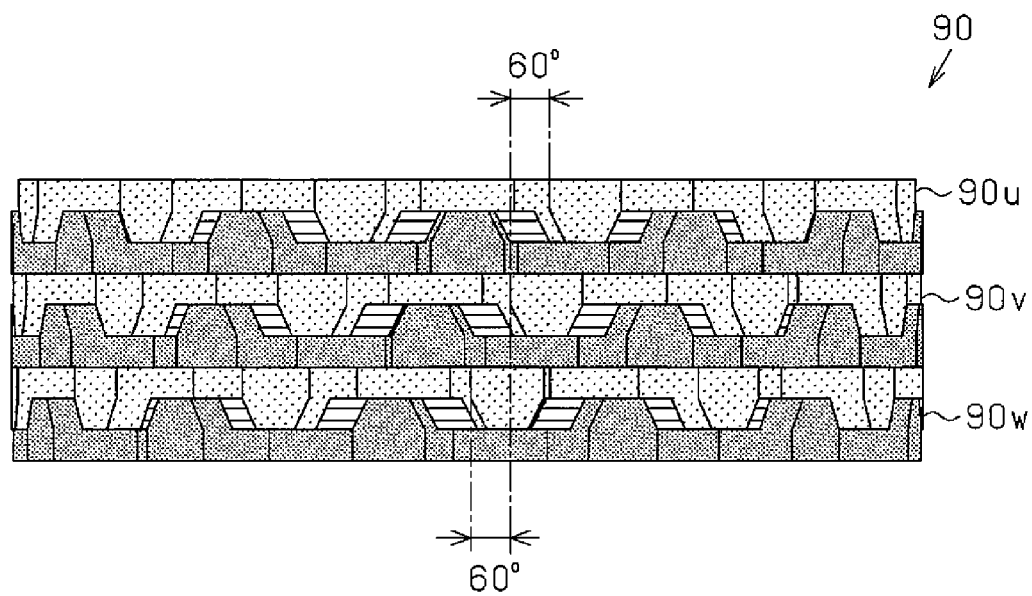
FIG. 55 is a front view taken from a radial direction of the stator of FIG. 54.
Figure 58:
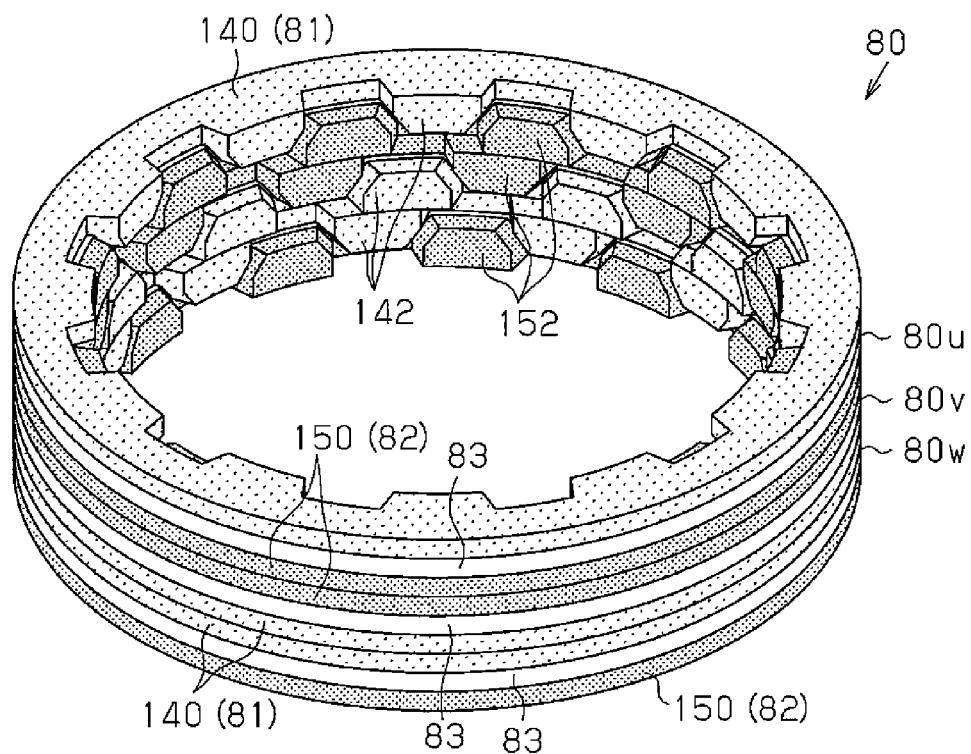
FIG. 58 is an overall perspective view of a rotor of FIG. 50.
Figure 59:
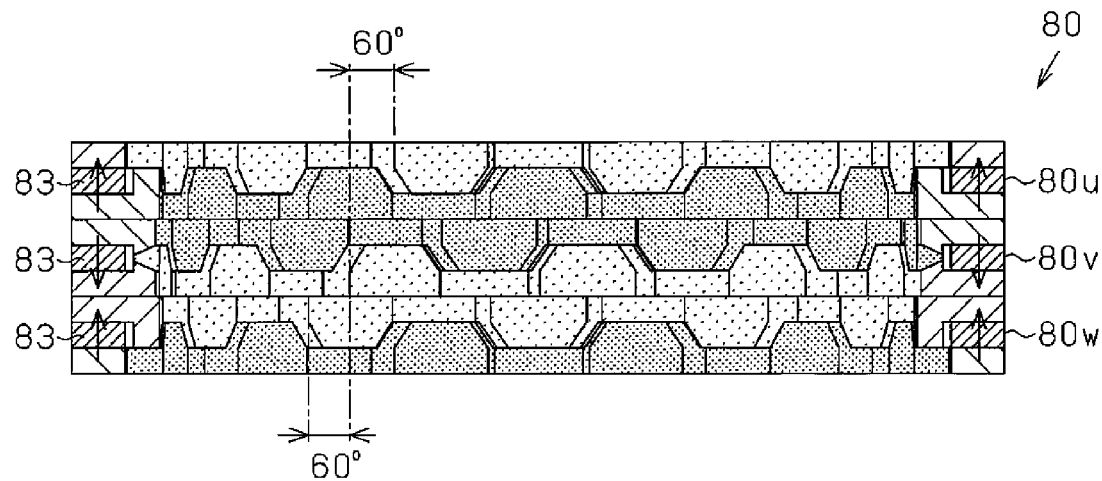
FIG. 59 is a cross-sectional view taken from a radial direction of the rotor of FIG. 58.

As shown in FIG. 49, the stator 90 fixed on an outer circumferential surface of the boss section 113 of the base housing 111 includes three components, namely a U-phase stator 90u, a V-phase stator 90v, and a W-phase stator 90w as shown in FIG. 54 and FIG. 55. As shown in FIG. 58 and FIG. 59, the stators 90u, 90v, 90w of the respective phases are configured by being stacked in order in the axial direction so as to respectively oppose the corresponding one of the U-phase rotor 80u, the V-phase rotor 80v, and the W-phase rotor 80w in a radial direction.

Figure 56:
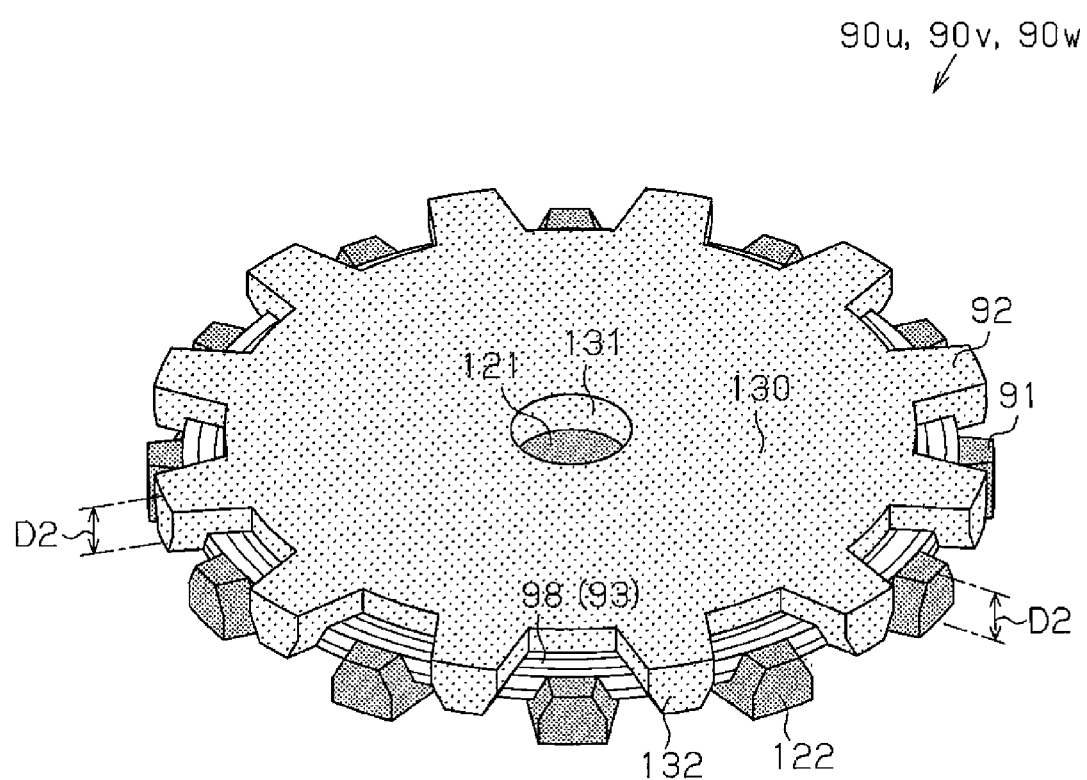
FIG. 56 is a perspective view of the single stator of FIG. 54.
Figure 57:
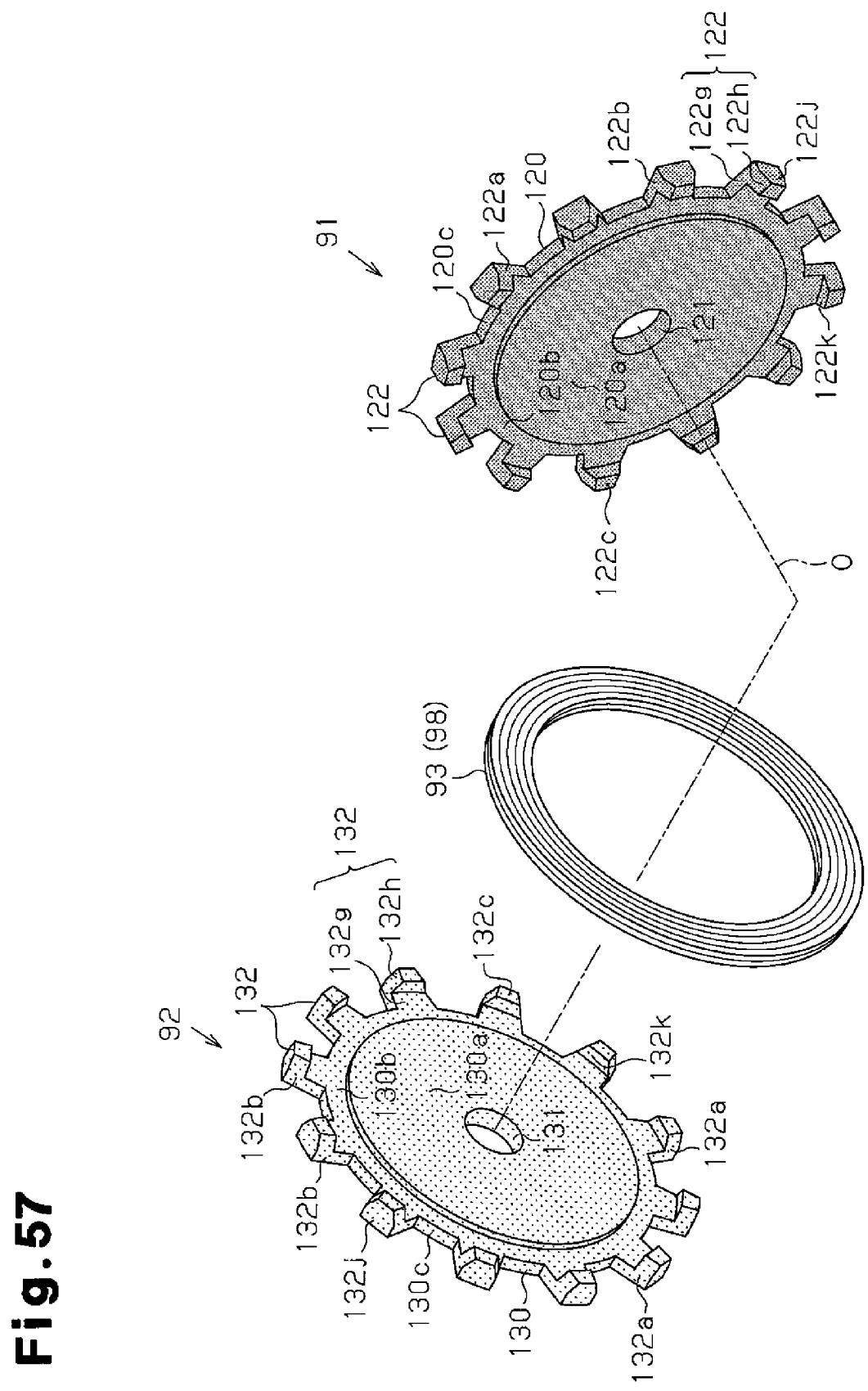
FIG. 57 is an exploded perspective view of the single stator of FIG. 56.

The stators 90u, 90v, 90w of the respective phases have identical structures, and as shown in FIG. 56 and FIG. 57, and each include first and second stator cores 91, 92, and a coil section 93.

(First Stator Core 91)

As shown in FIG. 57, the first stator core 91 includes a first stator core base 120 that is formed in a disk shape. A through hole 121 for insertion and fixing of the boss section 113 is formed at a center position of the first stator core base 120. In the first stator core base 120, a center portion of a part opposing the second stator core 92 is formed thicker than an outer circumferential portion (length in the axial direction being longer). Further, the thick portion at the center is referred to as a thick portion 120a, and the outer circumferential portion of the thick portion 120a is referred to as a thin portion 120b.

Further, twelve pieces of first stator claw magnetic poles 122 having an identical shape are formed at equal intervals on an outer circumferential surface 120c of the first stator core base 120. Each of the first stator claw magnetic poles 122 projects radially outward, and a distal end thereof is bent toward the second stator core 92 in the axial direction.

Here, in each first stator claw magnetic poles 122, the portion projecting radially outward from the outer circumferential surface 120c of the first stator core base 120 is referred to as a first stator base portion 122g, and the distal end portion bent in the axial direction is referred to as a first stator magnetic pole portion 122h. Further, the first stator claw magnetic poles 122 before the first stator magnetic pole portions 122h are formed by bending have a trapezoidal shape that narrows toward a distal end when viewed in the axial direction.

That is, the shape of each first stator base portion 122g when viewed in the axial direction is a trapezoidal shape that narrows toward a radially outer side, and the shape of each first stator magnetic pole portion 122h when viewed in the radial direction is a trapezoidal shape that narrows toward the distal end. Further, circumferential end surfaces 122a, 122b of each first stator claw magnetic pole 122 configured of the first stator base portion 122g and the first stator magnetic pole portion 122h are both flat surfaces, and approach each other toward the outer side in the radial direction.

Thus, a cross-sectional area of a cross-section of the first stator base portion 122g cut in an axial direction becomes smaller toward the radially outer side when viewed in the radial direction. Further, a cross-sectional area of a cross-section of the first stator magnetic pole portion 122h cut in the radial direction becomes smaller toward the distal end side when viewed in the axial direction.

The first stator magnetic pole portion 122h that is bent in the axial direction has a sector-shaped cross-section in a direction perpendicular to the axis, and an outer side surface 122j and an inner side surface 122k thereof in the radial direction are circular arc surfaces that form a concentric circle with the outer circumferential surface 120c of the first stator core base 120 about a center axis O when viewed in the axial direction.

Further, an angle of the first stator base portion 122g of each first stator claw magnetic pole 122 in a circumferential direction, that is, an angle that basal end portions of the circumferential end surfaces 122a, 122b form with the center axis O of the rotation shaft SF is smaller than an angle of a gap between basal ends of first stator base portions 122g of the adjacent first stator claw magnetic poles 122.

(Second Stator Core 92)

As shown in FIG. 57, the second stator core 92 is of identical material and shape as the first stator core 91, and a through hole 131 for insertion and fixing of the boss section 113 is formed at a center position of a second stator core base 130. In the second stator core base 130, a center portion of a part opposing the first stator core 91 is formed thicker than an outer circumferential portion (length in the axial direction). Further, the thick portion at the center is referred to as a thick portion 130a, and the outer circumferential portion of the thick portion 130a is referred to as a thin portion 130b.

Further, twelve pieces of second stator claw magnetic poles 132 having an identical shape are formed at equal intervals on an outer circumferential surface 130c of the second stator core base 130. Each of the second stator claw magnetic poles 132 projects radially outward, and a distal end bent toward the first stator core 91 in the axial direction.

Here, in each of the second stator claw magnetic poles 132, a portion projecting in the radially outer side from the outer circumferential surface 130c of the second stator core base 130 is referred to as a second stator base portion 132g, and a distal end portion bent in the axial direction is referred to as a second stator magnetic pole portion 132h. Further, the second stator claw magnetic poles 132 before the second stator magnetic pole portions 132h are formed through bending have a trapezoidal shape that narrows toward a distal end when viewed in the axial direction.

That is, the shape of the second stator base portions 132g when viewed in the axial direction becomes a trapezoidal shape of which width narrows toward the radially outer side, and the shape of the second stator magnetic pole portions 132h when viewed in the radial direction becomes a trapezoidal shape of which width narrows toward the distal end. Further, circumferential end surfaces 97a, 97b of each second stator claw magnetic pole 132 including the second stator base portion 132g and the second stator magnetic pole portion 132h are both flat surfaces, and approach each other toward the outer side in the radial direction.

Thus, a cross-sectional area of a cross-section of the second stator base portion 132g cut in an axial direction becomes smaller toward the radially outer side when viewed in the radial direction. Further, a cross-sectional area of a cross-section of the second stator magnetic pole portion 132h cut in the radial direction becomes smaller toward the distal end side when viewed in the axial direction.

The second stator magnetic pole portion 132h that is bent in the axial direction has a sector-shaped cross-section in the direction perpendicular to the axis, and an outer side surface 132j and an inner side surface 132k thereof in the radial direction are circular arc surfaces that form a concentric circle with the outer circumferential surface 130c of the second stator core base 130 about the center axis O when viewed in the axial direction.

An angle of the second stator base portion 132g of each second stator claw magnetic pole 132 in the circumferential direction, that is, an angle formed by basal ends of the circumferential end surfaces 132a, 132b and the center axis O of the rotation shaft SF is smaller than an angle of a gap between basal ends of the second stator base portion 132g of the second stator claw magnetic pole 132 that are adjacent to each other.

The second stator core 92 is arranged relative to the first stator core 91 such that each of the second stator claw magnetic poles 132 of the second stator core 92 is positioned between the first stator claw magnetic poles 122 of the first stator core 91 as viewed in the axial direction. Further, the thick portions 120a, 130a of the first and second stator core bases 120, 130 are in contact under pressure with each other and thereby fixed.

As shown in FIG. 53, here, each of the first stator claw magnetic poles 122 is configured such that a distal end surface 122c of the first stator magnetic pole portion 122h thereof is positioned where it becomes flush with an opposing surface 130d that is the thin portion 130b of the second stator core base 130 opposing the first stator core 91. In the same manner, each of the second stator claw magnetic poles 132 is configured such that a distal end surface 132c of the second stator magnetic pole portion 132h thereof is positioned at a position where it becomes flush with an opposing surface 120d that is the thin portion 120b of the first stator core base 120 opposing the second stator core 92. That is, in the present embodiment, the length D2 (see FIG. 56) of the first and second stator claw magnetic poles 122, 132 in the axial direction is shorter by a thickness of the thin portions 120b, 130b in the axial direction.

When both thick portions 120a, 130a are in contact under pressure with each other and the first and second stator core bases 120, 130 are coupled, an annular space with a square cross-section is formed between the thin portions 120b, 130b of the first and second stator core bases 120, 130. Further, as shown in FIG. 53 and FIG. 57, the coil section 93 is arranged and fixed in the annular space with the square cross-section.

(Coil Section 93)

As shown in FIG. 57, the coil section 93 has an annular wiring 98 and the annular wiring 98 is wound in the annular space.

The U-phase, V-phase, and W-phase stators 90u, 90v, 90w each become a so-called Lundell type (claw-pole type) stator with twenty-four poles that excites the first and second stator claw magnetic poles 122, 132 to different magnetic poles each time due to the annular wiring 98 between the first and second stator cores 91, 92. Further, as shown in FIG. 54 and FIG. 55, the U-phase, V-phase, and W-phase stators 90u, 90v, 90w are stacked in the axial direction to form the stator 90.

Here, as shown in FIG. 55, in the stator 90 including the U-phase, V-phase, and W-phase stators 90u, 90v, 90w, the U-phase stator 90u, the V-phase stator 90v, and the W-phase stator 90w are stacked by deviating their phases by 60 degrees in electrical angle (5 degrees in mechanical angle).

More specifically, the V-phase stator 90v is fixed to the boss section 113 formed in the base housing 111 with its phase deviated by 60 degrees in electrical angle in a clockwise direction relative to the U-phase stator 90u. Further, the W-phase stator 90w is fixed to the boss section 113 formed in the base housing 111 with its phase deviated by 60 degrees in electrical angle in the clockwise direction relative to the V-phase stator 90v.

Further, a U-phase power voltage of a three-phase AC power is applied to the annular wiring 98 of the U-phase stator 90u, a V-phase power voltage of the three-phase AC power is applied to the annular wiring 98 of the V-phase stator 90v, and a W-phase power voltage of the three-phase AC power is applied to the annular wiring 98 of the W-phase stator 90w.

(Rotor 80)

As shown in FIG. 49, the rotor 80 fixed on the inner side surface of the cylindrical wall 118b of the rotor housing 118 includes three components, namely a U-phase rotor 80u, a V-phase rotor 80v, and a W-phase rotor 80w, as shown in FIG. 58 and FIG. 59. As shown in FIG. 54 and FIG. 55, rotors 80u, 80v, 80w of respective phases are configured by being stacked in order along the axial direction so as to respectively oppose the U-phase stator 90u, the V-phase stator 90v, and the W-phase stator 90w corresponding in the radial direction.

Figure 60:
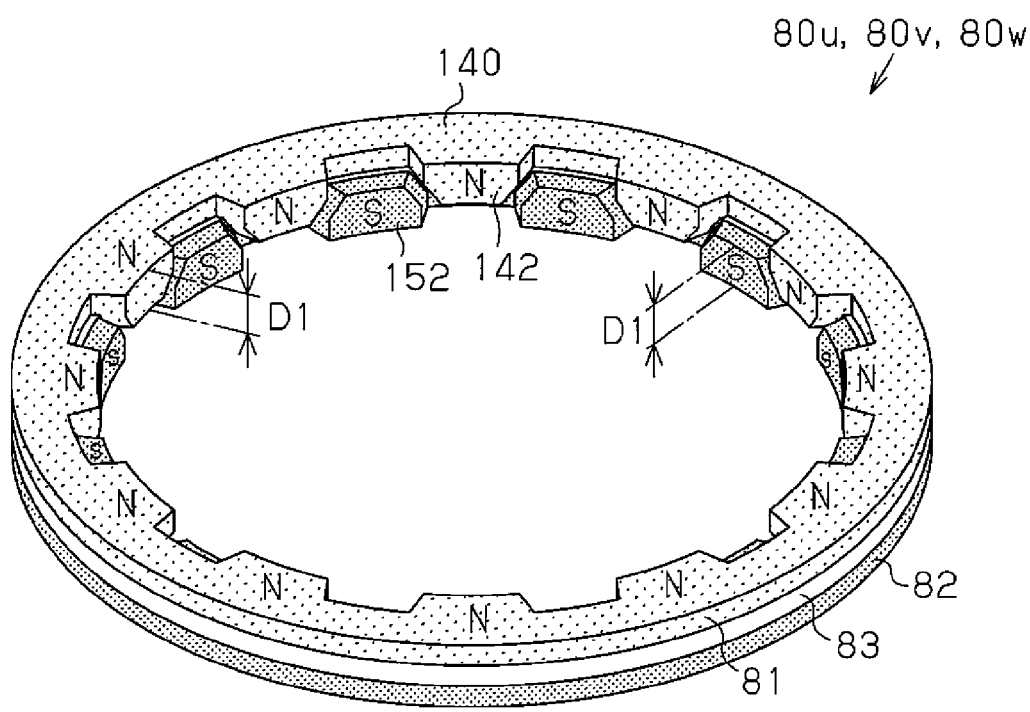
FIG. 60 is a perspective view of the single rotor of FIG. 58.
Figure 61:
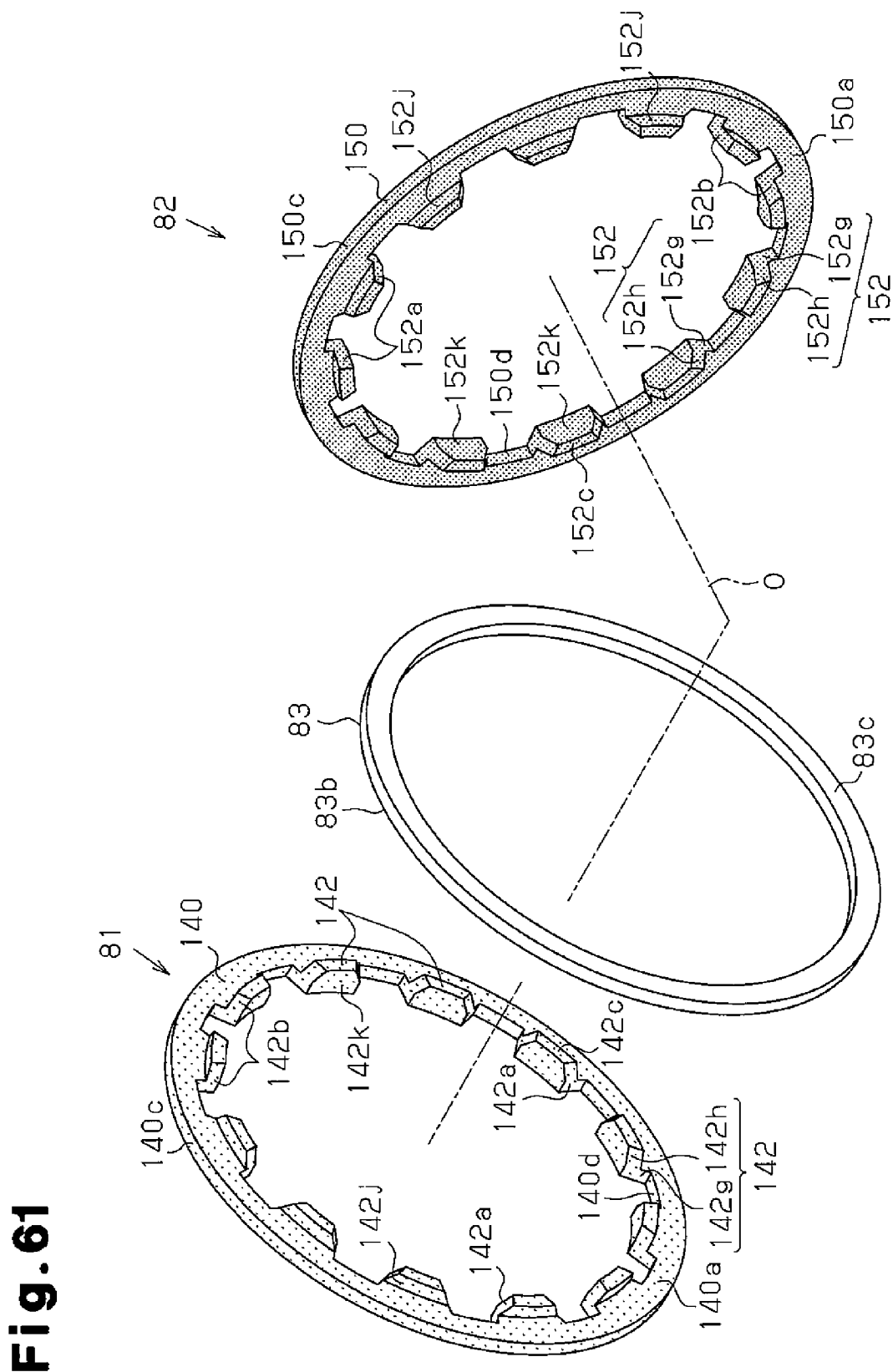
FIG. 61 is an exploded perspective view of the single rotor of FIG. 60.

As shown in FIG. 60 and FIG. 61, each of the rotors 80u, 80v, 80w of the respective phases includes first and second rotor cores 81, 82 and a field magnet 83.

(First Rotor Core 81)

As shown in FIG. 61, the first rotor core 81 includes a first rotor core base 140 having the shape of an annular plate. Twelve pieces of first rotor claw magnetic poles 142 are arranged at equal intervals on an inner circumferential surface 140d of the first rotor core base 140. Each of the first rotor claw magnetic poles 142 is projected toward the radially inner side, and a distal end thereof is bent toward the second rotor core 82 in the axial direction.

Here, in each of the first rotor claw magnetic poles 142, a portion that projects to the radially inner side from the inner circumferential surface 140d of the first rotor core base 140 is referred to as a first rotor base portion 142g, and the distal end portion bent in the axial direction is referred to as a first rotor magnetic pole portion 142h. Further, the first rotor claw magnetic poles 142 before the first rotor magnetic pole portions 142h are bent and formed have a trapezoidal shape that narrows toward the distal end when viewed in the axial direction.

That is, the shape of the first rotor base portions 142g when viewed in the axial direction becomes a trapezoidal shape of which width narrows toward the radially outer side, and the shape of the first rotor magnetic pole portions 142h when viewed in the radial direction becomes a trapezoidal shape of which width narrows toward the distal end. Further, circumferential end surfaces 142a, 142b of each first rotor claw magnetic pole 142 including the first rotor base portion 142g and the first rotor magnetic pole portion 142h are both flat surfaces, and approach each other toward the outer side in the radial direction.

Thus, a cross-sectional area of a cross-section of the first rotor base portion 142g cut in the axial direction becomes smaller toward the radially outer side when viewed in the radial direction. Further, a cross-sectional area of a cross-section of the first rotor magnetic pole portion 142h cut in the radial direction becomes smaller toward the distal end side when viewed in the axial direction.

The first rotor magnetic pole portion 142h that is bent in the axial direction has a sector-shaped cross-section in a direction perpendicular to the axis, and an outer side surface 142j and an inner side surface 142k thereof in the radial direction are circular arc surfaces that form a concentric circle with the inner circumferential surface 140d of the first rotor core base 140 about a center axis O when viewed in the axial direction.

Further, an angle of the first rotor base portion 142g of each first rotor claw magnetic pole 142 in a circumferential direction, that is, an angle that basal end portions of the circumferential end surfaces 142a, 142b form with the center axis O of the rotation shaft SF is smaller than an angle of a gap between basal ends of first rotor base portions 142g of the adjacent first rotor claw magnetic poles 142.

(Second Rotor Core 82)

As shown in FIG. 61, the second rotor core 82 includes an annular plate shaped second rotor core base 150 that is formed from the same material and shaped identically to the first rotor core base 140. Twelve pieces of second rotor claw magnetic poles 152 are arranged at equal intervals on an inner circumferential surface 150d of the second rotor core base 150. Each of the second rotor claw magnetic poles 152 is projected toward the radially inner side, and a distal end thereof is bent toward the first rotor core 81 in the axial direction.

Here, in each of the second rotor claw magnetic poles 152, a portion that projects to the radially inner side from an inner circumferential surface 150d of the second rotor core base 150 is referred to as a second rotor base portion 152g, and the distal end portion bent in the axial direction is referred to as a second rotor magnetic pole portion 152h. Further, the second rotor claw magnetic poles 152 before the second rotor magnetic pole portions 152h are bent and formed have a trapezoidal shape that narrows toward the distal end when viewed in the axial direction.

That is, the shape of the second rotor base portions 152g when viewed in the axial direction becomes a trapezoidal shape of which width narrows toward the radially outer side, and the shape of the second rotor magnetic pole portions 152h when viewed in the radial direction becomes a trapezoidal shape of which width narrows toward the distal end. Further, circumferential end surfaces 152a, 152b of each second rotor claw magnetic pole 152 including the second rotor base portion 152g and the second rotor magnetic pole portion 152h are both flat surfaces, and approach each other toward the outer side in the radial direction.

Thus, a cross-sectional area of a cross-section of the second rotor base portion 152g cut in the axial direction becomes smaller toward the radially outer side when viewed in the radial direction. Further, a cross-sectional area of a cross-section of the second rotor magnetic pole portion 152h cut in the radial direction becomes smaller toward the distal end side when viewed in the axial direction.

The second rotor magnetic pole portion 152h that is bent in the axial direction has a sector-shaped cross-section in the direction perpendicular to the axis, and an outer side surface 152j and an inner side surface 152k thereof in the radial direction are circular arc surfaces that form a concentric circle with the inner circumferential surface 150d of the second rotor core base 150 about the center axis O when viewed in the axial direction.

An angle of the second rotor base portion 152g of each second rotor claw magnetic pole 152 in the circumferential direction, that is, an angle that basal end portions of the circumferential end surfaces 152a, 152b form with the center axis O of the rotation shaft SF is smaller than an angle of a gap between basal ends of second rotor base portions 152g of the adjacent second rotor claw magnetic poles 152.

Further, the second rotor core 82 is arranged and fixed relative to the first rotor core 81 such that each of the second rotor claw magnetic poles 152 is positioned between the first rotor claw magnetic poles 142 of the first rotor core 81 as viewed in the axial direction. Here, the second rotor core 82 is coupled to the first rotor core 81 such that the field magnet 83 is arranged between the first rotor core 81 and the second rotor core 82 in the axial direction.

(Field Magnet 83)

The field magnet 83 in the present embodiment is an annular plate-shaped permanent magnet formed of a ferrite magnet. Further, one side surface 83b of the field magnet 83 contacts the opposing surface 140a of the first rotor core base 140 and the other side surface 83c of the field magnet 83 contacts the opposing surface 150a of the second rotor core base 150, respectively, and the field magnet 83 is sandwiched and fixed between the first rotor core 81 and the second rotor core 82.

An outer diameter of the field magnet 83 is set to conform to outer diameters of the first and second rotor core bases 140, 150 (outer circumferential surfaces 140c, 150c). Further, an inner diameter of the field magnet 83 is set to conform to inner diameters of the first and second rotor core bases 140, 150 (inner circumferential surfaces 140d, 150d).

Further, a thickness of the field magnet 83 is set at a predetermined thickness. In the present embodiment, as shown in FIG. 53, the first and second rotor claw magnetic poles 142, 152 have the length by which their distal end surfaces 142c, 152c become respectively flush with the opposing surfaces 140a, 150a of the first and second rotor core bases 140, 150. That is, in the present embodiment, a length D1 (see FIG. 60) of the first and second rotor claw magnetic poles 142, 152 in the axial direction is shorter by a thickness of the first and second rotor core bases 140, 150 in the axial direction.

As shown in FIG. 53, the field magnet 83 is magnetized along the axial direction such that the first rotor core 81 becomes an N pole and the second rotor core 82 becomes an S pole. Accordingly, the first rotor claw magnetic poles 142 of the first rotor core 81 function as N poles (first magnetic poles), and the second rotor claw magnetic poles 152 of the second rotor core 82 function as S poles (second magnetic poles) by the field magnet 83.

The U-phase rotor 80u, the V-phase rotor 80v and the W-phase rotor 80w form the so-called Lundell type structure rotors using the field magnet 83. Further, each of the rotors 80u, 80v, 80w forms a rotor with twenty-four poles (twelve pairs of pole numbers) in which the first rotor claw magnetic poles 142 functioning as the N poles and the second rotor claw magnetic poles 152 functioning as the S poles are alternately arranged in the circumferential direction.

Further, the U-phase, V-phase, and W-phase rotors 80u, 80v, 80w are stacked in the axial direction as shown in FIG. 58 and FIG. 59, and form the rotor 80.

Here, as shown in FIG. 60, when the first rotor core 81 is on an upper side and the second rotor core 82 is on a lower side relative to the field magnet 83 (configuration in which a magnetizing direction of the field magnet 83 is upward), the U-phase and W-phase rotors 80u, 80w are stacked facing frontward, and the V-phase rotor 80v is stacked facing backward. Thus, magnetizing directions of the field magnet 83 by the U-phase and W-phase rotors 80u, 80w are of a same direction (upward in FIG. 59) as shown by an arrow in FIG. 59, and a magnetizing direction of the field magnet 83 by the V-phase rotor 80v is of an opposite direction relative to the magnetizing direction of the field magnet 83 by the U-phase and W-phase rotors 80u, 80w (downward in FIG. 59).

Further, as shown in FIG. 58, the second rotor core bases 150 of the U-phase and V-phase rotors 80u, 80v are adjacent to each other in the axial direction, and portions of the field magnets 83 that are the S poles of the U-phase and V-phase rotors 80u, 80v oppose each other via the adjacent second rotor core bases 150. Further, the first rotor core bases 140 of the V-phase and W-phase rotors 80v, 80w are adjacent to each other in the axial direction, and portions of the field magnets 83 that are the N poles of the V-phase and W-phase rotors 80v, 80w oppose each other via the adjacent first rotor core bases 140.

Further, extending directions of the first rotor claw magnetic poles 142 of the U-phase and W-phase rotors 80u, 80w in the axial direction are of the same direction (downward in FIG. 58), and an extending direction of the first rotor claw magnetic poles 142 of the V-phase rotor 80v in the axial direction relative to the above direction is in an opposite direction (upward in FIG. 58). The U-phase first rotor claw magnetic poles 142 and the V-phase first rotor claw magnetic poles 142 are separated in the axial direction.

In the same manner, extending directions of the second rotor claw magnetic poles 152 of the U-phase and W-phase rotors 80u, 80w in the axial direction are of the same direction (upward in FIG. 58), and an extending direction of the second rotor claw magnetic poles 152 of the V-phase rotor 80v in the axial direction relative to the above direction is in an opposite direction (downward in FIG. 58). The V-phase second rotor claw magnetic poles 152 and the W-phase second rotor claw magnetic poles 152 are separated in the axial direction.

Further, as shown in FIG. 58 and FIG. 59, the U-phase rotor 80u, the V-phase rotor 80v, and the W-phase rotor 80w are stacked with their phases deviated by 60 degrees in electrical angle (5 degrees in mechanical angle).

More specifically, the V-phase rotor 80v is fixed to the cylindrical wall 118b of the rotor housing 118 with its phase deviated by 60 degrees in electrical angle from the U-phase rotor 80u in a counterclockwise direction. The W-phase rotor 80w is fixed to the cylindrical wall 118b of the rotor housing 118 with its phase deviated by 60 degrees in electrical angle from the V-phase rotor 80v in the counterclockwise direction.

That is, an inclined direction (see FIG. 55) relative to the axial direction formed by the deviations of the three rotors 80u, 80v, 80w when viewed in the radial direction and an inclined direction (see FIG. 59) relative to the axial direction formed by the deviations of the three stators 90u, 90v, 90w when viewed in the radial direction are arranged to be opposite to one another at the opposing surfaces of the rotor 80 and the stator 90.

Further, the rotor 80 fixed on the cylindrical wall 118b of the lidded cylindrical rotor housing 118 is integrally rotated with the rotation shaft SF with the rotation shaft SF as a rotation center by a rotating magnetic field generated by the stator 90 fixed in the boss section 113 of the base housing 111. That is, the brushless motor M of the present embodiment is an outer magnet rotor-type motor.

Next, the operation of the brushless motor M will be described.

Now, when a three-phase AC power voltage is applied to the stator 90, like the first to third embodiments, a U-phase power voltage is applied to an annular wiring 98 of the U-phase stator 90u, a V-phase power voltage is applied to an annular wiring 98 of the V-phase stator 90v, and a W-phase power voltage is applied to an annular wiring 98 of the W-phase stator 90w, respectively. Thus, a rotating magnetic field is generated in the stator 90, and the rotor 80 is rotated and driven.

Here, the stator 90 includes the three stage structure of the U-phase, V-phase, and W-phase stators 90u, 90v, 90w in correspondence with the three-phase AC power. Accordingly, the rotor 80 also includes the three stage structure of the U-phase, V-phase, and W-phase rotors 80u, 80v, 80w. Thus, in the stator and the rotor of each phase, the stator opposing the field magnet 83 along the axial direction can independently receive magnetic flux of the field magnet 83, and an increase in output can be achieved.

Moreover, the length D1 of the first and second rotor claw magnetic poles 142, 152 in the axial direction in the three-stage structured U-phase, V-phase, and W-phase rotors 80u, 80v, 80w is short.

Thus, the first rotor claw magnetic poles 142 of the U-phase rotor 80u and the first rotor claw magnetic poles 142 of the V-phase rotor 80v are separated from one another in the axial direction, and the second rotor claw magnetic poles 152 of the V-phase rotor 80v and the second rotor claw magnetic poles 152 of the W-phase rotor 80w are separated from one another in the axial direction. As a result, short circuiting of the magnetic flux between the first rotor claw magnetic poles 142 of U-phase and V-phase is suppressed, and short circuiting of the magnetic flux between the second rotor claw magnetic poles 152 of V-phase and W-phase is suppressed.

Further, the length D2 of the first and second stator claw magnetic poles 122, 132 in the axial direction in the three-stage structured U-phase, V-phase, and W-phase stators 90u, 90v, 90w is short.

That is, in the U-phase, V-phase, and W-phase stators 90u, 90v, 90w, each of the first stator claw magnetic poles 122 is separated from one another, and each of the second stator claw magnetic poles 132 is separated from one another. As a result, short circuiting of the magnetic flux between the first stator claw magnetic poles 122 of the different phases is suppressed, and short circuiting of the magnetic flux between the second stator claw magnetic poles 132 of the different phases is suppressed.

Further, since the first and second rotor claw magnetic poles 142, 152 of the U-phase, V-phase, and W-phase rotors 80u, 80v, 80w that are in the three-stage structure are formed in the trapezoidal shape that narrows toward the distal end, the magnetic flux from the field magnets 83 are more efficiently guided to the distal end portions of the first and second rotor magnetic pole portions 142h, 152h.

In the same manner, since the first and second stator claw magnetic poles 122, 132 of the U-phase, V-phase, and W-phase stators 90u, 90v, 90w in the three-stage structure are formed in the trapezoidal shape that narrows toward the distal end, the magnetic flux from the annular wirings 98 are more efficiently guided to the distal end portions of the first and second stator magnetic pole portions 122h, 132h.

In this manner, since the space between specific claw magnetic poles is open, the short circuiting of the magnetic flux is suppressed, and the magnetic flux is efficiently guided to the distal end portions of the respective magnetic pole portions 122h, 132h, 142h, 152h, it becomes possible to form the brushless motor M with high torque.

Further, with respect to the U-phase, V-phase, and W-phase stators 90u, 90v, 90w of the stator 90 deviated by 60 degrees in the electrical angle in the clockwise direction, the U-phase, V-phase, and W-phase rotors 80u, 80v, 80w of the rotor 80 are deviated by 60 degrees in the electrical angle in the counter-clockwise direction. That is, an inclined direction (see FIG. 55) relative to the axial direction formed by the deviations of the three rotors 80u, 80v, 80w when viewed in the radial direction and an inclined direction (see FIG. 59) relative to the axial direction formed by the deviations of the three stators 90u, 90v, 90w when viewed in the radial direction are arranged to be opposite to one another at the opposing surfaces of the rotor 80 and the stator 90.

Thus, the first and second rotor claw magnetic poles 142, 152 of the respective phases can suitably follow the switching of the first and second stator claw magnetic poles 122, 132 by the respective phase AC currents flowing in the annular wirings 98 of the respective phases, as a result of which a suitable rotation of the rotor 80 can be realized.

Further, in the present embodiment, the field magnet 83 of the V-phase rotor 80v has its magnetizing direction set opposite to the field magnets 83 of the U-phase and W-phase rotors 80u, 80w. Thus, since polarities on both sides of the V-phase field magnet 83 in the axial direction have the same polarities as polarities of the U-phase and W-phase field magnets 83 opposing in the axial direction, magnetic flux of the V-phase field magnet 83 becomes more unlikely to leak to the U-phase and W-phase rotors 80u, 80w, as a result of which the magnetic flux suitably flows to the V-phase first and second rotor claw magnetic poles 142, 152.

Further, since the rotor 80 is of the outer rotor type that is arranged to surround the outer circumference of the stator 90, an outer diameter of the field magnet 83 sandwiched between the first and second rotor cores 81, 82 becomes large. Thus, the magnetic flux from the field magnet 83 becomes large, and it becomes possible to further increase an output of the brushless motor M.

In the present embodiment also, like the above embodiments, when a request to change the number of magnetic poles is made, since the U-phase, V-phase, and W-phase rotors 80u, 80v, 80w of the rotor 80 form the Lundell type structure, the number of poles can easily be changed by simply changing the number of the first and second rotor claw magnetic poles 142, 152 while maintaining the field magnets 83 in the identical structure. In the same manner, since the U-phase, V-phase, and W-phase stators 90u, 90v, 90w of the stator 90 form a claw-pole type structure, the number of poles can easily be changed simply by changing the number of the first and second stator claw magnetic poles 122, 132 while maintaining the coil sections 93 (annular wiring 98) in the identical structure.

Next, the advantages of the present embodiment will be described.

(7) According to the present embodiment, due to being of the outer rotor type that arranges the rotor 80 on the outer circumference of the stator 90, the outer diameter of the field magnet 83 sandwiched between the first and second rotor cores 81, 82 can be enlarged. Thus, since magnetic flux density of the magnetic flux from the field magnet 83 to the first and second rotor magnetic pole portions 142h, 142h can be enlarged, it becomes possible to increase the output of the outer rotor type brushless motor M.

(8) According to the present embodiment, the first and second rotor claw magnetic poles 142, 152 are formed in the trapezoidal shape that narrows toward the distal end. Thus, the magnetic flux from the field magnet 83 is efficiently delivered to distal end portions of the first and second rotor magnetic pole portions 142h, 142h.

In the same manner, the first and second stator claw magnetic poles 122, 132 are formed in the trapezoidal shape that narrows toward the distal end. Thus, the magnetic flux from the annular wiring 98 is efficiently delivered to distal end portions of the first and second stator magnetic pole portions 122h, 132h.

Accordingly, the magnetic flux from the field magnet 83 and the annular wiring 98 is efficiently delivered to distal end portions of the respective magnetic pole portions 122h, 132h, 142h, 152h, and functions effectively as magnetic force, so it becomes possible to increase the output of the outer rotor type brushless motor M.

(9) According to the present embodiment, the stator 90 has the three-stage structure of the U-phase, V-phase, and W-phase stators 90u, 90v, 90w in correspondence with the three-phase AC power, and corresponding to this, the rotor 80 similarly has the three-stage structure of the U-phase, V-phase, W-phase rotors 80u, 80v, 80w. Accordingly, in the stators and rotors of the respective phases, the stators opposing in the axial direction can respectively receive the magnetic flux of the respective field magnets 83, and it becomes possible to increase the output of the outer rotor type brushless motor M.

Further, since the deviation direction of the rotors 80u, 80v, 80w of each phase (each stage) in the circumferential direction and the deviation direction of the stators 90u, 90v, 90w of each phase (each stage) in the circumferential direction are opposite to one another, preferable rotation of the rotor 80 can be realized.

(10) According to the present embodiment, the length D2 of the first and second stator claw magnetic poles 122, 132 in the axial direction in the three-stage structured U-phase, V-phase, and W-phase stators 90u, 90v, 90w is short. Further, in the U-phase, V-phase, and W-phase stators 90u, 90v, 90w, each of the first stator claw magnetic poles 122 is separated from one another, and each of the second stator claw magnetic poles 132 is separated from one another. As a result, short circuiting of the magnetic flux between the first stator claw magnetic poles 122 of the different phases is suppressed, and short circuiting of the magnetic flux between the second stator claw magnetic poles 132 of the different phases is suppressed.

In the same manner, the length D1 of the first and second rotor claw magnetic poles 142, 152 in the axial direction is shortened in the U-phase, V-phase, and W-phase rotors 80u, 80v, 80w of the three-stage structure. Thus, the first rotor claw magnetic poles 142 of the U-phase rotor 80u and the first rotor claw magnetic poles 142 of the V-phase rotor 80v are separated from one another in the axial direction, and the second rotor claw magnetic poles 152 of the V-phase rotor 80v and the second rotor claw magnetic poles 152 of the W-phase rotor 80w are separated from one another in the axial direction. As a result, short circuiting of the magnetic flux between the first rotor claw magnetic poles 142 of U-phase and V-phase is suppressed, and short circuiting of the magnetic flux between the second rotor claw magnetic poles 152 of V-phase and W-phase is suppressed.

Accordingly, it becomes possible to increase the output of the outer rotor type brushless motor M.

(11) According to the present embodiment, the U-phase, V-phase, and W-phase rotors 80u, 80v, 80w of the rotor 80 form a Lundell type structure. Thus, the number of poles can easily be changed by simply changing the numbers of the first and second rotor claw magnetic poles 142, 152 while maintaining the field magnets 83 in the identical structure. In the same manner, the U-phase, V-phase, and W-phase stators 90u, 90v, 90w of the stator 90 form a claw-pole type structure. Thus, the number of poles can easily be changed by simply changing the numbers of the first and second stator claw magnetic poles 122, 132 while maintaining the coil sections 93 (annular wirings 98) in the identical structure.

Accordingly, since the rotor 80 and the stator 90 can respectively change the number of poles without accompanying a dynamic design modification by maintaining field magnet members (field magnets 83 and annular wirings 98) in the identical configuration, an outer rotor type motor of which number of poles are easily changed can be manufactured.

Sixth Embodiment

Next, a sixth embodiment of a motor will be described with reference to FIG. 62 to FIG. 77.

Figure 62:
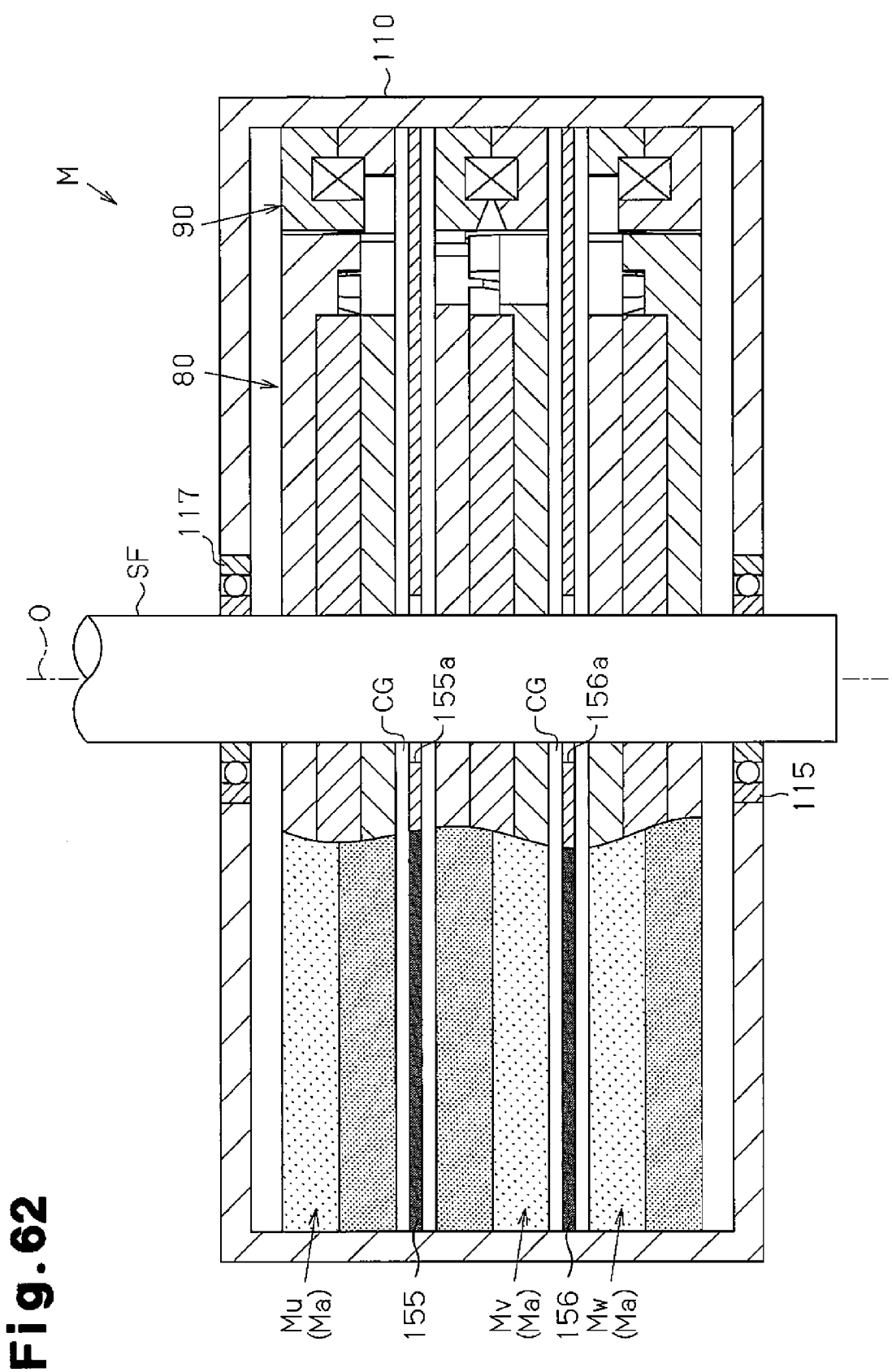
FIG. 62 is a cross-sectional view taken from a radial direction of a motor according to a sixth embodiment of the present invention.

In FIG. 62, a brushless motor M includes a motor housing 110. The motor housing 110 rotatably supports a rotation shaft SF, which extends through the motor housing 110, with bearings 115, 117. A rotor 80 and a stator 90 are provided in the motor housing 110. The rotor 80 is fixed to the rotation shaft SF and rotates integrally with the rotation shaft SF. The stator 90 is fixed to an inner circumferential surface of the motor housing 110 so as to surround the rotor 80.

Figure 63:
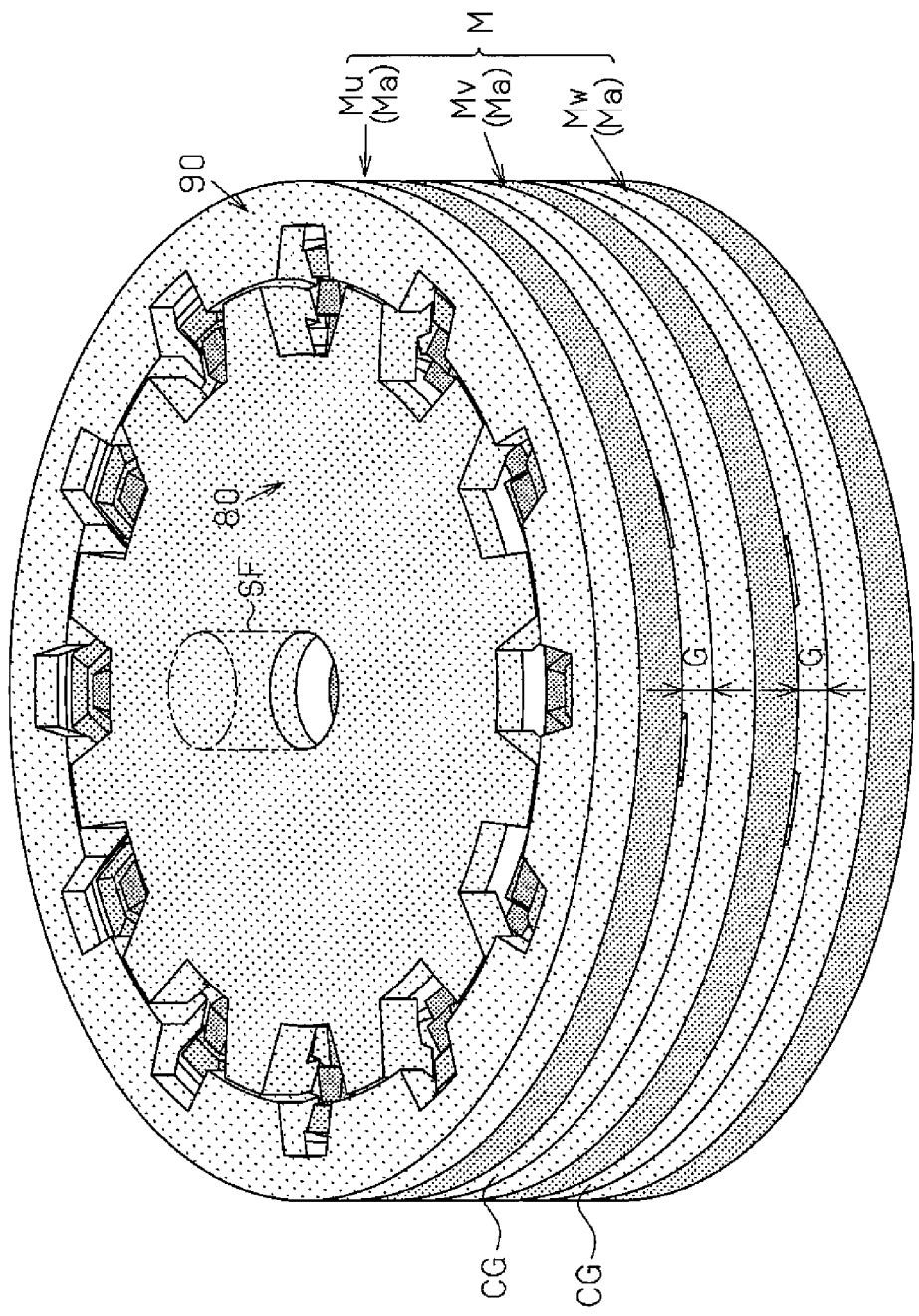
FIG. 63 is a perspective view of the motor of FIG. 62.
Figure 64:
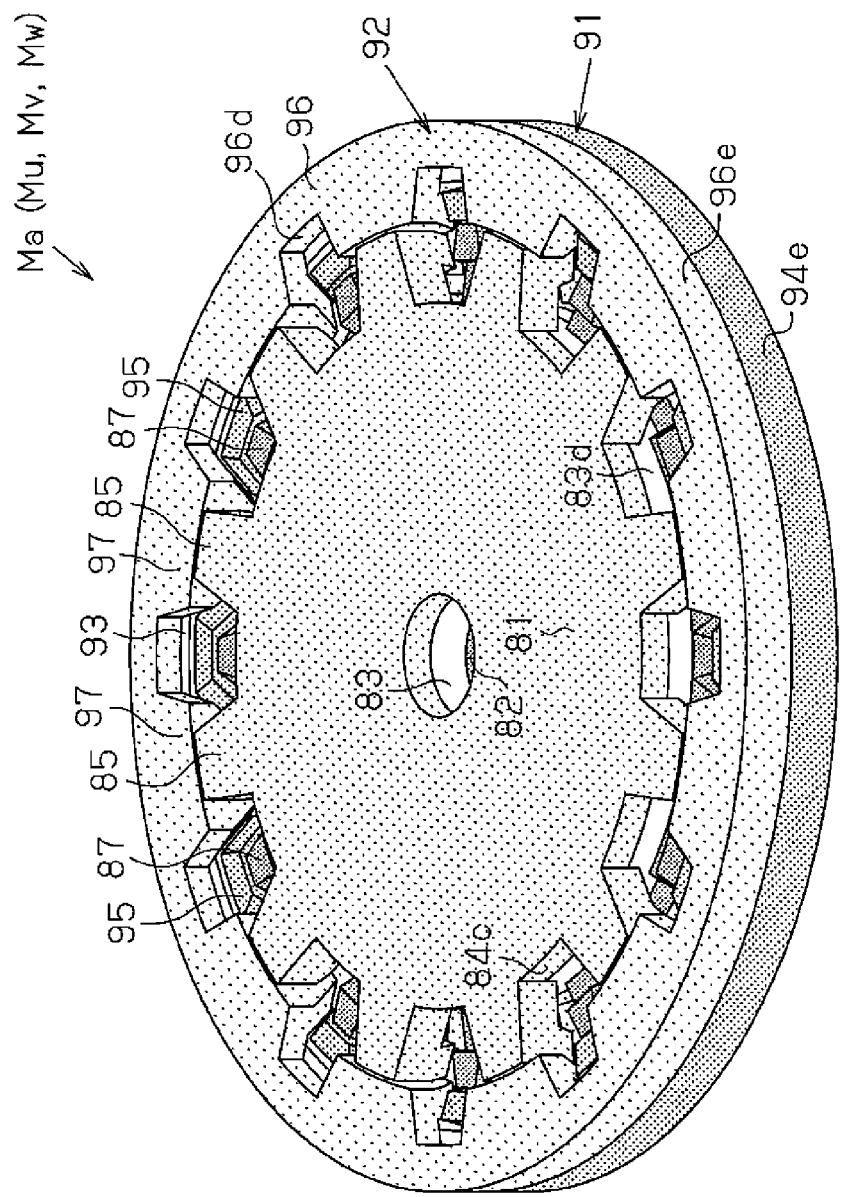
FIG. 64 is a perspective view of the single motor of FIG. 63.
Figure 65:
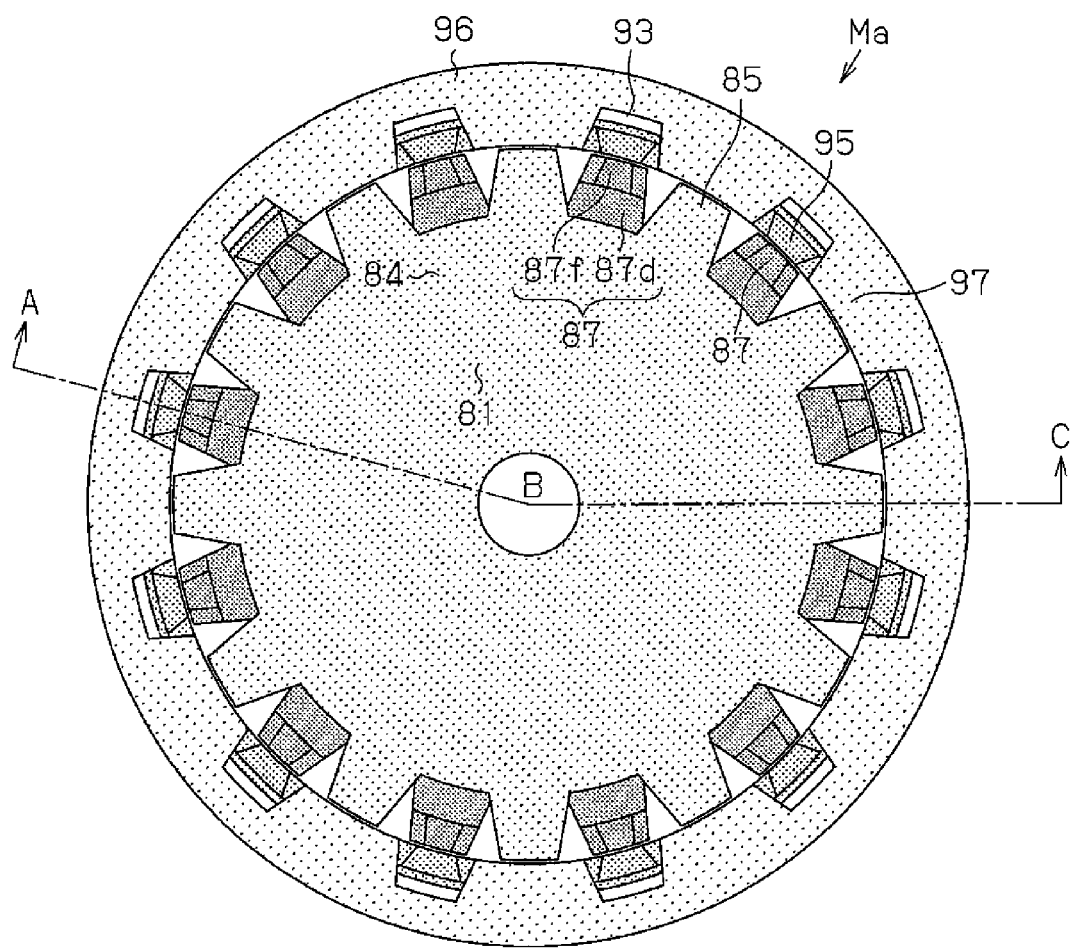
FIG. 65 is a front view taken from an axial direction of the single motor of FIG. 64.
Figure 66:
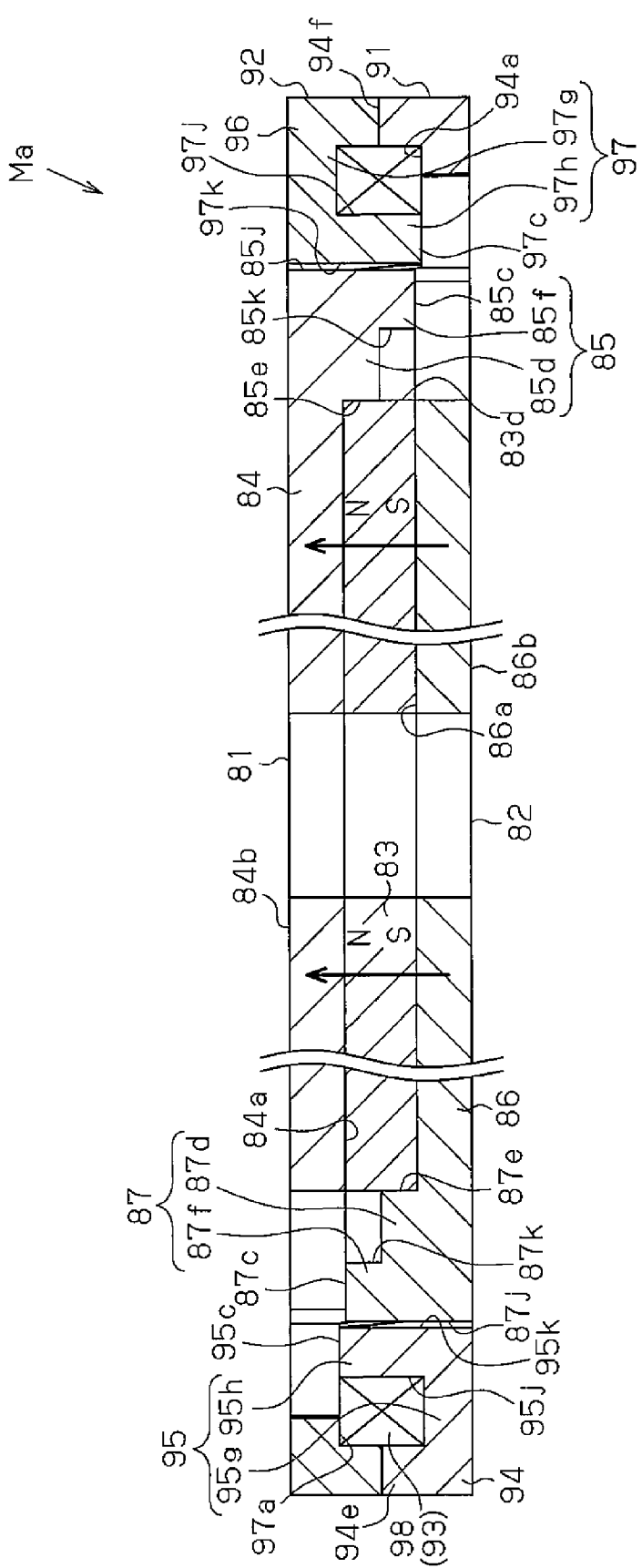
FIG. 66 is a combined cross-sectional view taken along line A-B-C in FIG. 65.

As shown in FIG. 64 to FIG. 66, the brushless motor M includes three single motors Ma arranged in an axial direction, and in FIG. 63, the motors Ma are stacked in the order of a U-phase motor unit Mu, a V-phase motor unit Mv, and a W-phase motor unit Mw from the top. Here, the U-phase motor unit Mu and the V-phase motor unit Mv, as well as the V-phase motor unit My and the W-phase motor unit Mw are spaced apart by a gap CG and separated by a predetermined interval G in the axial direction.

(Rotor 80)

Figure 67:
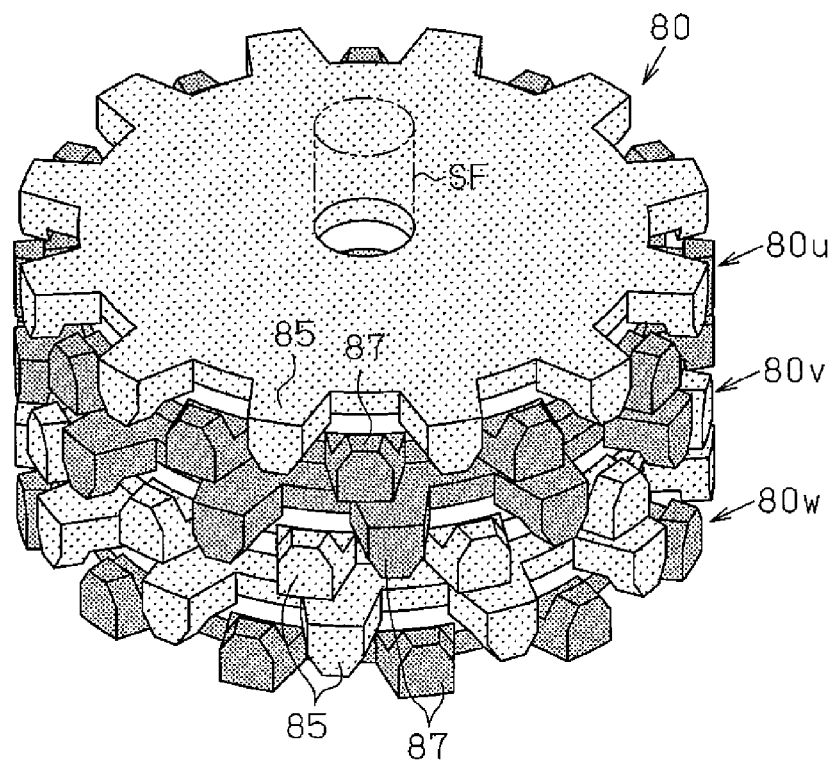
FIG. 67 is an overall perspective view of a rotor of FIG. 63.
Figure 68:
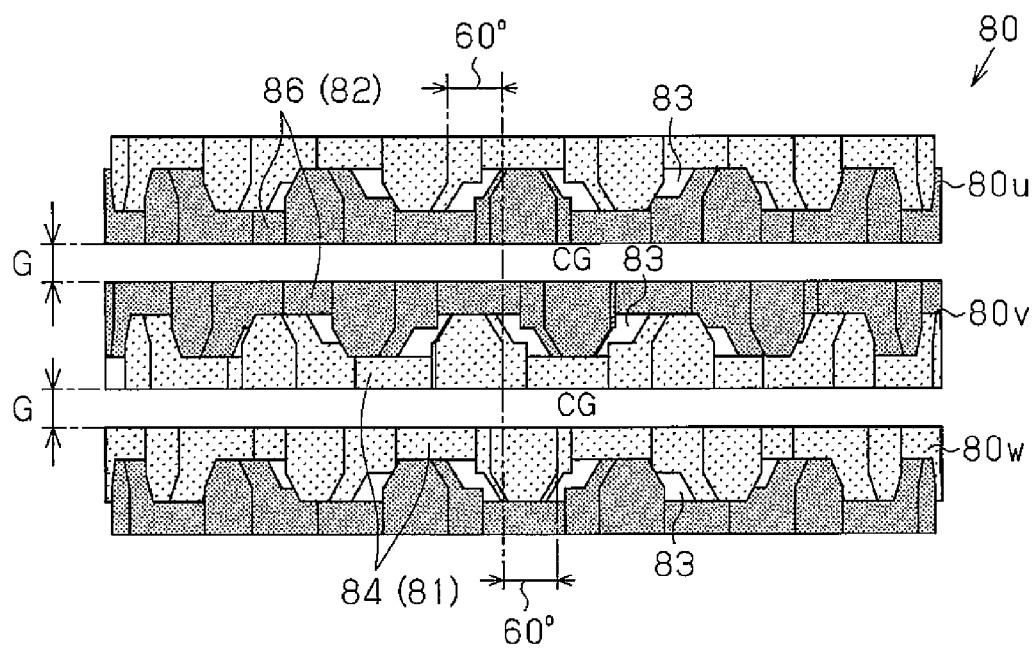
FIG. 68 is a front view taken from a radial direction of the rotor of FIG. 67.
Figure 69:
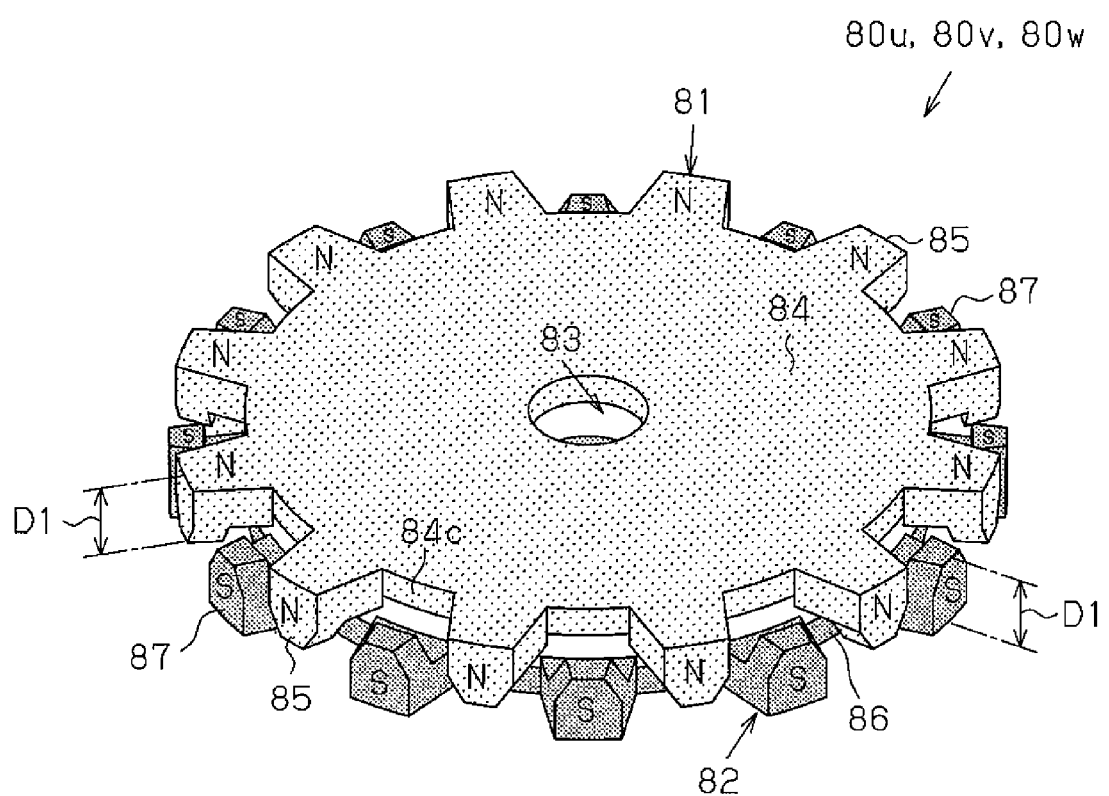
FIG. 69 is a perspective view of the single rotor of FIG. 67.
Figure 70:
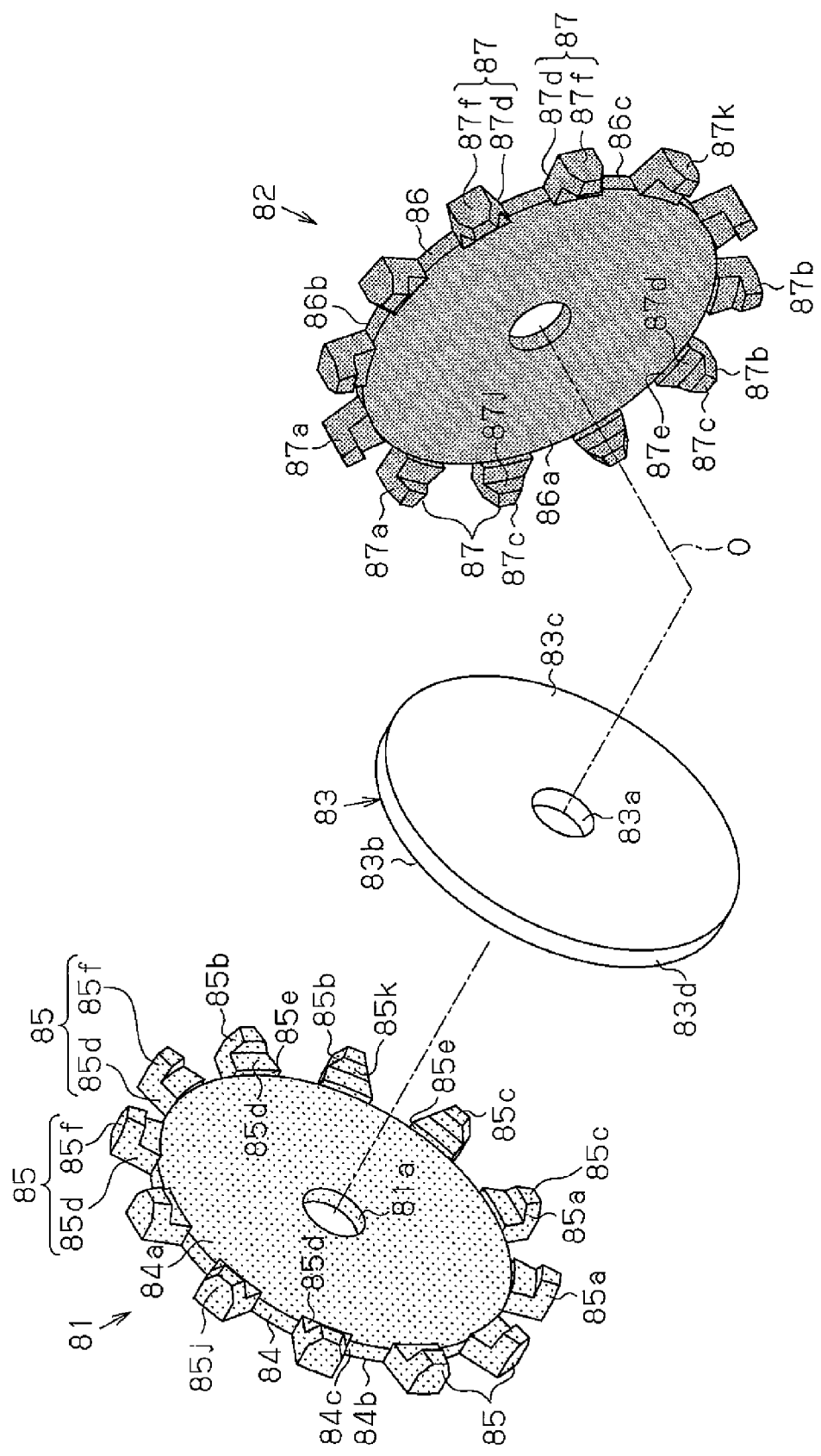
FIG. 70 is an exploded perspective view of the single rotor of FIG. 69.

As shown in FIG. 67 and FIG. 68, the rotor 80 of the brushless motor M includes three components, namely a U-phase rotor 80u, a V-phase rotor 80v, and a W-phase rotor 80w. Further, a U-phase rotor 80u and a V-phase rotor 80v, as well as the V-phase rotor 80v and a W-phase rotor 80w are fixed to a rotation shaft SF with the gap CG that separates them by the predetermined interval G in the axial direction. As shown in FIG. 69 and FIG. 70, each of the rotors 80u, 80v, 80w of the respective phases includes first and second rotor cores 81, 82 and a field magnet 83.

(First Rotor Core 81)

As shown in FIG. 70, the first rotor core 81 includes a first rotor core base 84 formed in a circular disk shape. A through hole 81a for inserting and fixing a rotation shaft SF is formed at a center position of the first rotor core base 84.

Further, twelve pieces of first rotor claw magnetic poles 85 having an identical shape are arranged at equal intervals on an outer circumferential surface 84c of the first rotor core base 84. Each of the first rotor claw magnetic poles 85 projects outward in a radial direction and includes a distal end that is bent to extend toward the second rotor core 82 in the axial direction.

In each of the first rotor claw magnetic poles 85, a portion that projects to the radially outer side from the outer circumferential surface 84c of the first rotor core base 84 has its plate thickness (length in the axial direction) formed thicker than a plate thickness (length in the axial direction) of the first rotor core base 84, and is formed into a first step portion 85d. The first step portions 85d are formed to become thicker toward the second rotor core 82, and have horizontal surfaces on an opposite side of a surface opposing the second rotor core 82 being flush with a non-opposing surface 84b of the first rotor core base 84.

Accordingly, when viewed in the radial direction, a cross-sectional area of a cross-section of the first step portions 85d cut in the axial direction (hereinafter referred to as a magnetic path area) becomes larger compared to a cross-sectional area of the portion (first rotor base portion 85g shown in FIG. 40) projecting to the radially outer side from the outer circumferential surface of the first rotor core base 84 as shown in the fourth embodiment. That is, by the magnetic path area of the first step portions 85d becoming larger, a magnetic resistance of the first step portions 85d can be made smaller than the portion (first rotor base portion 85g shown in FIG. 40) projecting to the radially outer side from the outer circumferential surface of the first rotor core base 84 as shown in the fourth embodiment.

A first step surface 85e formed on a radially inner side of each first step portion 85d is a circular arc surface that forms a concentric circle with the outer circumferential surface 84c of the first rotor core base 84 about a center axis O as viewed in an axial direction.

Further, the first rotor claw magnetic poles 85 are formed by first magnetic pole portions 85f projecting from outer side ends of the first step portions 85d in the radial direction toward the second rotor core 82 along the axial direction.

Circumferential end surfaces 85a, 85b of each first rotor claw magnetic pole 85 including the first step portion 85d and the first magnetic pole portion 85f are both flat surfaces, and approach one another closer toward their distal ends.

That is, the shape of the first step portions 85d when viewed in the axial direction becomes a trapezoidal shape of which width narrows toward the radially outer side, and the shape of the first magnetic pole portions 85f when viewed in the radial direction becomes a trapezoidal shape of which width narrows toward the distal end.

The first magnetic pole portion 85f of each first rotor claw magnetic pole 85 has a sector-shaped cross-section in a direction perpendicular to the axis, and an outer side surface 85j and an inner side surface 85k of the first magnetic pole portion 85f in the radial direction are circular arc surfaces that form a concentric circle with the outer circumferential surface 84c of the first rotor core base 84 about the center axis O when viewed in the axial direction.

Further, an angle of each first rotor claw magnetic pole 85 in the circumferential direction, that is, an angle formed by the circumferential end surfaces 85a, 85b and the center axis O of the rotation shaft SF is smaller than an angle of a gap between a first rotor claw magnetic pole 85 and a first rotor claw magnetic pole 85 that are adjacent to each other.

(Second Rotor Core 82)

As shown in FIG. 70, the second rotor core 82 is formed from the same material and shaped identically to the first rotor core 81, and a through hole 82a for inserting and fixing the rotation shaft SF is formed at a center position of a second rotor core base 86 that is formed in a disk shape.

Further, twelve pieces of second rotor claw magnetic poles 87 having an identical shape are arranged at equal intervals on an outer circumferential surface of the second rotor core base 86. Each of the second rotor claw magnetic poles 87 projects outward in the radial direction and includes a distal end that is bent to extend toward the first rotor core 81 in the axial direction.

In each of the second rotor claw magnetic poles 87, a portion that projects to the radially outer side from the outer circumferential surface 86c of the second rotor core base 86 has its plate thickness (length in the axial direction) formed thicker than a plate thickness (length in the axial direction) of the second rotor core base 86, and is formed into a second step portion 87d. The second step portions 87d are formed to become thicker toward the first rotor core 81, and have horizontal surfaces on an opposite side of a surface opposing the first rotor core 81 being flush with a non-opposing surface 86b of the second rotor core base 86.

Accordingly, when viewed in the radial direction, a cross-sectional area of a cross-section of the second step portions 87d cut in the axial direction (hereinafter referred to as a magnetic path area) becomes larger compared to a cross-sectional area of the portion (second rotor base portion 87g shown in FIG. 40) projecting to the radially outer side from the outer circumferential surface of the second rotor core base 86 as shown in the fourth embodiment. That is, by the magnetic path area of the second step portions 87d becoming larger, a magnetic resistance of the second step portions 87d can be made smaller than the portion (second rotor base portion 87g shown in FIG. 40) projecting to the radially outer side from the outer circumferential surface of the second rotor core base 86 as shown in the fourth embodiment.

A second step surface 87e formed on a radially inner side of each second step portion 87d is a circular arc surface that forms a concentric circle with the outer circumferential surface 86c of the second rotor core base 86 with the center axis as a center when viewed in the axial direction.

Further, the second rotor claw magnetic poles 87 are formed by second magnetic pole portions 87f projecting from outer side ends of the second step portions 87d in the radial direction toward the first rotor core 81 along the axial direction.

Circumferential end surfaces 87a, 87b of each second rotor claw magnetic pole 87 including the second step portion 87d and the second magnetic pole portion 87f are both flat surfaces, and approach one another closer toward their distal ends.

That is, the shape of the second step portions 87d when viewed in the axial direction becomes a trapezoidal shape of which width narrows toward the radially outer side, and the shape of the second magnetic pole portions 87f when viewed in the radial direction becomes a trapezoidal shape of which width narrows toward the distal end.

The second magnetic pole portion 87f of each second rotor claw magnetic pole 87 has a sector-shaped cross-section in the direction perpendicular to the axis, and an outer side surface 87j and an inner side surface 87k of the second magnetic pole portion 87f in the radial direction are circular arc surfaces that form a concentric circle with the outer circumferential surface 84c of the first rotor core base 84 about the center axis O when viewed in the axial direction.

Further, an angle of each second rotor claw magnetic pole 87 in the circumferential direction, that is, an angle formed by the circumferential end surfaces 87a, 87b and the center axis O of the rotation shaft SF is smaller than an angle of a gap between a second rotor claw magnetic pole 87 and a second rotor claw magnetic pole 87 that are adjacent to each other.

Further, the second rotor core 82 is arranged and fixed relative to the first rotor core 81 such that each of the second rotor claw magnetic poles 87 of the second rotor core 82 is positioned between the first rotor claw magnetic poles 85 of the first rotor core 81 as viewed in the axial direction. Here, the second rotor core 82 is coupled to the first rotor core 81 such that the field magnet 83 is arranged between the first rotor core 81 and the second rotor core 82 in the axial direction.

(Field Magnet 83)

As shown in FIG. 70, the field magnet 83 in the present embodiment is a disk-shaped permanent magnet formed of a ferrite magnet, and a through hole 83a for inserting the rotation shaft SF is formed at a center position thereof. Further, one side surface 83b of the field magnet 83 contacts the opposing surface 84a of the first rotor core base 84 and the other side surface 83c of the field magnet 83 contacts the opposing surface 86a of the second rotor core base 86, respectively, and the field magnet 83 is sandwiched and fixed between the first rotor core 81 and the second rotor core 82.

An outer diameter of the field magnet 83 is set to conform to outer diameters of the first and second rotor core bases 84, 86 (outer circumferential surfaces 84c, 86c).

Accordingly, in sandwiching the field magnet 83 by the first rotor core base 84 and the second rotor core base 86, the field magnet 83 is press-fitted into the first and second step portions 85d, 87d so that the outer circumferential surface 83d of the field magnet 83 contacts under pressure the first and second step surfaces 85e, 87e of the respective first and second rotor claw magnetic poles 85, 87.

Further, a thickness of the field magnet 83 (length in an axial direction) is set to a predetermined thickness. In the present embodiment, as shown in FIG. 66, the first and second rotor claw magnetic poles 85, 87 have a length by which their distal end surfaces 85c, 87c respectively are flush with one another with the opposing surfaces 84a, 86a of the first and second rotor core bases 84, 86. That is, in the present embodiment, as shown in FIG. 69, the length D1 of the first and second rotor claw magnetic poles 85, 87 is short by the thickness of the first and second rotor core bases 84, 86 in the axial direction.

As shown in FIG. 66, the field magnet 83 is magnetized along the axial direction such that the first rotor core 81 becomes an N pole and the second rotor core 82 becomes an S pole. Accordingly, the first rotor claw magnetic poles 85 of the first rotor core 81 function as N poles (first magnetic poles), and the second rotor claw magnetic poles 87 of the second rotor core 82 function as S poles (second magnetic poles) by the field magnet 83.

The U-phase rotor 80u, the V-phase rotor 80v and the W-phase rotor 80w form the so-called Lundell type structure rotors using the field magnet 83. Further, each of the rotors 80u, 80v, 80w forms a rotor with twenty-four poles (twelve pairs of pole numbers) in which the first rotor claw magnetic poles 85 functioning as the N poles and the second rotor claw magnetic poles 87 functioning as the S poles are alternately arranged in the circumferential direction.

Further, the rotor 80 is formed by the U-phase, V-phase, and W-phase rotors 80u, 80v, 80w are arranged in the axial direction with gaps CG at intervals G as shown in FIG. 67 and FIG. 68.

Here, as shown in FIG. 66 and FIG. 69, when the first rotor core 81 is on an upper side and the second rotor core 82 is on a lower side relative to the field magnet 83 (configuration in which a magnetizing direction of the field magnet 83 is upward), the U-phase and W-phase rotors 80u, 80w are provided in the frontward posture, and the V-phase rotor 80v is provided in a backward posture. Thus, magnetizing directions of the field magnet 83 by the U-phase and W-phase rotors 80u, 80w are of a same direction (upward in FIG. 67), and a magnetizing direction of the field magnet 83 by the V-phase rotor 80v is of an opposite direction relative to the magnetizing direction of the field magnet 83 by the U-phase and W-phase rotors 80u, 80w (downward in FIG. 67).

Further, as shown in FIG. 68, the second rotor core bases 86 of the U-phase and V-phase rotors 80u, 80v are opposed in the axial direction via the gap CG (and a first circuit board 155 to be described later), and portions of the field magnets 83 that are the S poles of the U-phase and V-phase rotors 80u, 80v oppose each other. Further, the first rotor core bases 84 of the V-phase and W-phase rotors 80v, 80w are opposed in the axial direction via the gap CG (and a second circuit board 156 to be described later), and portions of the field magnets 83 that are the N poles of the V-phase and W-phase rotors 80v, 80w oppose each other.

Further, as shown in FIG. 67, extending directions of the first rotor claw magnetic poles 85 of the U-phase and W-phase rotors 80u, 80w in the axial direction are of the same direction (downward in FIG. 67), and an extending direction of the first rotor claw magnetic poles 85 of the V-phase rotor 80v in the axial direction relative to the above direction is in an opposite direction (upward in FIG. 67). The first rotor claw magnetic poles 85 of the three phases are separated from one another in the axial direction.

In the same manner, extending directions of the second rotor claw magnetic poles 87 of the U-phase and W-phase rotors 80u, 80w in the axial direction are of the same direction (upward in FIG. 67), and an extending direction of the second rotor claw magnetic poles 87 of the V-phase rotor 80v in the axial direction relative to the above direction is in an opposite direction (downward in FIG. 67). The second rotor claw magnetic poles 87 of the three phases are separated from one another in the axial direction.

Further, as shown in FIG. 67 and FIG. 68, the U-phase rotor 80u, the V-phase rotor 80v, and the W-phase rotor 80w are arranged by their phases being deviated by 60 degrees in an electrical angle (5 degrees in mechanical angle).

More specifically, the V-phase rotor 80v is fixed to the rotation shaft with its phase deviated by 60 degrees in electrical angle from the U-phase rotor 80u in a counterclockwise direction. The W-phase rotor 80w is fixed to the rotation shaft with its phase deviated by 60 degrees in electrical angle from the V-phase rotor 80v in the counterclockwise direction.

(Stator 90)

Figure 71:
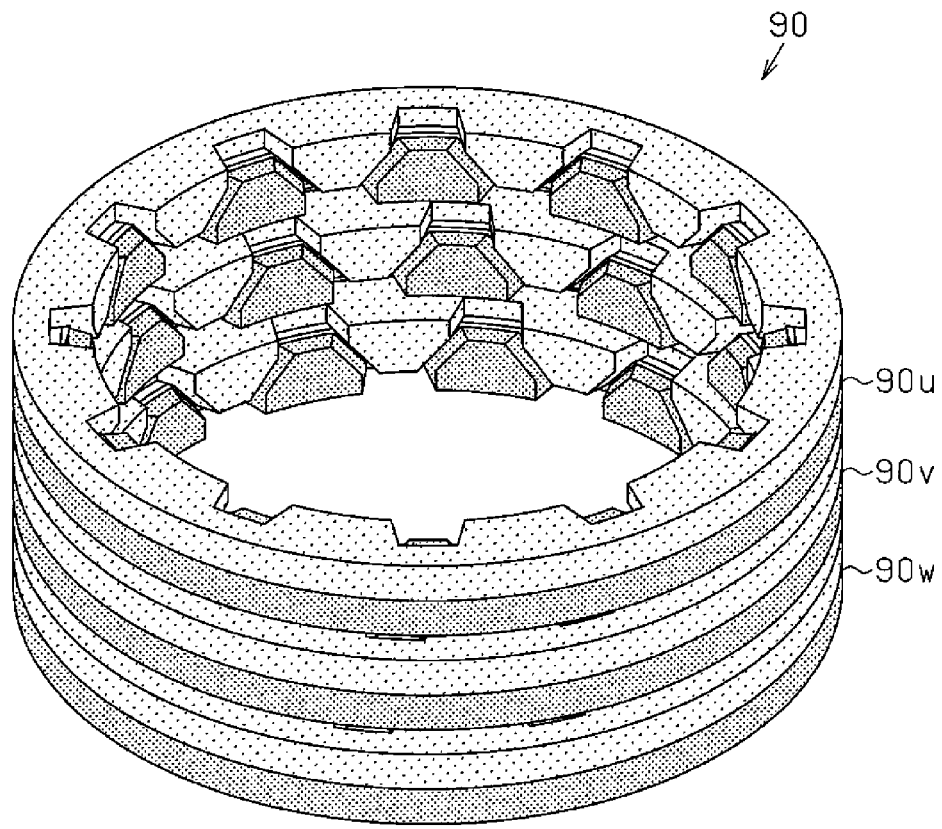
FIG. 71 is an overall perspective view of a stator of FIG. 63.
Figure 72:
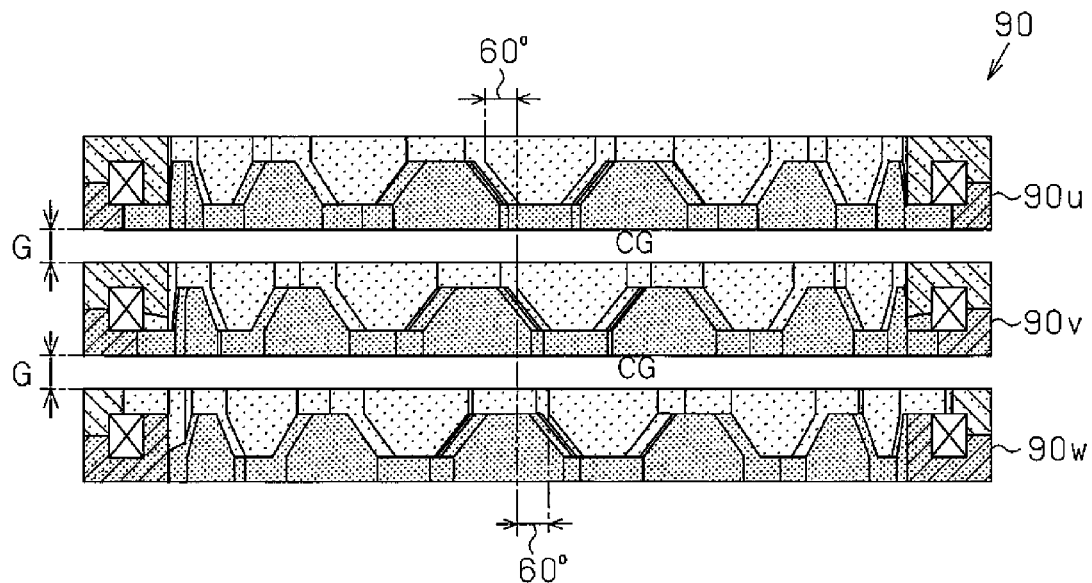
FIG. 72 is a cross-sectional view taken from a radial direction of the stator of FIG. 71.

As shown in FIG. 71 and FIG. 72, the stator 90 arranged on an outer side of the rotor 80 in the radial direction includes three stators, namely a U-phase stator 90u, a V-phase stator 90v, and a W-phase stator 90w. The stators 90u, 90v, 90w of the respective phases are arranged in order in an axial direction so as to respectively oppose the corresponding one of the U-phase rotor 80u, the V-phase rotor 80v, and the W-phase rotor 80w in the radial direction.

Further, the U-phase stator 90u and the V-phase stator 90v, as well as the V-phase stator 90v and the W-phase stator 90w are fixed on an inner circumferential surface of the motor housing 110 with gaps CG that are separated by predetermined intervals G in the axial direction in between them.

Figure 73:
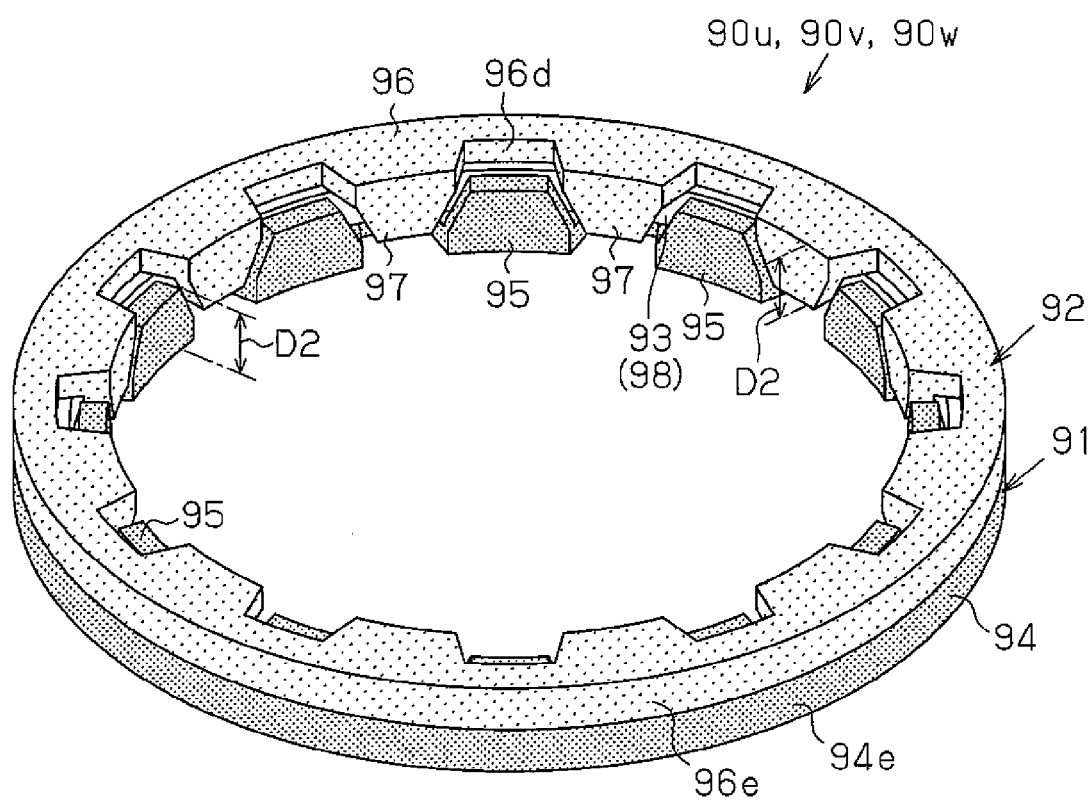
FIG. 73 is a perspective view of the single stator of FIG. 71.
Figure 74:
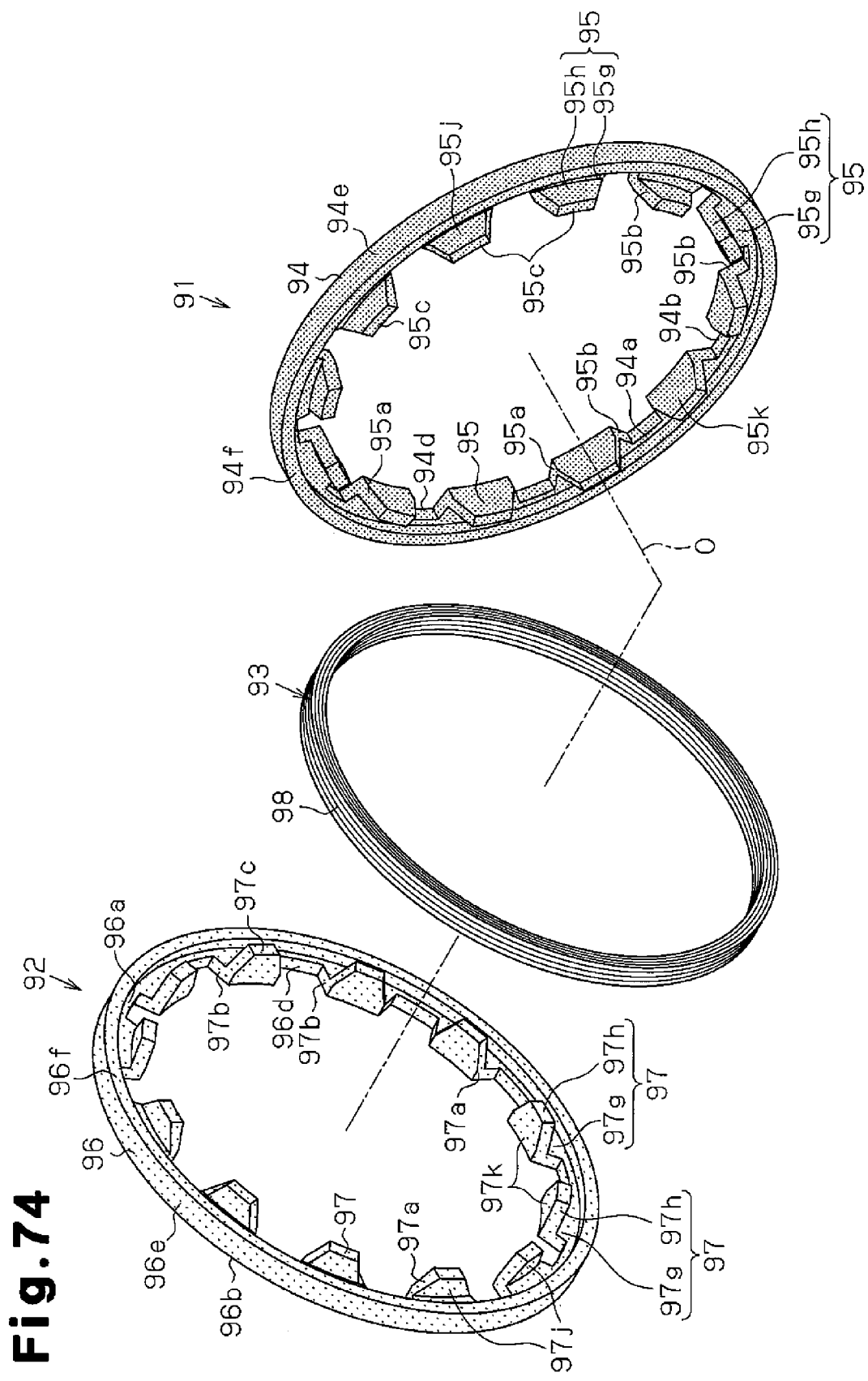
FIG. 74 is an exploded perspective view of the single stator of FIG. 73.

The stators 90u, 90v, 90w of the respective phases have identical structures, and as shown in FIG. 73 and FIG. 74, and each include first and second stator cores 91, 92, and a coil section 93.

(First Stator Core 91)

As shown in FIG. 74, the first stator core 91 includes an annular plate shaped first stator core base 94. A first stator-side cylindrical wall 94e that extends toward the second stator core 92 is bent and formed on an outer circumferential portion of the annular plate-shaped first stator core base 94. An annular distal end surface 94f of the first stator-side cylindrical wall 94e faces the second stator core 92. The length of the first stator-side cylindrical wall 94e in the axial direction is half the length of the rotor of each phase in the axial direction.

Twelve pieces of first stator claw magnetic poles 95 are arranged at equal intervals on an inner circumferential surface 94d of the first stator core base 94. Each of the first stator claw magnetic poles 95 projects toward an inner side in the radial direction, and its distal end is bent in the axial direction toward the second stator core 92.

Here, in each of the first stator claw magnetic poles 95, a portion projecting toward the inner side in the radial direction from the inner circumferential surface 94d of the first stator core base 94 is referred to as a first stator base portion 95g, and a distal end portion bent in the axial direction is referred to as a first stator magnetic pole portion 95h. Further, the first stator claw magnetic poles 95 before the first stator magnetic pole portions 95h are bent and formed have a trapezoidal shape that narrows toward a distal end when viewed in the axial direction.

That is, a shape of the first stator base portion 95g when viewed in the axial direction becomes a trapezoidal shape of which width narrows toward a radially inner side, and a shape of the first stator-side magnetic pole portion 95h when viewed in the radial direction becomes a trapezoidal shape of which width narrows toward the distal end. Further, circumferential end surfaces 95a, 95b of each first stator claw magnetic pole 95 including the first stator base portion 95g and the first stator-side magnetic pole portion 95h are both flat surfaces, and approach one another toward the distal end.

Thus, a cross-sectional area of a cross-section of the first stator base portion 95g cut in an axial direction becomes smaller toward the radially inner side when viewed in the radial direction. Further, a cross-sectional area of a cross-section of the first stator-side magnetic pole portion 95h cut in the radial direction becomes smaller toward the distal end side when viewed in the axial direction.

The first stator-side magnetic pole portion 95h that is bent in the axial direction has a sector-shaped cross-section in the direction perpendicular to the axis, and an outer side surface 95j and an inner side surface 95k thereof in the radial direction are circular arc surfaces that form a concentric circle with the inner circumferential surface 94d of the first stator core base 94 about the center axis O when viewed in the axial direction.

An angle of each first stator claw magnetic pole 95 in the circumferential direction, that is, an angle formed by the circumferential end surfaces 95a, 95b and the center axis O of the rotation shaft SF is smaller than an angle of a gap between basal ends of a first stator claw magnetic pole 95 and a first stator claw magnetic pole 95 that are adjacent to each other.

(Second Stator Core 92)

As shown in FIG. 74, the second stator core 92 includes an annular plate-shaped second stator core base 96 that is formed from the same material and shaped identically to the first stator core base 94. A second stator-side cylindrical wall 96e that extends toward the first stator core 91 is bent and formed on an outer circumferential portion of the annular plate-shaped second stator core base 96. An annular distal end surface 96f of the second stator-side cylindrical wall 96e faces the distal end surface 94f of the first stator-side cylindrical wall 94e. The length of the second stator-side cylindrical wall 96e in the axial direction is half the length of the rotor of each phase in the axial direction.

Twelve pieces of second stator claw magnetic poles 97 are arranged at equal intervals on the inner circumferential surface 96d of the second stator core base 96. Each of the second stator claw magnetic poles 97 is projected toward the inner side in the radial direction, and its distal end is bent in the axial direction toward the first stator core 91.

Here, in each of the second stator claw magnetic poles 97, a portion projecting toward the inner side in the radial direction from the inner circumferential surface 96d of the second stator core base 96 is referred to as a second stator base portion 97g, and a distal end portion bent in the axial direction is referred to as a second stator-side magnetic pole portion 97h. Further, the second stator claw magnetic poles 97 before the second stator-side magnetic pole portions 97h are formed by bending have a trapezoidal shape that narrows toward a distal end when viewed in the axial direction.

That is, a shape of the second stator base portion 97g when viewed in the axial direction becomes a trapezoidal shape of which width narrows toward the radially inner side, and a shape of the second stator-side magnetic pole portion 97h when viewed in the radial direction becomes a trapezoidal shape of which width narrows toward the distal end. Further, circumferential end surfaces 97a, 97b of each second stator claw magnetic pole 97 including the second stator base portion 97g and the second stator-side magnetic pole portion 97h are both flat surfaces, and approach one another closer toward the distal end.

Thus, a cross-sectional area of a cross-section of the second stator base portion 97g cut in the axial direction becomes smaller toward the radially inner side when seen in a radial direction. Further, a cross-sectional area of a cross-section of the second stator-side magnetic pole portion 97h cut in the radial direction becomes smaller toward the distal end side when viewed in the axial direction.

The second stator-side magnetic pole portion 97h that is bent in the axial direction has a sector-shaped cross-section in the direction perpendicular to the axis, and an outer side surface 97j and an inner side surface 97k thereof in the radial direction are circular arc surfaces that form a concentric circle with the inner circumferential surface 96d of the second stator core base 96 about the center axis O when viewed in the axial direction.

An angle of each second stator claw magnetic pole 97 in the circumferential direction, that is, an angle formed by the circumferential end surfaces 97a, 97b and the center axis O of the rotation shaft SF is smaller than an angle of a gap between basal ends of a second stator claw magnetic pole 97 and a second stator claw magnetic pole 97 that are adjacent to each other.

That is, by being formed as above, a shape of the second stator core 92 becomes identical to the first stator core 91. Then, the first and second stator cores 91, 92 are arranged and fixed such that the distal end surface 94f of the first stator-side cylindrical wall 94e and the distal end surface 96f of the second stator-side cylindrical wall 96e are caused to make contact, and each of the second stator claw magnetic poles 97 is positioned between the first stator claw magnetic poles 95 respectively when viewed in the axial direction.

Here, as shown in FIG. 66, the first stator claw magnetic poles 95 have a length by which the distal end surfaces 95c of the first stator-side magnetic pole portions 95h become flush with the opposing surface 96a of the second stator core base 96. In the same manner, the second stator claw magnetic poles 97 have a length by which the distal end surfaces 97c of the second stator-side magnetic pole portions 97h become flush with the opposing surface 94a of the first stator core base 94. That is, in the present embodiment, the length D2 (see FIG. 73) of the first and second stator claw magnetic poles 95, 97 in the axial direction is shorter by a thickness of the first and second stator core bases 94, 96 in the axial direction.

An annular space having a square cross-sectional shape is defined and formed by the opposing surfaces 94a, 96a of the first and second stator core bases 94, 96, the inner circumferential surfaces of the first and second stator-side cylindrical walls 94e, 96e, and the outer side surfaces 95j, 97j of the first and second stator-side magnetic pole portions 95h, 97h. Further, as shown in FIG. 66, the coil section 93 (annular wiring 98) is arranged and fixed in the annular space with the square cross-sectional shape.

(Coil Section 93)

As shown in FIG. 74, the coil section 93 has an annular wiring 98 and the annular wiring 98 is wound in the annular space.

The U-phase, V-phase, and W-phase stators 90u, 90v, 90w each become a so-called Lundell type (claw-pole type) stator with twenty-four poles that excites the first and second stator claw magnetic poles 95, 97 to magnetic poles that are different from one another each time by the annular wiring 98 between the first and second stator cores 91, 92. Further, the stator 90 is formed by having U-phase, V-phase, and W-phase stators 90u, 90v, 90w arranged with gaps CG at intervals G in the axial direction as shown in FIG. 71 and FIG. 72.

Here, as shown in FIG. 55, in the stator 90 including the U-phase, V-phase, and W-phase stators 90u, 90v, 90w, the U-phase stator 90u, the V-phase stator 90v, and the W-phase stator 90w are arranged by deviating their phases by 60 degrees in electrical angle (5 degrees in mechanical angle).

More specifically, the V-phase stator 90v is fixed to a motor housing 110 with its phase deviated by 60 degrees in electrical angle in a clockwise direction relative to the U-phase stator 90u. The W-phase stator 90w is fixed to the motor housing 110 with its phase deviated by 60 degrees in electrical angle in the clockwise direction relative to the V-phase stator 90v.

That is, an inclined direction (see FIG. 68) relative to the axial direction formed by the deviations of the three rotors 80u, 80v, 80w when viewed in the radial direction and an inclined direction (see FIG. 72) relative to the axial direction formed by the deviations of the three stators 90u, 90v, 90w when viewed in the radial direction are arranged to be opposite to one another at the opposing surfaces of the rotor 80 and the stator 90.

Further, a U-phase power voltage of a three-phase AC power is applied to the annular wiring 98 of the U-phase stator 90u, a V-phase power voltage of the three-phase AC power is applied to the annular wiring 98 of the V-phase stator 90v, and a W-phase power voltage of the three-phase AC power is applied to the annular wiring 98 of the W-phase stator 90w.

As shown in FIG. 62, the brushless motor M has a first circuit board 155 provided in the gap CG formed between the U-phase motor unit Mu and the V-phase motor unit Mv, and a second circuit board 156 provided in the gap CG formed between the V-phase motor unit Mv and the W-phase motor unit Mw. The first and second circuit boards 155, 156 are disk-shaped insulated substrates, of which outer circumferential surfaces are fixed on the inner circumferential surface of the motor housing 110, and at which center portions through holes 155a, 156a through which the rotation shaft SF extends are formed.

A drive control circuit for controlling a supply of the U-phase power voltage to the annular wiring 98 of the U-phase stator 90u is mounted on the first circuit board 155 provided in the gap CG between the U-phase motor unit Mu and the V-phase motor unit Mv. Further, a drive control circuit for controlling a supply of the W-phase power voltage to the annular wiring 98 of the W-phase stator 90w is mounted on the second circuit board 156 provided in the gap CG between the V-phase motor unit My and the W-phase motor unit Mw.

A drive control circuit for controlling a supply of the V-phase power voltage to the annular wiring 98 of the V-phase stator 90v is mounted on the first circuit board 155 or the second circuit board 156. The drive control circuit for controlling the supply of the V-phase power voltage to the annular wiring 98 of the V-phase stator 90v may be mounted partially on both the first circuit board 155 and the second circuit board 156.

Next, the operation of the brushless motor M will be described.

Now, when a three-phase AC power voltage is applied to the stator 90, like the above embodiments, a U-phase power voltage is applied to an annular wiring 98 of the U-phase stator 90u, a V-phase power voltage is applied to an annular wiring 98 of the V-phase stator 90v, and a W-phase power voltage is applied to an annular wiring 98 of the W-phase stator 90w, respectively. Thus, a rotating magnetic field is generated in the stator 90, and the rotor 80 is rotated and driven.

Here, the stator 90 includes the three stage structure of the U-phase, V-phase, and W-phase stators 90u, 90v, 90w in correspondence with the three-phase AC power. Accordingly, the rotor 80 also includes the three stage structure of the U-phase, V-phase, and W-phase rotors 80u, 80v, 80w. Thus, in the stator and the rotor of each phase, the stator opposing the field magnet 83 along the axial direction can independently receive magnetic flux of the field magnet 83, and an increase in output can be achieved.

Further, the field magnet 83 of the V-phase rotor 80v has its magnetizing direction set opposite to the field magnets 83 of the U-phase and W-phase rotors 80u, 80w. Thus, polarities of the V-phase field magnet 83 on both sides in the axial direction have the same polarities as the U-phase and W-phase field magnets 83 opposed in the axial direction, so the magnetic flux of the V-phase field magnet 83 becomes unlikely to leak to the side of the U-phase and W-phase rotors 80u, 80w. As a result, the magnetic flux of the V-phase field magnet 83 suitably flows in the V-phase first and second rotor claw magnetic poles 85, 87.

Further, in the present embodiment, the gap CG is provided between the U-phase motor unit Mu and the V-phase motor unit Mv, and the gap CG is provided between the V-phase motor unit Mv and the W-phase motor unit Mw.

Figure 75:
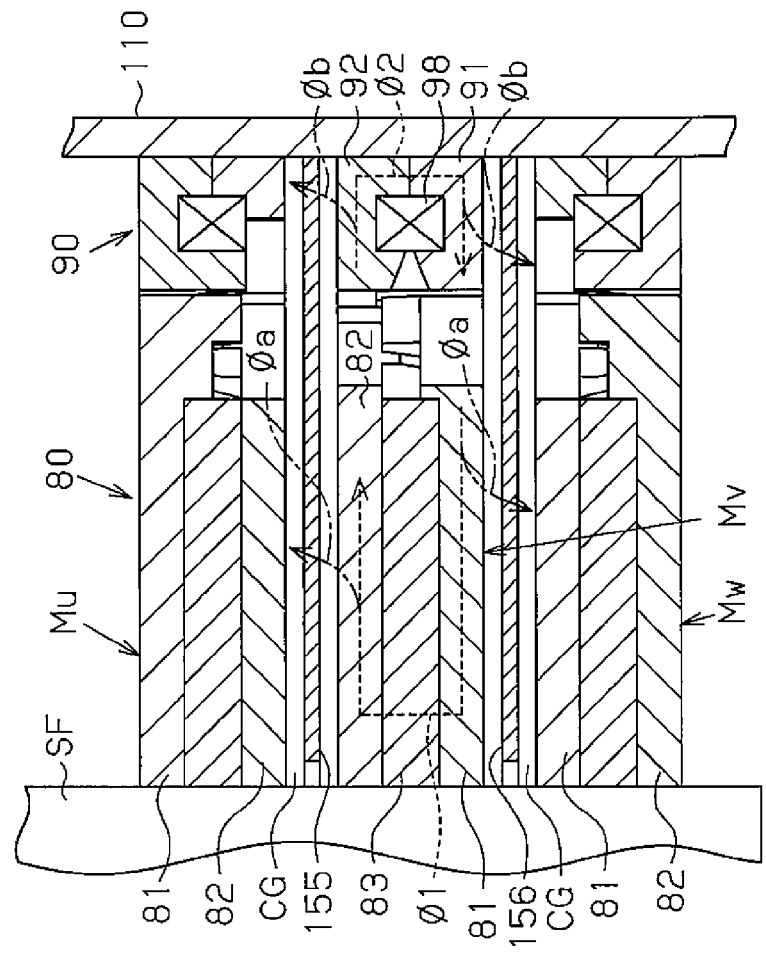
FIG. 75 is an explanatory diagram illustrating a magnetic flux path of the motor of FIG. 62.

Accordingly, as shown in FIG. 75, since the U-phase, V-phase, and W-phase rotors 80u, 80v, 80w are separated from one another, a part of main magnetic flux φ1 based on the field magnet 83 leaking to its adjacent rotors as leaking magnetic flux φa is further suppressed. In the same manner, since the U-phase, V-phase, and W-phase stators 90u, 90v, 90w are separated from one another, a part of main magnetic flux φ2 based on the annular wiring 98 leaking to its adjacent stators as leaking magnetic flux φb is suppressed.

Here, experiments were conducted to evaluate a torque increasing rate (%) and a ripple factor (%) relative to the gaps CG (intervals G) provided between the U-phase motor unit Mu and the V-phase motor unit Mv as well as between the V-phase motor unit Mv and the W-phase motor unit Mw. All of the experiments were conducted under same conditions except for that the gap CG between the U-phase motor unit Mu and the V-phase motor unit Mv and the gap CG between the V-phase motor unit Mv and the W-phase motor unit Mw were changed at the same interval G.

Figure 76:
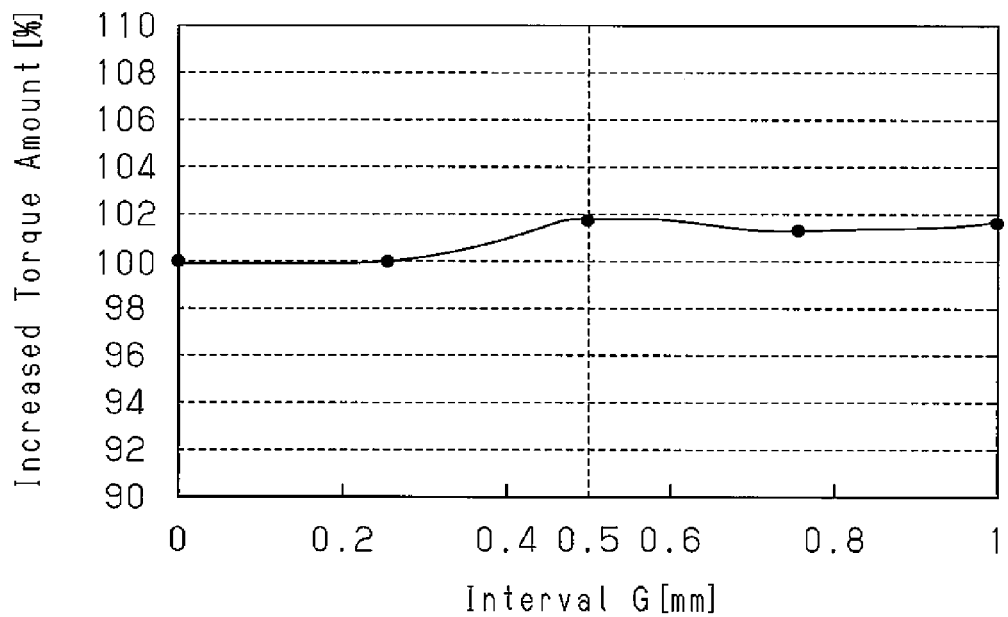
FIG. 76 is a graph showing the relationship of the interval and the increased amount of torque.

FIG. 76 is a graph showing the torque increasing rate (%) relative to the interval G of the gap CG obtained from the experiments. A horizontal axis shows the interval G (mm) of the gap CG, and a vertical axis shows the torque increasing rate (%). The torque increasing rate is shown by percentage with torque of the brushless motor M upon when the interval G of the gap CG is 0 as a reference (100%).

As is apparent from FIG. 76, it has been found that the leaking magnetic flux φa, φb is decreased and the torque increasing rate is increased when the interval G is set to be 0.25 mm or more.

Figure 77:
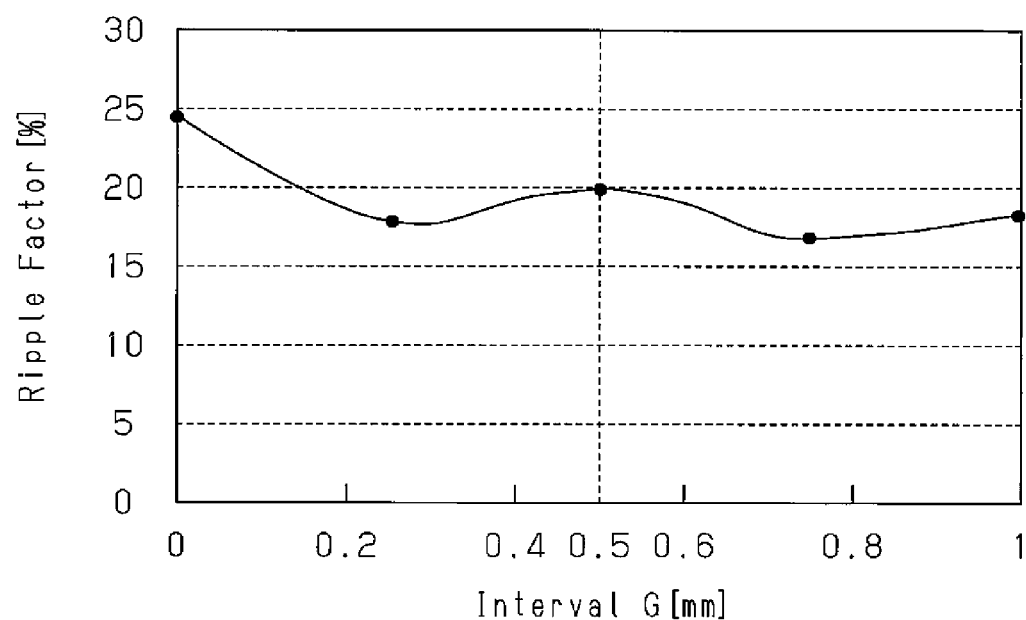
FIG. 77 is a graph showing the relationship of the interval and the ripple factor.

FIG. 77 is a graph showing the ripple factor (%) relative to the interval G of the gap CG obtained from the experiments. A horizontal axis shows the interval G (mm) of the gap CG, and a vertical axis shows the ripple factor (%).

As is apparent from this FIG. 77, it has been found that magnetic imbalance in the U-phase, V-phase, and W-phase is resolved by creating the intervals G, that is, balance of the magnetic flux can be equalized, whereby the rippling is decreased.

It can be understood that the torque increasing rate is high when the interval G is 0.5 mm and 1 mm. At these occasions, it can be understood that, among the interval G being 0.5 mm and 1 mm, the case with the interval G of 1 mm has a lower ripple factor than the case with the interval G of 0.5 mm.

Thus, a brushless motor M that decreases the rippling and obtains high torque can be realized by creating the intervals G to be at least 0.25 mm or more.

Further, the first circuit board 155 is provided in the gap CG between the U-phase motor unit Mu and the V-phase motor unit Mv, and the second circuit board 156 is provided in the gap CG between the V-phase motor unit Mv and the W-phase motor unit Mw. Further, the drive control circuits for respectively controlling the supplies of the U-phase, V-phase, and W-phase power voltages to the respective annular wirings 98 of the U-phase, V-phase, and W-phase stators 90*u*, 90*v*, 90*w* are mounted on the first and second circuit boards 155, 156.

That is, since the drive control circuits are respectively arranged at positions in the vicinities of the annular wirings 98 of the U-phase, V-phase, and W-phase stators 90*u*, 90*v*, 90*w*, wires of the annular wirings 98 can be made short, and use thereof becomes easy. As a result, the assembling becomes easy.

Further, the first and second circuit boards 155, 156 are arranged in the gaps CG formed between the U-phase, V-phase, and W-phase rotors 80*u*, 80*v*, 80*w*. Thus, electromagnetic waves radiated from the mounted drive control circuits become unlikely to be radiated to outside, and their undesirable influence such as erroneous operation of other electric apparatuses can be reduced.

Further, the length D1 of the first and second rotor claw magnetic poles 85, 87 in the axial direction is shortened in the U-phase, V-phase, and W-phase rotors 80*u*, 80*v*, 80*w* of the three-stage structure.

That is, in the U-phase, V-phase, and W-phase rotors 80*u*, 80*v*, 80*w*, the three first rotor claw magnetic poles 85 are separated from one another, and the three second rotor claw magnetic poles 87 are separated from one another. As a result, short circuiting of the magnetic flux among the first rotor claw magnetic poles 85 of the three phases is suppressed, and short circuiting of the magnetic flux among the second rotor claw magnetic poles 87 of the three phases is suppressed.

In the same manner, the length D2 of the first and second stator claw magnetic poles 95, 97 in the axial direction is shortened in the U-phase, V-phase, and W-phase stators 90*u*, 90*v*, 90*w* of the three-stage structure.

That is, in the U-phase, V-phase, and W-phase stators 90*u*, 90*v*, 90*w*, the three first stator claw magnetic poles 95 are separated from one another, and the three second stator claw magnetic poles 97 are separated from one another. As a result, short circuiting of the magnetic flux among the first stator claw magnetic poles 95 of the three phases is suppressed, and short circuiting of the magnetic flux among the second stator claw magnetic poles 97 of the three phases is suppressed.

Further, since the first and second rotor claw magnetic poles 85, 87 of the U-phase, V-phase, and W-phase rotors 80*u*, 80*v*, 80*w* that are in the three-stage structure are formed in trapezoidal shape that narrows toward the distal end, the magnetic flux from the field magnets 83 are more efficiently guided to the distal end portions of the first and second magnetic pole portions 85*f*, 87*f*.

In the same manner, since the first and second stator claw magnetic poles 95, 97 of the U-phase, V-phase, and W-phase stators 90*u*, 90*v*, 90*w* in the three-stage structure are formed in trapezoidal shape that narrows toward the distal end, the magnetic flux from the annular wirings 98 are more efficiently guided to the distal end portions of the first and second stator-side magnetic pole portions 95*h*, 97*h*.

In this manner, since the intervals between the claw magnetic poles of the three phases are released open, the short circuiting of the magnetic flux is suppressed, and the magnetic flux is efficiently guided to the distal end portions of the respective magnetic pole portions 85*f*, 87*f*, 95*h*, 97*h*, it becomes possible to form the brushless motor M with high torque.

Further, with respect to the U-phase, V-phase, and W-phase stators 90*u*, 90*v*, 90*w* of the stator 90 deviated by 60 degrees in the electrical angle in the clockwise direction, the U-phase, V-phase, and W-phase rotors 80*u*, 80*v*, 80*w* of the rotor 80 are deviated by 60 degrees in the electrical angle in the clockwise direction. That is, an inclined direction (see FIG. 68) relative to the axial direction formed by the deviations of the three rotors 80*u*, 80*v*, 80*w* when viewed in the radial direction and an inclined direction (see FIG. 72) relative to the axial direction formed by the deviations of the three stators 90*u*, 90*v*, 90*w* when viewed in the radial direction are arranged to be opposite to one another at the opposing surfaces of the rotor 80 and the stator 90.

Thus, the first and second rotor claw magnetic poles 85, 87 of the respective phases can suitably follow the switching of the first and second stator claw magnetic poles 95, 97 by the respective phase AC currents flowing in the annular wirings 98 of the respective phases, as a result of which a suitable rotation of the rotor 80 can be realized.

Further, the first and second step portions 85*d*, 87*d* having a large cross-sectional magnetic path area are provided at the first and second rotor claw magnetic poles 85, 87 of the U-phase, V-phase, and W-phase rotors 80*u*, 80*v*, 80*w* in the three-stage structure. Accordingly, a magnetic resistance in the first and second step portions 85*d*, 87*d* becomes small, whereby a magnetic saturation of the magnetic flux between the first and second magnetic pole portions 85*f*, 87*f* of the first and second rotor claw magnetic poles 85, 87 and the first and second rotor core bases 84, 86 can be resolved, and the increase in the output can be achieved.

Further, by the outer circumferential surface 83*d* of the field magnet 83 contacting under pressure the first and second step surfaces 85*e*, 87*e* of the first and second step portions 85*d*, 87*d* respectively, an air gap that is to be the magnetic resistance can be reduced, and even a greater increase in the output can be achieved.

In addition, the field magnet 83 is sandwiched and fixed by the first rotor core base 84 and the second rotor core base 86 by the outer circumferential surface 83*d* of the field magnet 83 being press-fitted into the first and second step surfaces 85*e*, 87*e* of the first and second step portions 85*d*, 87*d*. Accordingly, the task for positioning and fixing the field magnet 83 between the first rotor core base 84 and the second rotor core base 86 can be performed just by carrying out fitting and fixing without using a special fixing member and mechanism.

In this manner, since intervals among claw magnetic poles of the three phases are released open and the short circuiting of the magnetic flux is suppressed, a magnetic circuit for generating torque and free from magnetic saturation is formed and it becomes possible to form the brushless motor M with high torque.

In the present embodiment also, like the above embodiments, when a request to change the number of magnetic poles is made, since the U-phase, V-phase, and W-phase rotors 80*u*, 80*v*, 80*w* of the rotor 80 form the Lundell type structure, the number of poles can easily be changed by simply changing the number of the first and second rotor claw magnetic poles 142, 152 while maintaining the field magnets 83 in the identical structure. In the same manner, since the U-phase, V-phase, and W-phase stators 90*u*, 90*v*, 90*w* of the stator 90 form a claw-pole type structure, the number of poles can easily be changed simply by changing the number of the first and second stator claw magnetic poles 95, 97 while maintaining the coil sections 93 (annular wiring 98) in the identical structure.

As described above in detail, the present embodiment has the following advantages in addition to the advantages of the respective embodiments.

(12) According to the present embodiment, the gap CG is provided between the U-phase motor unit Mu and the V-phase motor unit Mv, and the gap CG is provided between the V-phase motor unit Mv and the W-phase motor unit Mw.

Accordingly, since the U-phase, V-phase, and W-phase rotors 80u, 80v, 80w are separated from one another, a part of the main magnetic flux φ1 based on the field magnet 83 leaking to its adjacent rotors as the leaking magnetic flux φa is suppressed. In the same manner, since the U-phase, V-phase, and W-phase stators 90u, 90v, 90w are separated from one another, a part of main magnetic flux φ2 based on the annular wiring 98 leaking to its adjacent stators as leaking magnetic flux φb is suppressed. As a result, the brushless motor M can be provided with high torque.

Especially, by setting the intervals G of the gaps CG to be 0.25 mm or more, the increase of torque and the reduction of ripple can be achieved compared to the case where the interval G is 0 mm.

(13) According to the present embodiment, the first circuit board 155 is provided in the gap CG between the U-phase motor unit Mu and the V-phase motor unit Mv, and the second circuit board 156 is provided in the gap CG between the V-phase motor unit Mv and the W-phase motor unit Mw. Further, the drive control circuits for respectively controlling the supplies of the U-phase, V-phase, and W-phase power voltages to the respective annular wirings 98 of the U-phase, V-phase, and W-phase stators 90u, 90v, 90w are mounted on the first and second circuit boards 155, 156.

Accordingly, since the drive control circuits are respectively arranged at positions in the vicinities of the annular wirings 98 of the U-phase, V-phase, and W-phase stators 90u, 90v, 90w, wires of the annular wirings 98 can be made short, and use thereof becomes easy. As a result, the assembling becomes easy.

(14) According to the present embodiment, the first and second circuit boards 155, 156 mounted with the drive control circuits for respectively controlling the supplies of the U-phase, V-phase, and W-phase power voltages are arranged in the gaps CG formed between the U-phase, V-phase, and W-phase rotors 80u, 80v, 80w.

Thus, electromagnetic waves radiated from each of the mounted drive control circuits become unlikely to be radiated to outside, and their undesirable influence to other electric apparatuses can be reduced.

Seventh Embodiment

Next, a seventh embodiment of a motor will be described with reference to FIG. 78 to FIG. 88.

Figure 78:
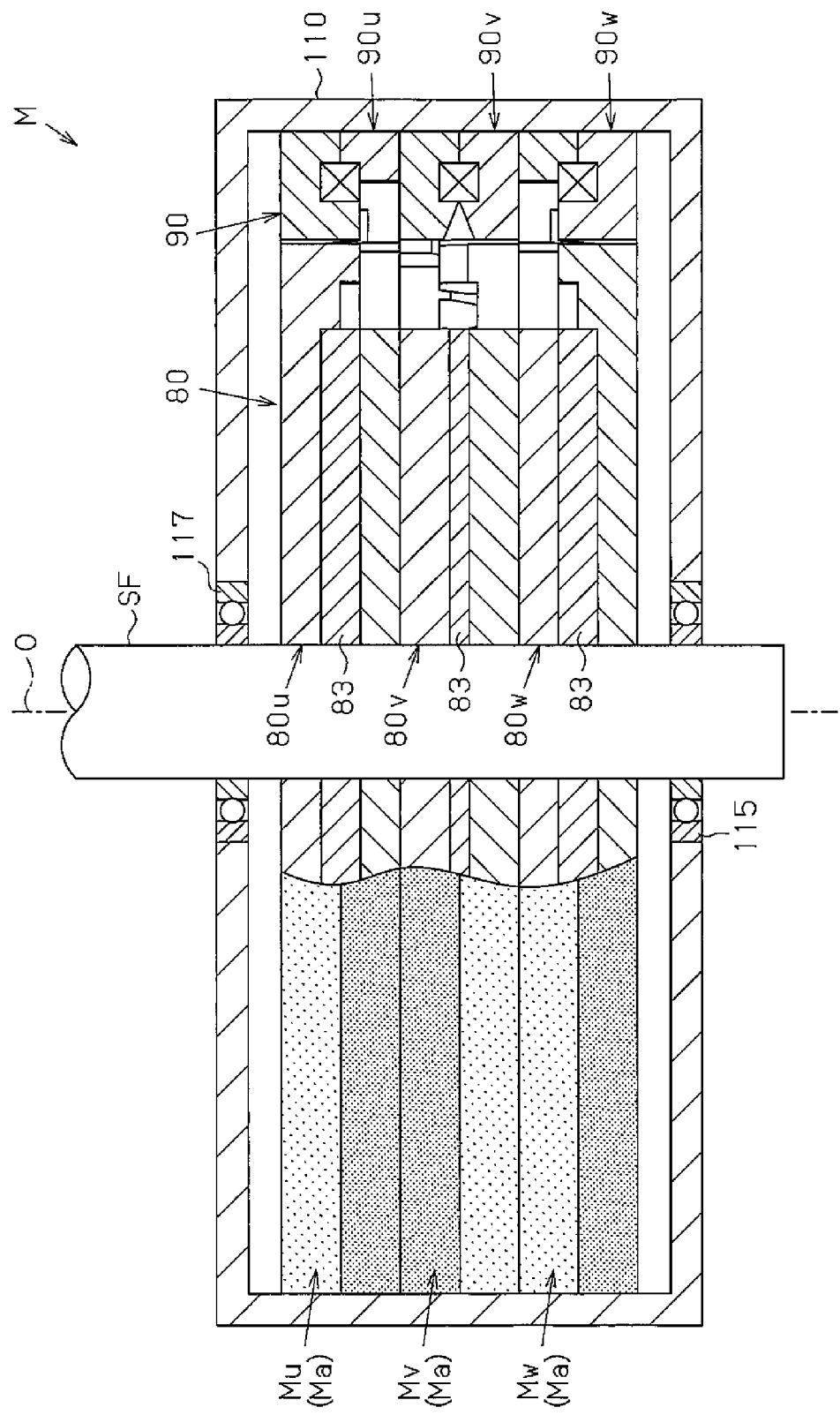
FIG. 78 is a cross-sectional view taken from a radial direction of a motor of a seventh embodiment of the present invention.
Figure 79:
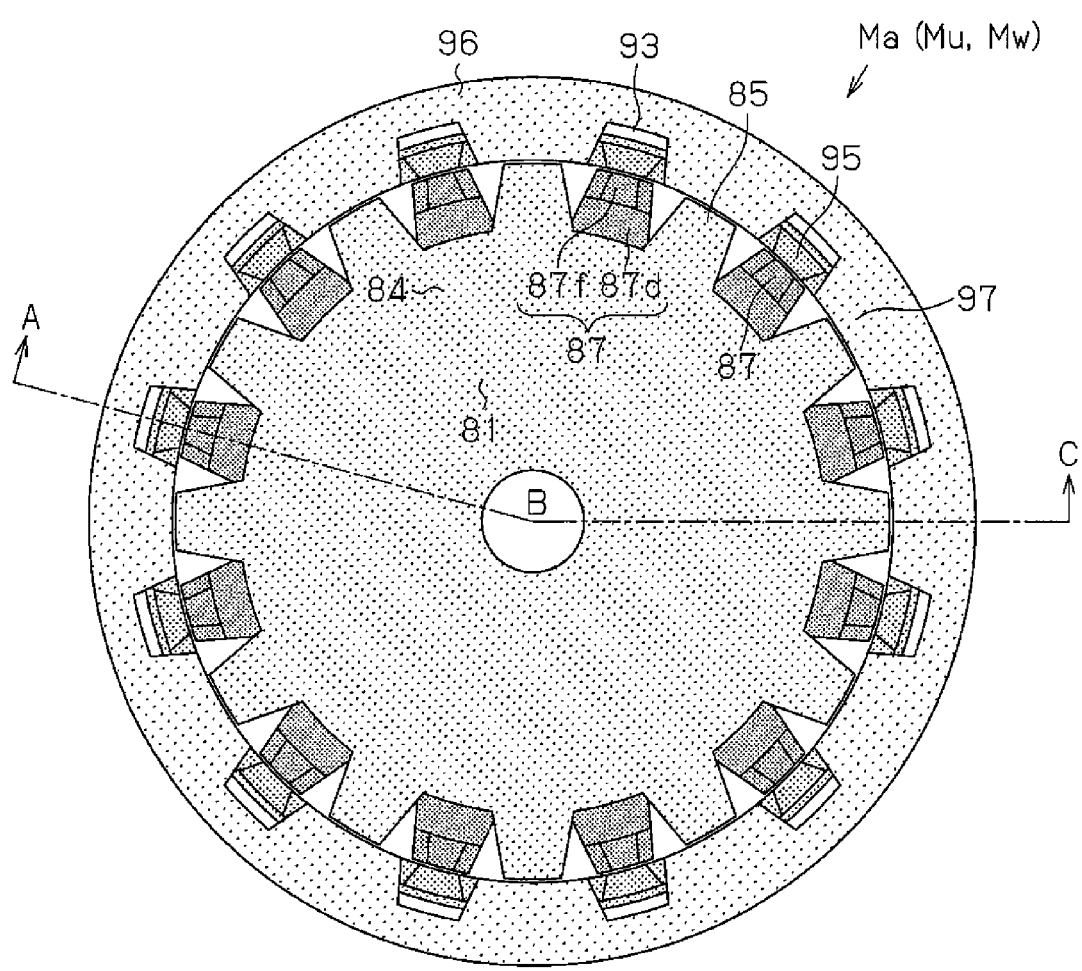
FIG. 79 is a front view taken from an axial direction of the U-phase and W-phase single motors of FIG. 78.

In FIG. 78, a brushless motor M includes a motor housing 110. The motor housing 110 rotatably supports a rotation shaft SF, which penetrates the motor housing 110, via bearings 115, 117. A rotor 80 and a stator 90 are provided in the motor housing 110. The rotor 80 is fixed to the rotation shaft SF, and rotates integrally with the rotation shaft SF. The stator 90 is fixed on an inner circumferential surface of the motor housing 110 so as to surround the rotor 80.

As shown in FIG. 78 to FIG. 82, the brushless motor M includes three single motors Ma arranged in an axial direction, and in FIG. 78. The motors Ma are stacked in the order of a U-phase motor unit Mu, a V-phase motor unit Mv, and a W-phase motor unit Mw from the top.

(Rotor 80)

Figure 83:
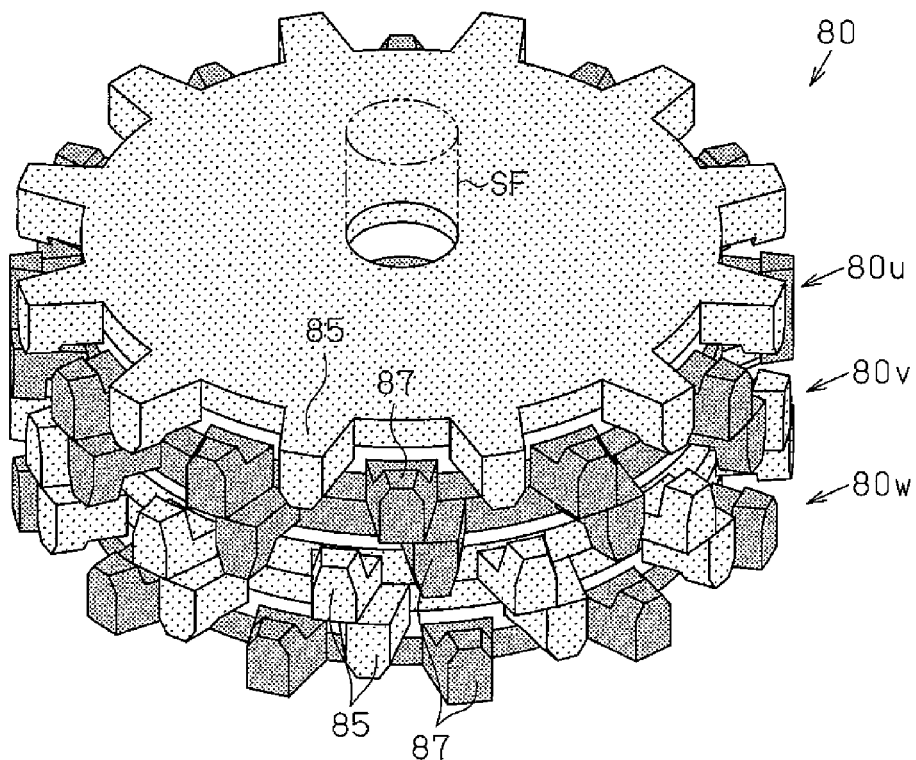
FIG. 83 is an overall perspective view of a rotor of FIG. 78.
Figure 84:
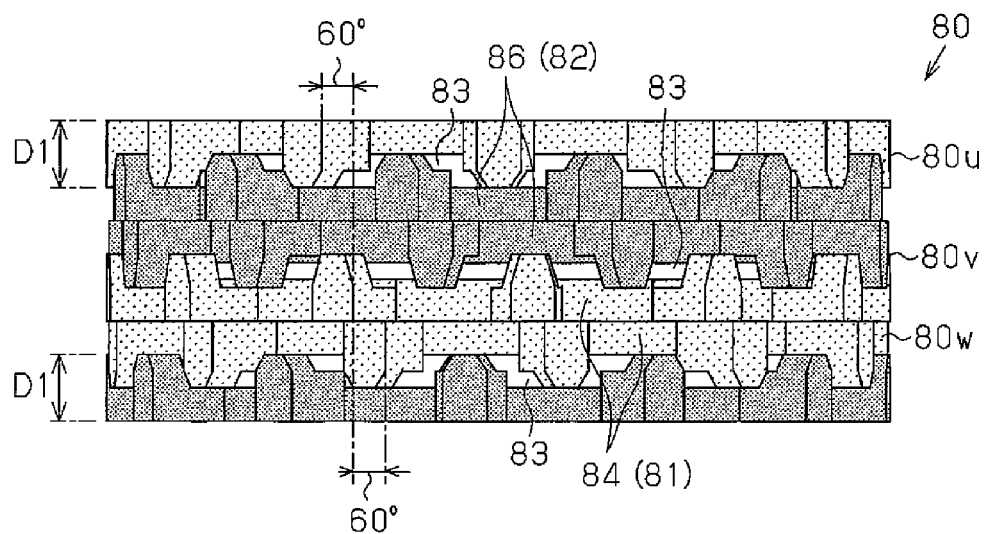
FIG. 84 is a front view taken from a radial direction of the rotor of FIG. 83.

As shown in FIG. 83 and FIG. 84, the rotor 80 of the brushless motor M includes three components, namely a U-phase rotor 80u, a V-phase rotor 80v, and a W-phase rotor 80w, each of which is fixed to the rotation shaft SF. Further, they are stacked in the order of the U-phase rotor 80u, the V-phase rotor 80v, and the W-phase rotor 80w from the top.

Each of the rotors 80u, 80v, 80w of the respective phases includes first and second rotor cores 81, 82 and a field magnet 83, like the above embodiments. However, in the present embodiment, instead of the U-phase and W-phase rotors 80u, 80w being configured of a same shape, only the V-phase rotor 80v includes a different shape.

More specifically, the rotors 80u, 80v, 80w are configured such that a magnetic force of the field magnet 83 provided in the V-phase rotor 80v is made smaller than a magnetic force of the field magnets 83 of the U-phase and W-phase rotors 80u, 80w. In more detail, a thickness of the field magnet 83 provided in the V-phase rotor 80v is (length T2 in an axial direction (see FIG. 82)) is made small compared to a thickness of the field magnets 83 of the U-phase and W-phase rotors 80u, 80w (length T1 in the axial direction (see FIG. 80)). Further, a shape of the first and second rotor cores 81, 82 provided in the U-phase and W-phase rotors 80u, 80w and a shape of the first and second rotor cores 81, 82 provided in the V-phase rotor 80v differ based on the difference in the thicknesses of the field magnets 83.

Firstly, the configuration of the U-phase and W-phase rotors 80u, 80w will be described.

(First Rotor Core 81 of U-Phase and W-Phase Rotors 80u, 80w)

Figure 85:
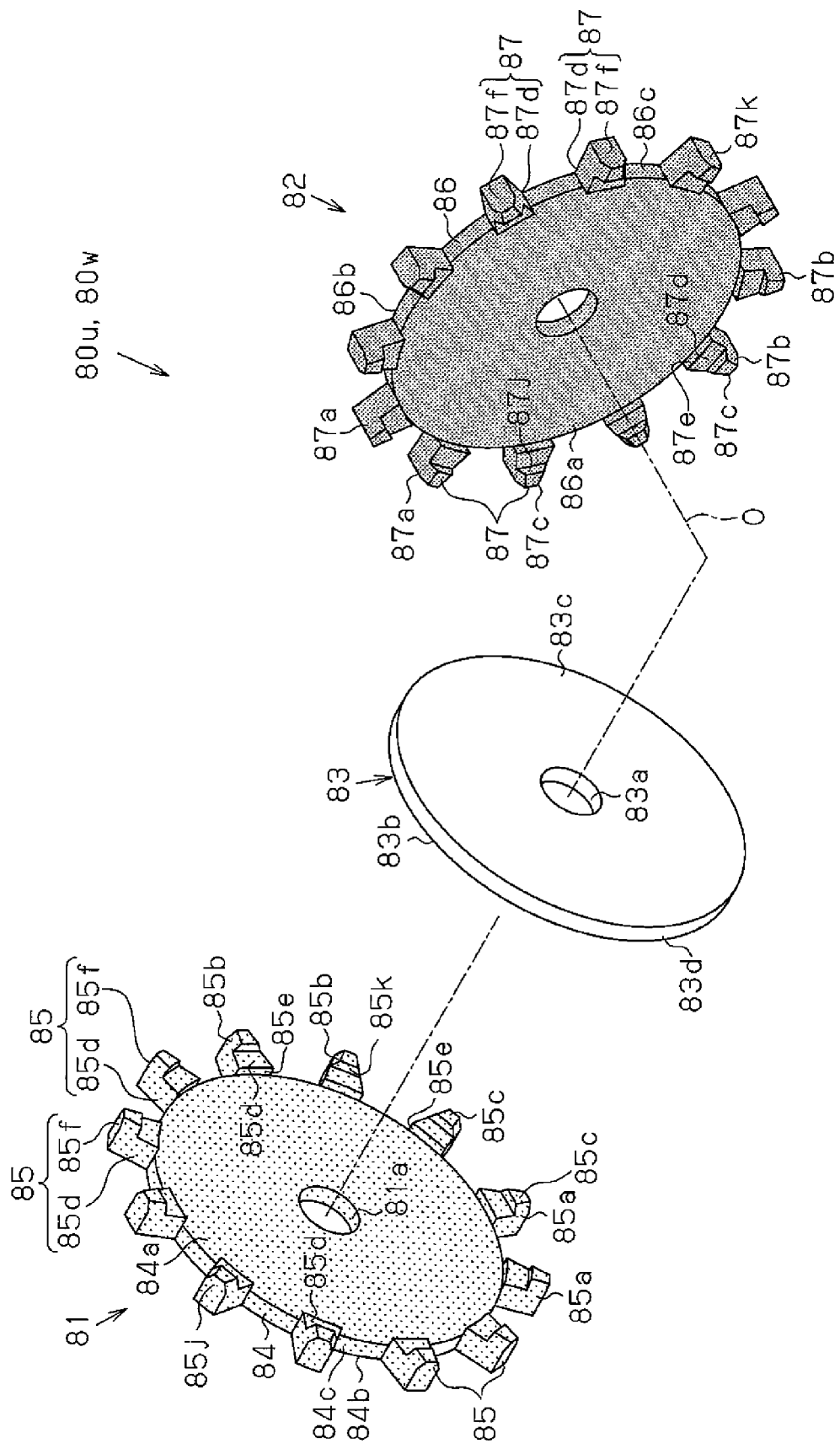
FIG. 85 is an exploded perspective view of the U-phase and W-phase single rotors of FIG. 84.

The first rotor cores 81 of the U-phase and W-phase rotors 80u, 80w have the same shape as the sixth embodiment. To explain simply, as shown in FIG. 85, each of the first rotor cores 81 has a first rotor core base 84 formed in a disk shape, and a through hole 81a for inserting and fixing the rotation shaft SF is formed at a center position of the first rotor core base 84.

Further, twelve pieces of first rotor claw magnetic poles 85 having an identical shape are arranged at equal intervals on an outer circumferential surface 84c of the first rotor core base 84. Each of the first rotor claw magnetic poles 85 projects outward in a radial direction and includes a distal end that is bent to extend toward the second rotor core 82 in the axial direction.

Similar to the first rotor core base 84 of the sixth embodiment, each of the first rotor claw magnetic poles 85 has a first step portion 85d positioned at a portion that is projected radially outward from the outer circumferential surface 84c of the first rotor core base 84. Further, similar to the first rotor core base 84 of the sixth embodiment, a first step surface 85e formed on a radially inner side of each first step portion 85d is a circular arc surface that forms a concentric circle with the outer circumferential surface 84c of the first rotor core base 84.

Thus, similar to the first rotor core base 84 of the sixth embodiment, the first rotor claw magnetic poles 85 are formed by first magnetic pole portions 85f projecting from outer side ends of the first step portions 85d in the radial direction toward the second rotor core 82 along the axial direction.

Further, in the same manner, the shape of the first step portions 85d when viewed in the axial direction becomes a trapezoidal shape of which width narrows toward the radially outer side, and the shape of the first magnetic pole portions 85f when viewed in the radial direction becomes a trapezoidal shape of which width narrows toward the distal end.

Further, the first magnetic pole portion 85f of each first rotor claw magnetic pole 85 has a sector-shaped cross-section in a direction perpendicular to the axis, and an outer side surface 85j and an inner side surface 85k of the first magnetic pole portion 85f in the radial direction are formed as circular arc surfaces that form a concentric circle with the outer circumferential surface 84c of the first rotor core base 84 about a center axis O when viewed in the axial direction.

(Second Rotor Core 82 of U-Phase and W-Phase Rotors 80u, 80w)

The second rotor cores 82 of the rotors 80u, 80w have the same shape as the sixth embodiment. To explain simply, as shown in FIG. 85, the second rotor core 82 is formed from the same material and shaped identically to the first rotor core 81, and a through hole 82a for inserting and fixing the rotation shaft SF is formed at a center position of a second rotor core base 86 that is formed in a disk shape.

Further, twelve pieces of second rotor claw magnetic poles 87 having an identical shape are arranged at equal intervals on an outer circumferential surface of the second rotor core base 86. Each of the second rotor core base 86 projects outward in the radial direction and includes a distal end that is bent to extend toward the first rotor core 81 in the axial direction.

Like the second rotor core base 86 of the sixth embodiment, each of the second rotor claw magnetic poles 87 has a second step portion 87d positioned at a portion that is protruded radially outward from the outer circumferential surface 86c of the second rotor core base 86. Further, a second step surface 87e formed on a radially inner side of each second step portion 87d is a circular arc surface that forms a concentric circle with the outer circumferential surface 86c of the second rotor core base 86 like to the second rotor core base 86 of the sixth embodiment.

Thus, like the second rotor core base 86 of the sixth embodiment, the second rotor claw magnetic poles 87 are formed by second magnetic pole portions 87f projecting from outer side ends of the second step portions 87d in the radial direction toward the first rotor core 81 along the axial direction.

Further, in the same manner, the shape of the second step portions 87d when viewed in the axial direction becomes a trapezoidal shape of which width narrows toward the radially outer side, and the shape of the second magnetic pole portions 87f when viewed in the radial direction becomes a trapezoidal shape of which width narrows toward the distal end.

Further, the second magnetic pole portion 87f of each second rotor claw magnetic pole 87 has a sector-shaped cross-section in the direction perpendicular to the axis, and an outer side surface 87j and an inner side surface 87k of the second magnetic pole portion 87f in the radial direction are circular arc surfaces that form a concentric circle with the outer circumferential surface 84c of the first rotor core base 84 about a center axis O when viewed in the axial direction.

(Field Magnets 83 of U-Phase and W-Phase Rotors 80u, 80w)

Each of the field magnets 83 of the U-phase and W-phase rotors 80u, 80w has an identical shape as in the sixth embodiment, and is arranged and assembled between the first rotor core 81 and the second rotor core 82 in an axial direction. To describe briefly, as shown in FIG. 85, a through hole 83a for inserting and fixing a rotation shaft SF is formed at a center position of the field magnet 83. Further, one side surface 83b of the field magnet 83 contacts the opposing surface 84a of the first rotor core base 84 and the other side surface 83c of the field magnet 83 contacts the opposing surface 86a of the second rotor core base 86, respectively, and the field magnet 83 is sandwiched and fixed between the first rotor core 81 and the second rotor core 82.

An outer diameter of the field magnet 83 is set to conform to outer diameters of the first and second rotor core bases 84, 86 (outer circumferential surfaces 84c, 86c).

Accordingly, like the sixth embodiment, in sandwiching the field magnet 83 by the first rotor core base 84 and the second rotor core base 86, the field magnet 83 is fitted into the first and second step portions 85d, 87d so that the outer circumferential surface 83d of the field magnet 83 contacts under pressure the first and second step surfaces 85e, 87e of the respective first and second rotor claw magnetic poles 85, 87.

Figure 80:
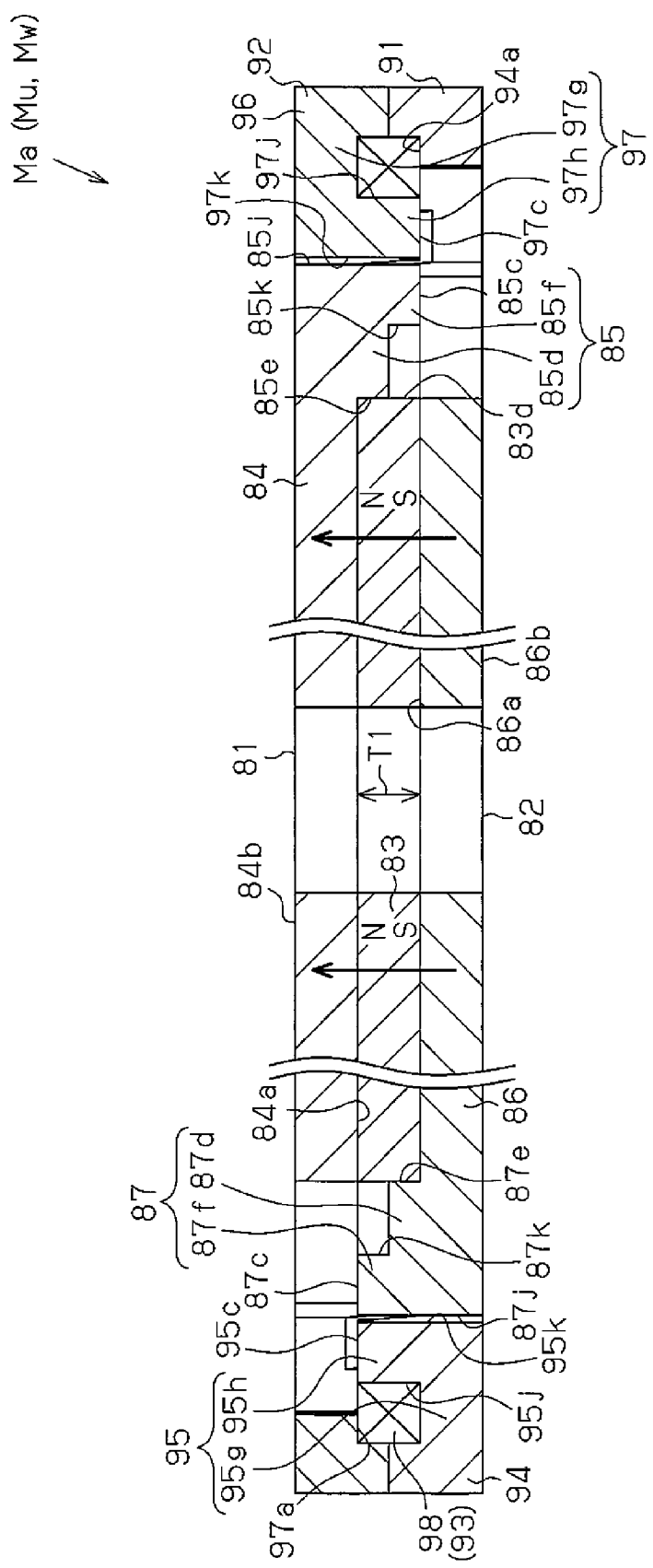
FIG. 80 is a combined cross-sectional view taken along line A-B-C in FIG. 79.
Figure 81:
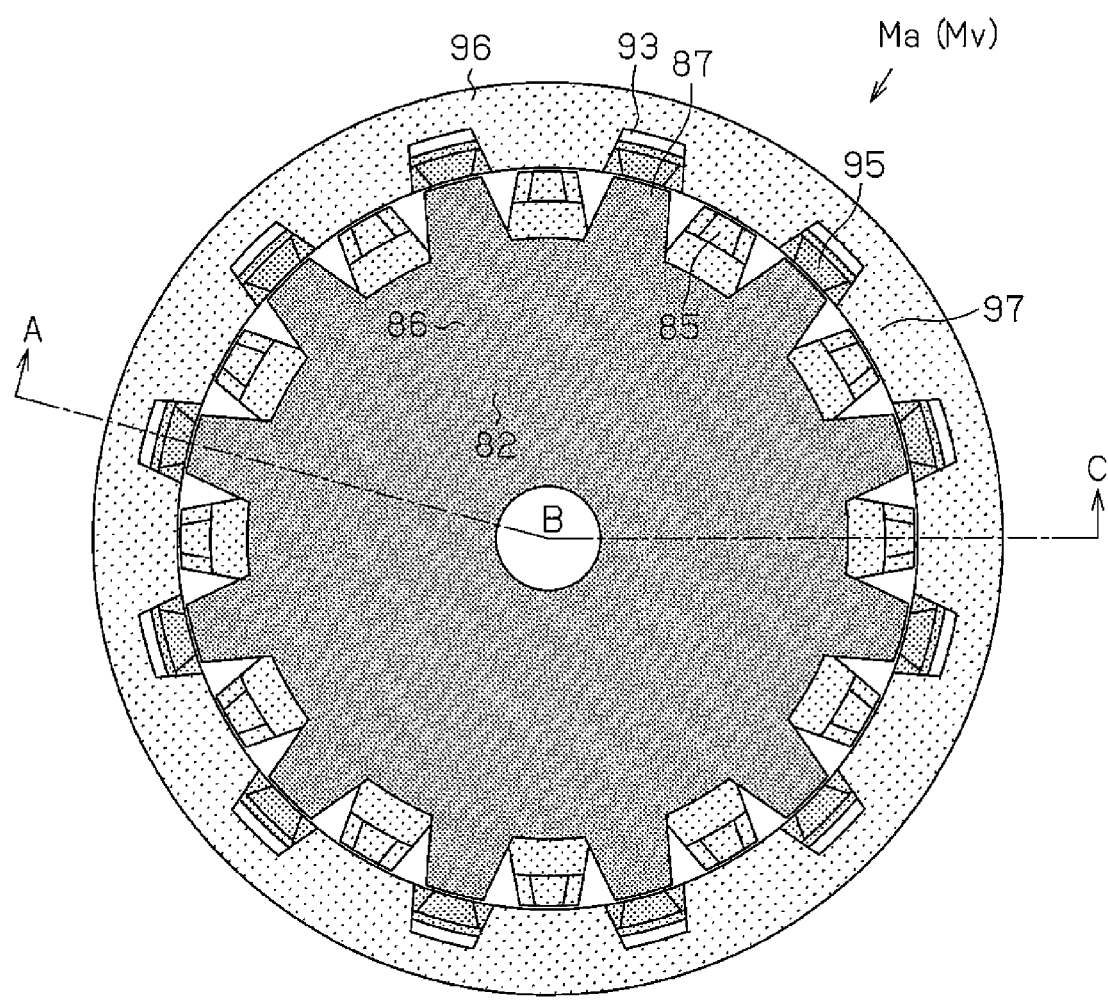
FIG. 81 is a front view taken from an axial direction of the V-phase single motor of FIG. 78.

Further, a thickness of the field magnet 83 (length T1 in an axial direction) is set to a predetermined thickness. As shown in FIG. 80, the first and second rotor claw magnetic poles 85, 87 have a length by which their distal end surfaces 85c, 87c become flush with the opposing surfaces 84a, 86a of the first and second rotor core bases 84, 86, respectively, according to the thickness of the field magnet 83 (length T1 in the axial direction). That is, in the present embodiment, as shown in FIG. 84, the length D1 of the first and second rotor claw magnetic poles 85, 87 is short by the thickness of the first and second rotor core bases 84, 86 in the axial direction.

As shown in FIG. 80, the field magnet 83 is magnetized along the axial direction such that the first rotor core 81 becomes an N pole and the second rotor core 82 becomes an S pole. Accordingly, the first rotor claw magnetic poles 85 of the first rotor core 81 function as N poles (first magnetic poles), and the second rotor claw magnetic poles 87 of the second rotor core 82 function as S poles (second magnetic poles) by the field magnet 83.

Next, the configuration of the V-phase rotor 80v will be described.

(First Rotor Core 81 of V-Phase Rotor 80v)

Figure 86:
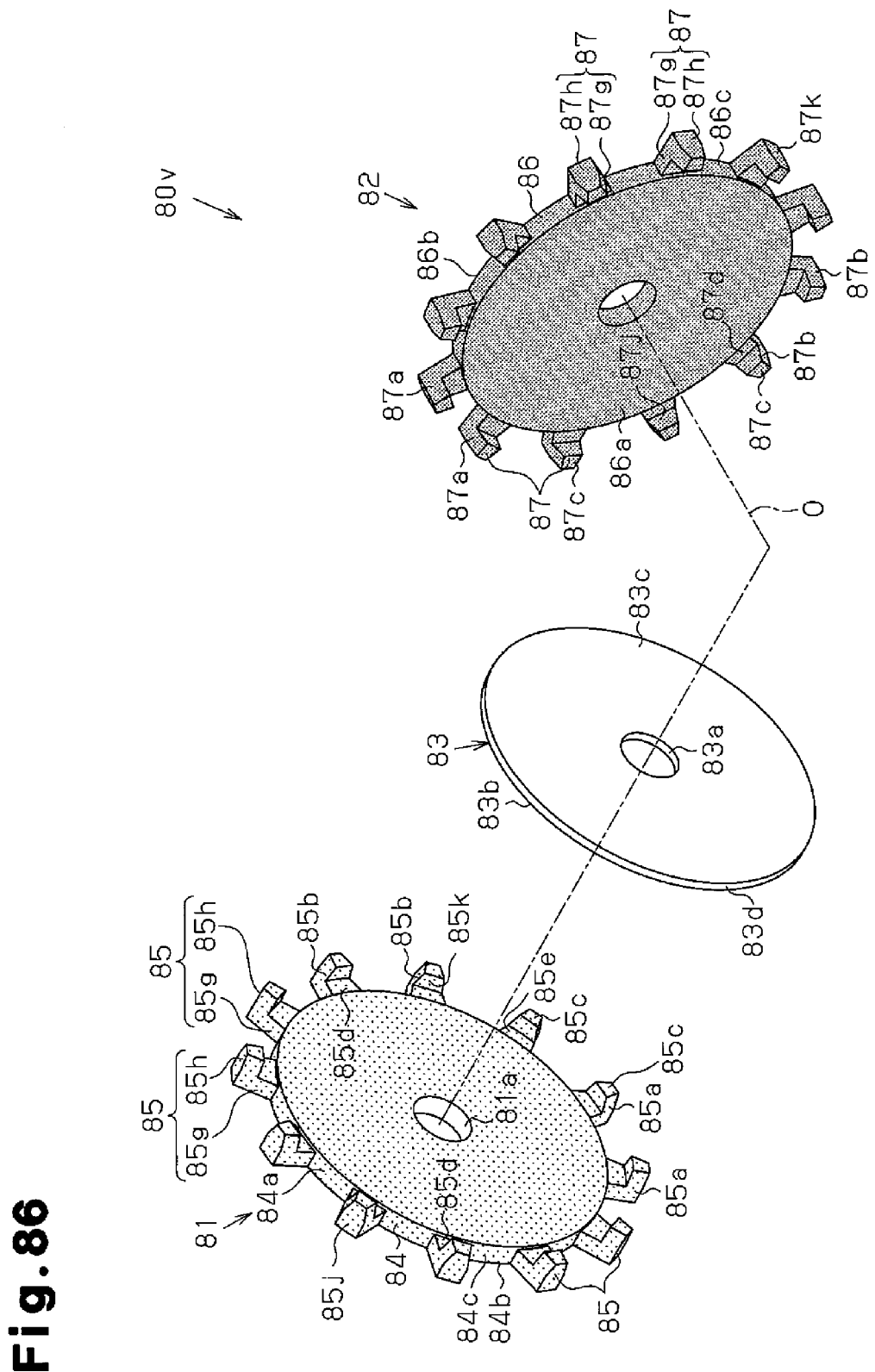
FIG. 86 is an exploded perspective view of the V-phase single rotor of FIG. 83.

As shown in FIG. 86, the first rotor core 81 of the V-phase rotor 80v has a first rotor core base 84 formed in a disk shape, and a through hole 81a for inserting and fixing the rotation shaft SF is formed at a center position thereof. An outer diameter of the first rotor core base 84 of the V-phase rotor 80v is identical to the outer diameter of the first rotor core bases 84 of the U-phase and W-phase rotors 80u, 80w.

Further, twelve pieces of first rotor claw magnetic poles 85 having an identical shape are arranged at equal intervals on an outer circumferential surface 84c of the first rotor core base 84. Each of the first rotor claw magnetic poles 85 projects outward in a radial direction and includes a distal end that is bent to extend toward the second rotor core 82 in the axial direction. Here, in each of the first rotor claw magnetic poles 85, a portion that projects to the radially outer side from an outer circumferential surface 84c of the first rotor core base 84 is referred to as a first rotor base portion 85g, and the distal end portion bent in the axial direction is referred to as a first rotor-side magnetic pole portion 85h.

A shape of the first rotor base portions 85g when viewed in the axial direction is of an identical outer shape as the shape of the first step portions 85d of the first rotor core 81 of each of the U-phase and W-phase rotors 80u, 80w when viewed in the axial direction, and is formed in a trapezoidal shape of which width narrows toward a radially outer side. Further, a shape of the first rotor-side magnetic pole portions 85h when viewed in the radial direction is of an identical outer shape as the shape of the first magnetic pole portions 85f of the first rotor core 81 of each of the U-phase and W-phase rotors 80u, 80w when viewed in the radial direction, and is formed in a trapezoidal shape of which width narrows toward a distal end.

Further, circumferential end surfaces 85a, 85b of each first rotor claw magnetic pole 85 including the first rotor base portion 85g and the first rotor-side magnetic pole portion 85h are both flat surfaces, and approach each other toward the outer side in the radial direction. Thus, a cross-sectional area of a cross-section of the first rotor base portion 85g cut in the axial direction becomes smaller toward the radially outer side when viewed in the radial direction. Further, a cross-sectional area of a cross-section of the first rotor-side magnetic pole portion 85h cut in the radial direction becomes smaller toward the distal end side when viewed in the axial direction.

The first rotor-side magnetic pole portion 85h that is bent in the axial direction has a sector-shaped cross-section in a direction perpendicular to the axis, and an outer side surface 85j and an inner side surface 85k thereof in the radial direction are formed in circular arc surfaces that form a concentric circle with the outer circumferential surface 84c of the first rotor core base 84 about a center axis O when viewed in the axial direction.

Further, the first rotor core base 84 has its thickness (length in the axial direction) formed thicker than a thickness (length in the axial direction) of the first rotor base portions 85g, and the opposing surface 84a is formed to become thicker toward the second rotor core 82. It is formed as such in order to set a thickness (length T2 in the axial direction) of the field magnet 83 to be described later smaller than the thickness (length T1 in the axial direction) of the field magnets 83 of the U-phase and W-phase rotors 80u, 80w.

(Second Rotor Core 82 of V-Phase Rotor 80v)

As shown in FIG. 86, the second rotor core 82 of the V-phase rotor 80v is formed from the same material and shaped identically to the first rotor core 81 of the rotor 80v, and a through hole 82a for inserting and fixing the rotation shaft SF is formed at a center position of a second rotor core base 86 that is formed in a disk shape. Accordingly, an outer diameter of the second rotor core base 86 of the V-phase rotor 80v is identical to the outer diameter of the second rotor core bases 86 of the U-phase and W-phase rotors 80u, 80w.

Further, twelve pieces of second rotor claw magnetic poles 87 having an identical shape are arranged at equal intervals on an outer circumferential surface of the second rotor core base 86. Each of the second rotor claw magnetic poles 87 is projected toward the radially outer side and includes a distal end that is bent to extend toward the first rotor core 81 in the axial direction. Here, in each of the second rotor claw magnetic poles 87, a portion that projects to the radially outer side from an outer circumferential surface 86c of the second rotor core base 86 is referred to as a second rotor base portion 87g, and the distal end portion bent in the axial direction is referred to as a second rotor-side magnetic pole portion 87h.

A shape of the second rotor base portions 87g when viewed in the axial direction is of an identical outer shape as the shape of the second step portions 87d of the second rotor core 82 of each of the U-phase and W-phase rotors 80u, 80w when viewed in the axial direction, and is formed in a trapezoidal shape of which width narrows toward the radially outer side. Further, a shape of the second rotor-side magnetic pole portions 87h when viewed in the radial direction is of an identical outer shape as the shape of the second magnetic pole portions 87f of the second rotor core 82 of each of the U-phase and W-phase rotors 80u, 80w when viewed in the radial direction, and is formed in a trapezoidal shape of which width narrows toward a distal end.

Further, circumferential end surfaces 87a, 87b of each second rotor claw magnetic pole 87 including the second rotor base portion 87g and the second rotor-side magnetic pole portion 87h are both flat surfaces, and approach each other toward the outer side in the radial direction. Thus, a cross-sectional area of a cross-section of the second rotor base portion 87g cut in the axial direction becomes smaller toward the radially outer side when viewed in the radial direction. Further, a cross-sectional area of a cross-section of the second rotor-side magnetic pole portion 87h cut in the radial direction becomes smaller toward the distal end side when viewed in the axial direction.

The second rotor-side magnetic pole portion 87h that is bent in the axial direction has a sector-shaped cross-section in the direction perpendicular to the axis, and an outer side surface 87j and an inner side surface 87k thereof in the radial direction are circular arc surfaces that form a concentric circle with the outer circumferential surface 86c of the second rotor core base 86 about the center axis O when viewed in the axial direction.

Further, the second rotor core base 86 has its thickness (length in the axial direction) formed thicker than a thickness (length in the axial direction) of the second rotor base portions 87g, and the opposing surface 86a is formed to become thicker toward the first rotor core 81. It is formed as such in order to set the thickness (length T2 in the axial direction) of the field magnet 83 to be described later smaller than the thickness (length T1 in the axial direction) of the field magnets 83 of the U-phase and W-phase rotors 80u, 80w.

Further, the second rotor core 82 is arranged and fixed relative to the first rotor core 81 such that each of the second rotor claw magnetic poles 87 is positioned between the first rotor claw magnetic poles 85 of the first rotor core 81 as viewed in the axial direction. Here, the second rotor core 82 is coupled to the first rotor core 81 such that the field magnet 83 is arranged between the first rotor core 81 and the second rotor core 82 in the axial direction.

(Field Magnet 83 of V-Phase Rotor 80v)

As shown in FIG. 86, the field magnet 83 is a disk-shaped permanent magnet formed of a ferrite magnet. A through hole 83a for inserting and fixing a rotation shaft SF is formed at a center position of the field magnet 83. Further, one side surface 83b of the field magnet 83 contacts the opposing surface 84a of the first rotor core base 84 and the other side surface 83c of the field magnet 83 contacts the opposing surface 86a of the second rotor core base 86, respectively, and the field magnet 83 is sandwiched and fixed between the first rotor core 81 and the second rotor core 82.

An outer diameter of the field magnet 83 is set to conform to outer diameters of the first and second rotor core bases 84, 86 (outer circumferential surfaces 84c, 86c).

Further, a thickness Y of the field magnet 83 is set at a predetermined thickness. In the present embodiment, the length of the V-phase rotor 80v in the axial direction is set to conform to the length of each of the U-phase and W-phase rotors 80u, 80w in the axial direction. Accordingly, the length T2 (thickness) of the field magnet 83 of the V-phase rotor 80v in the axial direction is shortened by a surplus length by which the length of the first and second rotor core bases 84, 86 of the V-phase rotor 80v in the axial direction is longer than the first and second rotor core bases 84, 86 of each of the U-phase and W-phase rotors 80u, 80w in the axial direction.

That is, the length T2 (thickness) of the field magnet 83 of the V-phase rotor 80v in the axial direction is shorter than the length T1 (thickness) of the field magnet 83 of each of the U-phase and W-phase rotors 80u, 80w in the axial direction. Accordingly, a magnetic force of the field magnet 83 of the V-phase rotor 80v is smaller than a magnetic force of the field magnets 83 of the U-phase and W-phase rotors 80u, 80w by the thickness thereof being formed shorter than the thickness of the field magnets 83 of the U-phase and W-phase rotors 80u, 80w.

Figure 82:
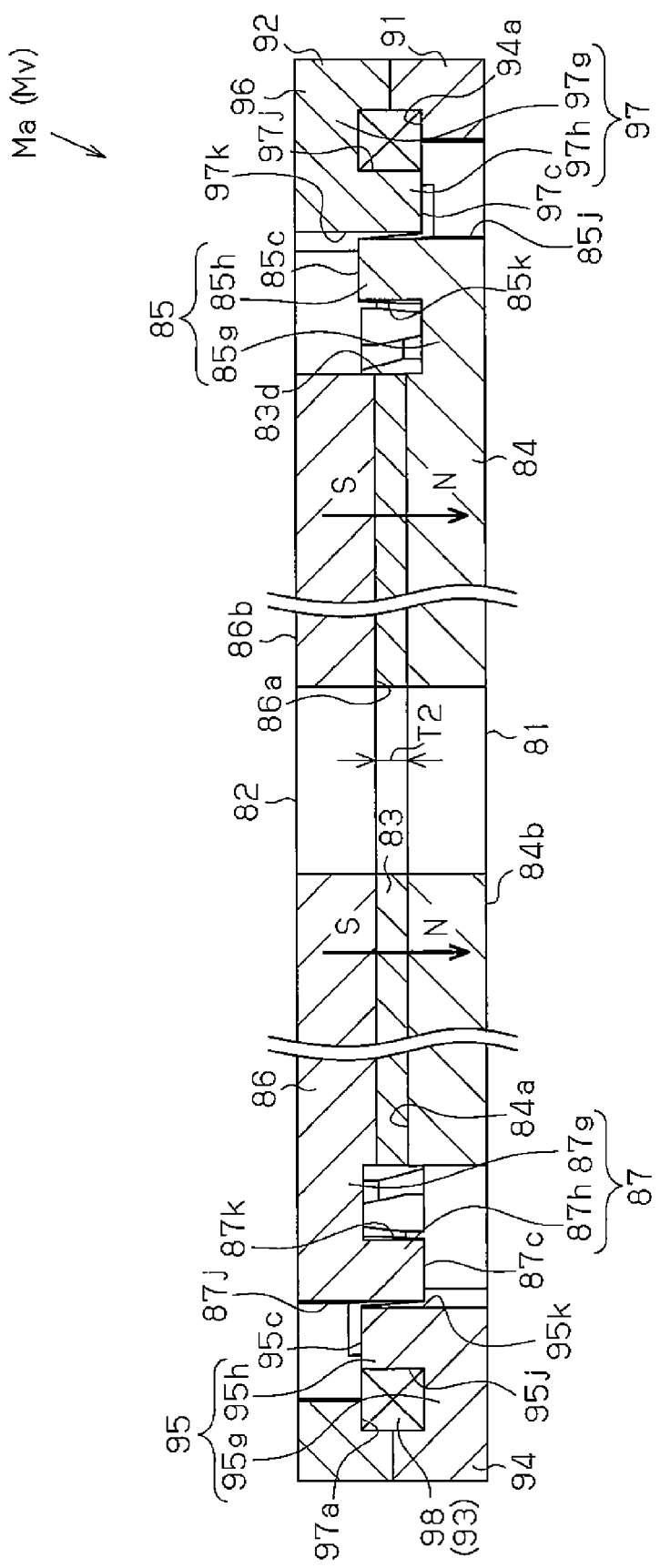
FIG. 82 is a combined cross-sectional view taken along line A-B-C in FIG. 81.

Further, in the present embodiment, as shown in FIG. 82, the first and second rotor claw magnetic poles 85, 87 of the V-phase rotor 80v have the length by which their distal end surfaces 85c, 87c become respectively flushed with opposing surfaces 84a, 86a of the first and second rotor core bases 84, 86. That is, in this case also, as shown in FIG. 84, the length D1 of the first and second rotor claw magnetic poles 85, 87 is short by the thickness of the first and second rotor core bases 84, 86 in the axial direction.

As shown in FIG. 82, the field magnet 83 of the V-phase rotor 80v is magnetized along the axial direction such that the first rotor core 81 becomes an N pole and the second rotor core 82 becomes an S pole. Accordingly, the first rotor claw magnetic poles 85 of the first rotor core 81 function as N poles (first magnetic poles), and the second rotor claw magnetic poles 87 of the second rotor core 82 function as S poles (second magnetic poles) by the field magnet 83.

The V-phase rotor 80v becomes the so-called Lundell type structure rotor using the field magnet 83. Further, the V-phase rotor 80v forms a rotor with twenty-four poles (twelve pairs of pole numbers) in which the first rotor claw magnetic poles 85 functioning as the N poles and the second rotor claw magnetic poles 87 functioning as the S poles are alternately arranged in the circumferential direction.

Further, as shown in FIG. 83 and FIG. 84, the rotor 80 is formed by the U-phase, V-phase, and W-phase rotors 80u, 80v, 80w being arranged and stacked from the top in this order.

Here, when the first rotor core 81 is on an upper side and the second rotor core 82 is on a lower side relative to the field magnet 83 (configuration in which a magnetizing direction of the field magnet 83 is upward), the U-phase and W-phase rotors 80u, 80w are stacked facing frontward, and the V-phase rotor 80v is stacked facing backward. Thus, magnetizing directions of the field magnet 83 by the U-phase and W-phase rotors 80u, 80w are of a same direction (upward in FIG. 84), and a magnetizing direction of the field magnet 83 by the V-phase rotor 80v is of an opposite direction relative to the magnetizing direction of the field magnet 83 by the U-phase and W-phase rotors 80u, 80w (downward in FIG. 84).

Further, the second rotor core bases 86 of the U-phase and V-phase rotors 80u, 80v are adjacent to each other in the axial direction, and portions of the field magnets 83 that are the S poles of the U-phase and V-phase rotors 80u, 80v oppose each other via the adjacent second rotor core bases 86. Further, the first rotor core bases 84 of the V-phase and W-phase rotors 80v, 80w are adjacent to each other in the axial direction, and portions of the field magnets 83 that are the N poles of the V-phase and W-phase rotors 80v, 80w oppose each other via the adjacent first rotor core bases 84.

Further, extending directions of the first rotor claw magnetic poles 85 of the U-phase and W-phase rotors 80u, 80w in the axial direction are of the same direction (downward in FIG. 83), and an extending direction of the first rotor claw magnetic poles 85 of the V-phase rotor 80v in the axial direction relative to the above direction is in an opposite direction (upward in FIG. 83). The U-phase first rotor claw magnetic poles 85 and the V-phase first rotor claw magnetic poles 85 are separated in the axial direction.

In the same manner, extending directions of the second rotor claw magnetic poles 87 of the U-phase and W-phase rotors 80u, 80w in the axial direction are of the same direction (upward in FIG. 83), and an extending direction of the second rotor claw magnetic poles 87 of the V-phase rotor 80v in the axial direction relative to the above direction is in an opposite direction (downward in FIG. 83). The V-phase second rotor claw magnetic poles 87 and the W-phase second rotor claw magnetic poles 87 are separated in the axial direction.

Further, as shown in FIG. 83 and FIG. 84, the U-phase rotor 80u, the V-phase rotor 80v, and the W-phase rotor 80w are arranged by their phases being deviated by 60 degrees in an electrical angle (5 degrees in mechanical angle). More specifically, the V-phase rotor 80v is fixed to the rotation shaft SF with its phase deviated by 60 degrees in electrical angle from the U-phase rotor 80u in a counterclockwise direction. The W-phase rotor 80w is fixed to the rotation shaft SF with its phase deviated by 60 degrees in electrical angle from the V-phase rotor 80v in the counterclockwise direction.

(Stator 90)

The stator 90 of the present embodiment has an identical configuration as the stator 90 of the formerly described fourth embodiment. That is, first and second stator cores 91, 92 and a coil section 93 configuring each of the stators 90u, 90v, 90w of the respective phases of the present embodiment can easily be understood by understanding the description of the stator 90 of the fourth embodiment shown in FIG. 41 to FIG. 44, thus a detailed description herein will be omitted.

Accordingly, the U-phase, V-phase, and W-phase stators 90u, 90v, 90w each become a so-called Lundell type (claw-pole type) stator with twenty-four poles that excites the first and second stator claw magnetic poles 95, 97 to magnetic poles that are different from one another at each occasion by an annular wiring 98 (coil section 93) between the first and second stator cores 91, 92. Further, as shown in FIG. 41 and FIG. 42, the U-phase, V-phase, and W-phase stators 90u, 90v, 90w are stacked in the axial direction to form the stator 90.

Here, like the fourth embodiment, as shown in FIG. 41 and FIG. 42, the stator 90 of the present embodiment stacks the U-phase stator 90u, the V-phase stator 90v, and the W-phase stator 90w by deviating them by 60 degrees in an electrical angle (5 degrees in mechanical angle).

Further, a U-phase power voltage of a three-phase AC power is applied to the annular wiring 98 of the U-phase stator 90u, a V-phase power voltage of the three-phase AC power is applied to the annular wiring 98 of the V-phase stator 90v, and a W-phase power voltage of the three-phase AC power is applied to the annular wiring 98 of the W-phase stator 90w.

Next, the operation of the brushless motor M will be described.

Now, when a three-phase AC power voltage is applied to the stator 90, like the above embodiments, a U-phase power voltage is applied to an annular wiring 98 of the U-phase stator 90u, a V-phase power voltage is applied to an annular wiring 98 of the V-phase stator 90v, and a W-phase power voltage is applied to an annular wiring 98 of the W-phase stator 90w, respectively. Thus, a rotating magnetic field is generated in the stator 90, and the rotor 80 is rotated and driven.

Here, the stator 90 includes the three stage structure of the U-phase, V-phase, and W-phase stators 90u, 90v, 90w in correspondence with the three-phase AC power. Accordingly, the rotor 80 also includes the three stage structure of the U-phase, V-phase, and W-phase rotors 80u, 80v, 80w. Thus, in the stator and the rotor of each phase, the stator opposing the field magnet 83 along the axial direction can independently receive magnetic flux of the field magnet 83, and an increase in output can be achieved.

Further, the length D1 of the first and second rotor claw magnetic poles 85, 87 in the axial direction is shortened in the U-phase, V-phase, and W-phase rotors 80u, 80v, 80w of the three-stage structure.

Thus, the first rotor claw magnetic poles 85 of the U-phase rotor 80u and the first rotor claw magnetic poles 85 of the V-phase rotor 80v are separated from one another in the axial direction, and the second rotor claw magnetic poles 87 of the V-phase rotor 80v and the second rotor claw magnetic poles 87 of the W-phase rotor 80w are separated from one another in the axial direction. As a result, short circuiting of the magnetic flux between the first rotor claw magnetic poles 85 of the U-phase and V-phase is suppressed, and short circuiting of the magnetic flux between the second rotor claw magnetic poles 87 of the V-phase and W-phase is suppressed.

Moreover, the length D2 of the first and second stator claw magnetic poles 95, 97 in the axial direction is shortened in the U-phase, V-phase, and W-phase stators 90*u*, 90*v*, 90*w* of the three-stage structure.

That is, in the U-phase, V-phase, and W-phase stators 90*u*, 90*v*, 90*w*, each of the first stator claw magnetic poles 95 are separated from one another, and each of the second stator claw magnetic poles 97 are separated from one another. As a result, short circuiting of the magnetic flux between the first stator claw magnetic poles 95 of the different phases is suppressed, and short circuiting of the magnetic flux between the second stator claw magnetic poles 97 of the different phases is suppressed.

Further, since the first and second rotor claw magnetic poles 85, 87 of the U-phase, V-phase, and W-phase rotors 80*u*, 80*v*, 80*w* that are in the three-stage structure are formed in trapezoidal shape that narrows toward the distal end, the magnetic flux from the field magnets 83 are more efficiently guided to the distal end portions of the first and second magnetic pole portions 85*f*, 87*f*.

In the same manner, since the first and second stator claw magnetic poles 95, 97 of the U-phase, V-phase, and W-phase stators 90*u*, 90*v*, 90*w* in the three-stage structure are formed in trapezoidal shape that narrows toward the distal end, the magnetic flux from the annular wirings 98 are more efficiently guided to the distal end portions of the first and second stator-side magnetic pole portions 95*h*, 97*h*.

In this manner, since the space between specific claw magnetic poles is open, the short circuiting of the magnetic flux is suppressed, and the magnetic flux is efficiently guided to the distal end portions of the respective magnetic pole portions 85*f*, 87*f*, 95*h*, 97*h*, it becomes possible to form the brushless motor M with high torque.

Further, with respect to the U-phase, V-phase, and W-phase stators 90*u*, 90*v*, 90*w* of the stator 90 deviated by 60 degrees in the electrical angle in the clockwise direction, the U-phase, V-phase, and W-phase rotors 80*u*, 80*v*, 80*w* of the rotor 80 are deviated by 60 degrees in the electrical angle in the counterclockwise direction. That is, the inclined direction (see FIG. 84) relative to the axial direction formed by the deviations of the three rotors 80*u*, 80*v*, 80*w* when viewed in the radial direction and the inclined direction relative to the axial direction formed by the deviations of the three stators 90*u*, 90*v*, 90*w* when viewed in the radial direction are arranged to be opposite to one another at the opposing surfaces of the rotor 80 and the stator 90.

Thus, the first and second rotor claw magnetic poles 85, 87 of the respective phases can suitably follow the switching of the first and second stator claw magnetic poles 95, 97 by the respective phase AC currents flowing in the annular wirings 98 of the respective phases, as a result of which a suitable rotation of the rotor 80 can be realized.

Further, the first and second step portions 85*d*, 87*d* having a large cross-sectional magnetic path area are provided at the first and second rotor claw magnetic poles 85, 87 of the U-phase and W-phase rotors 80*u*, 80*w*. Accordingly, a magnetic resistance in the first and second step portions 85*d*, 87*d* becomes small, whereby a magnetic saturation of the magnetic flux between the first and second magnetic pole portions 85*f*, 87*f* of the first and second rotor claw magnetic poles 85, 87 and the first and second rotor core bases 84, 86 can be resolved, and the increase in the output can be achieved.

Further, by the outer circumferential surface 83*d* of the field magnet 83 of each of the U-phase and W-phase rotors 80*u*, 80*w* contacting under pressure the first and second step surfaces 85*e*, 87*e* of the first and second step portions 85*d*, 87*d* respectively, an air gap that is to be the magnetic resistance can be reduced, and even a greater increase in the output can be achieved.

In addition, the field magnet 83 is sandwiched and fixed by the first rotor core base 84 and the second rotor core base 86 by the outer circumferential surface 83*d* of the field magnet 83 of each of the U-phase and W-phase rotors 80*u*, 80*w* being press-fitted into the first and second step surfaces 85*e*, 87*e* of the first and second step portions 85*d*, 87*d*. Accordingly, the task for positioning and fixing the field magnet 83 between the first rotor core base 84 and the second rotor core base 86 of each of the U-phase and W-phase rotors 80*u*, 80*w* can be performed just by carrying out fitting and fixing without using a special fixing member and mechanism.

Further, the brushless motor M makes the magnetic force of the field magnet 83 of the V-phase rotor 80*v* to be smaller than the magnetic force of the field magnet 83 of each of the U-phase and W-phase rotors 80*u*, 80*w*. That is, the length T2 of the field magnet 83 of the V-phase rotor 80*v* in the axial direction is short relative to the length T1 of the field magnet 83 of each of the U-phase and W-phase rotors 80*u*, 80*w* in the axial direction. Thus, a brushless motor M that can reduce torque rippling without reducing torque can be realized.

Here, experiments were conducted to evaluate a torque increasing rate (%) and a ripple factor (%) with respect to changing the length T2 of the field magnet 83 of the V-phase rotor 80*v* in the axial direction relative to the length T1 of the field magnet 83 of each of the U-phase and W-phase rotors 80*u*, 80*w* in the axial direction.

All of the experiments were conducted under the same condition except for that the length T1 of the field magnets 83 of the U-phase and W-phase rotors 80*u*, 80*w* in the axial direction is made constant and the length T2 of the V-phase rotor 80*v* in the axial direction is made variable.

Figure 87:
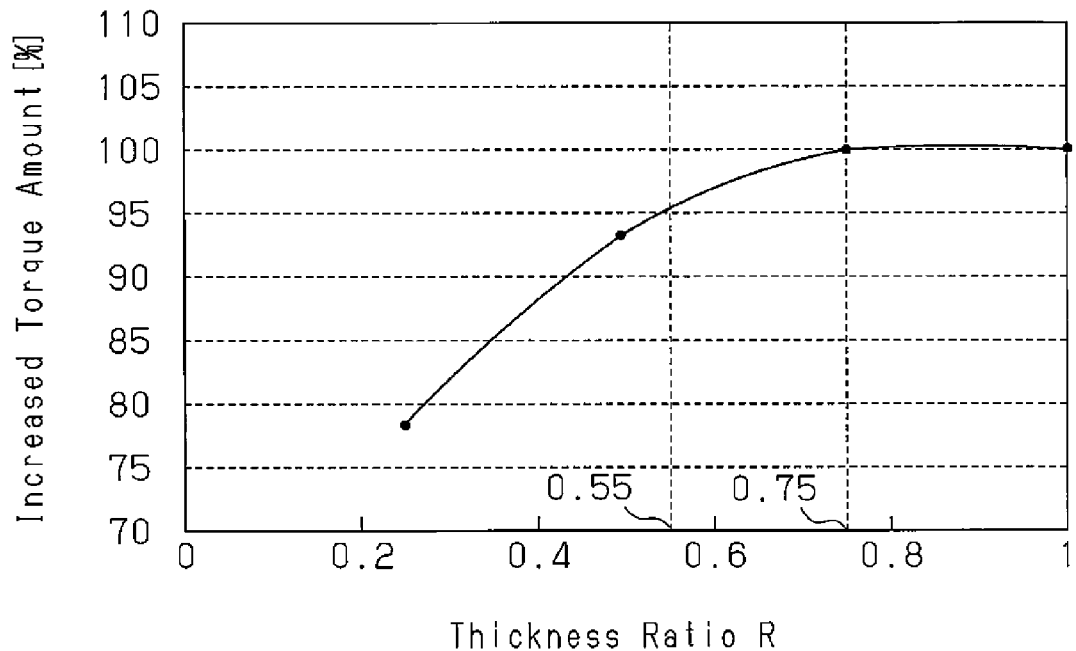
FIG. 87 is a graph showing the relationship of the thickness ratio and the increased amount of torque.

FIG. 87 is a graph showing the torque increasing rate (%) as obtained by the experiments in a case of setting the length T1 of the field magnets 83 of the U-phase and W-phase rotors 80*u*, 80*w* in the axial direction to be constant and varying the length T2 of the V-phase rotor 80*v* in the axial direction toward a smaller direction than the length T1.

A horizontal axis indicates a thickness ratio R (=T2/T1) of the length T2 in the axial direction relative to the length T1 in the axial direction, and a vertical axis indicates the increasing rate of torque (%). The torque increasing rate (%) is shown by percentage with torque of the brushless motor M upon when the length T2 in the axial direction is equal to the length T1 of the axial direction (thickness ratio R=1.0) as a reference (100%).

As is apparent from FIG. 87, it has been found that the torque increasing rate (%) hardly changes when the thickness ratio R is less than 1 to 0.75, and the torque increasing rate (%) increases in a negative direction as the thickness ratio R becomes smaller from 0.75.

Figure 88:
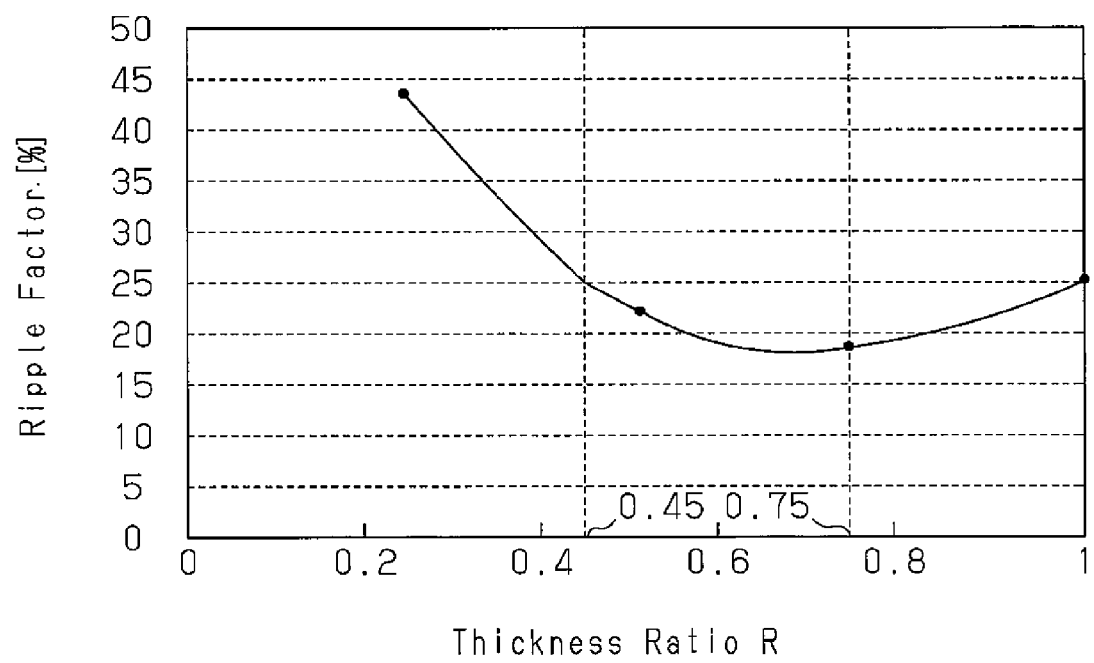
FIG. 88 is a graph showing the relationship of the thickness ratio and the ripple factor.

FIG. 88 is a graph showing the ripple factor (%) as obtained by the experiments in the case of setting the length T1 of the field magnets 83 of the U-phase and W-phase rotors 80*u*, 80*w* in the axial direction to be constant and varying the length T2 of the V-phase rotor 80*v* in the axial direction toward the smaller direction than the length T1.

A horizontal axis indicates the thickness ratio R (=T2/T1) of the length T2 in the axial direction relative to the length T1 in the axial direction, and a vertical axis indicates the ripple factor (%).

As is apparent from FIG. 88, it has been found that the torque ripple decreases when the thickness ratio R is less than 1 and the thickness ratio R is 0.45 or more than when the thickness ratio R is 1.

It can be understood that when the thickness ratio R(=T2/T1) is 0.75, the torque ripple factor can be reduced without making the torque increasing rate be a negative value.

In this regard, a part of magnetic flux of the U-phase and W-phase field magnets 83 is concentrated in the V-phase field magnet 83 sandwiched in between, and flows to the first and second rotor cores 81, 82 of the V-phase rotor 80v. Here, the length T2 of the V-phase field magnet 83 is short, that is, the magnetic force of the V-phase field magnet 83 is smaller than the magnetic force of the U-phase and W-phase field magnets 83. As a result, since the part of the magnetic flux of the U-phase and W-phase field magnets 83 complements the reduced amount of the magnetic flux, flowing manners of the magnetic flux of the first and second rotor cores 81, 82 of the rotors 80u, 80v, 80w of the respective phases become similar, and it is assumed that imbalance is resolved, that is, balance of the magnetic flux can be equalized.

Thus, at the least, if the thickness ratio R(=T2/T1) is set to be less than 1 and 0.75 or more, a brushless motor M that can reduce the torque ripple without making the torque increasing rate be a negative value can be realized.

In the present embodiment also, like the above embodiments, when a request to change the number of magnetic poles is made, since the U-phase, V-phase, and W-phase rotors 80u, 80v, 80w of the rotor 80 form the Lundell type structure, the number of poles can easily be changed by simply changing the number of the first and second rotor claw magnetic poles 85, 87 while maintaining the field magnets 83 in the identical structure. In the same manner, since the U-phase, V-phase, and W-phase stators 90u, 90v, 90w of the stator 90 form a claw-pole type structure, the number of poles can easily be changed simply by changing the number of the first and second stator claw magnetic poles 95, 97 while maintaining the coil sections 93 (annular wiring 98) in the identical structure.

As described above in detail, the present embodiment has the following advantages in addition to the advantages of the first to fifth embodiments.

(15) According to the present embodiment, since the brushless motor M makes the length T1 of the field magnets 83 of the U-phase and W-phase rotors 80u, 80w in the axial direction shorter than the length T2 of the field magnet 83 of the V-phase rotor 80v in the axial direction, a brushless motor M that reduces the torque ripple without reducing the torque can be realized.

Especially, by setting the thickness ratio R (=T2/T1) of the length T2 of the axial direction relative to the length T1 of the axial direction to be 1 or less and 0.75 or more, the torque ripple can be reduced without making the torque increasing rate be a negative value, and a high quality output can be obtained.

(16) According to the present embodiment, by simply changing the length T2 of the field magnet 83 of the V-phase rotor 80v in the axial direction relative to the length T1 of the field magnets 83 in the U-phase and W-phase rotors 80u, 80w in the axial direction, the magnetic force of the field magnet 83 of the V-phase rotor 80v can easily be adjusted, and a brushless motor M having a low torque ripple can be realized.

In the present embodiment, in order to make the magnetic force of the field magnet 83 of the V-phase rotor 80v smaller than the magnetic force of the field magnets 83 of the U-phase and W-phase rotors 80u, 80w, the length T2 of the field magnet 83 of the V-phase rotor 80v in the axial direction is short relative to the length T1 of the field magnets 83 in the U-phase and W-phase rotors 80u, 80w in the axial direction.

This may be realized by changing magnetic materials of the field magnets 83 of 80u, 80w and the field magnet 83 of the V-phase rotor 80v (for example, a neodymium magnet and a ferrite magnet), or by changing magnetization rates. In this case, an implementation can be made by making the shapes of the first and second rotor cores 81, 82 of the U-phase, the V-phase, and the W-phase to be identical.

Further, in the present embodiment, the length T2 of the field magnet 83 of the V-phase rotor 80v in the axial direction is short. As an alternative of the field magnet 83 of the V-phase rotor 80v, the implementation may be made by making a length of one of the field magnet 83 of the U-phase rotor 80u and the W-phase rotor 80w in the axial direction shorter than lengths of the other two field magnets 83 in the axial direction.

Further, the implementation may be made by making the lengths of two field magnets 83 among the U-phase, V-phase, and W-phase rotors 80u, 80v, 80w shorter than the length of the other one field magnet 83 in the axial direction.

Further, the implementation may be made by making the lengths of the respective field magnets 83 of the U-phase, V-phase, W-phase rotors 80u, 80v, 80w in the axial direction to be different.

Further, in the present embodiment, the present invention is adapted to the brushless motor M having the three-stage structure of single motors Ma, however, the present invention may be adapted to a brushless motor having two-stage structure of the single motors Ma, or in a brushless motor having a structure including four stages of the single motors Ma.

Eighth Embodiment

Next, an eighth embodiment of a motor will be described with reference to FIG. 89 to FIG. 95.

Figure 89:
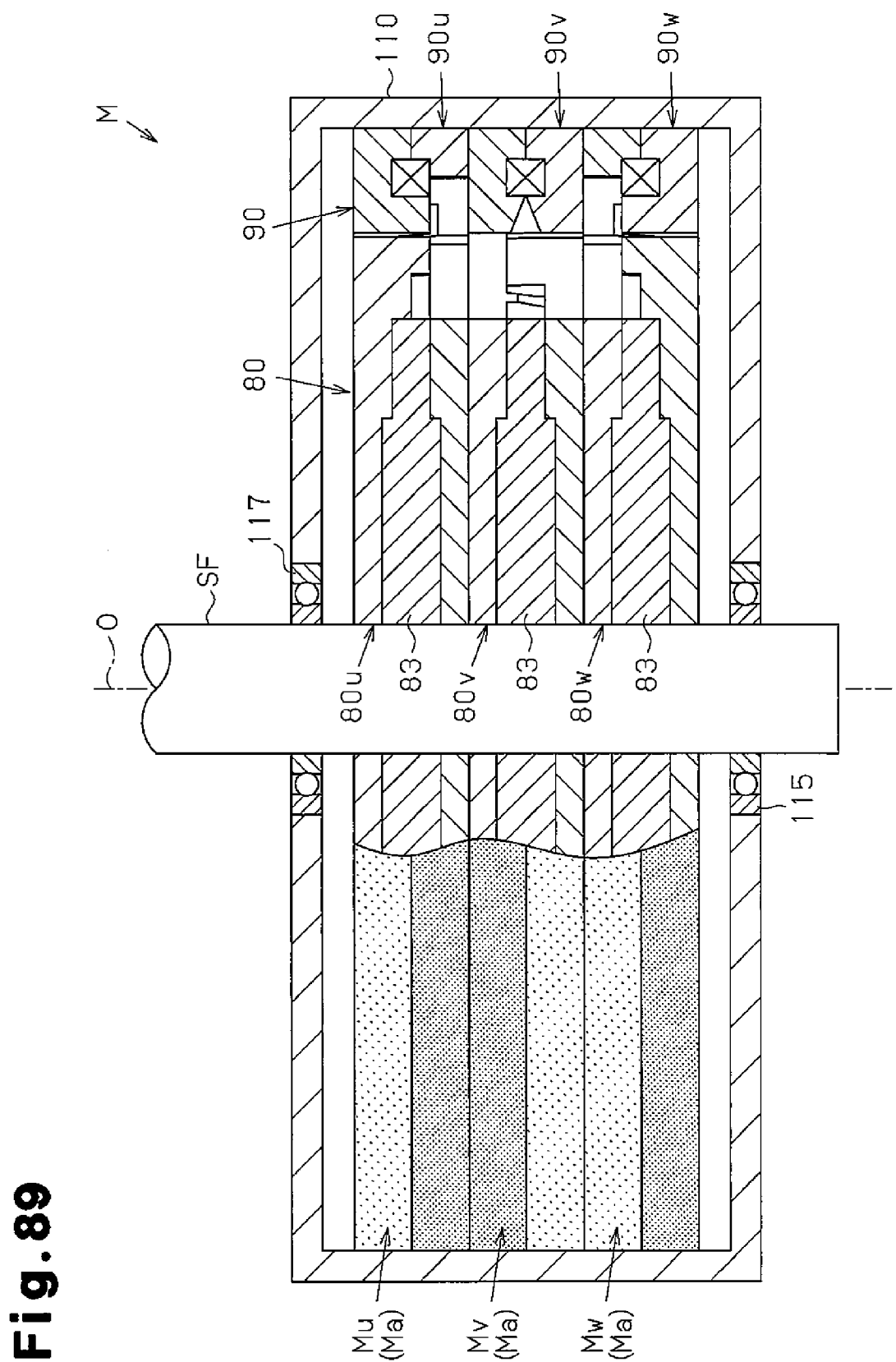
FIG. 89 is a cross-sectional view taken from a radial direction of a motor of an eighth embodiment of the present invention.
Figure 90:
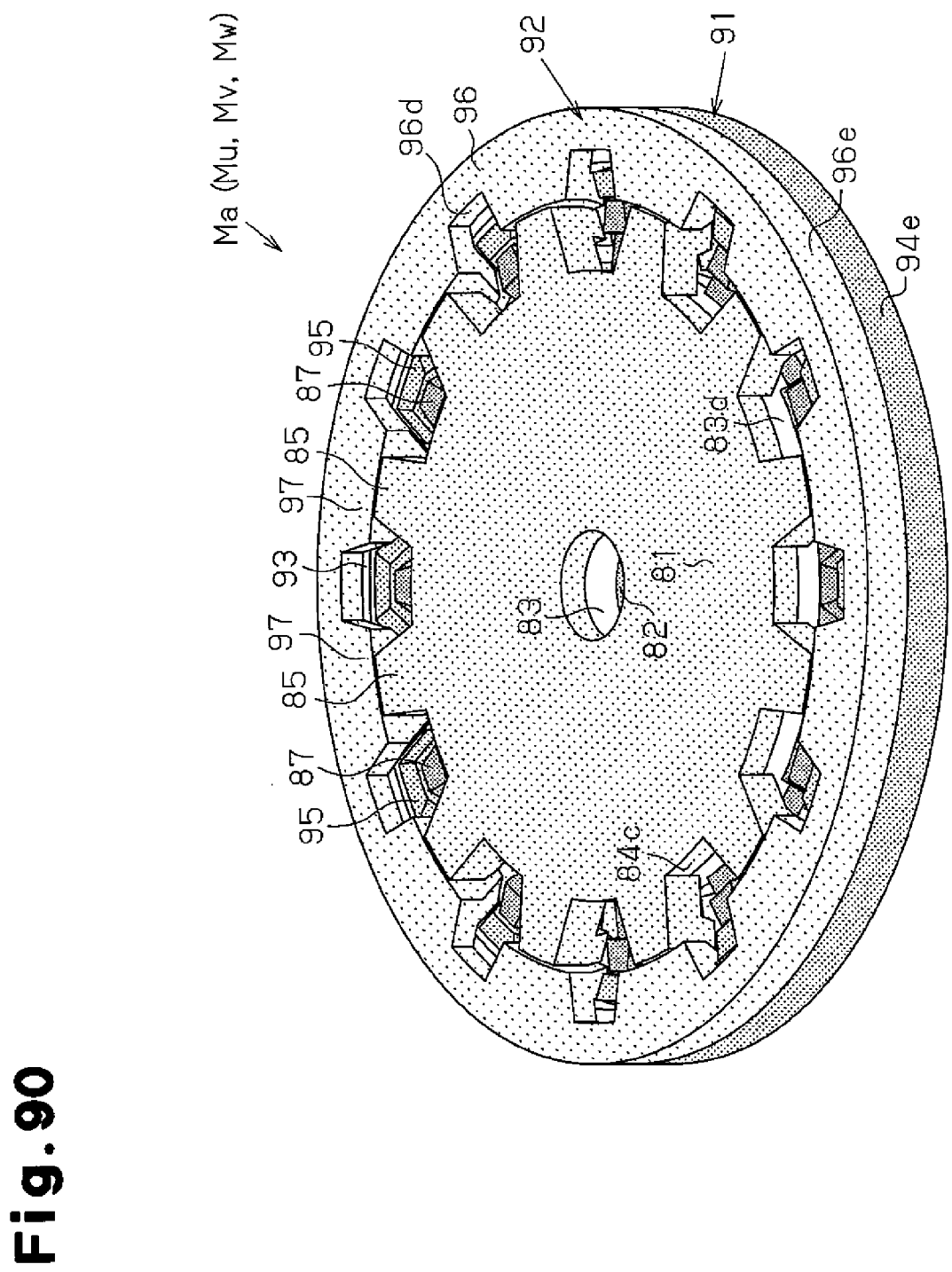
FIG. 90 is an overall perspective view of the single motor of FIG. 89.
Figure 91:
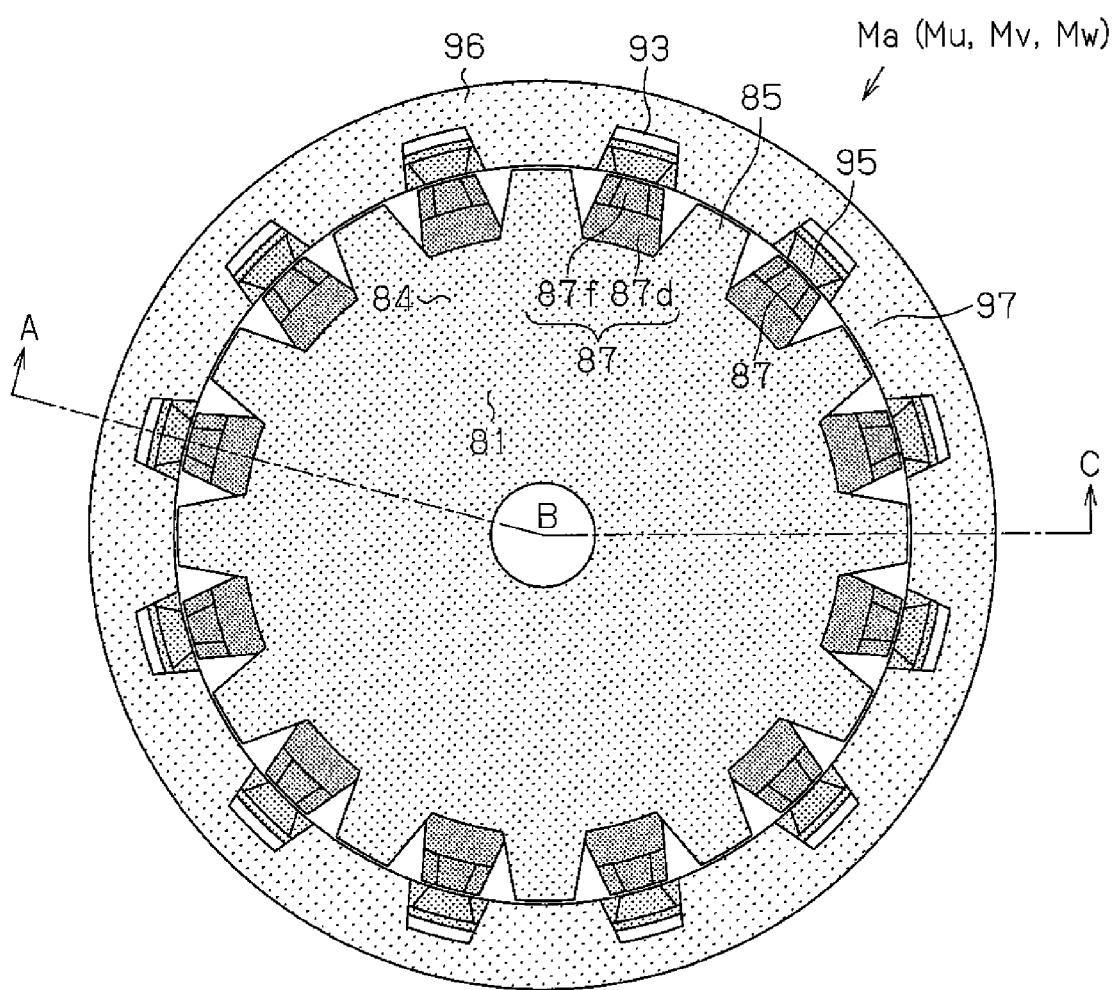
FIG. 91 is a front view taken from an axial direction of the single motor of FIG. 90.

In FIG. 89, a brushless motor M includes a motor housing 110. The motor housing 110 rotatably supports a rotation shaft SF, which extends through the motor housing 110, with bearings 115, 117. A rotor 80 and a stator 90 are provided in the motor housing 110. The rotor 80 is fixed to the rotation shaft SF, and rotates integrally with the rotation shaft SF. The stator 90 is fixed on an inner circumferential surface of the motor housing 110 so as to surround the rotor 80.

As shown in FIG. 89 to FIG. 92, the brushless motor M includes three single motors Ma arranged in an axial direction. In FIG. 89, a U-phase motor unit Mu, a V-phase motor unit Mv, and a W-phase motor unit Mw are stacked in this order from the top.

Figure 93:
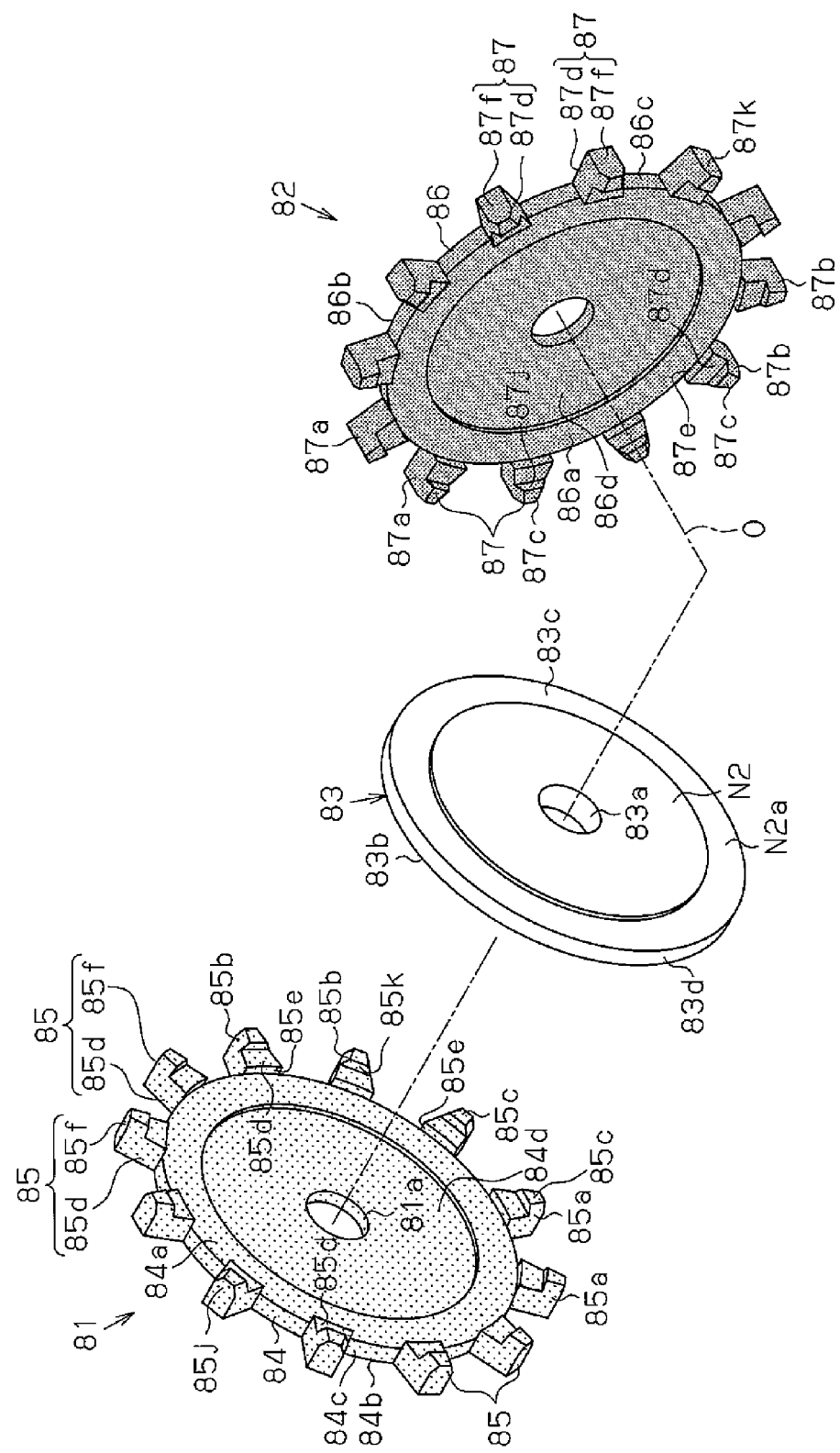
FIG. 93 is an exploded perspective view of the single rotor of FIG. 90.

As shown in FIG. 83 and FIG. 84 shown in the seventh embodiment, the rotor 80 of the brushless motor M includes three components, namely a U-phase rotor 80u, a V-phase rotor 80v, and a W-phase rotor 80w, each of which is fixed to the rotation shaft SF. Further, they are stacked and arranged in the order of the U-phase rotor 80u, the V-phase rotor 80v, and the W-phase rotor 80w from the top. As shown in FIG. 93, each of the rotors 80u, 80v, 80w of the respective phases includes first and second rotor cores 81, 82 and a field magnet 83.

(First Rotor Core 81)

As shown in FIG. 93, each of the first rotor cores 81 has a first rotor core base 84 formed in a disk shape, and a through hole 81a for inserting and fixing the rotation shaft SF is formed at a center position of the first rotor core base 84.

Further, twelve pieces of first rotor claw magnetic poles 85 having an identical shape are arranged at equal intervals on an outer circumferential surface 84c of the first rotor core base 84. Each of the first rotor claw magnetic poles 85 projects outward in a radial direction and includes a distal end that is bent to extend toward the second rotor core 82 in the axial direction.

Like the first rotor core 81 of the sixth embodiment, each of the first rotor claw magnetic poles 85 has a first step portion 85d positioned at a portion that is projected radially outward from the outer circumferential surface 84c of the first rotor core base 84. Further, like the first rotor core 81 of the sixth embodiment, a first step surface 85e formed on a radially inner side of each first step portion 85d is a circular arc surface that forms a concentric circle with the outer circumferential surface 84c of the first rotor core base 84.

Thus, like the first rotor core 81 of the sixth embodiment, the first rotor claw magnetic poles 85 are formed by first magnetic pole portions 85f projecting from outer side ends of the first step portions 85d in the radial direction toward the second rotor core 82 in the axial direction.

Further, the shape of the first step portions 85d when viewed in the axial direction becomes a trapezoidal shape of which width narrows toward the radially outer side, and the shape of the first magnetic pole portions 85f when viewed in the radial direction becomes a trapezoidal shape of which width narrows toward the distal end.

Further, the first magnetic pole portion 85f of each first rotor claw magnetic pole 85 has a sector-shaped cross-section in a direction perpendicular to the axis, and an outer side surface 85j and an inner side surface 85k of the first magnetic pole portion 85f in the radial direction are formed as circular arc surfaces that form a concentric circle with the outer circumferential surface 84c of the first rotor core base 84 about a center axis O when viewed in the axial direction.

Further, the first rotor core base 84 has a round-shaped first core-side concave portion 84d formed at a center portion of the opposing surface 84a. An inner diameter and a depth of the first core-side concave portion 84d formed on the opposing surface 84a is set in advance to conform to the shape of the field magnet 83, which will be described later.

(Second Rotor Core 82)

The second rotor cores 82 have the same shape as the sixth embodiment. To describe simply, as shown in FIG. 93, the second rotor core 82 is formed from the same material and shaped identically to the first rotor core 81, and a through hole 82a for inserting and fixing the rotation shaft SF is formed at a center position of a second rotor core base 86 that is formed in a disk shape.

Further, twelve pieces of second rotor claw magnetic poles 87 having an identical shape are arranged at equal intervals on an outer circumferential surface of the second rotor core base 86. Each of the second rotor claw magnetic poles 87 projects outward in the radial direction and includes a distal end that is bent to extend toward the first rotor core 81 in the axial direction.

Similar to the second rotor core 82 of the sixth embodiment, each of the second rotor claw magnetic poles 87 has a second step portion 87d positioned at a portion that is protruded radially outward from the outer circumferential surface 86c of the second rotor core base 86. Further, a second step surface 87e formed on a radially inner side of each second step portion 87d is a circular arc surface that forms a concentric circle with the outer circumferential surface 86c of the second rotor core base 86 like the second rotor core 82 of the sixth embodiment.

Thus, like the second rotor core 82 of the sixth embodiment, the second rotor claw magnetic poles 87 are formed by second magnetic pole portions 87f projecting from outer side ends of the second step portions 87d in the radial direction toward the first rotor core 81 along the axial direction.

Further, the shape of the second step portions 87d when viewed in the axial direction becomes a trapezoidal shape of which width narrows toward the radially outer side, and the shape of the second magnetic pole portions 87f when viewed in the radial direction becomes a trapezoidal shape of which width narrows toward the distal end.

Further, the second magnetic pole portion 87f of each second rotor claw magnetic pole 87 has a sector-shaped cross-section in the direction perpendicular to the axis, and an outer side surface 87j and an inner side surface 87k of the second magnetic pole portion 87f in the radial direction are circular arc surfaces that form a concentric circle with the outer circumferential surface 84c of the first rotor core base 84 about a center axis O when viewed in the axial direction.

Further, a round-shaped second core-side concave portion 86d is formed at a center portion of the opposing surface 86a of the second rotor core base 86. An inner diameter and a depth of the second core-side concave portion 86d formed on the opposing surface 86a is set in advance to conform to the shape of the field magnet 83 to be described later.

Further, the second rotor core 82 is arranged and fixed relative to the first rotor core 81 such that each of the second rotor claw magnetic poles 87 is positioned between the first rotor claw magnetic poles 85 of the first rotor core 81 as viewed in the axial direction. Here, the second rotor core 82 is coupled to the first rotor core 81 such that the field magnet 83 is arranged between the first rotor core 81 and the second rotor core 82 in the axial direction.

(Field Magnet 83)

The field magnet 83 is a disk-shaped permanent magnet formed of a ferrite magnet. As shown in FIG. 93, a through hole 83a for inserting a rotation shaft SF is formed at a center position of the field magnet 83.

An outer diameter R0 (see FIG. 92) of the field magnet 83 is set to conform to outer diameters of the first and second rotor core bases 84, 86 (outer circumferential surfaces 84c, 86c).

On a side surface 83b of the field magnet 83 on one side, a columnar-shaped first core-side columnar-shaped thick portion (small diameter portion) N1, which has an outer diameter R1 (see FIG. 92) and is formed so as to engage with the first core-side concave portion 84d formed on the opposing surface 84a of the first rotor core base 84, projects toward the first rotor core 81. Further, on a side surface 83c of the field magnet 83 on the other side, a columnar-shaped second core-side columnar-shaped thick portion (small diameter portion) N2, which has the outer diameter R1 and is formed so as to engage with the second core-side concave portion 86d formed on the opposing surface 86a of the second rotor core base 86, projects toward the second rotor core 82.

Accordingly, the field magnet 83 of the present embodiment is a permanent magnet that has a disk shape, and has the small diameter first and second core-side columnar-shaped thick portions N1, N2 projecting toward the first and second rotor cores 81, 82.

Here, an annular thin portion in the side surface 83b of the field magnet 83 on the one side that is positioned on an outer side of the first core-side columnar-shaped thick portion N1 is referred to as an annular thin portion (large diameter portion) N1a. Further, an annular thin portion in the side surface 83c of the field magnet 83 on the other side that is positioned on an outer side of the second core-side columnar-shaped thick portion N2 is referred to as an annular thin portion (large diameter portion) N2a.

Further, when the field magnet 83 is sandwiched and fixed between the first rotor core 81 and the second rotor core 82, the first core-side columnar-shaped thick portion N1 engages with the first core-side concave portion 84d, and a surface of the first core-side columnar-shaped thick portion N1 contacts a bottom portion of the first core-side concave portion 84d. In the same manner, the second core-side columnar-shaped thick portion N2 engages with the second core-side concave portion 86d, and a surface of the second core-side columnar-shaped thick portion N2 contacts a bottom portion of the second core-side concave portion 86d.

Here, the annular thin portion N1a of the side surface 83b of the field magnet 83 contacts the opposing surface 84a on the outer side of the first core-side concave portion 84d of the first rotor core base 84. In the same manner, the annular thin portion N2a of the side surface 83c of the field magnet 83 contacts the opposing surface 86a on the outer side of the second core-side concave portion 86d of the second rotor core base 86.

Further, like the sixth embodiment, when sandwiching the field magnet 83 with the first rotor core base 84 and the second rotor core base 86, the field magnet 83 is fitted into the first and second step portions 85d, 87d so that the outer circumferential surface 83d of the field magnet 83 contacts under pressure the first and second step surfaces 85e, 87e of the respective first and second rotor claw magnetic poles 85, 87. Further, as shown in FIG. 92, in the present embodiment also, when the field magnet 83 is sandwiched between the first rotor core base 84 and the second rotor core base 86, the length D1 of the first and second rotor claw magnetic poles 85, 87 is short by the thickness of the first and second rotor core bases 84, 86 in the axial direction.

Figure 92:
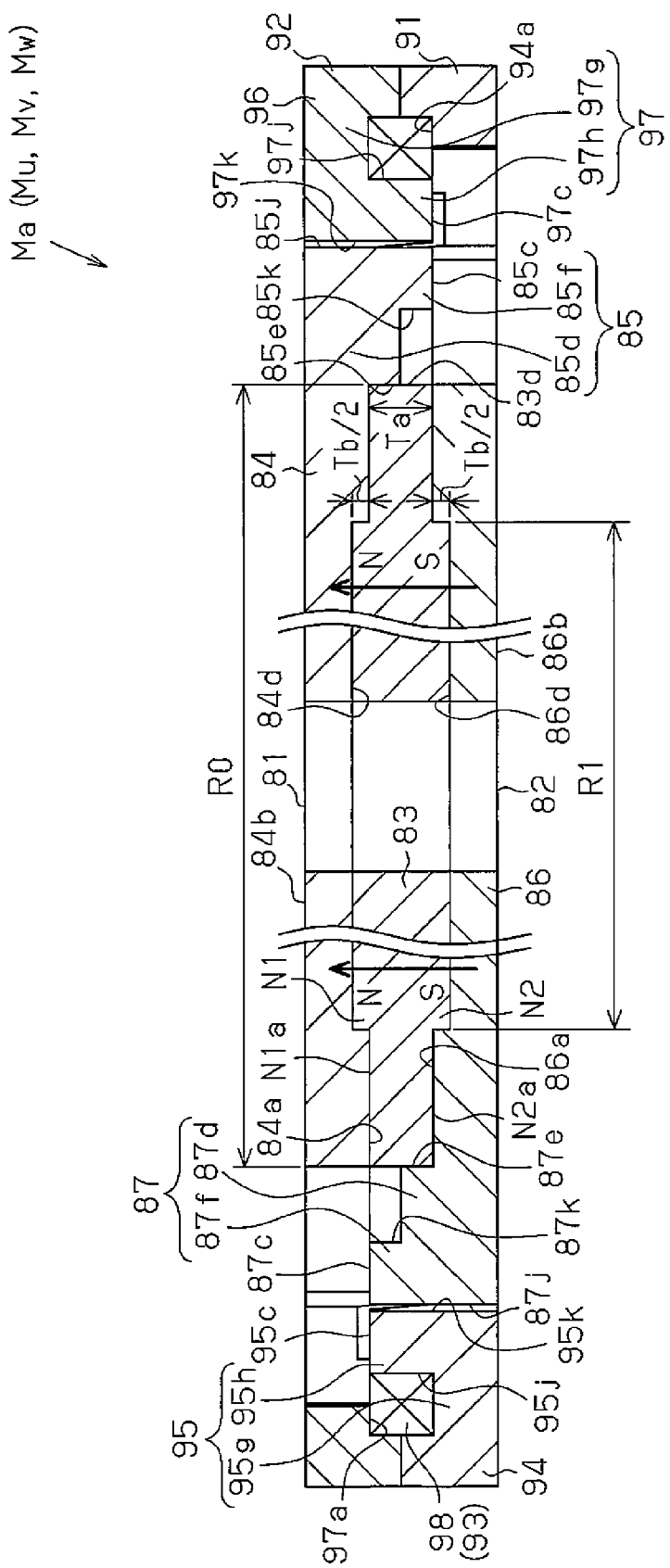
FIG. 92 is a combined cross-sectional view taken along line A-B-C in FIG. 91.

As shown in FIG. 92, the field magnet 83 is magnetized along the axial direction such that the first rotor core 81 becomes an N pole and the second rotor core 82 becomes an S pole. Accordingly, the first rotor claw magnetic poles 85 of the first rotor core 81 function as N poles (first magnetic poles), and the second rotor claw magnetic poles 87 of the second rotor core 82 function as S poles (second magnetic poles) by the field magnet 83.

The U-phase rotor 80u, the V-phase rotor 80v and the W-phase rotor 80w form the so-called Lundell type structure rotors using the field magnets 83. Further, each of the rotors 80u, 80v, 80w forms a rotor with twenty-four poles (twelve pairs of pole numbers) in which the first rotor claw magnetic poles 85 functioning as the N poles and the second rotor claw magnetic poles 87 functioning as the S poles are alternately arranged in the circumferential direction.

Further, like the seventh embodiment shown in FIG. 83 and FIG. 84, the rotor 80 is formed by the U-phase, V-phase, and W-phase rotors 80u, 80v, 80w being aligned in the axial direction. A stacking of the U-phase, V-phase, and W-phase rotors 80u, 80v, 80w is similar to the seventh embodiment.

Further, similar to the seventh embodiment shown in FIG. 83 and FIG. 84, in the rotor 80 configured of the U-phase, V-phase, and W-phase rotors 80u, 80v, 80w, the U-phase rotor 80u, the V-phase rotor 80v, and the W-phase rotor 80w are arranged with their phases being deviated by 60 degrees in an electrical angle (5 degrees in mechanical angle).

More specifically, the V-phase rotor 80v is fixed to the rotation shaft SF with its phase deviated by 60 degrees in electrical angle from the U-phase rotor 80u in a counterclockwise direction. The W-phase rotor 80w is fixed to the rotation shaft SF with its phase deviated by 60 degrees in electrical angle from the V-phase rotor 80v in the counterclockwise direction.

(Stator 90)

The stator 90 of the present embodiment has an identical configuration as the stator 90 of the formerly described fourth embodiment. That is, first and second stator cores 91, 92 and a coil section 93 configuring each of the stators 90u, 90v, 90w of the respective phases of the stator 90 of the present embodiment can easily be understood by understanding the description of the stator 90 of the fourth embodiment shown in FIG. 41 to FIG. 44, thus a detailed description will be omitted.

Accordingly, the U-phase, V-phase, and W-phase stators 90u, 90v, 90w each become a so-called Lundell type (clawpole type) stator with twenty-four poles that excites the first and second stator claw magnetic poles 95, 97 to magnetic poles that are different from one another at each occasion by an annular wiring 98 (coil section 93) between the first and second stator cores 91, 92. Further, as shown in FIG. 41 and FIG. 42 of the fourth embodiment, the U-phase, V-phase, and W-phase stators 90u, 90v, 90w are stacked in the axial direction to form the stator 90.

Here, like the fourth embodiment, as shown in FIG. 41 and FIG. 42, the stator 90 of the present embodiment stacks the U-phase stator 90u, the V-phase stator 90v, and the W-phase stator 90w by deviating them by 60 degrees in an electrical angle.

Further, a U-phase power voltage of a three-phase AC power is applied to the annular wiring 98 of the U-phase stator 90u, a V-phase power voltage of the three-phase AC power is applied to the annular wiring 98 of the V-phase stator 90v, and a W-phase power voltage of the three-phase AC power is applied to the annular wiring 98 of the W-phase stator 90w.

Next, the operation of the brushless motor M will be described.

Now, when a three-phase AC power voltage is applied to the stator 90, like the above embodiments, a U-phase power voltage is applied to an annular wiring 98 of the U-phase stator 90u, a V-phase power voltage is applied to an annular wiring 98 of the V-phase stator 90v, and a W-phase power voltage is applied to an annular wiring 98 of the W-phase stator 90w, respectively. Thus, a rotating magnetic field is generated in the stator 90, and the rotor 80 is rotated and driven.

Here, the stator 90 includes the three stage structure of the U-phase, V-phase, and W-phase stators 90u, 90v, 90w in correspondence with the three-phase AC power. Accordingly, the rotor 80 also includes the three stage structure of the U-phase, V-phase, and W-phase rotors 80u, 80v, 80w. Thus, in the stator and the rotor of each phase, the stator opposing the field magnet 83 along the axial direction can independently receive magnetic flux of the field magnet 83, and an increase in output can be achieved.

Further, the length D1 of the first and second rotor claw magnetic poles 85, 87 in the axial direction is shortened in the U-phase, V-phase, and W-phase rotors 80u, 80v, 80w of the three-stage structure.

Thus, the first rotor claw magnetic poles 85 of the U-phase rotor 80u and the first rotor claw magnetic poles 85 of the V-phase rotor 80v are separated from one another in the axial direction, and the second rotor claw magnetic poles 87 of the V-phase rotor 80v and the second rotor claw magnetic poles 87 of the W-phase rotor 80w are separated from one another in the axial direction. As a result, short circuiting of the magnetic flux between the first rotor claw magnetic poles 85 of the U-phase and V-phase is suppressed, and short circuiting of the magnetic flux between the second rotor claw magnetic poles 87 of the V-phase and W-phase is suppressed.

Moreover, the length D2 of the first and second stator claw magnetic poles 95, 97 in the axial direction is shortened in the U-phase, V-phase, and W-phase stators 90u, 90v, 90w of the three-stage structure.

That is, in the U-phase, V-phase, and W-phase stators 90u, 90v, 90w, each of the first stator claw magnetic poles 95 are separated from one another, and each of the second stator claw magnetic poles 97 are separated from one another. As a result, short circuiting of the magnetic flux between the first stator claw magnetic poles 95 of the different phases is suppressed, and short circuiting of the magnetic flux between the second stator claw magnetic poles 97 of the different phases is suppressed.

Further, since the first and second rotor claw magnetic poles 85, 87 of the U-phase, V-phase, and W-phase rotors 80u, 80v, 80w that are in the three-stage structure are formed in trapezoidal shape that narrows toward the distal end, the magnetic flux from the field magnets 83 are more efficiently guided to the distal end portions of the first and second magnetic pole portions 85f, 87f.

In the same manner, since the first and second stator claw magnetic poles 95, 97 of the U-phase, V-phase, and W-phase stators 90u, 90v, 90w in the three-stage structure are formed in trapezoidal shape that narrows toward the distal end, the magnetic flux from the annular wirings 98 are more efficiently guided to the distal end portions of the first and second stator-side magnetic pole portions 95h, 97h.

In this manner, since the space between specific claw magnetic poles is open, the short circuiting of the magnetic flux is suppressed, and the magnetic flux is efficiently guided to the distal end portions of the respective magnetic pole portions 85f, 87f, 95h, 97h, it becomes possible to form the brushless motor M with high torque.

Further, with respect to the U-phase, V-phase, and W-phase stators 90u, 90v, 90w of the stator 90 deviated by 60 degrees in the electrical angle in the clockwise direction, the U-phase, V-phase, and W-phase rotors 80u, 80v, 80w of the rotor 80 are deviated by 60 degrees in the electrical angle in the counterclockwise direction. That is, the inclined direction relative to the axial direction formed by the deviations of the three rotors 80u, 80v, 80w when viewed in the radial direction and the inclined direction relative to the axial direction formed by the deviations of the three stators 90u, 90v, 90w when viewed in the radial direction are arranged to be opposite to one another at the opposing surfaces of the rotor 80 and the stator 90.

Thus, the first and second rotor claw magnetic poles 85, 87 of the respective phases can suitably follow the switching of the first and second stator claw magnetic poles 95, 97 by the respective phase AC currents flowing in the annular wirings 98 of the respective phases, as a result of which a suitable rotation of the rotor 80 can be realized.

Further, the first and second step portions 85d, 87d having a large cross-sectional magnetic path area are provided at the first and second rotor claw magnetic poles 85, 87. Accordingly, a magnetic resistance in the first and second step portions 85d, 87d becomes small, whereby a magnetic saturation of the magnetic flux between the first and second magnetic pole portions 85f, 87f of the first and second rotor claw magnetic poles 85, 87 and the first and second rotor core bases 84, 86 can be resolved, and the increase in the output can be achieved.

Further, since the outer circumferential surface 83d of the field magnet 83 contacts under pressure the first and second step surfaces 85e, 87e of the first and second step portions 85d, 87d respectively, an air gap that is to be the magnetic resistance can be reduced, and even a greater increase in the output can be achieved.

In addition, the field magnet 83 is sandwiched and fixed by the first rotor core base 84 and the second rotor core base 86 by the outer circumferential surface 83d of the field magnet 83 being press-fitted into the first and second step surfaces 85e, 87e of the first and second step portions 85d, 87d. Moreover, the first and second core-side columnar-shaped thick portions N1, N2 of the field magnet 83 are engaged with the first and second core-side concave portions 84d, 86d of the first and second rotor core bases 84, 86.

Accordingly, the task for positioning and fixing the field magnet 83 between the first rotor core base 84 and the second rotor core base 86 can be performed just by carrying out fitting and fixing without using a special fixing member and mechanism.

Further, the brushless motor M forms the first and second core-side columnar-shaped thick portions N1, N2 at the center portions of the field magnets 83 of the U-phase, V-phase, and W-phase rotors 80u, 80v, 80w. Thus, a brushless motor M that improves the increase in the torque can be realized.

Thus, in order to evaluate the above, two experiments were conducted.

In regards to these experiments, the length (thickness) between the annular thin portions N1a, N2a of the field magnet 83 is referred to as a basic length Ta (see FIG. 92). Further, the length that adds the length in the axial direction from a surface of the annular thin portion N1a to a surface of the first core-side columnar-shaped thick portion N1 (=Tb/2; see FIG. 92) and the length in the axial direction from a surface of the annular thin portion N2a to a surface of the second core-side columnar-shaped thick portion N2 (=Tb/2; see FIG. 92) is referred to as a protuberant length Tb.

Further, a numerical value that expresses a protuberance ratio of the protuberant length Tb relative to the basic length Ta (=Tb/Ta) in percentage is referred to as a protuberant rate P. Moreover, a numerical value that expresses a thickness occupancy ratio of the outer diameter R1 of the first and second core-side columnar-shaped thick portions N1, N2 relative to the outer diameter R0 of the field magnet 83 (=R1/R0) in percentage is referred to as a thickness occupancy rate Q.

(Experiment 1)

An experiment 1 conducted evaluation of the torque increasing amount (%) with respect to changing the thickness occupancy ratio of the outer diameter R1 relative to the outer diameter R0.

Here, the outer diameter R0 of the field magnet 83 is set constant (R0=2×31.6 mm=63.2 mm), and the protuberant rate P is set constant (83%; Ta=3 mm, Tb=2.51 mm). Further, all of experiments were conducted under the same condition except for that the outer diameter R1 of the first and second core-side columnar-shaped thick portions N1, N2 was varied.

Figure 94:
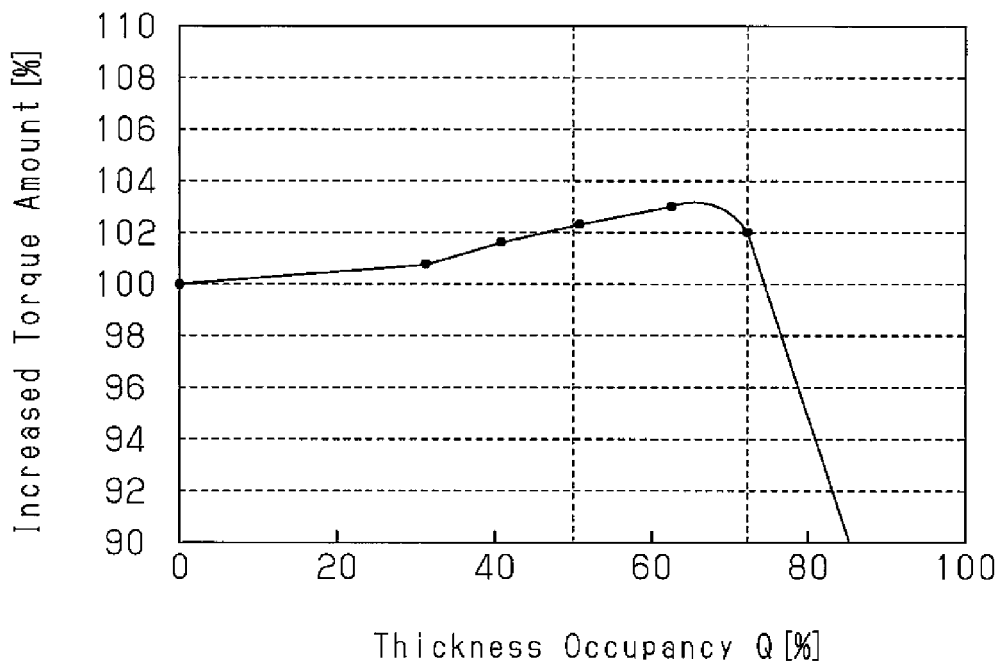
FIG. 94 is a graph showing the relationship between the thickness occupancy and the increased amount of torque.

FIG. 94 is a graph showing the torque increasing amount (%) that is empirically obtained in the case where the outer diameter R1 of the first core-side columnar-shaped thick portion N1 (second core-side columnar-shaped thick portion N2) is varied.

A horizontal axis indicates the thickness occupancy rate Q. A vertical axis indicates the torque increasing rate (%), shown by percentage with torque of the brushless motor M when the outer diameter R1 is 0, that is, when the first and second core-side columnar-shaped thick portions N1, N2 are not formed (thickness occupancy rate Q=0%) as reference (100%).

As is apparent from FIG. 94, when the thickness occupancy rate Q is 0% to 70%, the torque increasing rate (%) increases according to the increase of the thickness occupancy rate Q (the torque increasing rate becomes about 103% when the thickness occupancy rate Q is about 70%). Further, it can be understood that the torque increasing rate (%) rapidly decreases when the thickness occupancy rate Q is further increased from 70%, and the torque increasing rate (%) rapidly decreases to 100% or less when the thickness occupancy rate Q becomes 75% or more.

In this regard, the first and second core-side columnar-shaped thick portions N1, N2 are respectively engaged with the first and second core-side concave portions 84d, 86d formed on the first and second rotor core bases 84, 86. Thus, it is assumed that portions on a radially inner side of the first and second rotor cores 81, 82 that have reserves relative to magnetic saturation are effectively used as a magnetic circuit based on the first and second core-side columnar-shaped thick portions N1, N2, which leads to an increase in the output.

Accordingly, if the first and second rotor cores 81, 82 are configured so that the thickness occupancy rate Q is within 50% to 70%, it is possible to realize high torque in the motor M.

(Experiment 2)

An experiment 2 conducted evaluation the torque increasing amount (%) with respect to changing the protuberance ratio of the protuberant length Tb relative to the basic length Ta.

Here, the basic length Ta is set constant (Ta=3 mm), and the thickness occupancy rate Q is set constant (50.6%; R0=63.2 mm, R1=16. mm). Further, all of experiments were conducted under the same condition except for that the protuberant length Tb was varied.

Figure 95:
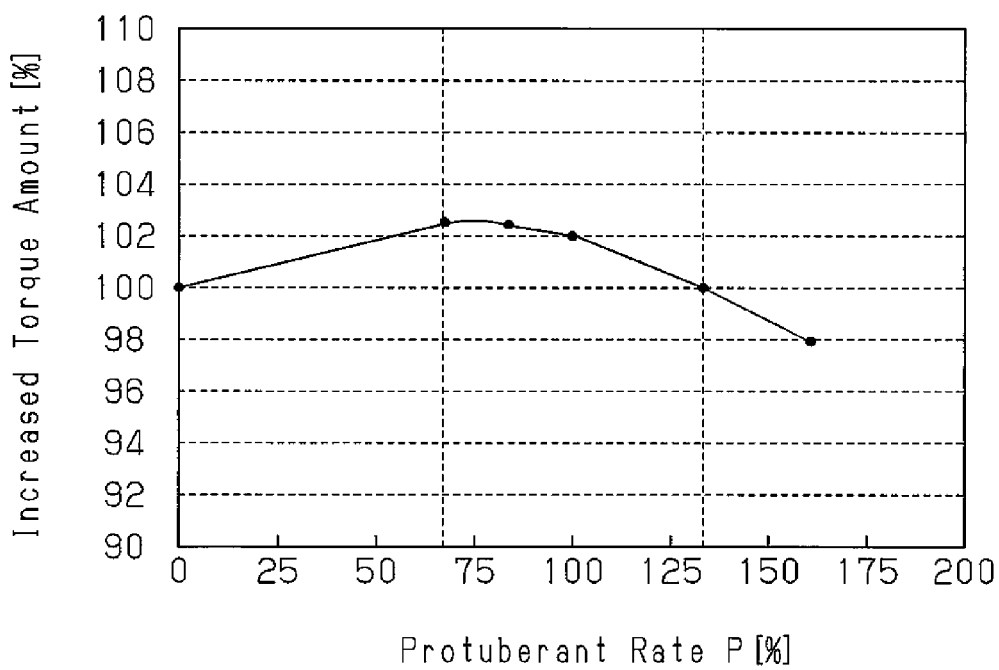
FIG. 95 is a graph showing the relationship of the protuberant rate and the increased amount of torque.

FIG. 95 is a graph showing the torque increasing amount (%) that is empirically obtained in the case where the protuberant length Tb is varied.

A horizontal axis indicates the protuberant rate P. A vertical axis indicates the torque increasing rate (%), shown by percentage with torque of the brushless motor M when the protuberant length Tb is 0, that is, when the first and second core-side columnar-shaped thick portions N1, N2 are not formed (protuberant rate P=0%) as reference (100%).

As is apparent from FIG. 95, when the protuberant rate P is 0% to 70%, the torque increasing rate (%) increases according to the increase of the protuberant rate P (the torque increasing rate becomes maximum at about 102.5% when the protuberant rate P is about 70%). Further, it can be understood that the torque increasing rate (%) decreases when the protuberant rate P is further increased from about 70%, and the torque increasing rate (%) rapidly decreases to 100% or less when the protuberant rate P becomes about 133% or more.

This is, similar to the experiment 1, assumed to be due to portions on the radially inner side of the first and second rotor cores 81, 82 that have reserves relative to the magnetic saturation being effectively used as a magnetic circuit based on the first and second core-side columnar-shaped thick portions N1, N2, which leads to the increase in the output.

Accordingly, if the first and second rotor cores 81, 82 are configured so that the protuberant rate P is within 65% to 133%, it is possible to realize high torque in the motor M.

In the present embodiment also, like the above embodiments, when a request to change the number of magnetic poles is made, since the U-phase, V-phase, and W-phase rotors 80u, 80v, 80w of the rotor 80 form the Lundell type structure, the number of poles can easily be changed by simply changing the number of the first and second rotor claw magnetic poles 85, 87 while maintaining the field magnets 83 in the identical structure. In the same manner, since the U-phase, V-phase, and W-phase stators 90u, 90v, 90w of the stator 90 form a claw-pole type structure, the number of poles can easily be changed simply by changing the number of the first and second stator claw magnetic poles 95, 97 while maintaining the coil sections 93 (annular wiring 98) in the identical structure.

As described above in detail, the present embodiment has the following advantages in addition to the advantages of the first to fifth embodiments.

(17) According to the present embodiment, since the first and second core-side columnar-shaped thick portions N1, N2 having the small diameter (outer diameter R1) are formed on both side surfaces 83b, 83c of each of the field magnets 83 of the U-phase, V-phase, and W-phase rotors 80u, 80v, 80w, it is possible to achieve even higher torque in the brushless motor M.

Especially, by setting the thickness occupancy rate Q to be within 50% to 70%, a brushless motor M with high torque can be realized. In the same manner, by setting the protuberant rate P to be within 65% to 133%, a brushless motor M with high torque can be realized.

In addition, in each of the field magnets 83, the torque can be adjusted to obtain high torque as desired by adjusting at least one of the thickness occupancy rate Q or the protuberant rate P, that is, by simply changing the shape of the field magnet 83, whereby a high quality output can be obtained.

(18) According to the present embodiment, the first and second core-side columnar-shaped thick portions N1, N2 of the field magnet 83 are engaged with the first and second core-side concave portions 84d, 86d of the first and second rotor core bases 84, 86. Accordingly, the task for positioning and fixing the field magnet 83 between the first rotor core base 84 and the second rotor core base 86 can be performed just by carrying out fitting and fixing without using a special fixing member and mechanism.

(19) According to the present embodiment, since each field magnet 83 is formed by one permanent magnet, so a manufacturing process of the field magnet 83 becomes easy, and an inexpensive brushless motor M can be realized.

The present embodiment may be modified as follows.

Although not specifically mentioned in the first to eighth embodiments, the stator and the rotor may be configured for example by a laminate of magnetic metal plates, or by molding of magnetic powder.

In the respective embodiments, the stators 90u, 90v, 90w of the respective phases are arranged by deviating them in the clockwise direction at a regular angle (60 degrees each in an electrical angle), and the rotors 80u, 80v, 80w of the respective phases are arranged by deviating them in the counterclockwise direction at a regular angle (60 degrees each in an electrical angle), however, no limitation is made hereto. For example, a deviation angle of the V-phase stator 90v relative to the U-phase stator 90u and a deviation angle of the W-phase stator 90w relative to the V-phase stator 90v may be made to differ. In the same manner, a deviation angle of the V-phase rotor 80v relative to the U-phase rotor 80u and a deviation angle of the V-phase rotor 80v relative to the W-phase rotor 80w may be made to differ. Further, for example, the stators 90u, 90v, 90w of the respective phases may be arranged deviated in order in the counterclockwise direction at an electrical angle, and the rotors 80u, 80v, 80w of the respective phases may be arranged deviated in order in the clockwise direction at an electrical angle.

In the first to fourth embodiments and sixth to eighth embodiments, the inclined direction relative to the axial direction as formed by the deviations of the three rotors 80u, 80v, 80w when viewed in the radial direction and the inclined direction relative to the axial direction as formed by the deviations of the three stators 90u, 90v, 90w when viewed in the radial direction are caused to be opposite to one another at the opposing surfaces of the rotor 80 and the stator 90. However, as a reference example other than the above, the inclined direction relative to the axial direction as formed by the deviations of the three rotors 80u, 80v, 80w when viewed in the radial direction and the inclined direction relative to the axial direction as formed by the deviations of the three stators 90u, 90v, 90w when viewed in the radial direction may be caused to be in the same direction as one another at the opposing surfaces of the rotor 80 and the stator 90. Further, implementation may be made without deviating the three rotors 80u, 80v, 80w and the three stators 90u, 90v, 90w. Further, implementation may be made by deviating the three stators 90u, 90v, 90w, and not deviating the three rotors 80u, 80v, 80w. Moreover, implementation may be made by not deviating the three stators 90u, 90v, 90w, and deviating the three rotors 80u, 80v, 80w.

Obviously, the outer rotor type brushless motor M shown in the fifth embodiment may similarly be modified in its implementation.

In the rotor 80 of the respective embodiments, the V-phase rotor 80v on the second stage is made to be opposite (backward) relative to the U-phase and W-phase rotors 80u, 80w on the first stage and the third stage. Thus, the magnetizing direction of the field magnet 83 of the V-phase rotor 80v becomes opposite to the magnetizing direction of the field magnets 83 of the U-phase and W-phase rotors 80u, 80w. However, no specific limitation is made hereto, and all of the rotors 80u, 80v, 80w of the respective phases may be arranged in the same direction, and the magnetizing direction of the field magnets 83 of the respective phases may be made the same.

In the second to fourth embodiments and sixth to eighth embodiments, the first and second stator claw magnetic poles 95, 97 of the respective phases are shortened by the thickness of the first and second stator core bases 94, 96 and the first and second rotor claw magnetic poles 85, 87 of the respective phases are shortened by the thickness of the first and second rotor core bases 84, 86, respectively, however, no limitation is made hereto. In brief, any configuration is acceptable so long as the first and second stator claw magnetic poles 95, 97 are configured such that a space with the length by which the short circuiting of the magnetic flux can be prevented is formed between claw magnetic poles of the different phases.

Obviously, the outer rotor type brushless motor M shown in the fifth embodiment may similarly be modified in its implementation.

In the second to fourth embodiments and sixth to eighth embodiments, implementation was made by making the first and second stator claw magnetic poles 95, 97 of the respective phases and the first and second rotor claw magnetic poles 85, 87 of the respective phases short in the axial direction, however, implementation may be made by shortening only either of them. Naturally, it goes without saying that the outer rotor type brushless motor M shown in the fifth embodiment may similarly be modified in its implementation.

In the respective embodiments, the field magnets 83 were including the ferrite magnets, however, other than this, for example, they may be neodymium magnets.

In the fourth and sixth to eighth embodiments, the first and second rotor claw magnetic poles 85, 87 and the first and second stator claw magnetic poles 95, 97 were formed in the trapezoidal shape. This may be made for example as a triangle, semicircle, semi-oval, or other polygonal shape, that is, a shape that narrows toward the distal end portion.

In the fourth and sixth to eighth embodiments, the first and second rotor base portions 85g, 87g of the first and second rotor claw magnetic poles 85, 87 and the first and second stator base portions 95g, 97g of the first and second stator claw magnetic poles 95, 97 were formed in the trapezoidal shape. This may be made for example as a rectangular shape instead of the trapezoidal shape that narrows toward the distal end. Further, implementation may be made by making only the first and second rotor-side magnetic pole portions 85h, 87h and the first and second stator-side magnetic pole portions 95h, 97h in the trapezoidal shape. Naturally, it goes without saying that implementation may be made by making only the first and second rotor-side magnetic pole portions 85h, 87h and the first and second stator-side magnetic pole portions 95h, 97h be in a shape that narrows toward the distal end portion such as a triangle or a semicircle.

Obviously, the outer rotor type brushless motor M shown in the fifth embodiment may similarly be modified in its implementation.

In the third embodiment and the sixth embodiment, the first and second step portions 85d, 87d were respectively provided in the first and second rotor claw magnetic poles 85, 87. It goes without saying that the first and second step portions 85d, 87d may be adapted to the fourth and fifth embodiments.

In the first to fifth embodiments, the present invention was implemented in the brushless motor M that has the three-stage structure of the single motors Ma, the present invention may be adapted to a brushless motor having only one single motor Ma, a brushless motor having a two stage structure of the single motors Ma, or in a brushless motor having a structure including four or more stages of the single motors Ma.

In the fourth embodiment, the method of manufacturing the rotor core material 101 of the inner type rotor 80 and the stator core material 102 of the outer type stator 90 was described. It goes without saying that this may be adapted to a method of manufacturing a rotor core material of an outer type rotor and a stator core material 102 of an inner type stator.

In the first to fifth embodiments and the seventh and eighth embodiments, a gap CG may be provided between the U-phase motor unit Mu and the V-phase motor unit Mv, and a gap CG may be provided between the V-phase motor unit Mv and the W-phase motor unit Mw, similar to the sixth embodiment.

In the sixth embodiment, the first and second circuit boards 155, 156 were provided in the gaps CG respectively, however, these first and second circuit boards 155, 156 may not be arranged in the gaps CG. Naturally, a circuit board that mounts drive control circuits of the respective phases may be provided in one of the gaps CG, and nothing may be arranged in the other gap CG.

In the sixth embodiment, the present invention was implemented in the brushless motor M having the three-stage structure of the single motors Ma, however, the present invention may be adapted to a brushless motor having a two stage structure of the single motors Ma, or in a brushless motor having a structure including four or more stages of the single motors Ma.

In the seventh embodiment, the length T2 of the field magnet 83 of the V-phase rotor 80v in the axial direction is shorter than the length T1 of the field magnet 83 of each of the U-phase and W-phase rotors 80u, 80w in the axial direction. This may be adapted to the rotor of the first to sixth embodiments.

In the first to sixth embodiments and eighth embodiment, the magnetic force of the field magnets 83 of the respective phases may be changed and adjusted as in the seventh embodiment.

In the eighth embodiment, in the respective field magnets 83 of the U-phase, V-phase, and W-phase rotors 80u, 80v, 80w, the first and second core-side columnar-shaped thick portions N1, N2 are formed respectively on both side surfaces 83b, 83c. This may for example be implemented by not forming the first and second core-side columnar-shaped thick portions N1, N2 on the both side surfaces 83b, 83c of the field magnet 83 of the V-phase rotor 80v. Thus, a balance of the flow of the magnetic flux in the first and second rotor cores 81, 82 of the rotors 80u, 80v, 80w for the respective phases can be improved, and the ripple can be reduced.

In the eighth embodiment, the respective field magnets 83 of the U-phase, V-phase, and W-phase rotors 80u, 80v, 80w have the first and second core-side columnar-shaped thick portions N1, N2 positioned respectively on both side surfaces 83b, 83c. Each of the field magnets 83 may include a columnar thick portion on only one side surface among the both side surfaces 83b, 83c.

Figure 96:
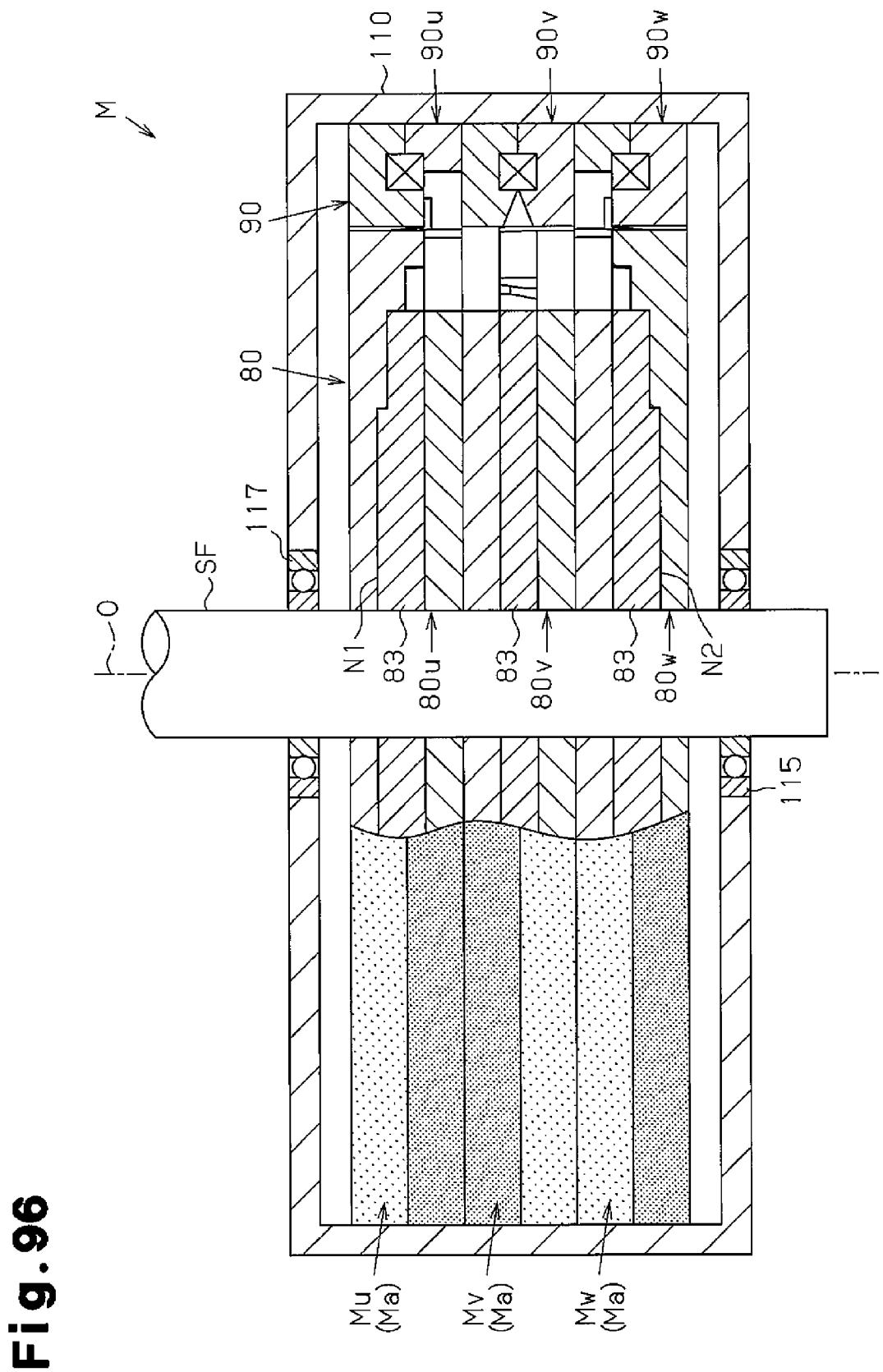
FIG. 96 is a cross-sectional view taken from a radial direction of a motor showing another example of the eighth embodiment.

Further, as shown in FIG. 96, the field magnet 83 of the U-phase rotor 80u may include only the first core-side columnar-shaped thick portion N1, and the field magnet 83 of the W-phase rotor 80w may include only the second core-side columnar-shaped thick portion N2. Further, the field magnet 83 of the V-phase rotor 80v includes the first and second core-side columnar-shaped thick portions N1, N2. The present invention may be adapted to a brushless motor M of such a configuration. In this case also, the balance of the flow of the magnetic flux of the first and second rotor cores 81, 82 of the rotors 80u, 80v, 80w for the respective phases can be improved, and the ripple can be reduced.

In the eighth embodiment, the respective field magnets 83 of the U-phase, V-phase, and W-phase rotors 80u, 80v, 80w are each formed by one permanent magnet.

Figure 97:
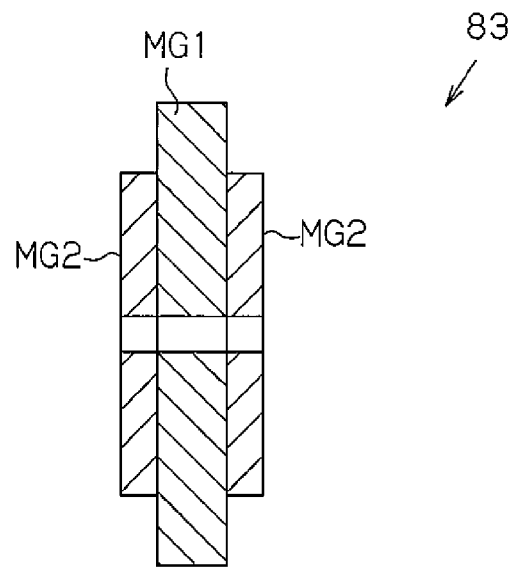
FIG. 97 is a cross-sectional view taken from a radial direction of a field magnet showing another example of the eighth embodiment.

In this regard, each field magnet 83 may be formed by overlapping second permanent magnets MG2 having a small diameter (outer diameter R1) that are formed in a disk shape on both side surfaces of a first permanent magnet MG1 having a large diameter (outer diameter R0) that is formed in a disk shape as shown in FIG. 97.

In this case, a desired output can easily be selected by the second permanent magnets MG2, or by causing the magnetic force of the first permanent magnet MG1 and the magnetic force of the second permanent magnets MG2 to be different, and a motor with a greater degree of freedom can be realized.

Further, implementation may be made by overlapping the second permanent magnet MG2 on one of the side surfaces of the large diameter first permanent magnet MG1.

Figure 98:
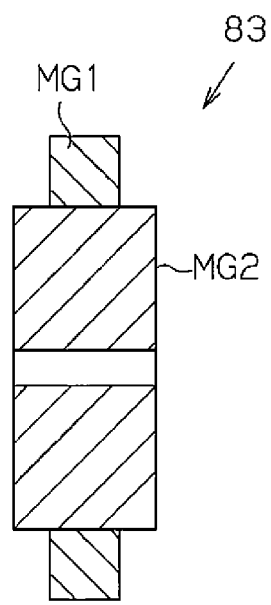
FIG. 98 is a cross-sectional view taken from a radial direction of a field magnet showing another example of the eighth embodiment.

Further, as shown in FIG. 98, each of the field magnets 83 may be made by providing the second permanent magnet MG2 formed in the disk shape, having a small diameter, and having the length in the axial direction that is longer than the length of the first permanent magnet MG1 in the axial direction relative to the first permanent magnet MG1 having a large diameter and being having the shape of an annular plate, and engaging the second permanent magnet MG2 to an inside of the first permanent magnet MG1.

In this case, the magnetic force of the first permanent magnet MG1 and the magnetic force of the second permanent magnet MG2 can be made to differ, whereby the desired output can easily be selected, and a motor with a greater degree of freedom can be realized.

The eighth embodiment was a brushless motor M having the three-stage structure of the single motors Ma, however, the present invention may be adapted to a brushless motor having a two stage structure of the single motors Ma, or in a brushless motor having a structure including four or more stages of the single motors Ma.

In the first to seventh embodiments, a thick portion may be formed at the center portion of the field magnet 83 as in the eighth embodiment.

The invention claimed is:
1. A motor comprising:
a first motor unit including a first rotor and a first stator,
a second motor unit including a second rotor and a second stator, and
a third motor unit including a third rotor and a third stator, wherein
the first motor unit, the second motor unit, and the third motor unit are arranged along an axial direction of the motor,
the second rotor is arranged deviated from the first rotor in a first circumferential direction, and the third rotor is arranged deviated from the second rotor in the first circumferential direction,
the second stator is arranged deviated from the first stator in a second circumferential direction that is opposite to the first circumferential direction, and the third stator is arranged deviated from the second stator in the second circumferential direction,
each of the first rotor, the second rotor, and the third rotor includes
a first rotor core including a first rotor core base, which has the shape of an annular plate, and a plurality of first claw magnetic poles, which are arranged at equal intervals on an outer circumferential surface of the first rotor core base,
a second rotor core including a second rotor core base, which has the shape of an annular plate, and a plurality of second claw magnetic poles, which are arranged at equal intervals on an outer circumferential surface of the second rotor core base, and
a field magnet arranged between the first and second rotor cores,
each of the plurality of first claw magnetic poles of the first rotor core includes a distal end projecting from the outer circumferential surface of the first rotor core base toward an outer side in a radial direction, wherein each of the plurality of first claw magnetic poles of the first rotor core is bent from the distal end and extended along the axial direction toward the field magnet,
each of the plurality of second claw magnetic poles of the second rotor core includes a distal end projecting from the outer circumferential surface of the second rotor core base toward an outer side in a radial direction, wherein each of the plurality of second claw magnetic poles of the second rotor core is bent from the distal end and extended along the axial direction toward the field magnet,
the plurality of first claw magnetic poles of the first rotor core and the plurality of second claw magnetic poles of the second rotor core are alternately arranged along a circumferential direction of the motor,
the field magnet is magnetized along the axial direction so that the plurality of first claw magnetic poles and the plurality of second claw magnetic poles function as different magnetic poles,
each of the first stator, the second stator, and the third stator includes
a first stator core including a plurality of first claw magnetic poles arranged at equal intervals along the circumferential direction,
a second stator core including a plurality of second claw magnetic poles arranged at equal intervals along the circumferential direction, and
a coil section arranged between the first and second stator cores and wound along the circumferential direction of the motor, the plurality of first claw magnetic poles of the first stator core and the plurality of second claw magnetic poles of the second stator core are alternately arranged along the circumferential direction of the motor, and are configured to oppose the plurality of first claw magnetic poles of the first rotor core and the plurality of second claw magnetic poles of the second rotor core, and the stator is configured so that, when the coil section is supplied with power, the plurality of first claw magnetic poles of the first stator core and the plurality of second claw magnetic poles of the second stator core become different magnetic poles and so that polarities thereof are switched.

2. The motor according to claim 1, wherein a magnetizing direction of the field magnet for the second rotor is set opposite to a magnetizing direction of the field magnets for the first rotor and the third rotor.

3. The motor according to claim 1, wherein the first and second claw magnetic poles are decreased in lengths in the axial direction so that the first and second claw magnetic poles of each motor unit and the first and second claw magnetic poles of an adjacent motor unit are separated from one another in the axial direction.

4. The motor according to claim 1, wherein each of the plurality of first claw magnetic poles of the first rotor core and each of the plurality of second claw magnetic poles of the second rotor core includes a basal end portion projecting from the outer circumferential surface of the rotor core base toward an outer side in the radial direction, and the basal end portion includes a step portion that extends in the axial direction toward the field magnet and is thicker than the rotor core base.

5. The motor according to claim 4, wherein the step portion includes a step surface located at an inner side in the radial direction, and the outer circumferential surface of the field magnet is in contact under pressure with the step surface.

6. The motor according to claim 4, wherein the step portion has a step height that is less than 40% of a length of the field magnet in the axial direction.

7. The motor according to claim 1, wherein each of the first and second claw magnetic poles of the rotor and the first and second claw magnetic poles of the stator has a tapered shape.

8. The motor according to claim 1, wherein each of the first and second claw magnetic poles of the rotor and the first and second claw magnetic poles of the stator has a trapezoidal shape.

9. The motor according to claim 1, wherein a gap is provided between the motor units that are adjacent to each other in the axial direction.

10. The motor according to claim 9, wherein a circuit board, onto which a drive control circuit that controls a power voltage supplied to the motor unit is mounted, is arranged in the gap.

11. The motor according to claim 9, wherein the gap is 0.25 mm or greater.

12. The motor according to claim 1, wherein the field magnet of at least one of the first motor unit, the second motor unit, and the third motor unit has a magnetic force that differs from that of the field magnets of the other motor units.

13. The motor according to claim 12, wherein the field magnet of the second motor unit has a length in the axial direction that is shorter than that of the field magnets of the first motor unit and the third motor unit.

14. The motor according to claim 13, wherein the field magnet of the first motor unit has a length in the axial direction that is the same as the field magnet of the third motor unit.

15. The motor according to claim 14, wherein when a ratio of the length in the axial direction of the field magnet of the second motor unit relative to the length in the axial direction of the field magnets of the first motor unit and the third motor unit is referred to as a thickness ratio, the thickness ratio is set to 0.75 or greater and less than 1.

16. The motor according to claim 1, wherein the field magnet of at least one of the first motor unit, the second motor unit, and the third motor unit includes a large diameter portion and a thick portion that serves as a small diameter portion located on at least one of two side surfaces of the field magnet in the axial direction.

17. The motor according to claim 16, wherein when a ratio of an outer diameter of the thick portion relative to an outer diameter of the large diameter portion is referred to as a thickness occupancy ratio, the thickness occupancy ratio is set to 0.5 or greater and less than 0.75.

18. The motor according to claim 16, wherein when a ratio of a length of the thick portion in the axial direction relative to a length of the large diameter portion in the axial direction is referred to as a protuberance ratio, the protuberance ratio is set to 0.65 or greater and less than 1.33.

19. A method for manufacturing a stator core and a rotor core of a motor according to claim 1, the method comprising:

preparing a single sheet of a core plate material; and punching out a stator core material and a rotor core material from the single sheet of core plate material, wherein the stator core material includes an annular stator core base and a plurality of tapered claw magnetic poles formed on an inner circumferential portion of the stator core base, the rotor core material includes a rotor core base and a plurality of tapered claw magnetic poles formed on an inner circumferential portion of the rotor core base, the rotor core base is located at an inner side of the stator core base in the one piece of core plate material, and in the one piece of core plate material, the plurality of claw magnetic poles of the stator core material and the plurality of claw magnetic poles of the rotor core material are alternately arranged in a circumferential direction.

20. The method for manufacturing a stator core and a rotor core of the motor according to claim 19, wherein each of the plurality of claw magnetic poles of the stator core material and the rotor core material has a trapezoidal shape.

* * * * *